(12) United States Patent
Hu et al.

(10) Patent No.: US 11,422,330 B2
(45) Date of Patent: Aug. 23, 2022

(54) DRIVING MECHANISM

(71) Applicant: TDK TAIWAN CORP., Taoyuan (TW)

(72) Inventors: Chao-Chang Hu, Taoyuan (TW); Bing-Ru Song, Taoyuan (TW); Yi-Ho Chen, Taoyuan (TW); Chia-Pin Hsu, Taoyuan (TW); Chih-Wei Weng, Taoyuan (TW); Shin-Hua Chen, Taoyuan (TW); Chien-Lun Huang, Taoyuan (TW); Chao-Chun Chang, Taoyuan (TW); Shou-Jen Liu, Taoyuan (TW); Kun-Shih Lin, Taoyuan (TW); Nai-Wen Hsu, Taoyuan (TW); Yu-Cheng Lin, Taoyuan (TW); Shang-Yu Hsu, Taoyuan (TW); Yu-Huai Liao, Taoyuan (TW); Yi-Hsin Nieh, Taoyuan (TW); Shih-Ting Huang, Taoyuan (TW); Kuo-Chun Kao, Taoyuan (TW); Fu-Yuan Wu, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 17/193,580

(22) Filed: Mar. 5, 2021

(65) Prior Publication Data
US 2021/0191066 A1    Jun. 24, 2021

Related U.S. Application Data

(63) Continuation of application No. 15/982,860, filed on May 17, 2018, now Pat. No. 10,969,561.
(Continued)

(30) Foreign Application Priority Data

May 10, 2018   (CN) .......................... 201810443744.9

(51) Int. Cl.
*G02B 7/04* (2021.01)
*G03B 3/02* (2021.01)
(Continued)

(52) U.S. Cl.
CPC ................. *G02B 7/04* (2013.01); *G02B 7/09* (2013.01); *G03B 3/02* (2013.01); *G03B 3/10* (2013.01);
(Continued)

(58) Field of Classification Search
CPC ... G06F 16/128; G06F 16/955; G02B 27/646; G02B 7/04; G02B 7/09;
(Continued)

(56) References Cited

U.S. PATENT DOCUMENTS

| | | | |
|---|---|---|---|
| 7,880,982 B2 * | 2/2011 | Otsuki ..................... | G03B 3/10 359/822 |
| 2011/0096178 A1 * | 4/2011 | Ryu ................... | H04N 5/23248 348/208.2 |

(Continued)

FOREIGN PATENT DOCUMENTS

| CN | 208141023 U | 11/2018 |
|---|---|---|
| TW | M285732 U | 1/2006 |

OTHER PUBLICATIONS

Examiner Report issued in corresponding IN application No. 201824018356 dated Apr. 24, 2020.
(Continued)

*Primary Examiner* — Naishadh N Desai
(74) *Attorney, Agent, or Firm* — Muncy, Geissler, Olds & Lowe, P.C.

(57) ABSTRACT

A driving mechanism for moving an optical element is provided, including a movable portion, a fixed portion, a driving assembly, and a first resilient element. The movable portion is for connecting the optical element. The movable
(Continued)

portion is movable relative to the fixed portion. The driving assembly drives the movable portion to move relative to the fixed portion. The first resilient element has a board structure. The movable portion is movably connected to the fixed portion via the first resilient element. The fixed portion includes a connection surface, a restricting surface, and a recessed portion. At least a portion of the first resilient element is disposed on the connection surface. The restricting surface contacts and restricts the movable portion. The recessed portion is located between the connection surface and the restricting surface, wherein the recessed portion is lower than the connection surface and the restricting surface.

20 Claims, 153 Drawing Sheets

Related U.S. Application Data

(60) Provisional application No. 62/507,478, filed on May 17, 2017.

(51) Int. Cl.
| | | |
|---|---|---|
| *H02K 41/035* | (2006.01) | |
| *G02B 7/09* | (2021.01) | |
| *G03B 3/10* | (2021.01) | |
| *H02K 33/16* | (2006.01) | |
| *G02B 27/64* | (2006.01) | |

(52) U.S. Cl.
CPC ....... *H02K 41/0356* (2013.01); *G02B 27/646* (2013.01); *G03B 2205/0069* (2013.01); *H02K 33/16* (2013.01)

(58) Field of Classification Search
CPC .... G03B 2205/0069; G03B 3/02; G03B 3/10; H02K 33/16; H02K 41/0356
See application file for complete search history.

(56) References Cited

U.S. PATENT DOCUMENTS

| | | | |
|---|---|---|---|
| 2012/0218651 A1 | 8/2012 | Onishi | |
| 2014/0022655 A1* | 1/2014 | Cheng | G02B 7/1828 359/824 |
| 2014/0049848 A1 | 2/2014 | Hsu | |
| 2015/0370034 A1 | 12/2015 | Kasuga | |
| 2016/0377881 A1* | 12/2016 | Jung | G02B 27/646 359/824 |
| 2018/0115636 A1* | 4/2018 | Hu | H04N 5/2257 |

OTHER PUBLICATIONS

Office Action issued in corresponding CN application No. 201810443744.9 dated Aug. 27, 2021 (3 pages).

\* cited by examiner

DRIVING MECHANISM

CROSS REFERENCE TO RELATED APPLICATIONS

This application is a Continuation of U.S. patent application Ser. No. 15/982,860, filed May 17, 2018 and entitled "DRIVING MECHANISM", which claims priority to U.S. Provisional Patent Application No. 62/507,478, filed on May 17, 2017, and China Patent Application No. 201810443744.9 filed on May 10, 2018.

BACKGROUND OF THE DISCLOSURE

Field of the Disclosure

The disclosure relates to a driving mechanism, and more particularly to a driving mechanism for moving an optical element.

Description of the Related Art

As technology has advanced, a lot of electronic devices (for example, cameras and smartphones) have incorporated the functionality of taking photographs and recording video. These electronic devices have become more commonplace, and have been developed to be more convenient and thin. In some electronic devices, an electromagnetic driving mechanism such as a Voice Coil Motor (VCM) is disposed therein to adjust the focus of a lens. However, owing to the miniaturization of the electronic devices, how to achieve efficient space utilization of the inner components within the driving mechanism has become an important issue.

BRIEF SUMMARY OF THE DISCLOSURE

In view of the aforementioned problems, an object of the disclosure is to provide a driving mechanism for moving an optical element. The driving mechanism includes a housing, a hollow frame, a holder, and a driving assembly. The frame is fixed to the housing and has a stop surface. The holder is movably disposed in the housing for holding the optical element. The driving assembly is disposed in the housing to drive the holder and the optical element moving along the optical axis of the optical element relative to the frame. Specifically, the stop surface is parallel to the optical axis to contact the holder and restrict the holder in a limit position.

A driving mechanism is provided for moving an optical element in another embodiment of the present disclosure. The driving mechanism includes a fixed module, a holder for holding the optical element, a driving assembly, and a resilient member. The driving assembly can drive the holder and the optical element to move relative to the fixed module. The resilient member has a connection portion, an end portion, and a narrow portion connecting the connection portion with the end portion. The connecting portion is connected to the holder, and the end portion is electrically connected to the driving assembly by soldering or welding.

A driving mechanism is provided in another embodiment of the present disclosure. The driving mechanism includes a case, a holder, and a driving module. The holder is disposed in the case for holding an optical member. The driving module is disposed in the case for driving the holder. The case is substantially quadrilateral and includes a first side and a second side, and the driving module includes a first magnetic driving component winding on a periphery of the holder, wherein the first magnetic driving component includes a first segment and a second segment, the first segment is substantially parallel to the first side, and the second segment is substantially parallel to the second side, wherein the distance between the first segment and the first side is different from the distance between the second segment and the second side.

A driving mechanism is provided in another embodiment of the present disclosure. The driving mechanism includes a base, a carrier, a driving assembly, and a damping member. The base includes a plurality of positioning members. The carrier is disposed on the base, and carries an optical member, wherein the positioning members are farther away from an optical axis of the optical member than the carrier. The damping member is disposed between the positioning members and the carrier, and is in direct contact with the positioning members and the carrier.

A driving mechanism is provided in another embodiment of the present disclosure. The driving mechanism includes a frame, a carrying base, and a drive module. The frame includes a position element connected to the upper surface of the frame. The carrying base is disposed in the frame and configured to carry an optical element, wherein the upper surface is perpendicular to an optical axis that passes through the optical element. The drive module is disposed between the frame and the carrying base, and configured to drive the carrying base to move relative to the frame.

A driving mechanism is provided in another embodiment of the present disclosure. The driving mechanism includes a frame, a carrying base, and a drive module. The carrying base is disposed in the frame, and includes a carrying body, a first stop portion, and a second stop portion. The carrying body is configured to carry an optical element. The first stop portion is disposed on the carrying body, and configured to limit the range of motion of the carrying body in a first direction. The second stop portion is disposed on the carrying body, and configured to limit the range of motion of the carrying body in the first direction.

A driving mechanism is provided in another embodiment of the present disclosure. The driving mechanism includes a carrier, an optical lens, a first electromagnetic driving assembly, a fixed portion, and a first elastic member. The carrier has a side wall, and the optical lens is disposed in the carrier. The first electromagnetic driving assembly is disposed on the carrier. The side wall is disposed between the optical lens and the first electromagnetic driving assembly, and the optical lens and the first electromagnetic driving assembly is in contact with the side wall. The first elastic member is connected to the carrier and the fixed portion. At least a portion of the first elastic member overlaps the side wall as observed from the optical axis of the optical lens.

A driving mechanism for supporting an optical member is provided in another embodiment of the present disclosure. The driving mechanism includes a base, a frame, a movable portion, a driving module, and an adhesive member. The base includes a plurality of first sidewalls, and at least one recess is formed on the first sidewalls. The frame includes a plurality of second sidewalls, and at least one opening is formed on the second sidewalls. The base and the frame can form a hollow box, and the opening corresponds to the recess. The movable portion and the driving module are disposed in the hollow box. The driving module can drive the movable portion to move relative to the base. The adhesive member is accommodated in the opening and the recess, and extended along the first sidewalls. The adhesive member is disposed between the first sidewalls and the second sidewalls, and the first and second sidewalls are parallel to the optical axis of the optical member.

A driving mechanism for moving an optical element is provided in another embodiment of the present disclosure. The driving mechanism includes a driving module for moving an optical element. The driving module includes a housing, a frame, a holder, and a driving assembly. The frame is fixed to the housing and forms a depressed surface adjacent to the housing. Specifically, the depressed surface faces the housing and is not in contact with the housing. The holder is movably disposed in the housing for holding the optical element. The drive assembly is disposed in the housing to drive the holder and the optical element to move relative to the frame.

A driving mechanism for moving an optical element is provided, including a movable portion, a fixed portion, a driving assembly, and a first resilient element. The movable portion is for connecting the optical element. The movable portion is movable relative to the fixed portion. The driving assembly drives the movable portion to move relative to the fixed portion. The first resilient element has a board structure. The movable portion is movably connected to the fixed portion via the first resilient element. The fixed portion includes a connection surface, a restricting surface, and a recessed portion. At least a portion of the first resilient element is disposed on the connection surface. The restricting surface contacts and restricts the movable portion. The recessed portion is located between the connection surface and the restricting surface, wherein the recessed portion is lower than the connection surface and the restricting surface.

BRIEF DESCRIPTION OF THE DRAWINGS

The disclosure can be more fully understood by reading the subsequent detailed description and examples with references made to the accompanying drawings, wherein:

FIG. 1-2 is a schematic view of the lens module 1-10 in FIG. 1-1 after assembly with the optical element 1-E removed.

FIG. 1-3 is a cross-sectional view taken along line 1A1-1A1 in FIG. 1-2.

FIG. 1-4 is a schematic view of the driving mechanism of FIG. 1-2 with the housing 1-H removed.

FIGS. 1-5 and 1-6 are schematic views of the frame 1-F in FIG. 1-4.

FIG. 1-7 is a schematic view of the driving mechanism in FIG. 1-2 with the housing 1-H and the circuit board 1-P removed.

FIG. 1-8 is a cross-sectional view taken along line 1A2-1A2 in FIG. 1-2.

FIG. 1-9 is a cross-sectional view taken along line 1A3-1A3 in FIG. 1-2.

FIG. 2-1 is an exploded view of a driving mechanism in accordance with an embodiment of the disclosure.

FIG. 2-2 is a schematic view of the driving assembly in FIG. 2-1 after assembly.

FIG. 2-3 is a cross-sectional view taken along the line 2A1-2A1 in FIG. 2-2.

FIG. 2-4 is a schematic view of one of the lower springs 2-S2 in FIG. 2-1.

FIG. 2-5 is a schematic view showing relative position of the two lower springs 2-S2 and the base 2-B in FIG. 2-1 after assembly.

FIG. 2-6 is a top view of the lower springs 2-S2, the base 2-B, the holder 2-R, and the coil 2-C in FIG. 2-1 after assembly.

FIG. 2-7 is a partial enlarged view of the lower spring 2-S2, the base 2-B, the holder 2-R, and the coil 2-C after assembly.

FIG. 2-8 is a cross-sectional view taken along the line 2A2-2A2 in FIG. 2-6.

FIG. 2-9 is a schematic view of a lower spring 2-S2 in accordance with another embodiment of the disclosure.

FIG. 2-10 is an exploded view showing a holder 2-R, a coil 2-C, a wire 2-W, two lower springs 2-S2, a base 2-B, and two conductive pins 2-P in accordance with another embodiment of the disclosure FIG. 2-11 is a schematic view of the holder 2-R, the coil 2-C, the wire 2-W, the lower springs 2-S2, the base 2-B, and the conductive pins 2-P in FIG. 2-10 after assembly.

FIG. 2-12 is a partial enlarged view of the holder 2-R, the coil 2-C, the wire 2-W, the lower spring 2-S2, and the base 2-B in FIG. 2-11.

FIG. 2-13 is a partial enlarged view showing a corner of the base 2-B.

FIG. 2-14 is an enlarged cross-sectional view showing a column 2-B1 of the base 2-B extended through the lower spring 2-S2.

FIG. 2-15 is a partial enlarged view showing the holder 2-R, the coil 2-C, and the lower spring 2-S2 in FIG. 2-10 after assembly.

FIG. 2-16 is a partial enlarged view showing a holder 2-R, a coil 2-C, and a lower spring 2-S2 in accordance with another embodiment of the disclosure.

FIG. 2-17 is a schematic view of a frame 2-F in accordance with another embodiment of the disclosure.

FIG. 2-18 is a partial cross-sectional view showing a depressed portion 2-F2 of the frame 2-F in FIG. 2-17 which is spaced apart from an inner surface of a housing 2-H after assembly.

FIG. 2-19 is a partial cross-sectional view showing a recess 2-F3 of the frame 2-F in FIG. 2-17 which is spaced apart from an inner surface of a housing 2-H after assembly.

FIG. 2-20 is a schematic view of a holder 2-R, a coil 2-C, and at least one wire after assembly, in accordance with another embodiment of the disclosure.

FIGS. 2-21 and 2-22 are schematic views showing relative position of a holder 2-R and a frame 2-F of a driving mechanism after assembly, in accordance with another embodiment of the disclosure.

FIG. 3-1 is a perspective view of a driving mechanism according to an embodiment of the present disclosure.

FIG. 3-2 is an exploded view of the driving mechanism in FIG. 3-1.

FIG. 3-3 is a cross-segmental view along line 3A-3A' in FIG. 3-1.

FIG. 3-4A is a perspective view of a driving mechanism according to an embodiment of the present disclosure.

FIG. 3-4B is an exploded view of the driving mechanism in FIG. 3-4A.

FIG. 3-4C is a cross-segmental view along line 3B-3B' in FIG. 3-4A.

FIGS. 3-5A and 3-5B are top views of some components of a driving mechanism according to an embodiment of the present disclosure.

FIG. 3-5C is a top perspective view of some components of a driving mechanism according to an embodiment of the present disclosure.

FIGS. 3-6A and 3-6B are top views of some components of a driving mechanism according to an embodiment of the present disclosure.

FIG. 3-6C is a top perspective view of some components of a driving mechanism according to an embodiment of the present disclosure.

FIGS. 3-7A and 3-7B are top views of some components of a driving mechanism according to an embodiment of the present disclosure.

FIG. 3-8A is a bottom perspective view of some components of a driving mechanism according to an embodiment of the present disclosure.

FIGS. 3-8B and 3-8C are bottom perspective views of some components of a driving mechanism according to an embodiment of the present disclosure.

FIGS. 3-9A to 3-9D are flow diagrams of an assembly method of a driving mechanism according to an embodiment of the present disclosure.

FIG. 4-1 is a schematic perspective view illustrating a driving mechanism in accordance with an embodiment of the present disclosure.

FIG. 4-2 is an exploded view illustrating the driving mechanism in FIG. 4-1.

FIG. 4-3A is a cross-sectional view illustrating the driving mechanism along line 4A-4A' in FIG. 4-1.

FIG. 4-3B is a cross-sectional view illustrating the driving mechanism along line 4B-4B' in FIG. 4-1.

FIG. 4-4A is a schematic view illustrating the relative positions between a carrier and a base after assembly in accordance with an embodiment of the present disclosure.

FIG. 4-4B is an enlarged view illustrating a region 4-M in FIG. 4-4A.

FIG. 4-4C is an enlarged view illustrating the carrier and the base after assembly in accordance with another embodiment of the present disclosure.

FIG. 4-5A is a schematic perspective view illustrating the driving mechanism in accordance with another embodiment of the present disclosure.

FIG. 4-5B is a schematic perspective view illustrating interior components of the driving mechanism in FIG. 4-5A.

FIG. 4-5C is a partial cross-sectional view illustrating the driving mechanism in FIG. 4-5A.

FIG. 4-6A is a schematic perspective view illustrating the driving mechanism in accordance with another embodiment of the present disclosure.

FIG. 4-6B is a partial schematic perspective view illustrating the base in accordance with an embodiment of the present disclosure.

FIG. 4-6C is a partial schematic perspective view illustrating the base in accordance with another embodiment of the present disclosure.

FIG. 4-6D is a partial schematic perspective view illustrating the base in accordance with an embodiment of the present disclosure.

FIG. 4-7A is a partial schematic perspective view illustrating the base in accordance with another embodiment of the present disclosure.

FIG. 4-7B is a partial cross-sectional view illustrating the base in FIG. 4-7A and the housing after assembly.

FIG. 4-7C is a partial cross-sectional view illustrating the base in FIG. 4-7A and the housing after assembly in accordance with another embodiment of the present disclosure.

FIG. 4-8A is a top view illustrating a first elastic member in accordance with an embodiment of the present disclosure.

FIG. 4-8B is a top view illustrating the first elastic member after filling adhesive in accordance with an embodiment of the present disclosure.

FIG. 4-9A is a schematic perspective view illustrating the carrier and a driving coil in accordance with an embodiment of the present disclosure.

FIG. 4-9B is an enlarged view illustrating a region 4-N in FIG. 4-9A.

FIG. 4-10A is a schematic view illustrating the relative positions between the first elastic member, the second elastic member, the magnetic members, and the base after assembly in accordance with an embodiment of the present disclosure.

FIG. 4-10B is a side view illustrating the relative positions between the first elastic member, the second elastic member, and the magnetic members in FIG. 4-10A after assembly.

FIG. 4-10C is a schematic view illustrating the relative positions between the first elastic member, the second elastic member, and the base in FIG. 4-10A after assembly.

FIG. 4-10D is a schematic perspective view illustrating the positioning member in accordance with another embodiment of the present disclosure.

FIG. 5-1 is a perspective view of an electronic device in accordance with some embodiments of the disclosure.

FIG. 5-2 is a perspective view of a driving mechanism in accordance with some embodiments of the present disclosure.

FIG. 5-3 is an exploded view of the driving mechanism in accordance with some embodiments of the present disclosure.

FIG. 5-4 is a perspective view of the frame and the carrying base in accordance with some embodiments of the present disclosure.

FIGS. 5-5A to 5-5C are schematic views of the frame and the carrying base in accordance with some embodiments of the present disclosure.

FIG. 5-6 is a perspective view of a frame in accordance with some embodiments of the disclosure.

FIG. 5-7 is a top view of the frame in accordance with some embodiments of the disclosure.

FIG. 5-8 is a perspective view of a frame and a combination frame 7 in accordance with some embodiments of the disclosure.

FIG. 5-9 is a top view of the frame and the combination frame in accordance with some embodiments of the disclosure.

FIG. 5-10 is an exploded view of a driving mechanism in accordance with some embodiments of the present disclosure.

FIG. 5-11 is a perspective view of a carrying base and an elastic element in accordance with embodiments of the present disclosure.

FIG. 5-12 is a side view of the carrying base and the elastic element in accordance with embodiments of the present disclosure.

FIG. 5-13 is a top view of a frame, a carrying base and a drive module in accordance with some embodiments of the present disclosure.

FIG. 5-14 is a side view of the carrying base and the elastic element in accordance with embodiments of the present disclosure.

FIG. 5-15 is an exploded view of the frame and the carrying base in accordance with some embodiments of the present disclosure.

FIG. 5-16 is a cross-sectional view of the frame and the carrying base in accordance with some embodiments of the present disclosure.

FIG. 5-17 is an exploded view of a frame and a carrying base in accordance with some embodiments of the present disclosure.

FIG. 5-18 is a cross-sectional view of the frame and the carrying base in accordance with some embodiments of the present disclosure.

FIG. 5-19 is a schematic view of the frame and the carrying base in accordance with some embodiments of the present disclosure.

FIG. 6-1 is a perspective view of an electronic device in accordance with some embodiments of the disclosure.

FIG. 6-2 is a perspective view of a driving mechanism in accordance with some embodiments of the present disclosure.

FIG. 6-3 is an exploded view of the driving mechanism in accordance with some embodiments of the present disclosure.

FIG. 6-4 is a perspective view of the frame and the carrying base in accordance with some embodiments of the present disclosure.

FIGS. 5A to 5C are schematic views of the frame and the carrying base in accordance with some embodiments of the present disclosure.

FIG. 6-6A is a perspective view of a frame and a drive wire in accordance with some embodiments of the present disclosure.

FIG. 6-6B is a perspective view of a frame in accordance with some embodiments of the present disclosure.

FIG. 6-7 is a top view of the frame, the carrying base and the drive module in accordance with some embodiments of the present disclosure.

FIG. 6-8 is a perspective view of the carrying base and the bottom elastic element in accordance with some embodiments of the present disclosure.

FIG. 6-9 is a bottom view of the carrying base and the bottom elastic element in accordance with some embodiments of the present disclosure.

FIG. 6-10 is a perspective view of the carrying base, the bottom elastic element, and the base in accordance with some embodiments of the present disclosure.

FIG. 6-11 is a cross-sectional view of the frame, the carrying base, and the base in accordance with some embodiments of the present disclosure.

FIG. 6-12 is a cross-sectional view of the carrying base and the bottom elastic element in accordance with some embodiments of the present disclosure.

FIG. 6-13 is a perspective view of the carrying base in accordance with some embodiments of the present disclosure.

FIG. 7-1 is a schematic diagram of an electronic device according to an embodiment of the disclosure;

FIG. 7-2 is a schematic diagram of a driving mechanism according to an embodiment of the disclosure;

FIG. 7-3 is an exploded-view diagram of a driving mechanism according to an embodiment of the disclosure;

FIG. 7-4 is a schematic diagram of a first elastic member according to an embodiment of the disclosure;

FIG. 7-5 is a schematic diagram of a second elastic member according to an embodiment of the disclosure;

FIG. 7-6A is a schematic diagram of a movable portion according to an embodiment of the disclosure;

FIG. 7-6B is another schematic diagram of the movable portion according to an embodiment of the disclosure;

FIG. 7-6C is a cross-sectional view of the movable portion according to an embodiment of the disclosure;

FIG. 7-6D is an enlarged schematic diagram of a 7-S region in FIG. 7-6B;

FIG. 7-7A is a cross-sectional view along line 7A-7A in FIG. 7-2;

FIG. 7-7B is a cross-sectional view along line 7B-7B in FIG. 7-2;

FIG. 7-7C is a schematic diagram of the first elastic member and the second elastic member as observed from the optical axis of the optical lens when the driving mechanism is assembled according to an embodiment of the disclosure; and FIG. 7-7D is a schematic diagram of a lead at the end of the first electromagnetic driving assembly connected to the second elastic member with solder according to an embodiment of the disclosure.

FIG. 8-1 is a schematic diagram of an electronic device according to an embodiment of the disclosure;

FIG. 8-2 is a schematic diagram of a driving mechanism according to an embodiment of the disclosure;

FIG. 8-3 is an exploded-view diagram of a driving mechanism according to an embodiment of the disclosure;

FIG. 8-4A is a schematic diagram of a base according to an embodiment of the disclosure;

FIG. 8-4B is a partial cross-sectional view of a base according to an embodiment of the disclosure;

FIG. 8-4C is a top plan view of a base according to an embodiment of the disclosure;

FIG. 8-5 is a schematic diagram of a frame according to an embodiment of the disclosure;

FIG. 8-6 is a schematic diagram of the base joined to the frame through an adhesive member according to an embodiment of the disclosure;

FIG. 8-7 is a schematic diagram of a metal wire connected to a circuit board with solder according to an embodiment of the disclosure;

FIG. 8-8A is a schematic diagram of a base according to another embodiment of the disclosure;

FIG. 8-8B is a schematic diagram of a second electromagnetic driving assembly attached to the base with glue according to another embodiment of the disclosure;

FIG. 8-9 is a schematic diagram of a base, a movable portion, a first electromagnetic driving assembly, and a plurality of second electromagnetic driving assemblies according to another embodiment of the disclosure;

FIGS. 8-10A and 8-10B are schematic diagrams of a base according to another embodiment of the disclosure;

FIG. 8-11 is a schematic diagram of a base according to another embodiment of the disclosure;

FIG. 8-12 is a schematic diagram of a base and a plurality of second electromagnetic driving assemblies according to another embodiment of the disclosure;

FIG. 8-13A is a schematic diagram of a driving mechanism according to another embodiment of the disclosure, wherein the adhesive member has not been filled; and FIG. 8-13B is a schematic diagram of a metal wire and an elastic member according to another embodiment of the disclosure;

FIG. 9-1 is an exploded view of a lens module in accordance with an embodiment of the disclosure.

FIG. 9-2 is a schematic view of the lens module in FIG. 9-1 after assembly, wherein the optical element 9-E is removed therefrom.

Figure 1:
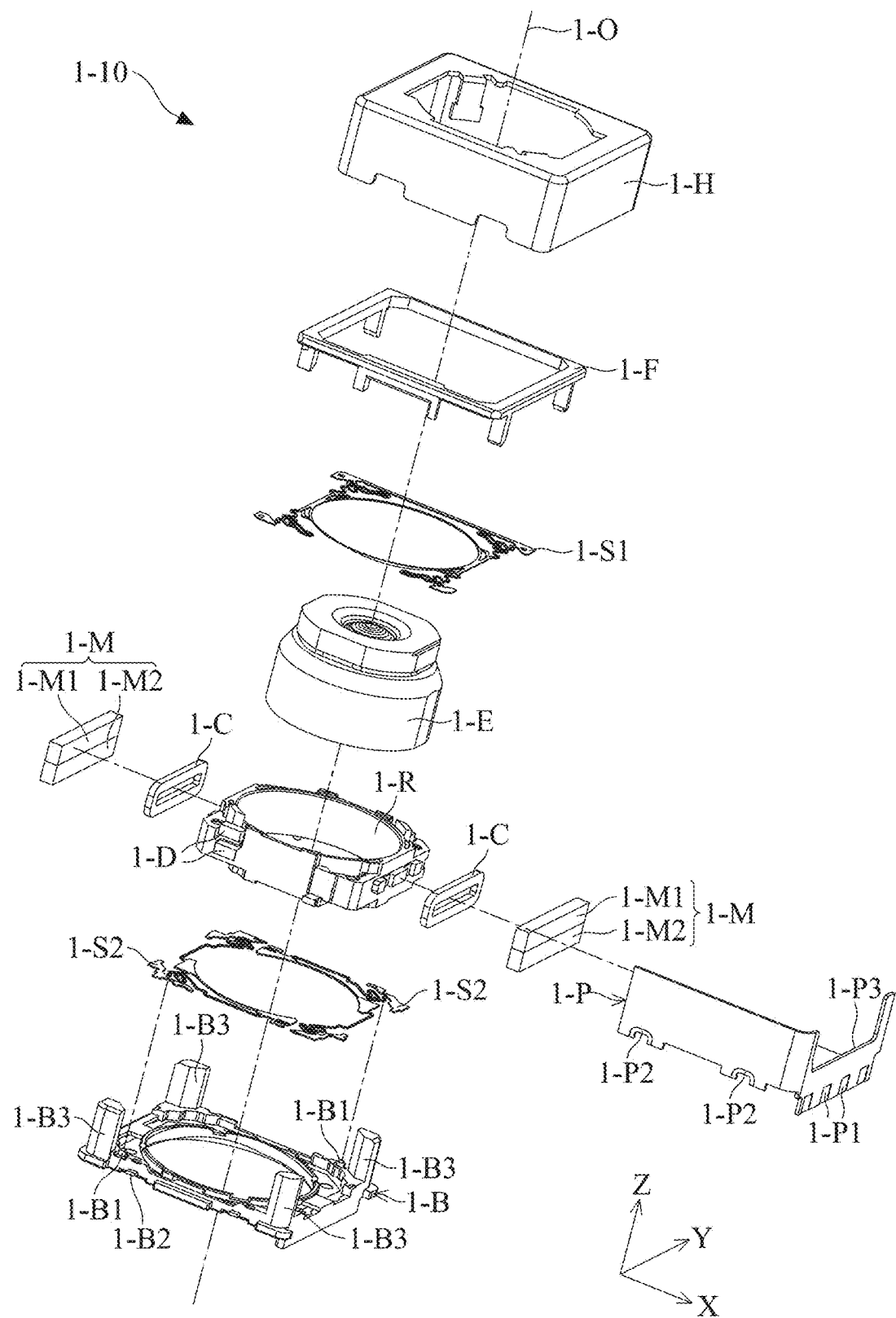
FIG. 1-1 is an exploded view of a lens module 1-10 in accordance with an embodiment of the disclosure.
Figures 1, 2:
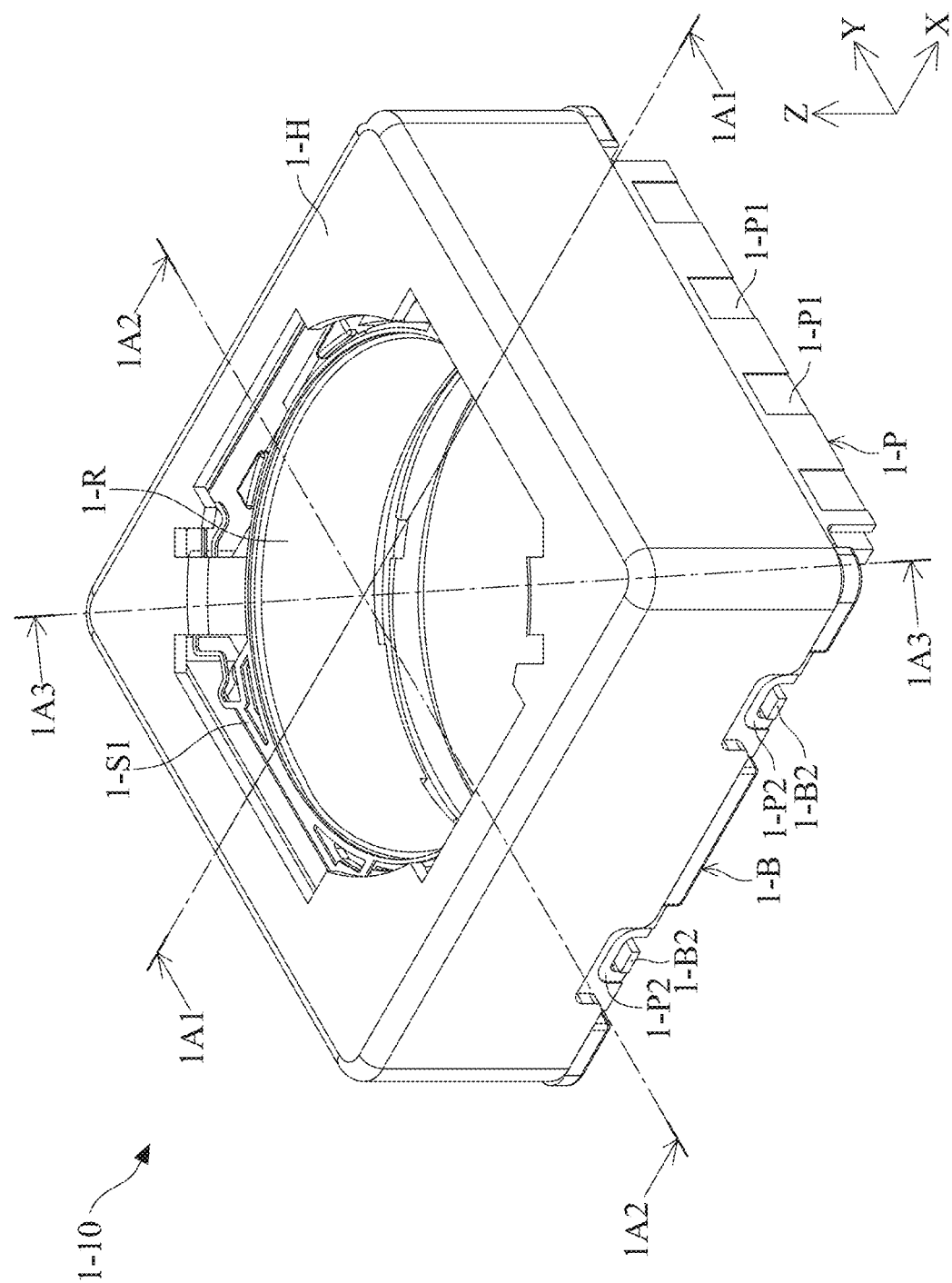
Figures 1, 2, 3:
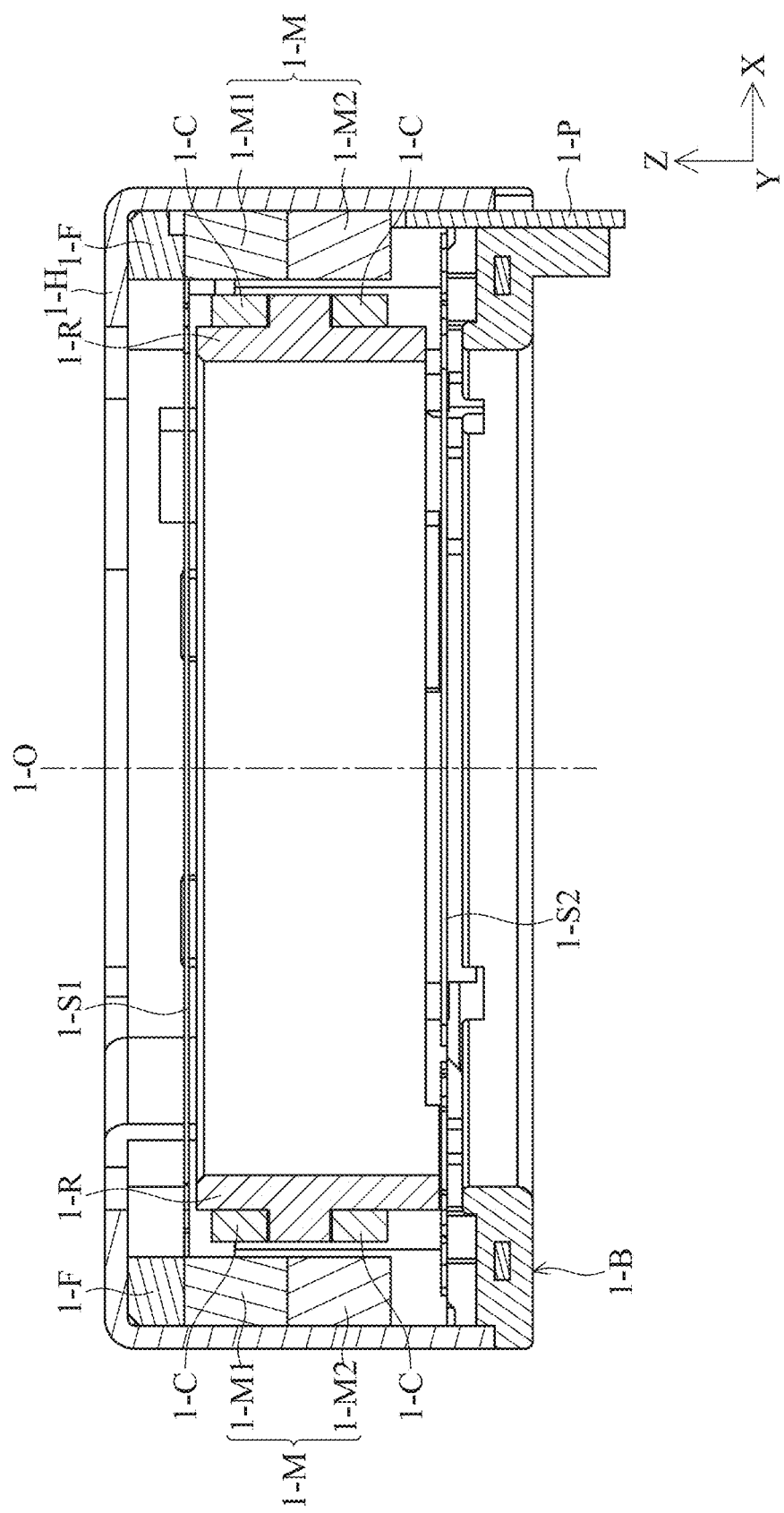
Figures 1, 2, 3, 4:
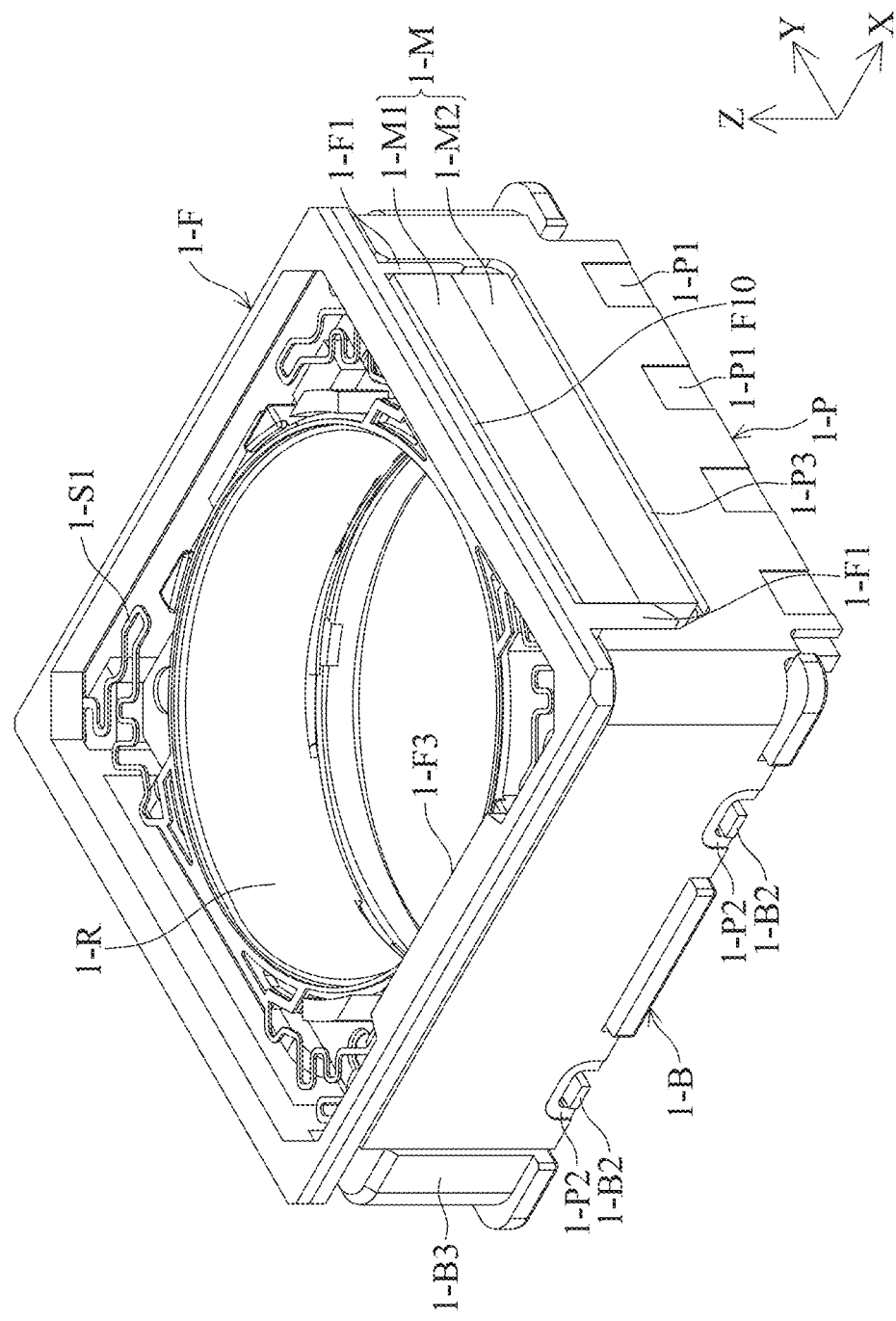
Figures 1, 2, 3, 4, 5:
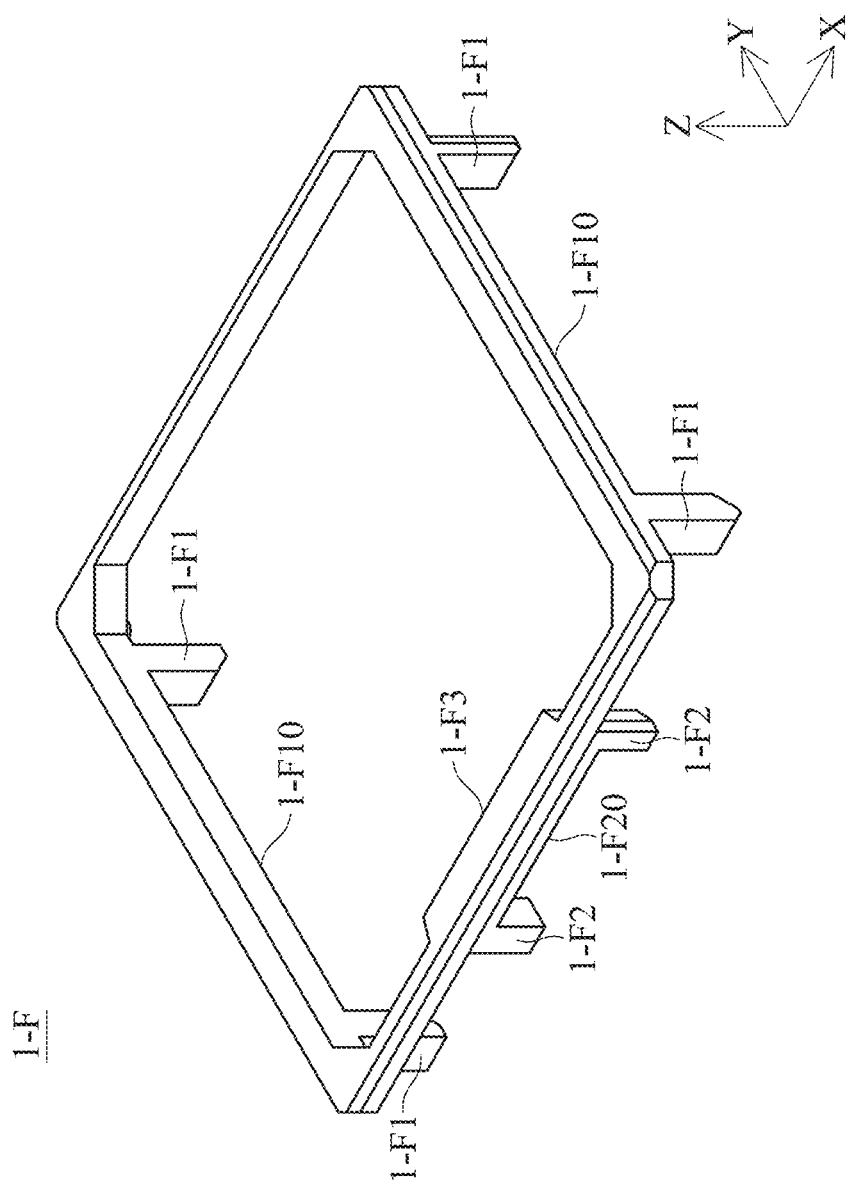
Figures 1, 2, 3, 4, 5, 6:
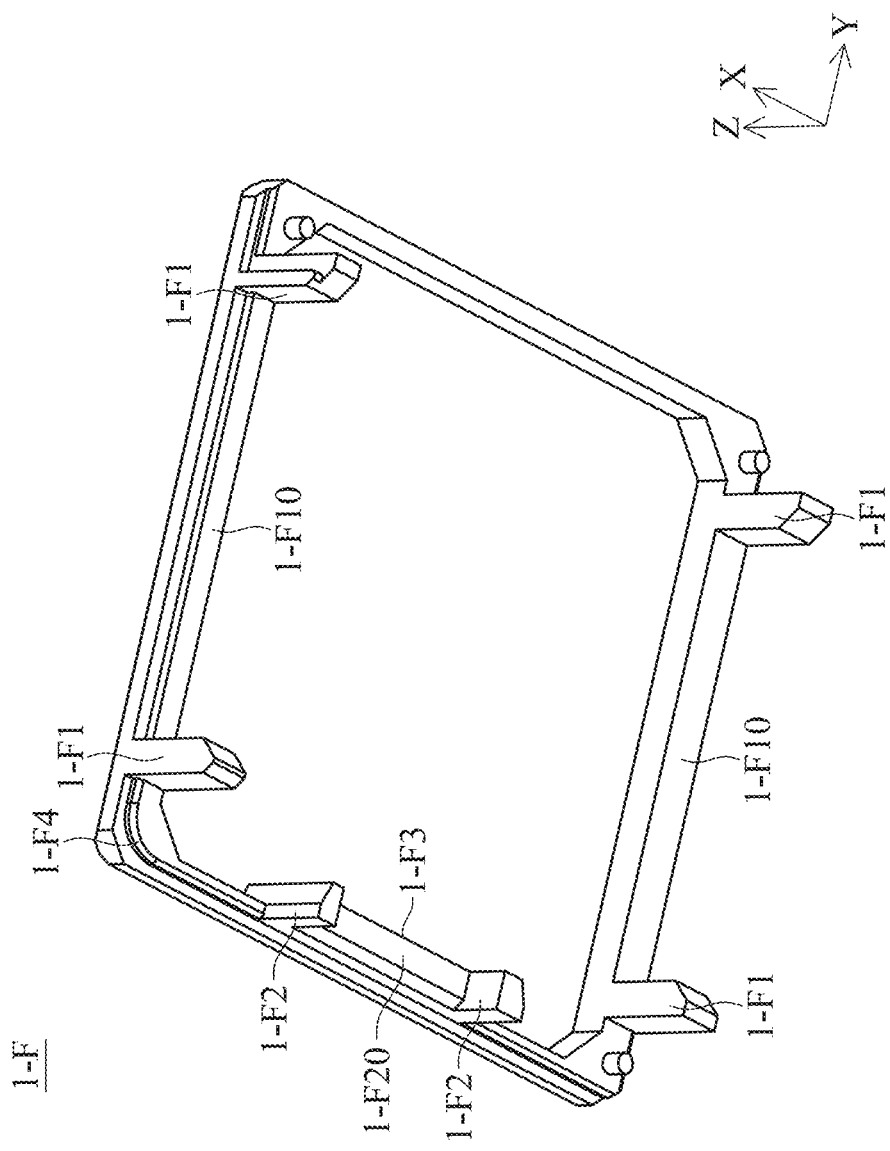
Figures 1, 2, 3, 4, 5, 6, 7:
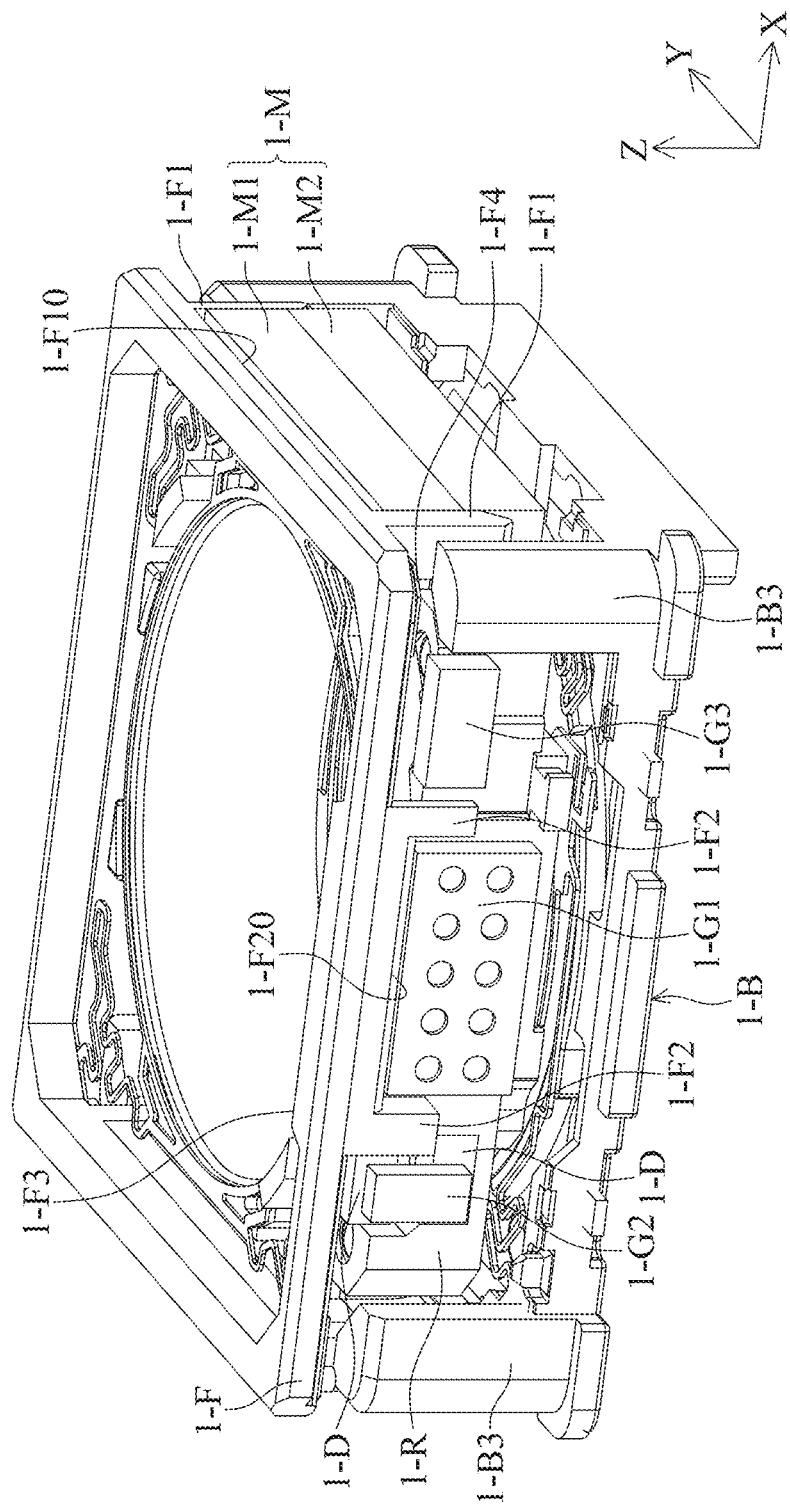
Figures 1, 2, 3, 4, 5, 6, 7, 8:
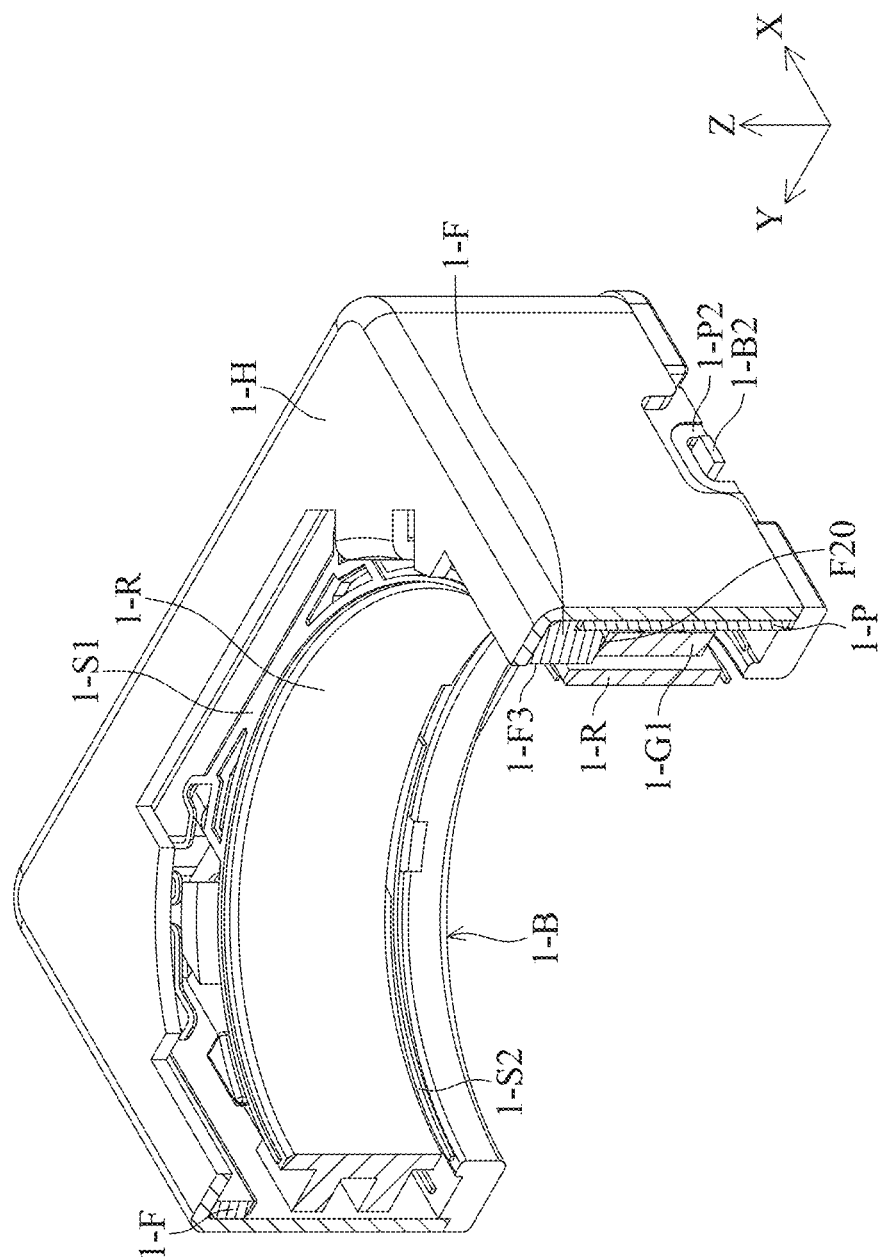
Figures 1, 2, 3, 4, 5, 6, 7, 8, 9:
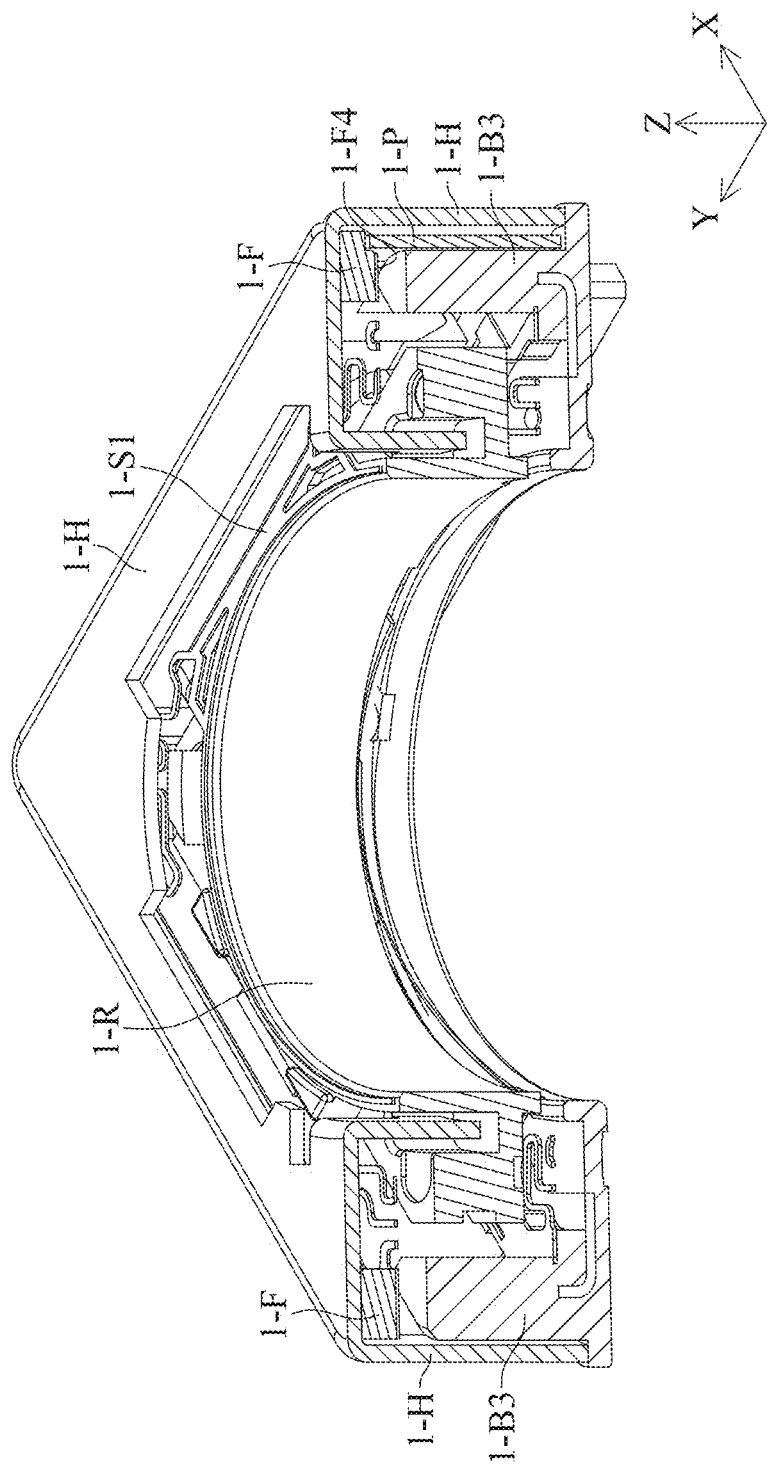

FIG. 9-3 is a cross-sectional view taken along the line 9A1-9A1 in FIG. 9-2.

FIG. 9-4 is a cross-sectional view taken along the line 9A2-9A2 in FIG. 9-2.

FIG. 9-5 is a schematic view of the driving mechanism of FIG. 9-2 with the housing 9-H removed therefrom.

Figures 1, 3:
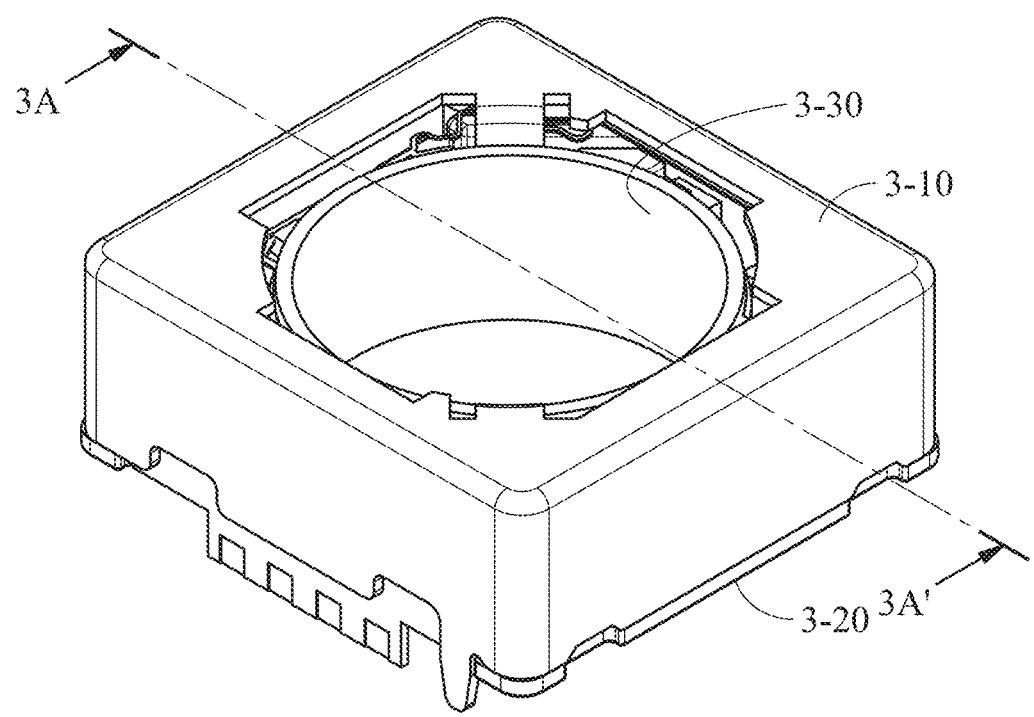
Figures 2, 3:
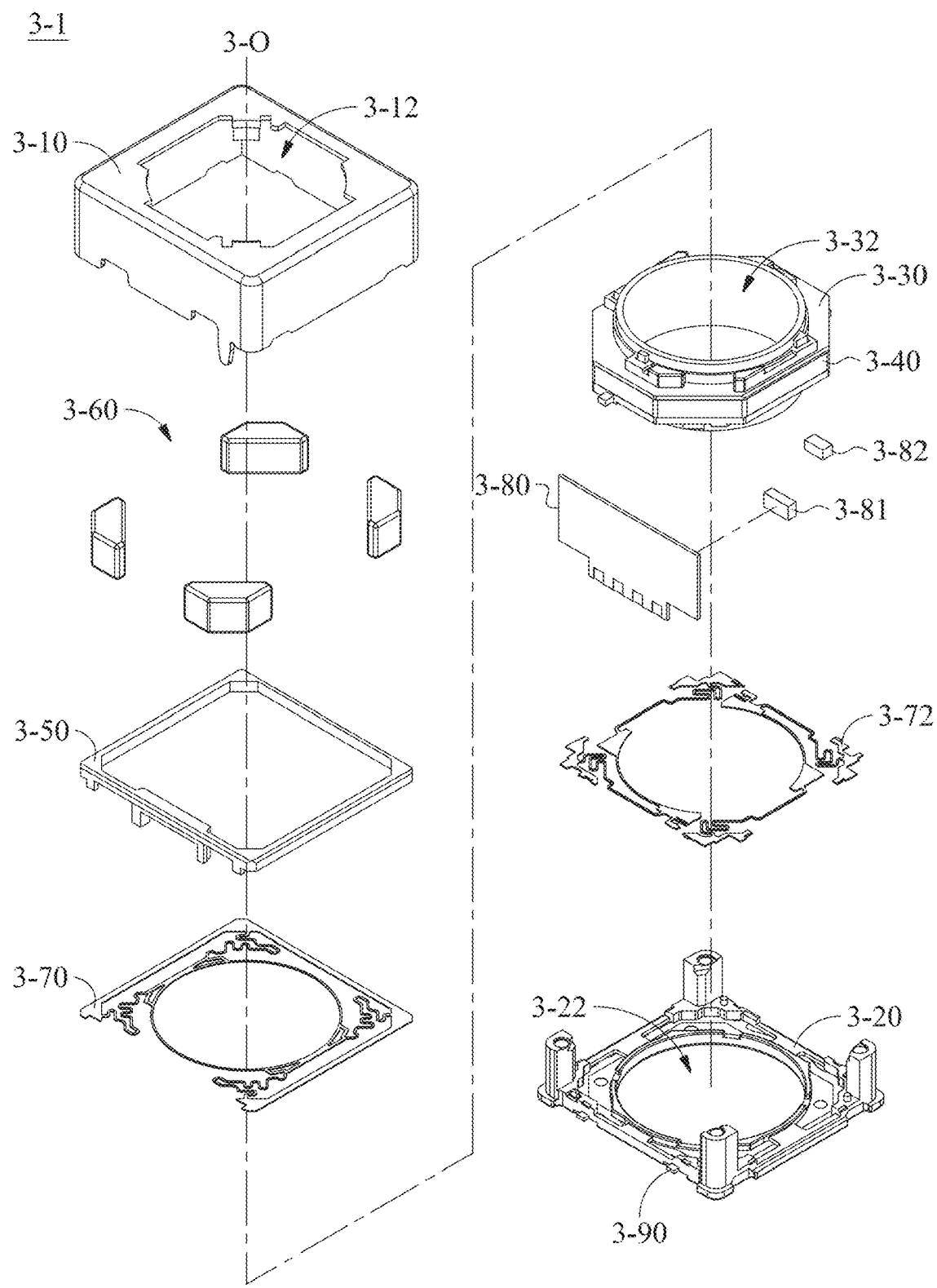
Figure 3:
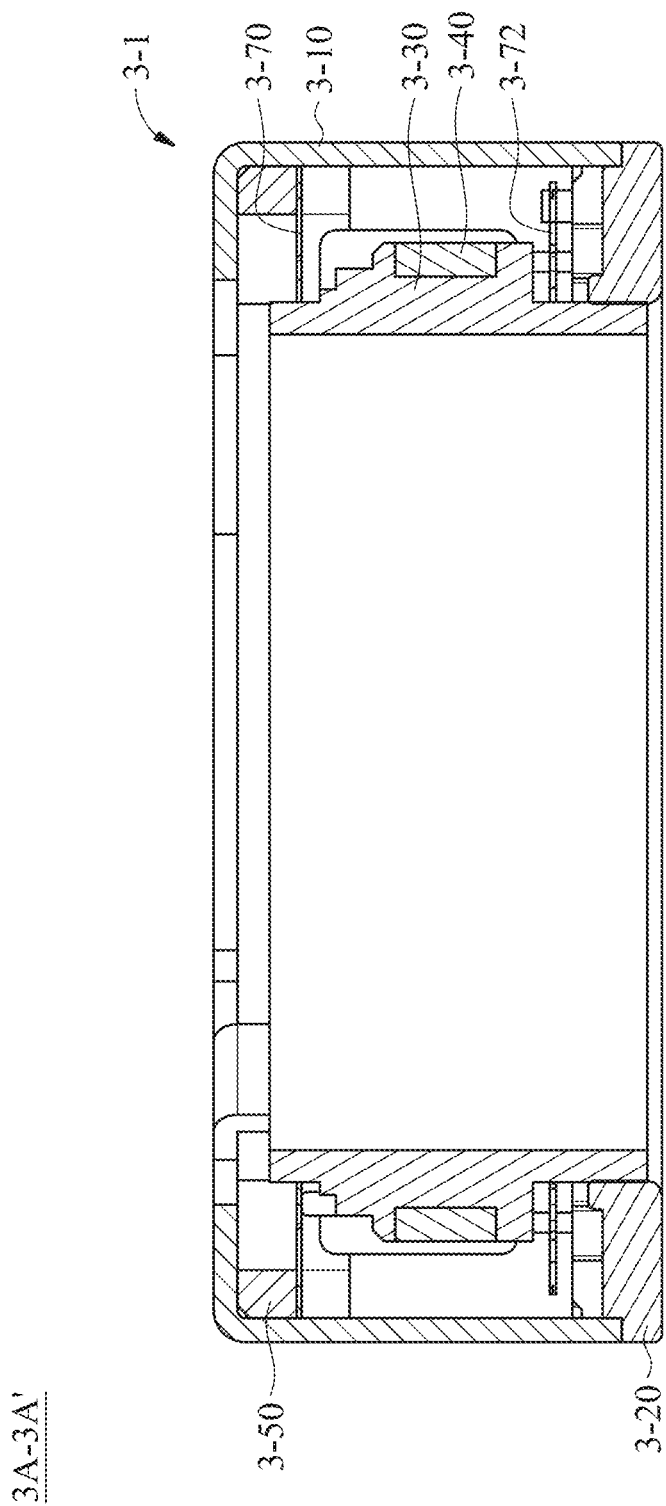
Figures 3, 4, 4A:
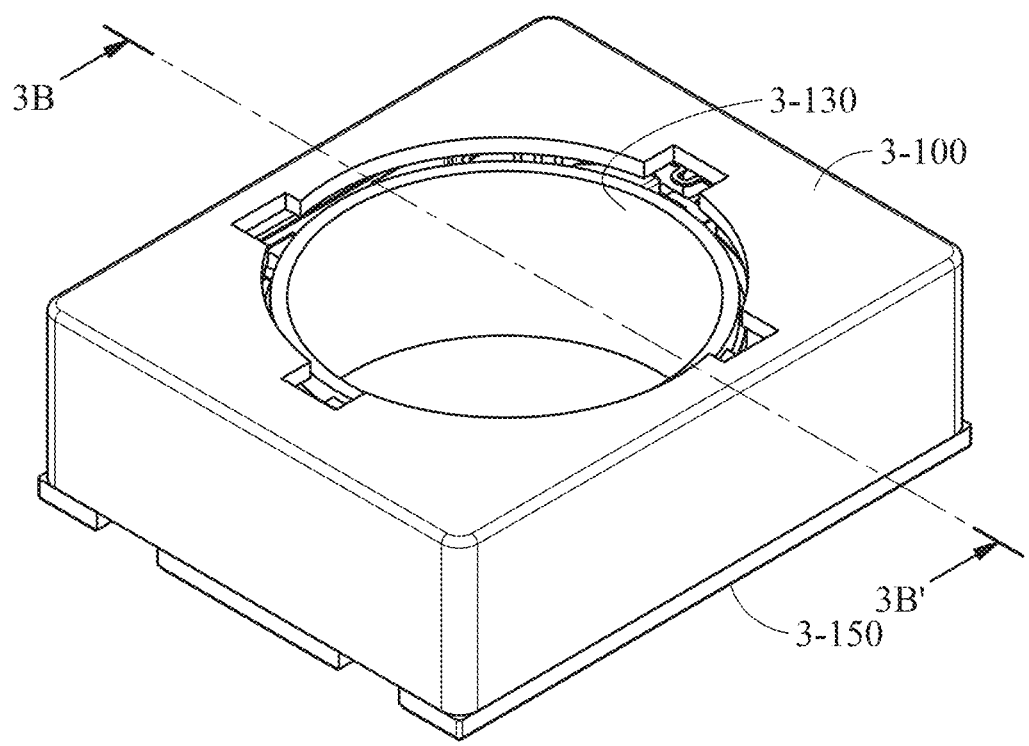
Figures 3, 4, 4B:
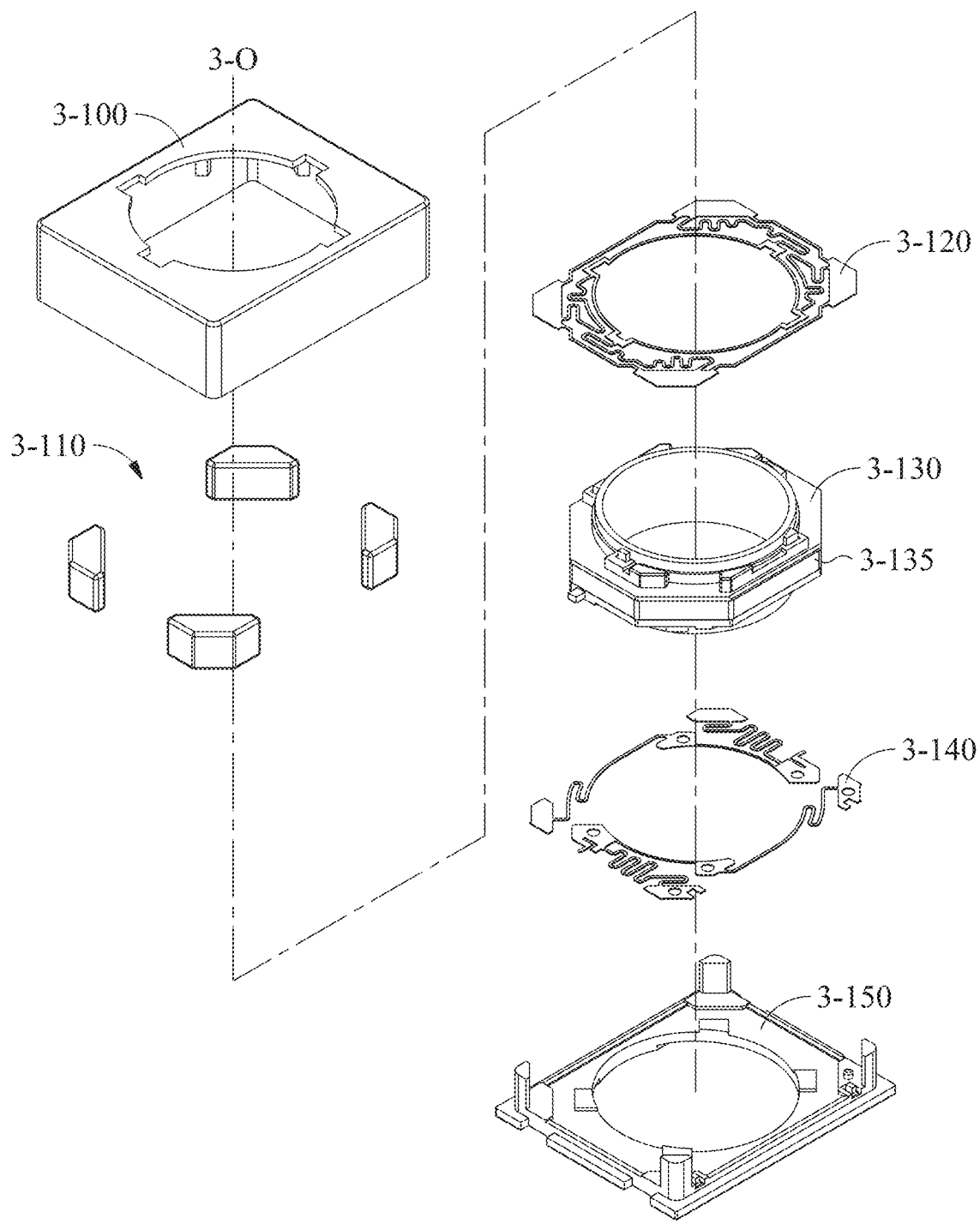
Figures 3, 4, 4C:
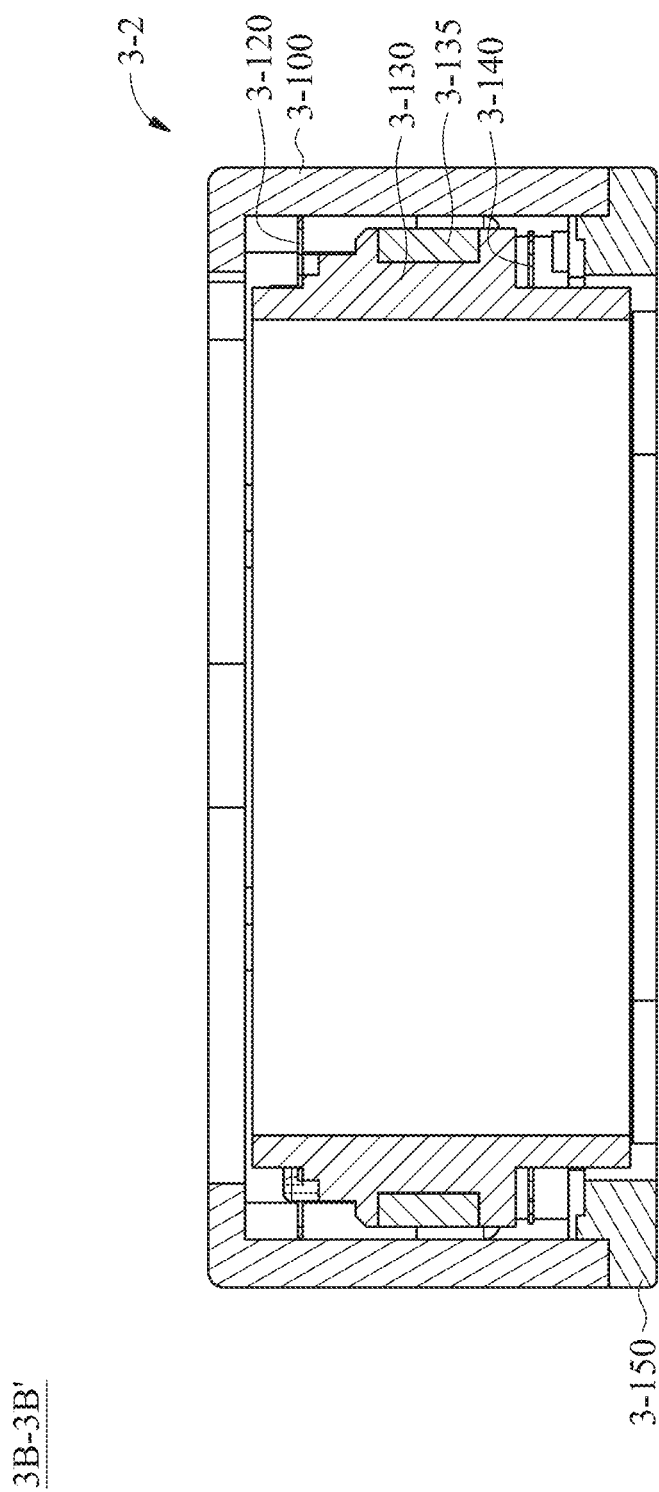
Figures 3, 4, 5, 5A:
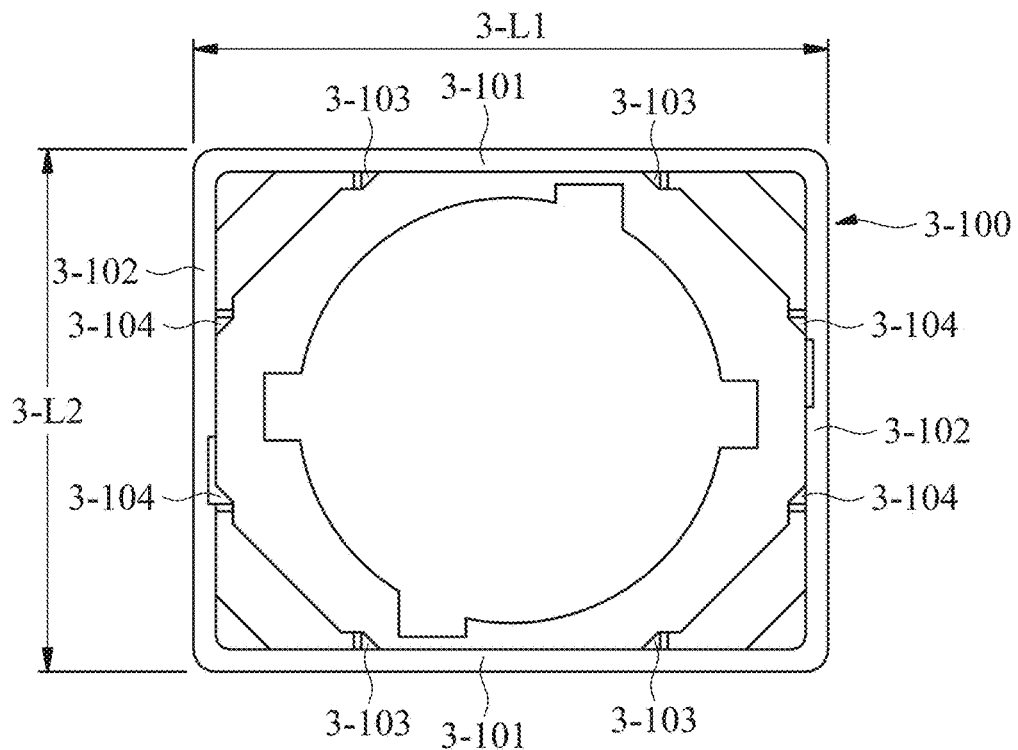
Figures 3, 4, 5, 5B:
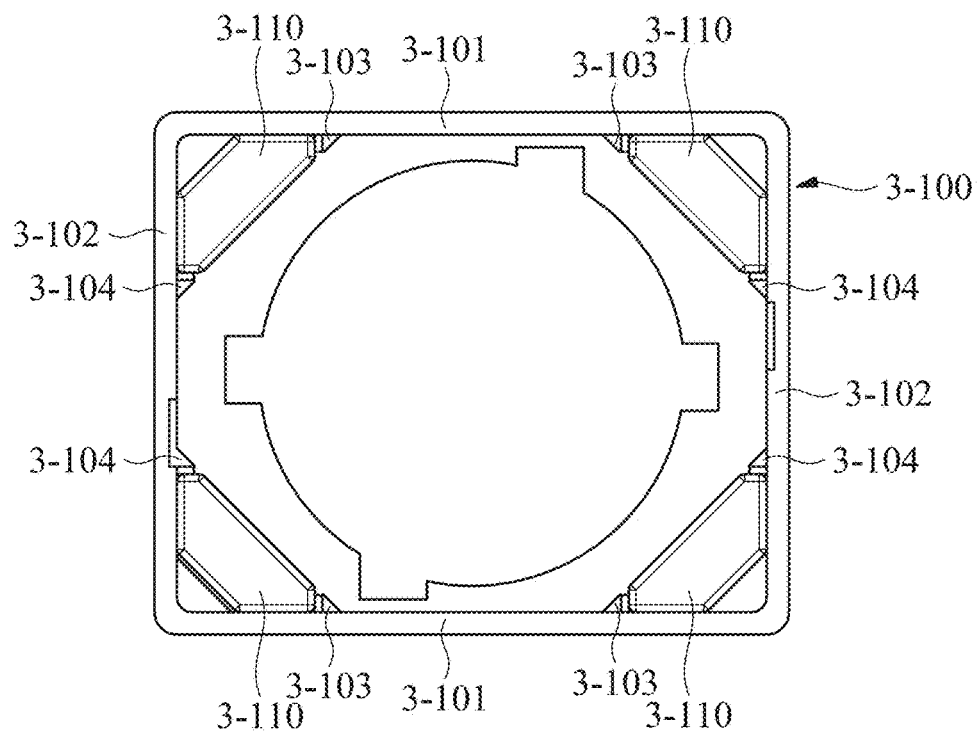
Figures 3, 4, 5, 5C:
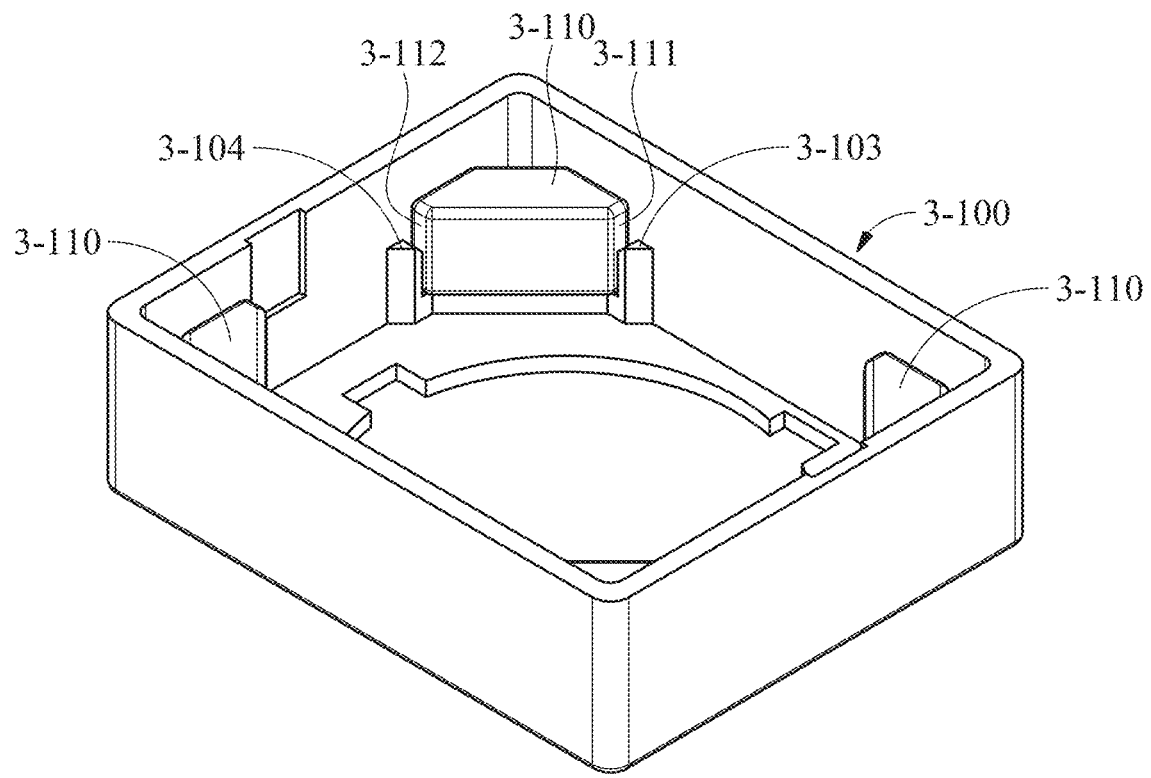
Figures 3, 4, 5, 6, 6A:
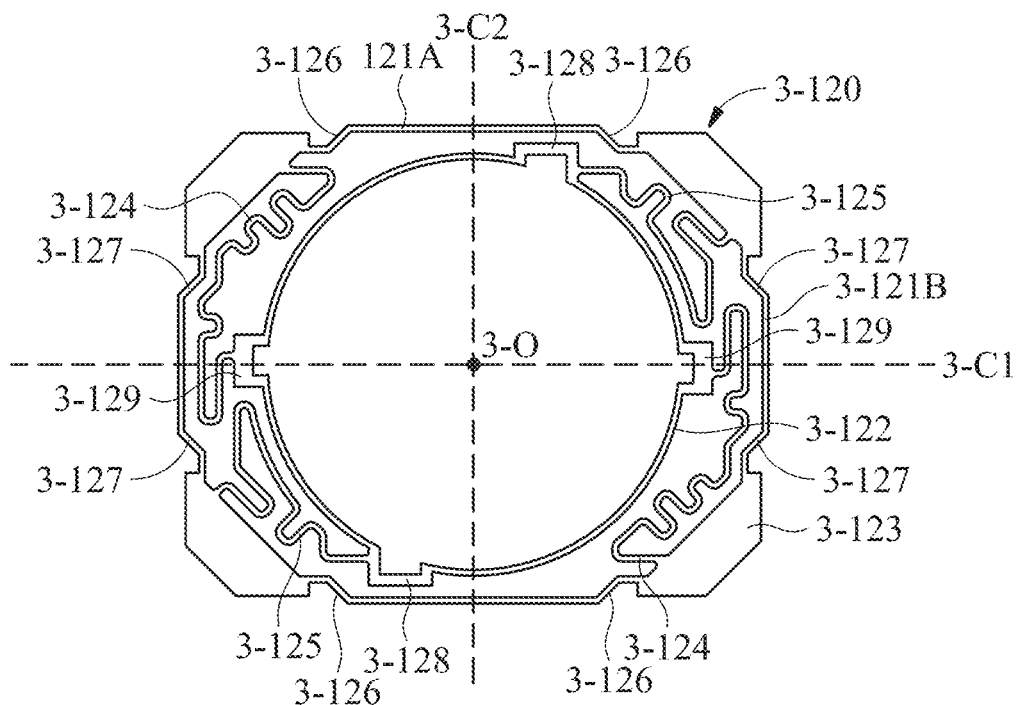

FIG. 9-6A is a schematic view showing relative position of the frame 9-F, the circuit board 9-P, and three electronic elements 9-G1 to 9-G3 after assembly.

Figures 3, 4, 5, 6, 6B:
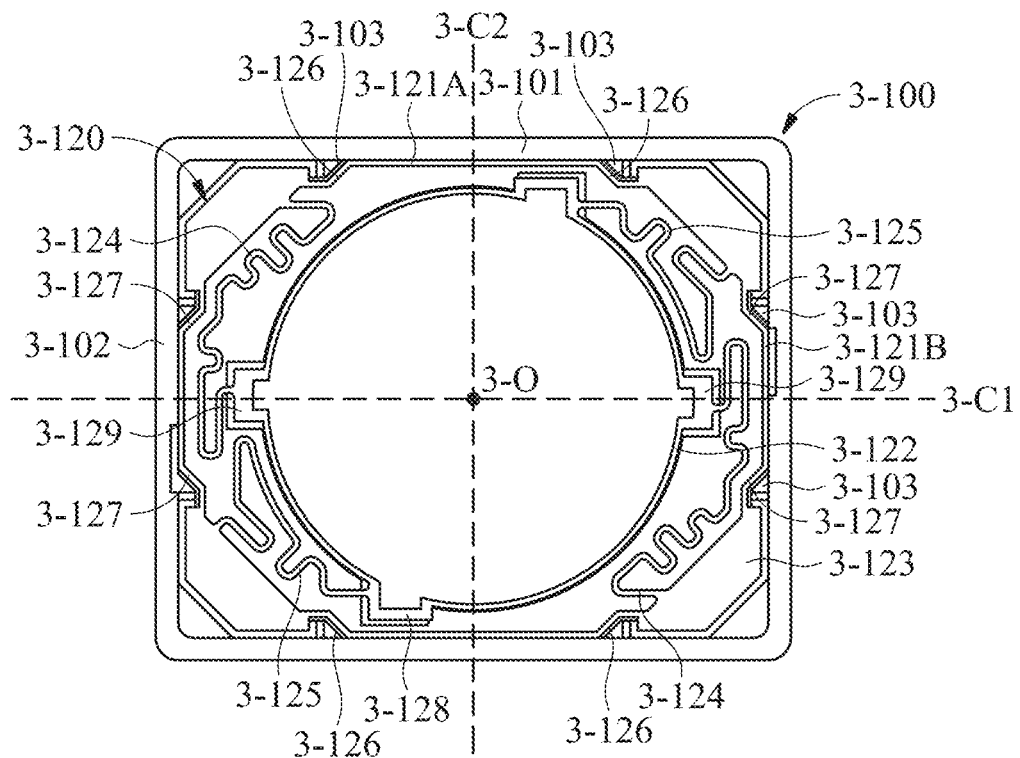

FIG. 9-6B is a cross-sectional view showing an L-shaped depressed surface 9-F32' of the frame 9-F adjacent to the housing 9-H, in accordance with another embodiment of the disclosure.

FIG. 9-7 is a schematic view showing relative position of the magnets 9-M, the coils 9-C, the holder 9-R, the circuit board 9-P, and three electronic elements 9-G1 to 9-G3 after assembly of the driving mechanism.

FIG. 9-8 is a partial cross-sectional view showing a holder 9-R and an optical element 9-E in accordance with another embodiment of the disclosure.

FIG. 9-9 is an exploded view showing a frame 9-F, two magnetic conductive members 9-Q, two magnets 9-M, a holder 9-R, and a coil 9-C in accordance with another embodiment of the disclosure.

Figures 1, 2:
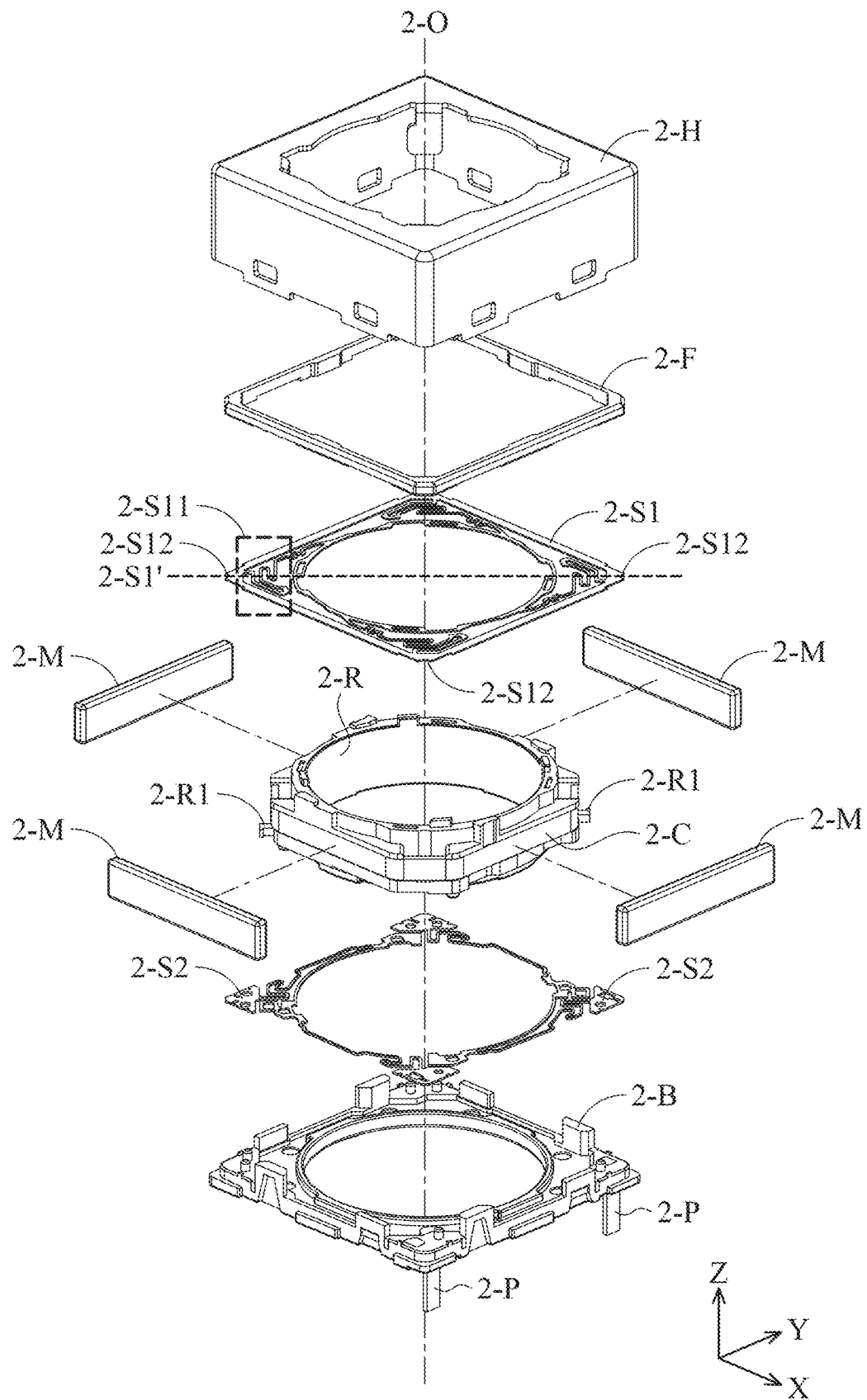
Figure 2:
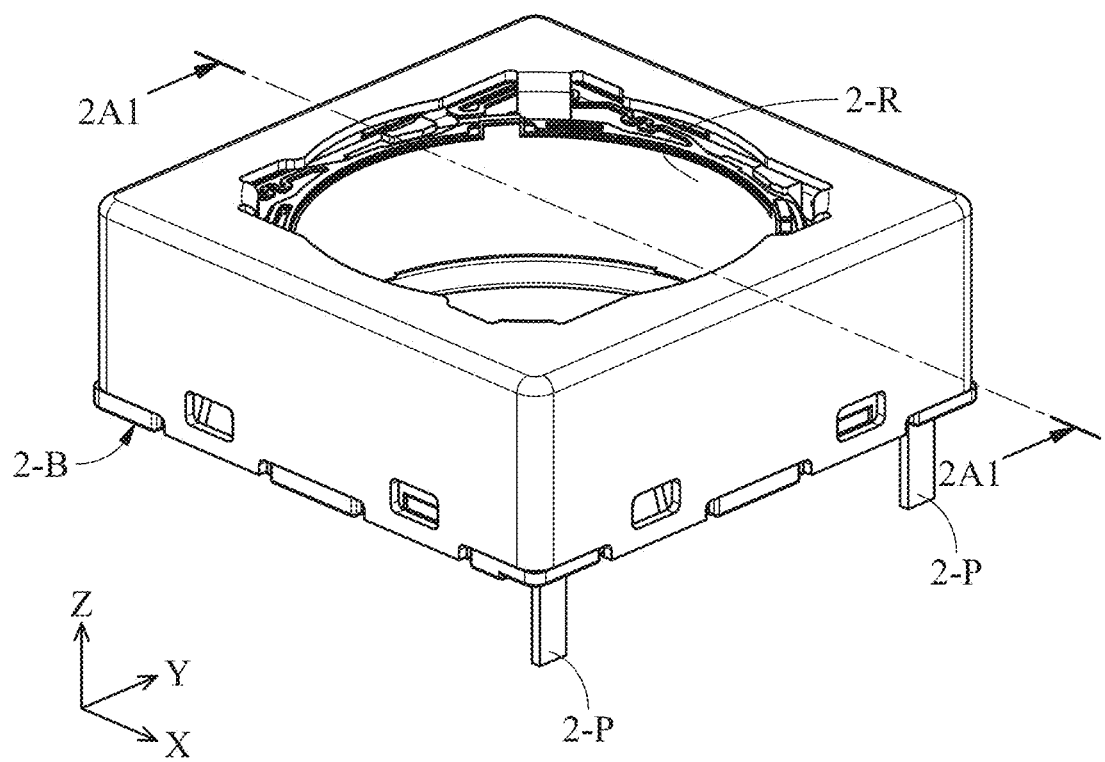
Figures 2, 3:
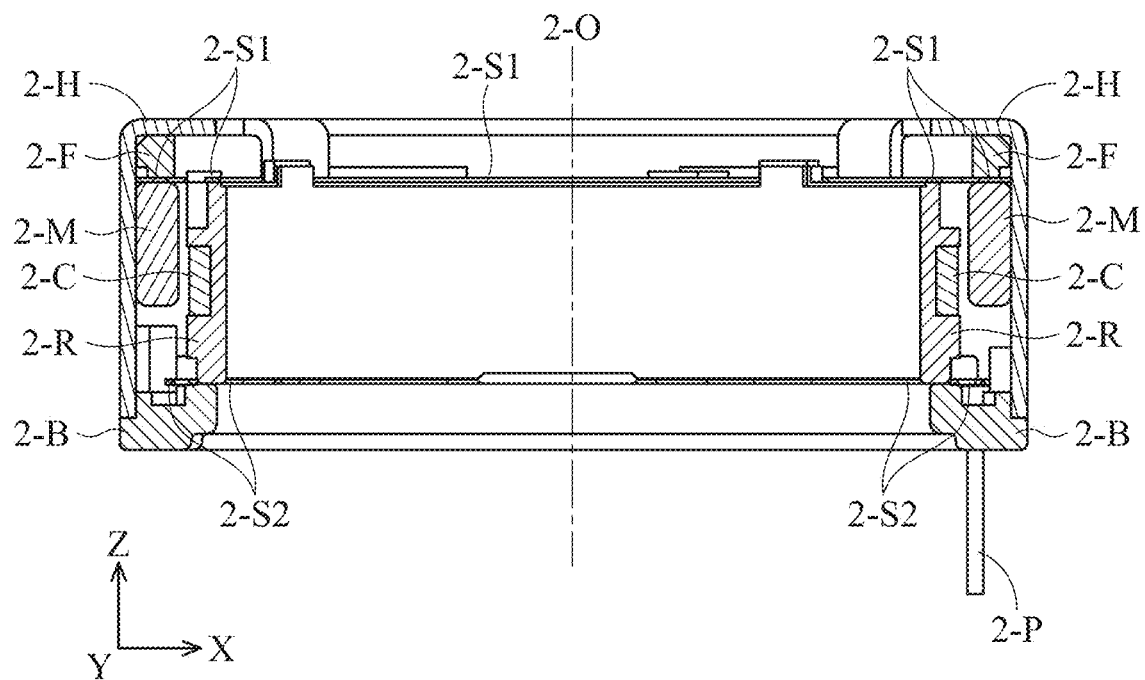
Figures 2, 3, 4:
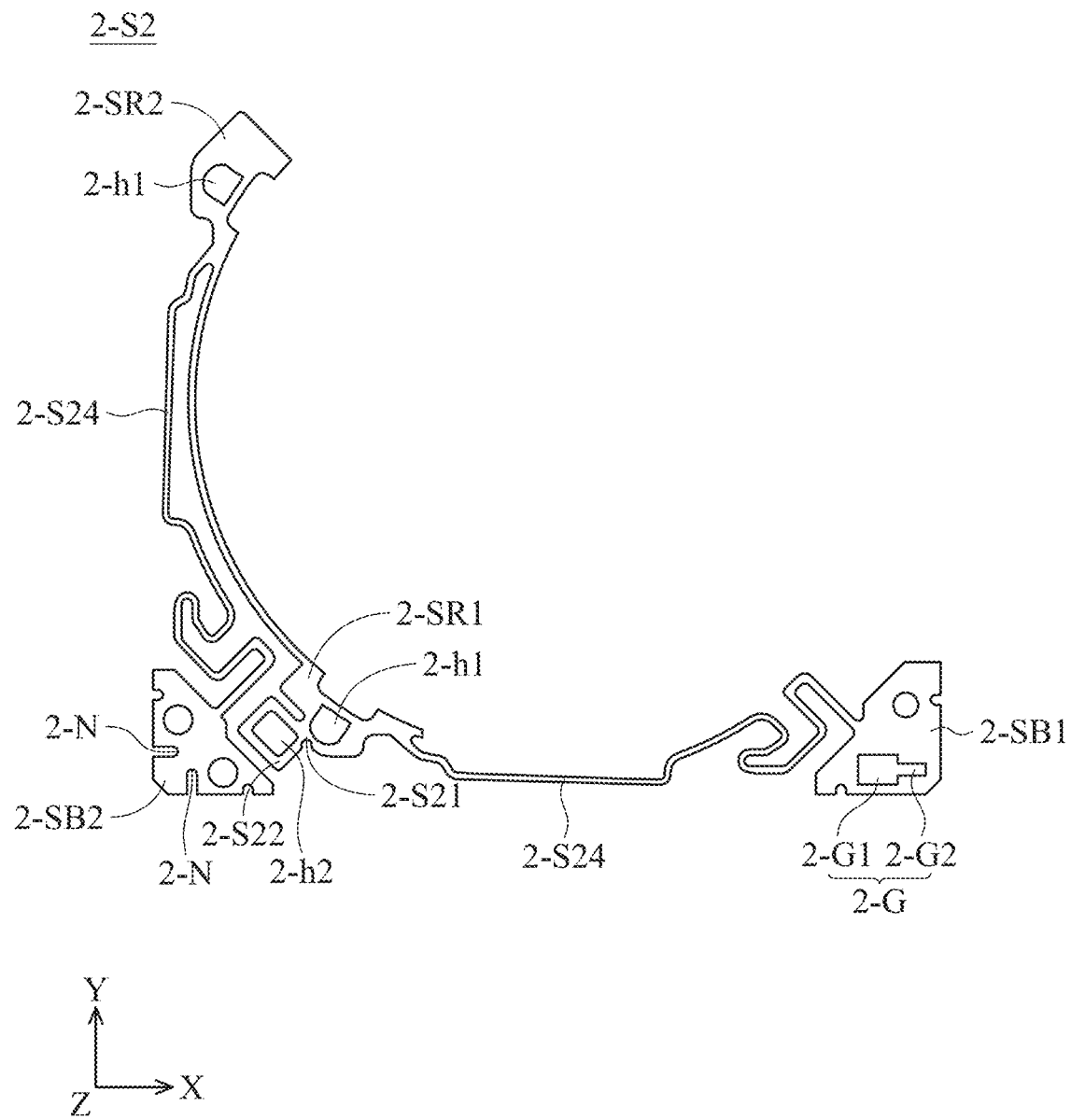
Figures 2, 3, 4, 5:
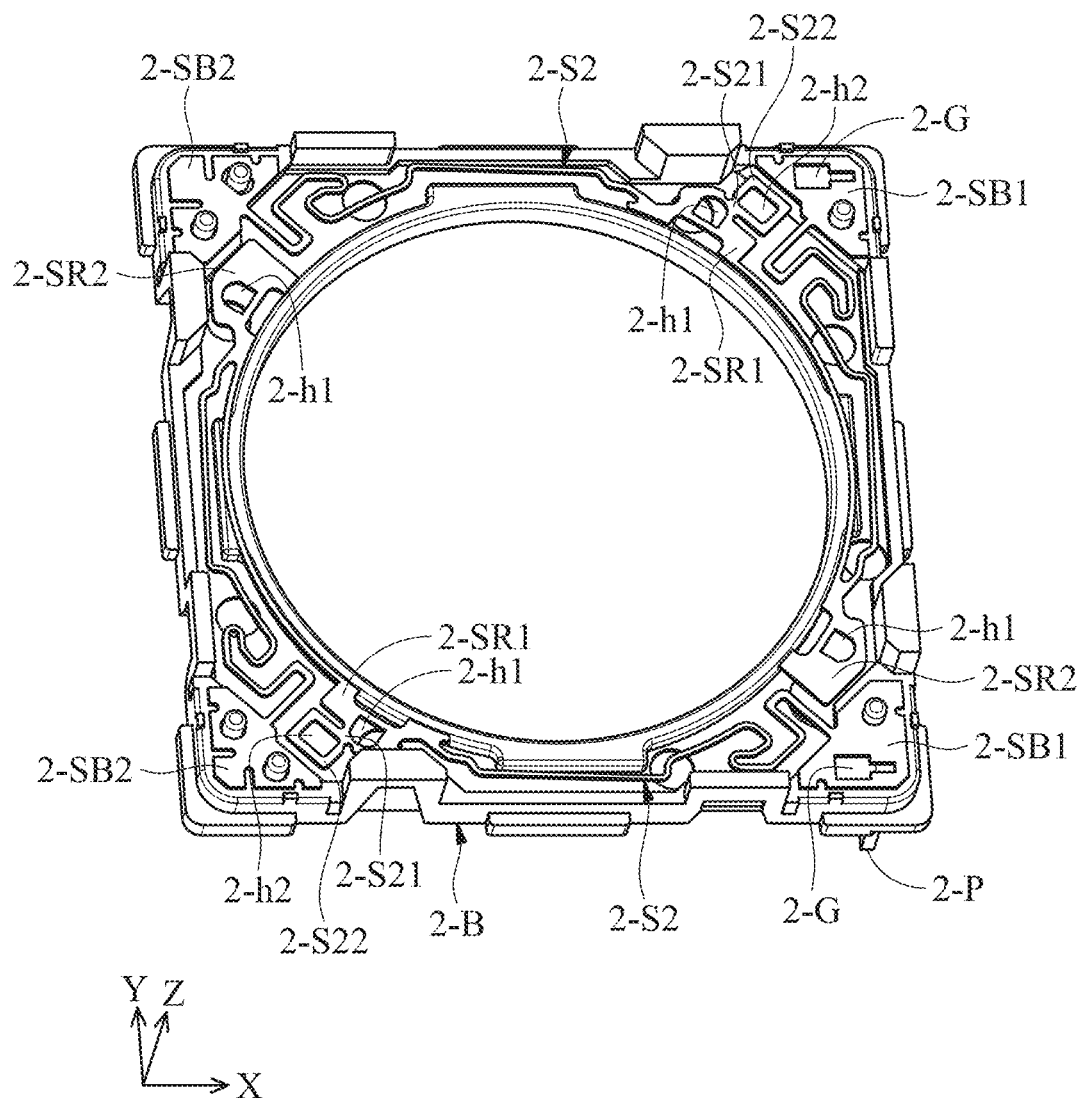
Figures 2, 3, 4, 5, 6:
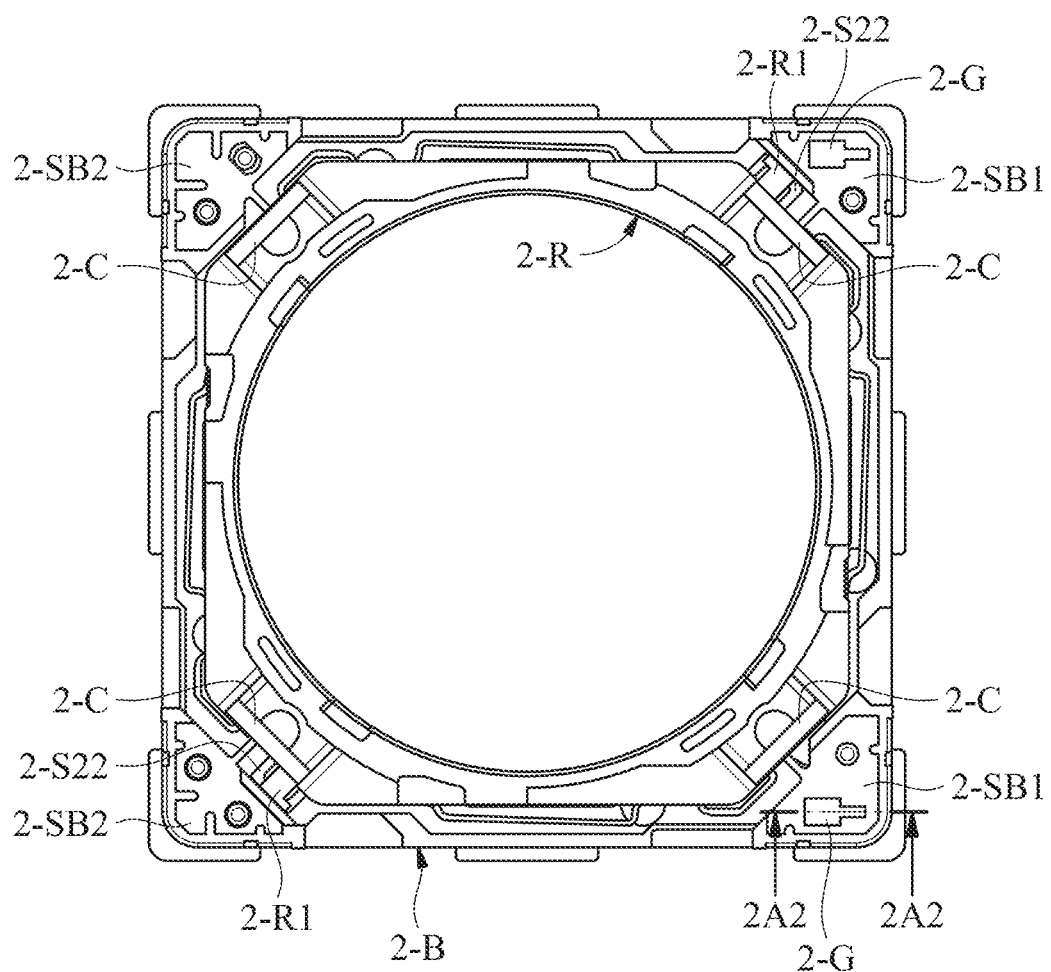
Figures 2, 3, 4, 5, 6, 7:
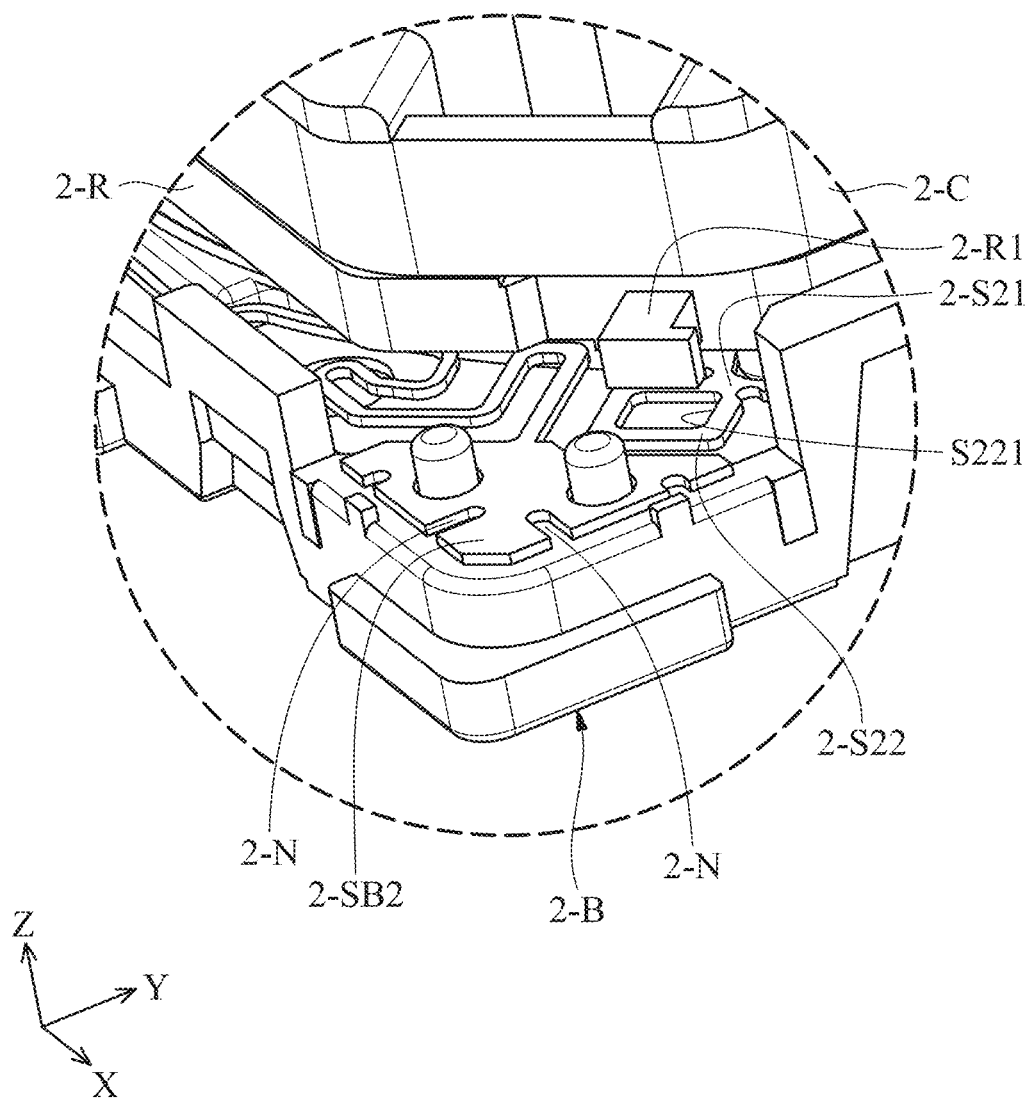
Figures 2, 3, 4, 5, 6, 7, 8:
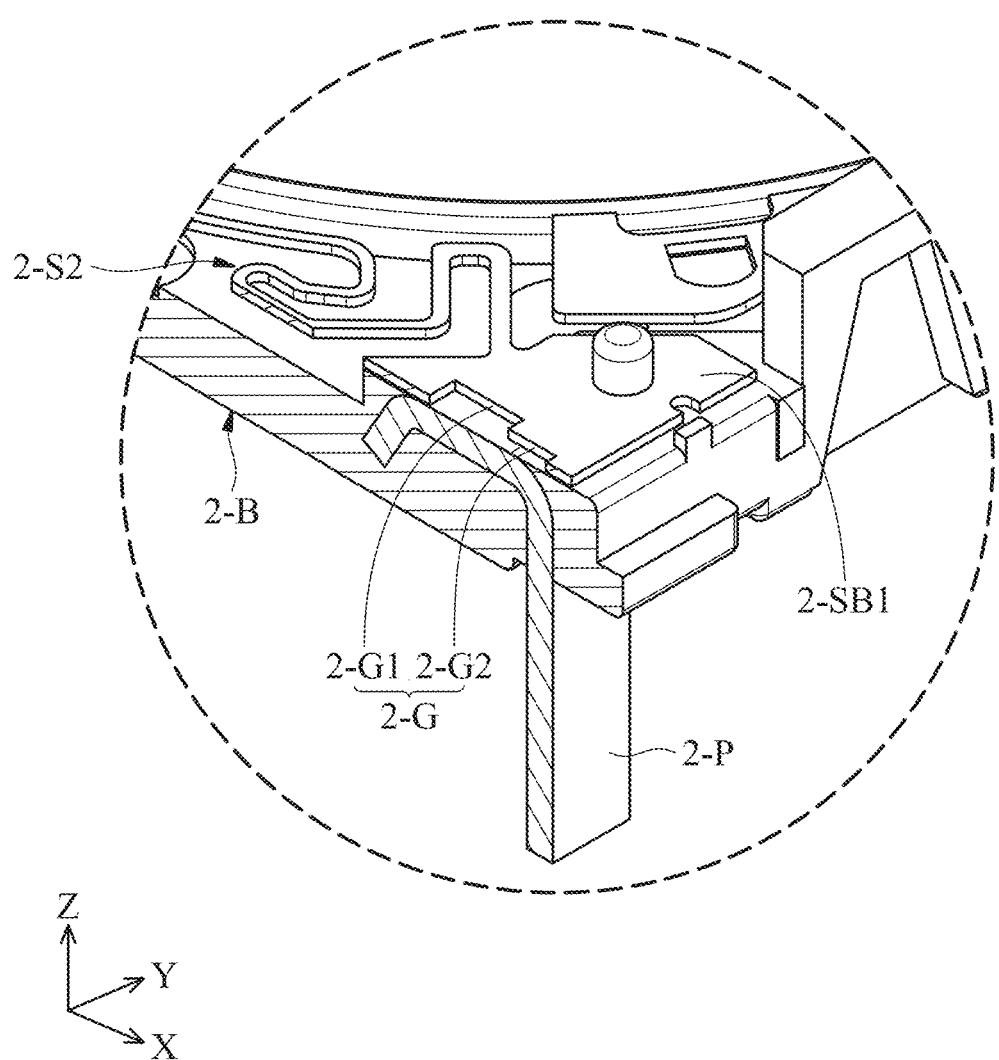
Figures 2, 3, 4, 5, 6, 7, 8, 9:
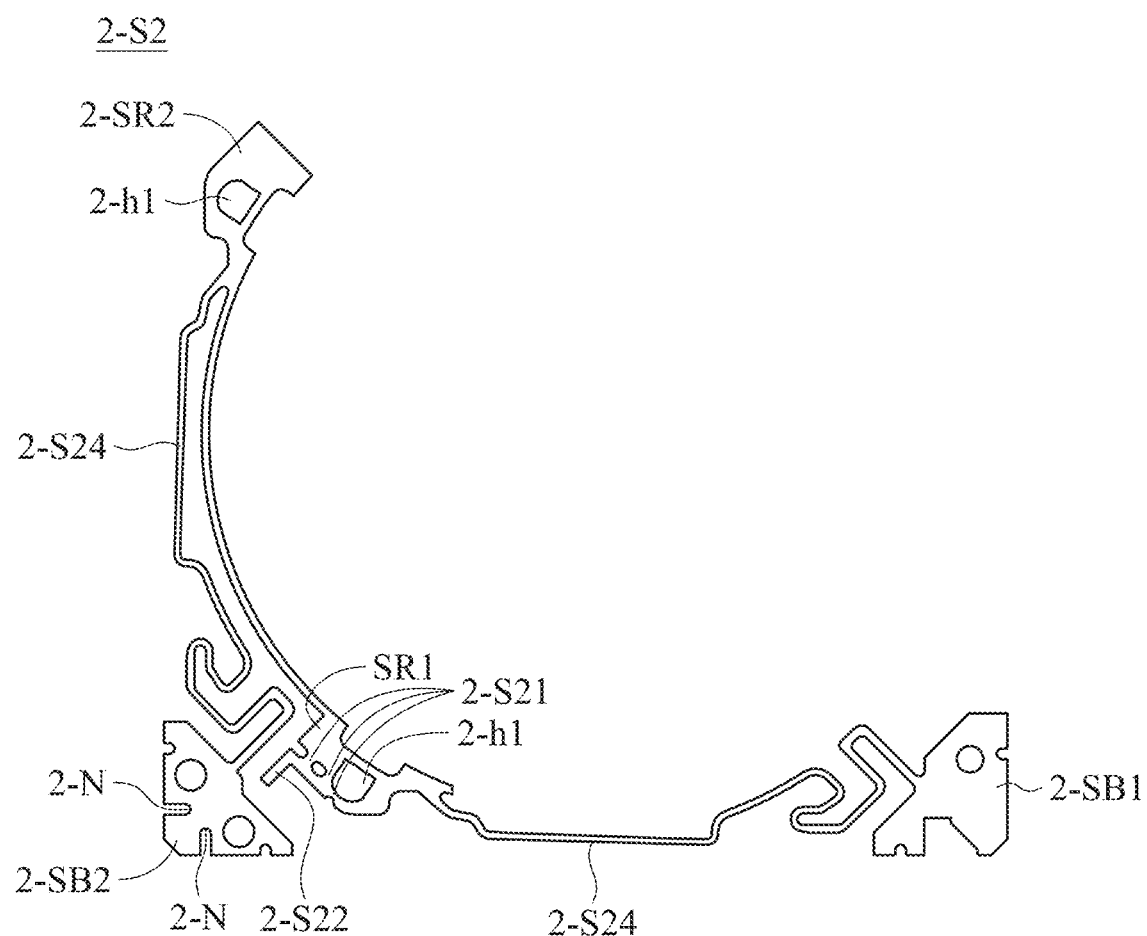
Figures 2, 3, 4, 5, 6, 7, 8, 9, 10:
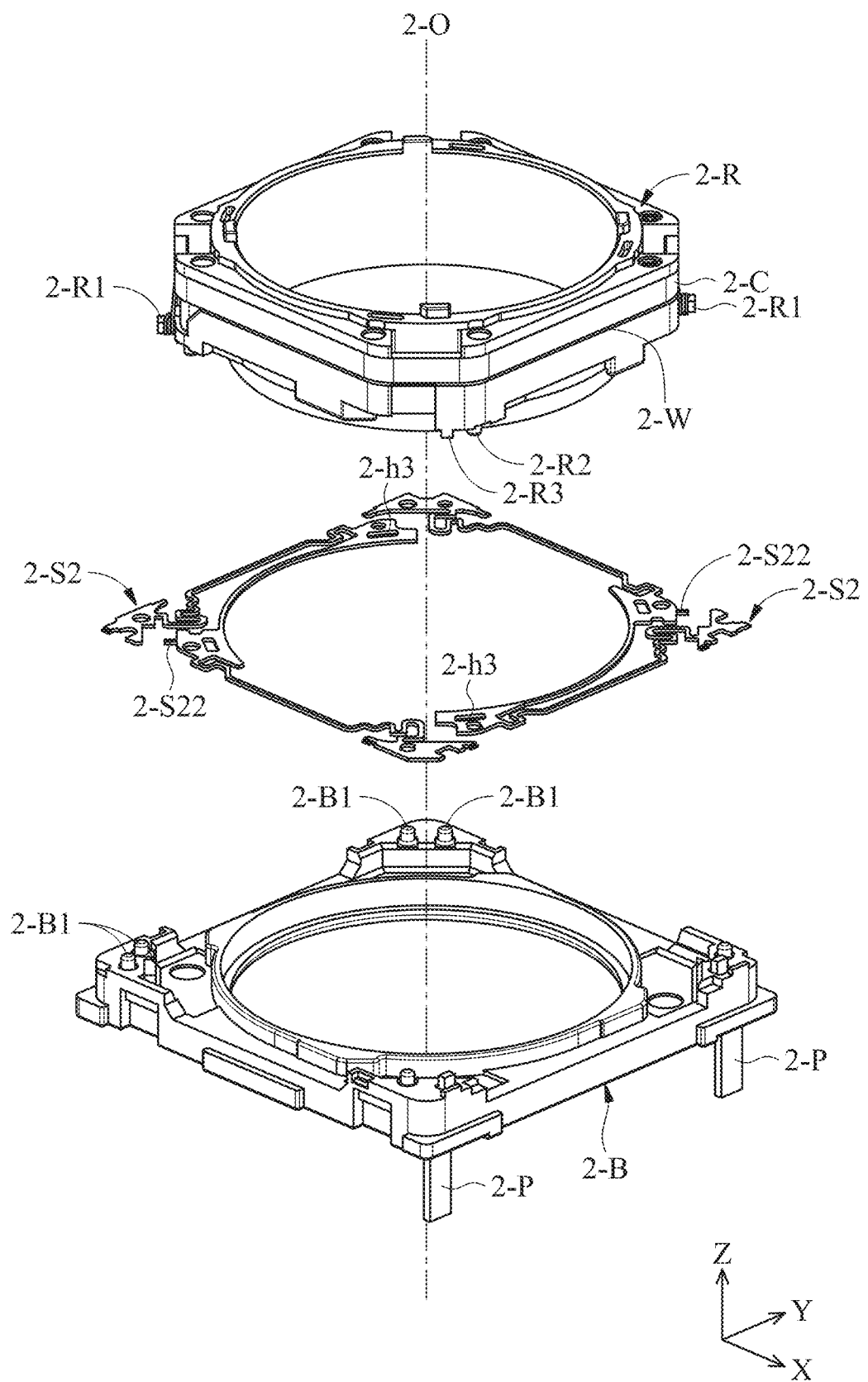

FIG. 9-10 is a cross-sectional view of the frame 9-F, the magnetic conductive members 9-Q, the magnets 9-M, the holder 9-R, and the coil 9-C in FIG. 9-9 after assembly.

Figures 2, 3, 4, 5, 6, 7, 8, 9, 10, 11:
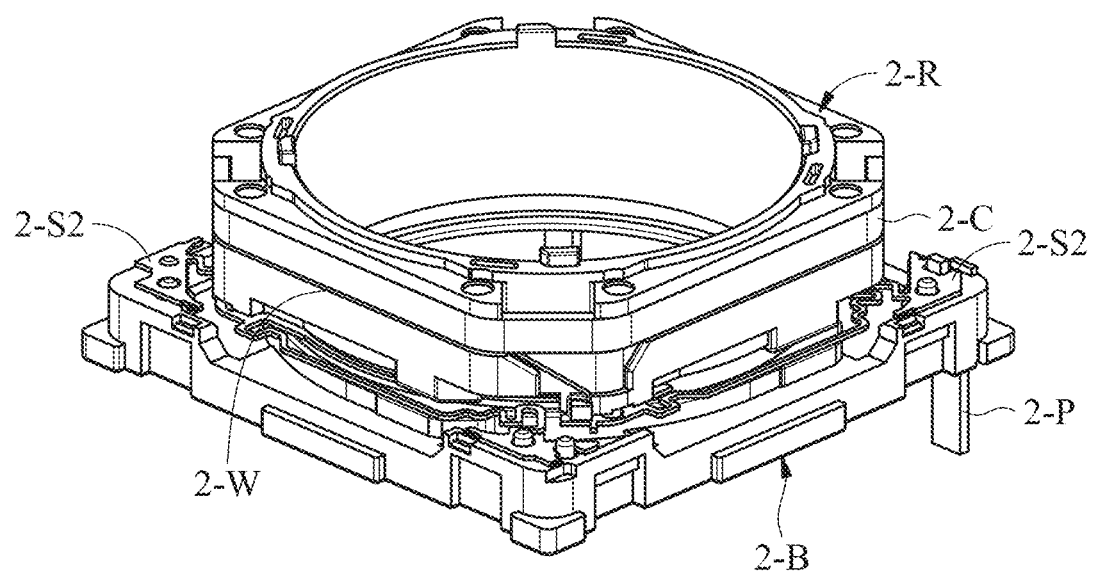
Figures 2, 3, 4, 5, 6, 7, 8, 9, 10, 11, 12:
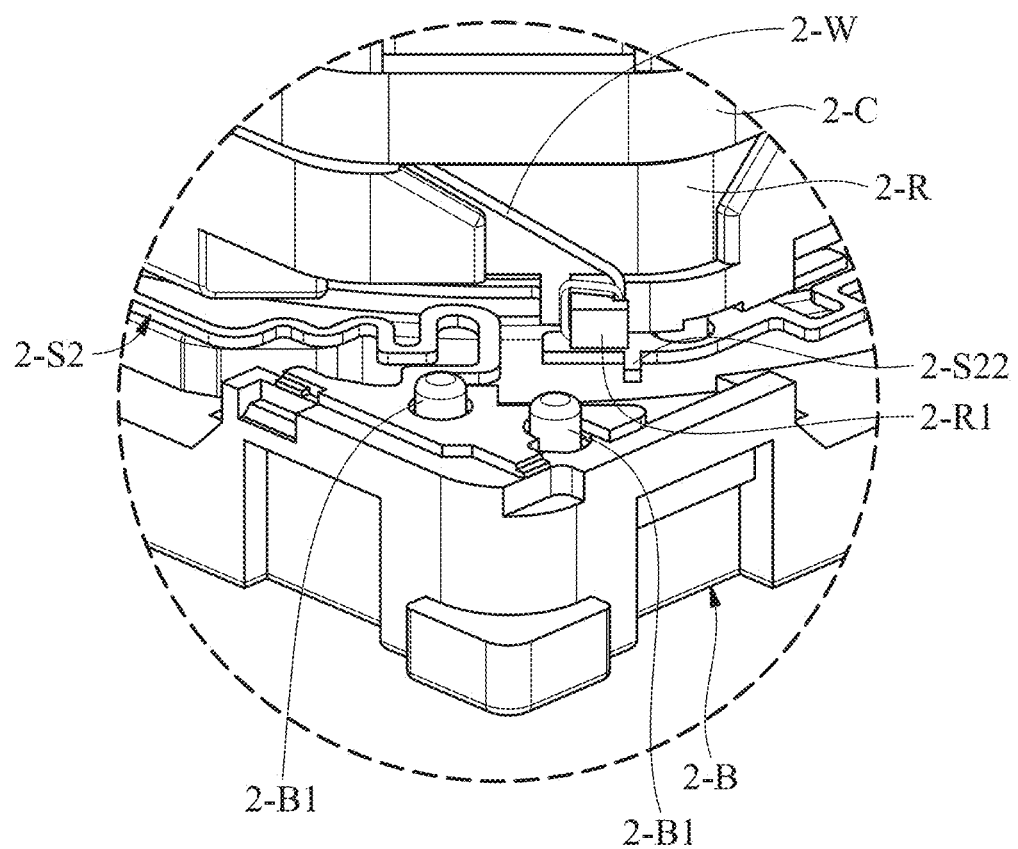
Figures 2, 3, 4, 5, 6, 7, 8, 9, 10, 11, 12, 13:
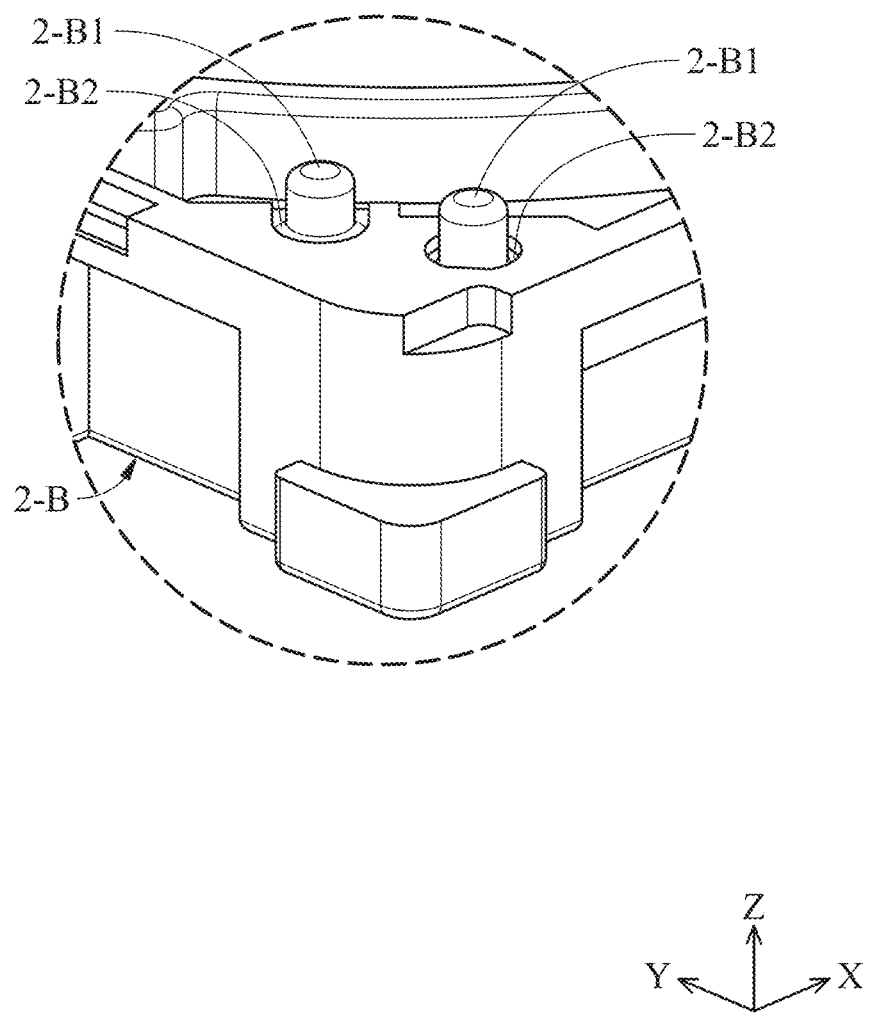
Figures 2, 3, 4, 5, 6, 7, 8, 9, 10, 11, 12, 13, 14:
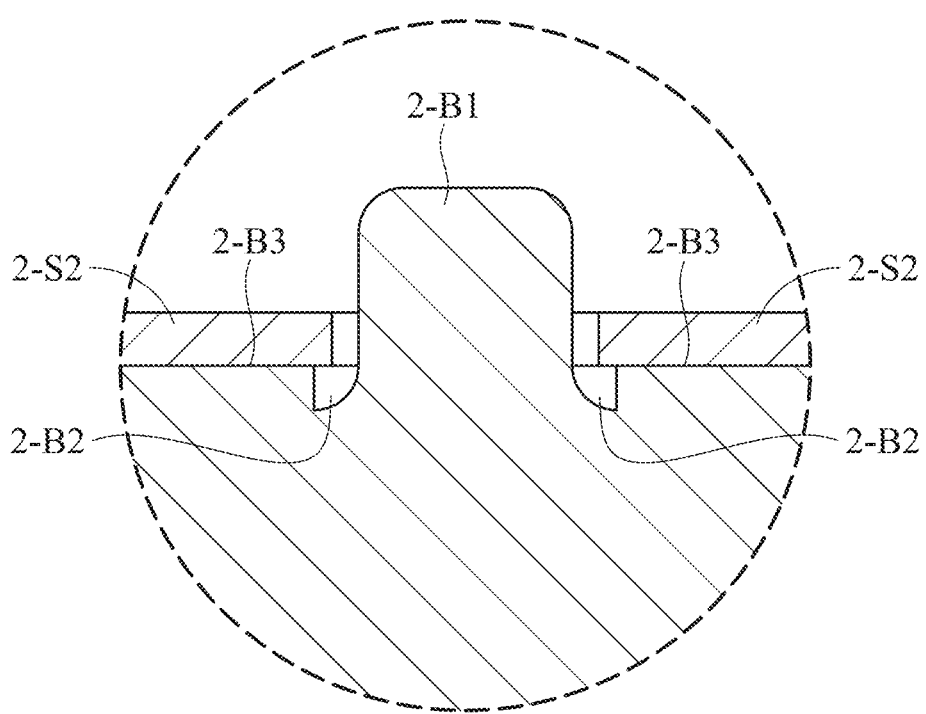
Figures 2, 3, 4, 5, 6, 7, 8, 9, 10, 11, 12, 13, 14, 15:
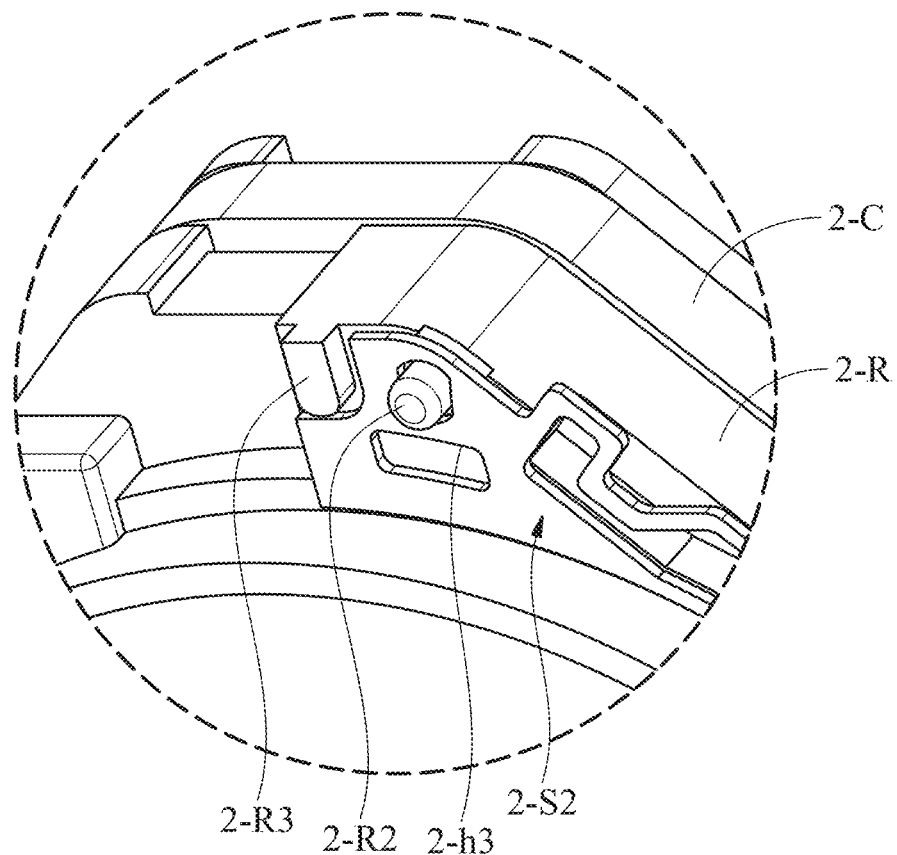
Figures 2, 3, 4, 5, 6, 7, 8, 9, 10, 11, 12, 13, 14, 15, 16:
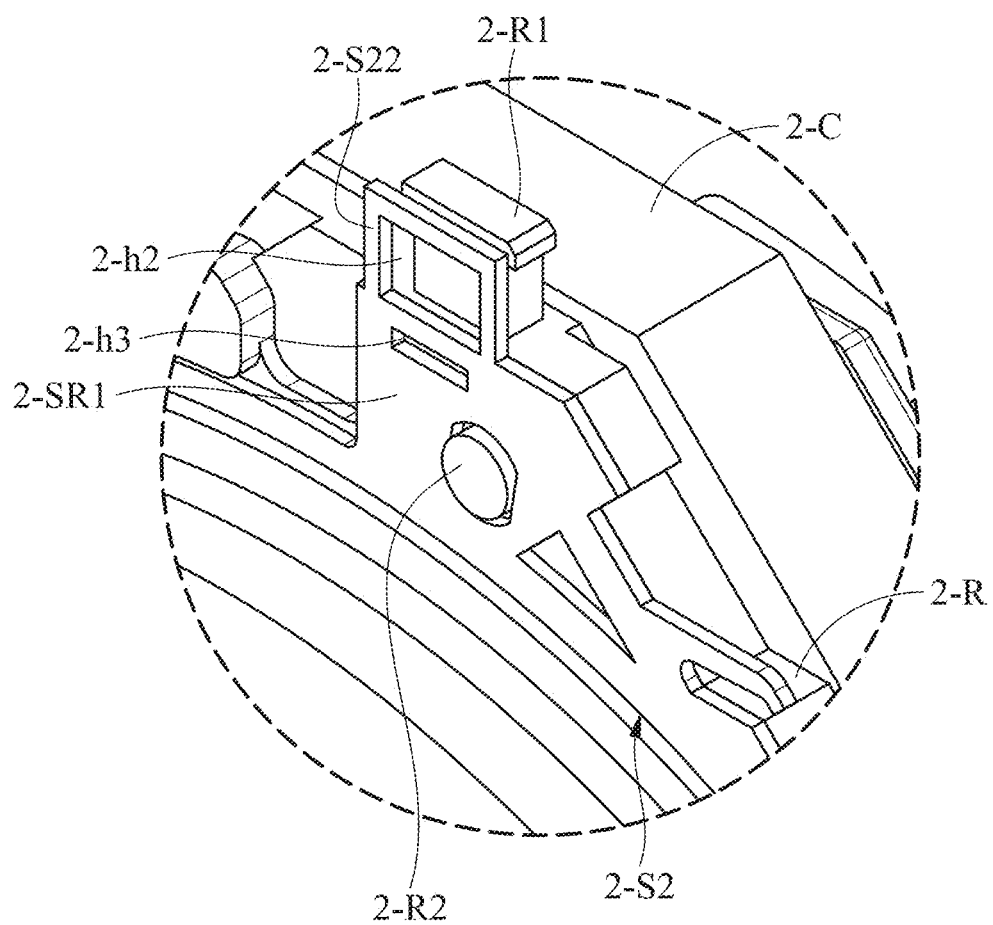
Figures 2, 3, 4, 5, 6, 7, 8, 9, 10, 11, 12, 13, 14, 15, 16, 17:
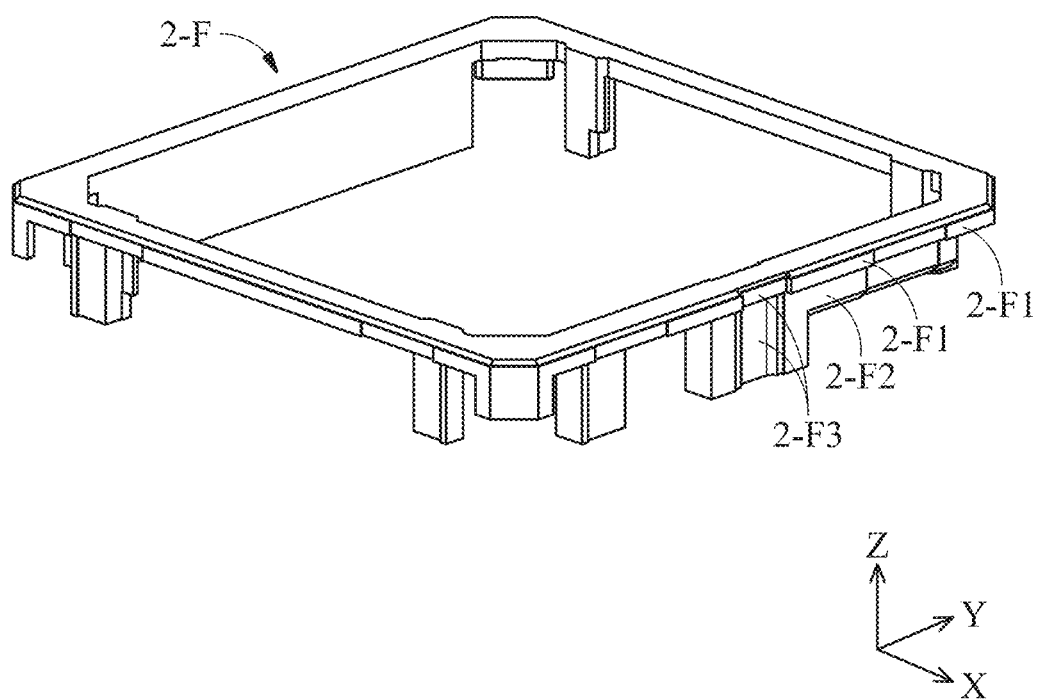
Figures 2, 3, 4, 5, 6, 7, 8, 9, 10, 11, 12, 13, 14, 15, 16, 17, 18:
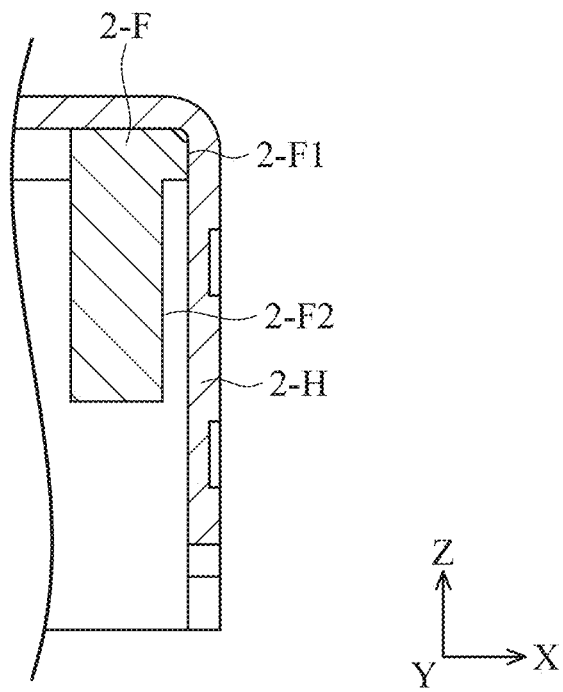
Figures 2, 3, 4, 5, 6, 7, 8, 9, 10, 11, 12, 13, 14, 15, 16, 17, 18, 19:
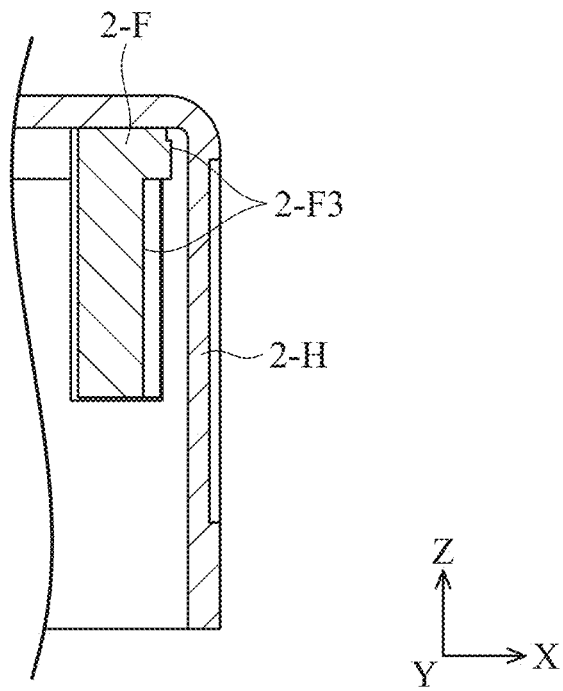
Figures 2, 3, 4, 5, 6, 7, 8, 9, 10, 11, 12, 13, 14, 15, 16, 17, 18, 19, 20:
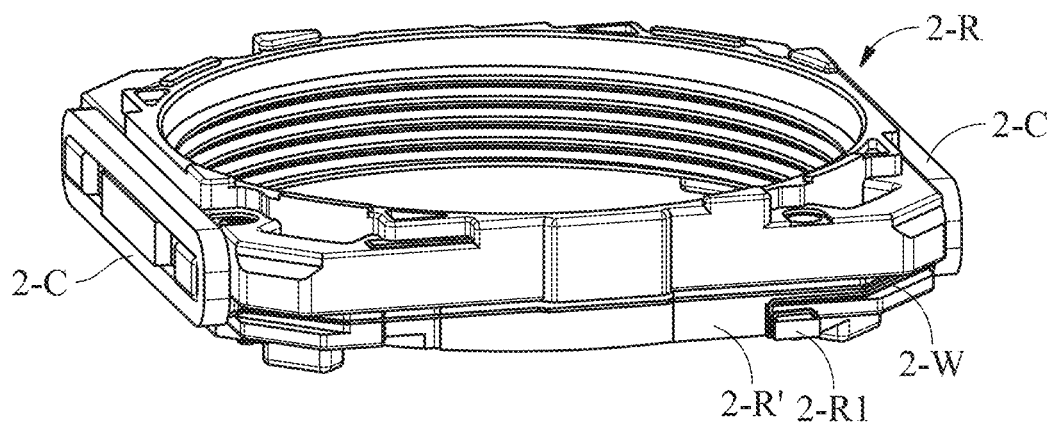
Figures 2, 3, 4, 5, 6, 7, 8, 9, 10, 11, 12, 13, 14, 15, 16, 17, 18, 19, 20, 21:
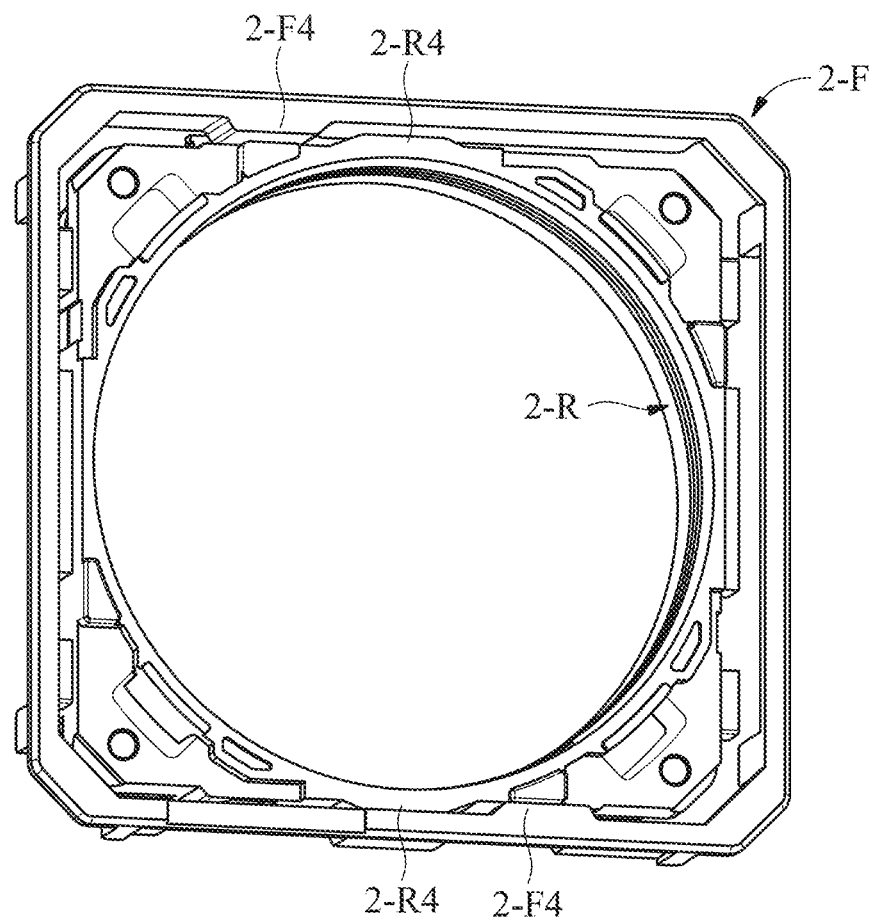
Figures 2, 3, 4, 5, 6, 7, 8, 9, 10, 11, 12, 13, 14, 15, 16, 17, 18, 19, 20, 21, 22:
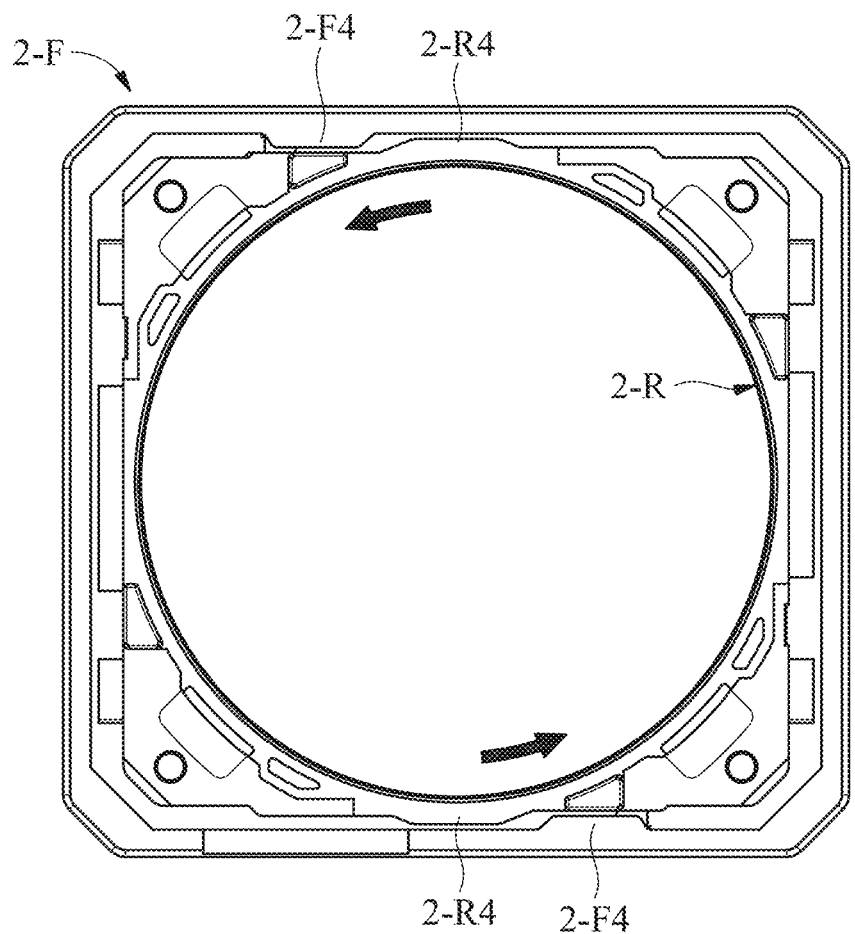

FIG. 9-11 is an exploded view showing a frame 9-F and a hollow magnetic conductive member 9-Q in accordance with another embodiment of the disclosure.

FIG. 9-12 is an exploded view showing the frame 9-F and the magnetic conductive member 9-Q in FIG. 9-11, two magnets 9-M, a holder 9-R, and a coil 9-C disposed on the holder 9-R.

FIG. 9-13 is a cross-sectional view of the frame 9-F, the magnetic conductive member 9-Q, the magnets 9-M, the holder 9-R, and the coil 9-C in FIG. 9-12 after assembly.

FIG. 9-14 is a schematic view showing relative position of a frame 9-F, an upper spring 9-S1, and four magnets 9-M after assembly of a driving mechanism, in accordance with another embodiment of the disclosure.

FIG. 9-15 is a schematic view showing relative position of a frame 9-F, an upper spring 9-S1, and four magnets 9-M after assembly of a driving mechanism, in accordance with another embodiment of the disclosure.

FIG. 9-16 is a cross-sectional view showing a holder 9-R, at least one lower spring 9-S2, and a base 9-B after assembly of a driving mechanism, in accordance with another embodiment of the disclosure.

DETAILED DESCRIPTION OF THE DISCLOSURE

The making and using of the embodiments of an electromagnetic driving system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the disclosure may be practiced are shown by way of illustration. In this regard, directional terminology, such as "top," "bottom," "left," "right," "front," "back," etc., is used with reference to the orientation of the figures being described. The components of the present disclosure can be positioned in a number of different orientations. As such, the directional terminology is used for the purposes of illustration and is in no way limiting.

FIG. 1-1 is an exploded view of a lens module 1-10 in accordance with an embodiment of the disclosure. It should be noted that the lens module 1-10 may be provided in handheld digital products such as mobile phones or tablet PCs. The lens module 1-10 primarily comprises a driving mechanism and an optical element 1-E received therein. In this embodiment, the driving mechanism may comprise a voice coil motor (VCM), and the optical element 1-E may comprise an optical lens, so as to achieve auto-focus (AF) function of the lens module 1-10.

As shown in FIG. 1-1, the driving mechanism primarily comprises a housing 1-H, a frame 1-F, an upper spring 1-S1, at least a lower spring 1-S2, a base 1-B, a holder 1-R, a circuit board 1-P, at least a longitudinal magnet 1-M, and at least a coil 1-C corresponding to the magnet 1-M. The holder 1-R is connected to the frame 1-F and the base 1-B via the upper and lower springs 1-S1 and 1-S2 (resilient elements), so that the holder 1-R can be suspended in the housing 1-H. The optical element 1-E is affixed in the holder 1-R, and the magnet 1-M and the coil 1-C can constitute a driving assembly for driving the holder 1-R and the optical element 1-E to move along an optical axis 1-O of the optical element 1-E, so as to achieve auto-focus (AF) of the lens module 1-10.

In this embodiment, two multipolar magnets 1-M and two coils 1-C are disposed in the driving mechanism. Each magnet 1-M comprises two magnetic units 1-M1 and 1-M2 having opposite polar directions. The two coils 1-C have an oval-shaped structure and are affixed to opposite sides of the holder 1-R, corresponding to the magnets 1-M. In some embodiments, the length of the magnet 1-M along a longitudinal axis thereof (Y axis) is greater than that of the coil 1-C along the longitudinal axis (Y axis). When a current is applied to the coil 1-C, an electromagnetic force can be generated between the coil 1-C and the magnet 1-M to drive the holder 1-R and the optical element 1-E to move along the optical axis 1-O (Z axis).

FIG. 1-2 is a schematic view of the lens module 1-10 in FIG. 1-1 after assembly with the optical element 1-E removed, FIG. 1-3 is a cross-sectional view taken along line 1A1-1A1 in FIG. 1-2, and FIG. 1-4 is a schematic view of the driving mechanism of FIG. 1-2 with the housing 1-H removed. Referring to FIGS. 1-1 to 1-4, the housing 1-H may comprise metal or plastic material and is affixed to the base 1-B. The frame 1-F, the upper spring 1-S1, two lower springs 1-S2, the holder 1-R, the circuit board 1-P, the magnets 1-M, and the coils 1-C are received in a space between the housing 1-H and the base 1-B. The frame 1-F is affixed to an inner surface of the housing 1-H, the magnets 1-M are affixed to a lower surface of the frame 1-F, and the upper and lower springs 1-S1 and 1-S2 are connected to the frame 1-F and the base 1-B, respectively.

It should be noted that the circuit board 1-P has an L-shaped structure, and at least a first terminal 1-P1 and at least a second terminal 1-P2 are provided on a lower side of the circuit board 1-P. Here, a plurality of first terminals 1-P1 are provided and can be electrically connected to an external circuit, and a plurality of second terminals 1-P2 are provided and can be electrically connected to the conductive pins 1-B2 (FIG. 1-1) on the base 1-B by soldering. Another two conductive pins 1-B1 protruding from the base 1-B are electrically connected to the conductive pins 1-B2, and the two lower springs 1-S2 can be electrically connected to the conductive pins 1-B1 by soldering, and the conductive pins 1-B1 can electrically connect to the coils 1-C on the holder 1-R via conductive wires (not shown). Thus, the external circuit can provide a current to the coils 1-C and drives the holder 1-R and the optical element 1-E to move along the optical axis 1-O (Z axis).

FIGS. 1-5 and 1-6 are schematic views of the frame 1-F in FIG. 1-4. Referring to FIGS. 1-4 to 1-6, the frame 1-F has a quadrilateral structure, and the circuit board is extended from a first side of the frame 1-F to a second side of the frame 1-F, wherein the second side is adjacent to the first side (FIG. 1-4). Here, the first terminals 1-P1 and the second terminals 1-P2 are respectively located on the first and second sides of the frame 1-F. It should be noted that the frame 1-F and the holder 1-R may comprise plastic material, wherein the frame 1-F forms a stop surface 1-F3 on the inner side thereof and parallel to the optical axis 1-O (Z axis). Hence, when the lens module 1-10 is impacted by an external force, the stop surface 1-F3 of the frame 1-F can contact and restrict the holder 1-R in a limit position along horizontal directions, so as to prevent the electronic components on the circuit board 1-P from being damaged by the holder 1-R.

As shown in FIGS. 1-1 and 1-4, the circuit board 1-P forms a depressed portion 1-P3 for receiving the magnet 1-M, and the circuit board 1-P and the magnet 1-M at least partially overlap in a direction parallel to the optical axis 1-O (Z axis). Thus, the dimensions of the lens module 1-10 can be reduced to achieve miniaturization of the lens module 1-10. FIGS. 1-4 to 1-6 show that the frame 1-F has two pair of protrusions 1-F1 extending toward the base 1-B, wherein the end portions of the protrusions 1-F1 are separated from and not connected to each other. Furthermore, a recess 1-F10 is formed between two of the protrusions 1-F1 for accommodating and positioning the magnet 1-M on the frame 1-F. As depicted in FIG. 1-4, two protrusions 1-F1 are received in the depressed portion 1-P3 for positioning the magnet 1-M during assembly of the driving mechanism.

FIG. 1-7 is a schematic view of the driving mechanism in FIG. 1-2 with the housing 1-H and the circuit board 1-P removed, and FIG. 1-8 is a cross-sectional view taken along line 1A2-1A2 in FIG. 1-2. Referring to FIGS. 1-7 and 1-8, the driving mechanism in this embodiment further comprises an integrated circuit element 1-G1, a displacement sensing element 1-G2, and a filter element 1-G3 disposed on an inner surface of the circuit board 1-P. The frame 1-F forms a pair of protrusions 1-F2 extending toward the base 1-B, and the integrated circuit element 1-G1 is received in a recess 1-F20 formed between the protrusions 1-F2. As shown in FIG. 1-8, the stop surface 1-F3 is closer to the holder 1-R than the integrated circuit element 1-G1, to protect and restrict the integrated circuit element 1-G1 in a safe position. It should be noted that the end portions of the protrusions 1-F1 and F2 are higher and closer to a light incident side of the optical axis 1-O (Z axis) than the bottom surface of the holder 1-R (FIG. 1-7).

Still referring to FIG. 1-7, the integrated circuit element 1-G1 is located between the displacement sensing element 1-G2 and the filter element 1-G3. The magnet 1-M is situated on a first side of the frame 1-F, and the integrated circuit element 1-G1, the displacement sensing element 1-G2, and the filter element 1-G3 are situated on a second side of the frame 1-F, adjacent to the first side. For example, the displacement sensing element 1-G2 may be a Hall effect sensor, MR sensor, or Fluxgate sensor which are located near a pair of magnetic elements 1-D (such as magnets), so that the displacement of the holder 1-R relative to the housing 1-H along the Z axis can be detected to achieve auto-focus (AF) function.

FIG. 1-9 is a cross-sectional view taken along line 1A3-1A3 in FIG. 1-2. Referring to FIGS. 1-6, 1-7, and 1-9, the frame 1-F in this embodiment forms a stage 1-F4 located at a corner of the frame 1-F and extended toward the base 1-B. During assembly, a bending portion of the circuit board 1-P is received and restricted between the stage 1-F4 and the housing 1-H, as shown in FIG. 1-9. Similarly, the base 1-B in this embodiment also forms at least a stage B3 extending toward the frame 1-F and corresponding to the stage 1-F4, wherein a bending portion of the circuit board 1-P is received restricted between the stage B3 and the housing 1-H during assembly, so that the circuit board 1-P can be protected and positioned in a fixed position. In this configuration, efficient assembly and space utilization can be both implemented, and miniaturization of the lens module can also be achieved.

FIG. 2-1 is an exploded view of a driving mechanism in accordance with an embodiment of the disclosure. The driving mechanism may comprise a voice coil motor (VCM) and may be provided in handheld digital products such as mobile phones or tablet PCs. The driving mechanism can be used to move an optical element received therein, so as to achieve auto-focus (AF) function.

As shown in FIG. 2-1, the driving mechanism primarily comprises a housing 2-H, a frame 2-F, an upper spring 2-S1, two lower springs 2-S2, a base 2-B, a holder 2-R, a coil 2-C, and at least a longitudinal magnet 2-M corresponding to the coil 2-C. The holder 2-R is connected to the frame 2-F and the base 2-B through the upper and lower springs 2-S1 and 2-S2 (resilient elements), respectively, so that the holder 2-R is suspended in the housing 2-H. An optical element (not shown) such as an optical lens is affixed in the holder 2-R, and the magnet 2-M and the coil 2-C can constitute a driving assembly for driving the holder 2-R and the optical element to move along an optical axis 2-O of the optical element.

FIG. 2-2 is a schematic view of the driving assembly in FIG. 2-1 after assembly, and FIG. 2-3 is a cross-sectional view taken along the line 2A1-2A1 in FIG. 2-2. Referring to FIGS. 2-1 to 2-3, the housing 2-H comprises metal or plastic material, and it is affixed to the base 2-B to form a fixed module. The frame 2-F is affixed to an inner surface of the housing 2-H. The magnets 2-M and the outer portion of the upper spring 2-S1 are affixed to a bottom surface of the frame 2-F, and the inner portion of the upper spring 2-S1 is affixed to the holder 2-R. In this embodiment, when a current is applied to the coil 2-C, an electromagnetic force can be generated between the coil 2-C and the magnets 2-M, so as to move the holder 2-R and the optical element relative to the housing 2-H and the base 2-B along the optical axis 2-O.

It should be noted that at least a conductive pin 2-P is embedded in the base 2-B. The conductive pin 2-P is extended through the base 2-B to electrically connect the lower spring 2-S2 with an external circuit. In some embodiments, the conductive pin 2-P may connect to the lower spring 2-S2 by soldering, and the lower spring 2-S2 may electrically connect to the coil 2-C via a wire (not shown). Thus, the external circuit can provide a current to the coil 2-C and drive the holder 2-R and the optical element to move along the optical axis 2-O. For example, an end of the wire may be connected to the coil 2-C, and the other end of the wire may be wound around a leg 2-R1 of the holder 2-R. During assembly, the lower spring 2-S2 is bonded to the wire wound on the leg 2-R1 by soldering or laser welding, so that the coil 2-C can be electrically connected to the external circuit.

As the area 2-S11 shows in FIG. 2-1, the upper spring 2-S1 forms at least a thin deformable portion which has a wiggle structure. Specifically, the deformable portion connects the inner portion with the outer portion of the upper spring 2-S1, and it has at least three parallel sections. In this embodiment, the deformable portion has four parallel sections. When viewed along the optical axis 2-O, a diagonal line 2-S1' of the upper spring 2-S1 is extended through the parallel sections. Additionally, at least a corner of the upper spring 2-S1 forms a recess 2-S12 to prevent interference between the housing 2-H and the upper spring 2-S1 during assembly.

FIG. 2-4 is a schematic view of one of the lower springs 2-S2 in FIG. 2-1, FIG. 2-5 is a schematic view showing relative position of the two lower springs 2-S2 and the base 2-B in FIG. 2-1 after assembly, FIG. 2-6 is a top view of the lower springs 2-S2, the base 2-B, the holder 2-R, and the coil 2-C in FIG. 2-1 after assembly, and FIG. 2-7 is a partial enlarged view of the lower spring 2-S2, the base 2-B, the holder 2-R, and the coil 2-C after assembly. Referring to FIG. 2-4, the lower spring 2-S2 may comprise metal and have two connection portions 2-SB1, 2-SB2 connected to the base 2-B, two deformable portions 2-S24, and two connection portions 2-SR1, 2-SR2 connected to the holder 2-R. The two connection portions 2-SB1, 2-SB2 may be affixed at two adjacent corners of the base 2-B by glue. The connection portions 2-SR1, 2-SR2 respectively have a through hole 2-h1, wherein two protruding columns of the holder 2-R are extended through the holes 2-h1 and adhered to the connection portions 2-SR1, 2-SR2 during assembly. The two thin deformable portions 2-S24 respectively connect the connection portions 2-SB1, 2-SB2 with the connection portions 2-SR1, 2-SR2, so that the holder 2-R can be suspended in the housing 2-H.

It should be noted that the lower spring 2-S2 further has a narrow portion 2-S21 and an end portion 2-S22. The end portion 2-S22 can be electrically connected to the wire wound on the leg 2-R1 by laser welding. The narrow portion 2-S21 is formed between connection portion 2-SR1 and the end portion 2-S22, so as to prevent insufficient welding temperature owing to the rapid heat conduction of the lower spring 2-S2 during the welding process. In this embodiment, the end portion 2-S22 comprises a hollow structure and forms a through hole 2-h2, wherein the narrow portion 2-S21 is close to the through holes 2-h1 and 2-h2.

As shown in FIGS. 2-6 and 2-7, the leg 2-R1 is extended from an outer surface of the holder 2-R, and it at least partially overlaps with the end portion 2-S22 of the lower spring 2-S2 along the optical axis 2-O (Z axis) of the optical element. Thus, a part of the wire wound on the leg 2-R1 is located between the end portion 2-S22 and the leg 2-R1, and the end portion 2-S22 can be easily bonded to the wire on the leg 2-R1 by soldering or laser welding.

Referring to FIGS. 2-4 and 2-7, at least a longitudinal recess 2-N is formed on the connection portion 2-SB2 of the lower spring 2-S2. Here, the recess 2-N is located at an edge of the lower spring 2-S2 and adjacent to a corner of the base 2-B. It should be noted that the glue can be applied between the base 2-B and the lower spring 2-S2 during assembly, and the recess 2-N can accommodate and guide the glue, so as to prevent overflow of the glue when the lower spring 2-S2 is pressed by a fixture.

FIG. 2-8 is a cross-sectional view taken along the line 2A2-2A2 in FIG. 2-6. As shown in FIGS. 2-4 and 2-8, the lower spring 2-S2 forms an opening 2-G having a bonding area 2-G1 and an extension area 2-G2, wherein the extension area 2-G2 is extended from the bonding area 2-G1. During assembly, a solder paste can be disposed in the bonding area 2-G1 to electrically connect the resilient element 2-S2 with the conductive pin 2-P embedded in the base 2-B. As the extension area 2-G2 is formed beside the bonding area 2-G1, the solder is exposed to and can be seen from a side of the extension area 2-G1. Namely, the extension area 2-G2 can be used as a window for observing and inspecting the solder, so that non-wetting of the solder can be prevented, and robust bonding between the soldering and the conductive pin 2-P can be ensured.

FIG. 2-9 is a schematic view of a lower spring 2-S2 in accordance with another embodiment of the disclosure. The lower spring 2-S2 in FIG. 2-9 differs from FIG. 2-4 in that it does not have the opening 2-G, and the end portion 2-S22 of the lower spring 2-S2 has a stick-shaped structure, thus facilitating manual soldering and positioning during the assembly process. FIG. 2-9 further shows that at least a narrow portion 2-S21 is formed between the connection portion 2-SR1 and the end portion 2-S22, so that insufficient welding temperature owing to the rapid heat conduction of the lower spring 2-S2 during the soldering or welding process can be avoided.

FIG. 2-10 is an exploded view showing a holder 2-R, a coil 2-C, a wire 2-W, two lower springs 2-S2, a base 2-B, and two conductive pins 2-P in accordance with another embodiment of the disclosure, FIG. 2-11 is a schematic view of the holder 2-R, the coil 2-C, the wire 2-W, the lower springs 2-S2, the base 2-B, and the conductive pins 2-P in FIG. 2-10 after assembly, and FIG. 2-12 is a partial enlarged view of the holder 2-R, the coil 2-C, the wire 2-W, the lower spring 2-S2, and the base 2-B in FIG. 2-11. It should be noted that the holder 2-R, the coil 2-C, the wire 2-W, the lower springs 2-S2, the base 2-B, and the conductive pins 2-P in FIGS. 2-10 to 2-12 can replace the corresponding elements in FIG. 2-1 to constitute a driving mechanism for moving an optical element (such as optical lens) received therein, so as to achieve auto-focus (AF) function.

As shown in FIG. 2-12, the wire 2-W is electrically connected to the coil 2-C, and an end of the wire 2-W is wound around the leg 2-R1 of the holder 2-R. During assembly, the end portion 2-S22 of the lower spring 2-S2 is bonded to the wire on the leg 2-R1 by soldering or laser welding, so that the coil 2-C can be electrically connected to an external circuit. Still referring to FIG. 2-12, the base 2-B forms a column 2-B1 extended through the lower spring 2-S2, wherein the glue can be disposed between the column 2-B1 and the lower spring 2-S2 to enhance the adhesion strength. In some embodiments, the column 2-B1 and the lower spring 2-S2 can also be bonded to each other by ultrasonic welding or hot pressing.

FIG. 2-13 is a partial enlarged view showing a corner of the base 2-B, and FIG. 2-14 is an enlarged cross-sectional view showing a column 2-B1 of the base 2-B extended through the lower spring 2-S2. Referring to FIGS. 2-13 and 2-14, the base 2-B forms an annular channel 2-B2 surrounding the column 2-B1. The column 2-B1 and the channel 2-B2 can constitute a positioning structure to facilitate close-fitting connection between the lower spring 2-S2 and an adhesion surface 2-B3 of the base 2-B. Since the channel 2-B2 is lower than the adhesion surface 2-B3, it can be used to receive and guide the glue, so that overflow of the glue can be efficiently avoided. As shown in FIG. 2-14, a gap is formed between the column 2-B1 and the lower spring 2-S2 along the horizontal direction, and the lower spring 2-S2 protrudes from an edge of the adhesion surface 2-B3 to cover a part of the channel 2-B2, so that the glue can be guided along the column 2-B1 to the upper surface of the lower spring 2-S2 to enhance the connection strength between the base 2-B and the lower spring 2-S2.

FIG. 2-15 is a partial enlarged view showing the holder 2-R, the coil 2-C, and the lower spring 2-S2 in FIG. 2-10 after assembly. Referring to FIGS. 2-10 and 2-15, the bottom of the holder 2-R forms at least a column 2-R2 and at least a protrusion 2-R3, and the lower spring 2-S2 forms a longitudinal slot 2-h3, wherein the slot 2-h3 and the protrusion 2-R3 are close to the column 2-R2. As shown in FIG. 2-15, the column 2-R2 is extended through the lower spring 2-S2, and the glue can be disposed between the column 2-R2 and the lower spring 2-S2 to firmly connect the lower spring 2-S2 with the holder 2-R.

In some embodiments, the holder 2-R may have a channel (as well as the channel 2-B2 shows in FIG. 2-14) surrounding the column 2-R2, to facilitate close-fitting connection between the lower spring 2-S2 and the holder 2-R. In some embodiments, the column 2-B2 and the lower spring 2-S2 can also be bonded to each other by ultrasonic welding or hot pressing. It should be noted that since the slot 2-h3 and the protrusion 2-R3 are both located close to the column 2-R2, the glue around the column 2-R2 can be efficiently guided along the edges of the slot 2-h3 and the protrusion 2-R3, so that overflow of the glue can be efficiently avoided. Additionally, the protrusion 2-R3 can also be used as a positioning structure during assembly, thus improving assembly accuracy and efficiency of the driving mechanism.

FIG. 2-16 is a partial enlarged view showing a holder 2-R, a coil 2-C, and a lower spring 2-S2 in accordance with another embodiment of the disclosure. Referring to FIG. 2-16, the holder 2-R has a leg 2-R1 with a wire (not shown) wound thereon. The lower spring 2-S2 has a connection portion 2-SR1 and an end portion 2-S22 protruding from the connection portion 2-SR1. In this embodiment, the connection portion 2-SR1 is affixed to the holder 2-R and forms a longitudinal slot 2-h3 (such as a hole extended through the lower spring 2-S2). Additionally, a through hole 2-h2 is formed on the end portion 2-S22.

It should be noted that a column 2-R2 is located close to slot 2-h3 and extended through the lower spring 2-S2. In some embodiments, the holder 2-R may have a channel (as well as the channel 2-B2 shows in FIG. 2-14) surrounding the column 2-R2, so as to facilitate close-fitting connection between the lower spring 2-S2 and the holder 2-R. During assembly, the glue is disposed between the column 2-R2 and the lower spring 2-S2, and the end portion 2-S22 and the wire (not shown) wound on the leg 2-R1 can be electrically connected by laser welding.

Since the slot 2-h3 is close to the column 2-R2, when the glue spills from the periphery of the column 2-R2, the slot 2-h3 can guide the glue to flow along the edge thereof, thus preventing the mechanism being damaged due to overflow of the glue. Additionally, since the slot 2-h3 is also close to the end portion 2-S22, insufficient welding temperature owing to the rapid heat conduction of the lower spring 2-S2 during the welding process can also be avoided. It should be noted that the structures of the slot 2-h3 and the protrusion 2-R3 shown in FIGS. 2-15 and 2-16 can also be respectively applied to the lower spring 2-S2 and the base 2-B, so that the glue can be guided by them to prevent overflow of the glue, and assembly efficiency and production yield can be therefore improved.

FIG. 2-17 is a schematic view of a frame 2-F in accordance with another embodiment of the disclosure, FIG. 2-18 is a partial cross-sectional view showing a depressed portion 2-F2 of the frame 2-F in FIG. 2-17 which is spaced apart from an inner surface of a housing 2-H after assembly, and FIG. 2-19 is a partial cross-sectional view showing a recess 2-F3 of the frame 2-F in FIG. 2-17 which is spaced apart from an inner surface of a housing 2-H after assembly. It should be noted that the frame 2-F in FIG. 2-17 can replace the corresponding element in FIG. 2-1, and it has four abutting surfaces 2-F1 on the four sides thereof. During assembly of the driving mechanism, the glue can be disposed between the abutting surfaces 2-F1 and the inner surface of the housing 2-H, to achieve both accuracy positioning and robust adhesion between the frame 2-F and the housing 2-H. Specifically, the frame 2-F forms a depressed portion 2-F2 depressed toward the center of the frame 2-F and a recess 2-F3 extended along the Z axis. The depressed portion 2-F2 (FIG. 2-18) can reduce the interference between the frame 2-F and the housing 2-H during assembly. The recess 2-F3 (FIG. 2-19) can be used as a flow channel to receive and guide the glue, so as to increase the adhesive area between the frame 2-F and the housing 2-H and prevent overflow of the glue.

FIG. 2-20 is a schematic view of a holder 2-R, a coil 2-C, and at least one wire after assembly, in accordance with another embodiment of the disclosure. Referring to FIG. 2-20, the holder 2-R and the coil 2-C can replace the corresponding elements in FIG. 2-1, wherein two oval-shaped coils 2-C are disposed on opposite sides of the holder 2-R and located corresponding to the magnets 2-M (e.g. multipolar magnets) shown in FIG. 2-1. An end of the wire 2-W is connected to one of the coils 2-C, and the other end of the wire 2-W is wound on the leg 2-R1. Specifically, the holder 2-R has a recessed portion 2-R', and at least a part of the leg 2-R1 is received in the recessed portion 2-R. Thus, the dimensions of the holder 2-R in the horizontal directions can be efficiently reduced to achieve miniaturization of the driving mechanism.

FIGS. 2-21 and 2-22 are schematic views showing relative position of a holder 2-R and a frame 2-F of a driving mechanism after assembly, in accordance with another embodiment of the disclosure. Referring to FIGS. 2-21 and 2-22, the holder 2-R forms at least a protrusion 2-R4 protruding from an outer surface of the holder 2-R, and the frame 2-F forms at least a protrusion 2-F4 corresponding to the protrusion 2-R4. It should be noted that when the driving mechanism is impacted by an external force, the holder 2-R may rotate with respect to the frame 2-F, as indicated by the arrows in FIG. 2-22. In this circumstance, the protrusion 2-F4 of the frame 2-F can contact the protrusion 2-R4 of the holder 2-R, so that the holder 2-R can be restricted in a limit position. Thus, the upper and lower springs 2-S1 and 2-S2 of the driving mechanism can be protected from damage due to excessive rotation of the holder 2-R.

Referring to FIGS. 3-1 to 3-3, FIG. 3-1 is a perspective view of a driving mechanism 3-1 according to an embodiment of the present disclosure, FIG. 3-2 is an exploded view of the driving mechanism 3-1 in FIG. 3-1, FIG. 3-3 is a cross-segmental view along line 3A-3A' in FIG. 3-1. It should be noted that the driving mechanism 3-1 of the present embodiment is for holding an optical member (not shown, such as a lens), and a driving module may be disposed in the driving mechanism 3-1, such as a voice coil motor (VCM) optical image stabilization (OIS) or auto focus (AF) functions.

As shown in FIGS. 3-1 to 3-3, in this embodiment, the driving mechanism 3-1 mainly includes a case 3-10, a base 3-20, a holder 3-30, a first magnetic driving component 3-40, a frame 3-50, a plurality of second magnetic driving components 3-60, a first elastic member 3-70, a second elastic member 3-72, a circuit board 3-80, and a metal circuit 3-90. In this embodiment, the shape of the driving mechanism 3-1 is a square.

The case 3-10 can be combined with the base 3-20 to form a housing for the driving mechanism 3-1. It should be noted that a case opening 3-12 and a base opening 3-22 are respectively formed on the case 3-10 and the base 3-20. The center of the case opening 3-12 is located at an optical axis 3-O of an optical member (not shown). The base opening 3-22 corresponds to an image sensor (not shown) placed outside the driving mechanism 3-1. Accordingly, the optical member in the driving mechanism 3-1 can perform image focusing with the image sensor in the direction of the optical axis 3-O.

The holder 3-30 has a through hole 3-32, wherein the optical member can be fixed in the through hole 3-32 (e.g. by securing, adhering, etc.). The frame 3-50 is disposed in the case 3-10 and the base 3-20, and the holder 3-30 is disposed in the frame 3-50. The first magnetic driving component 3-40 is, for example, a coil wound around the outer surface of the holder 3-30. The second magnetic driving components 3-60 are, for example, magnetic members disposed at corners of the driving mechanism 3-1. A magnetic force may be generated by the interaction between the second magnetic driving components 3-60 and the first magnetic driving component 3-40 to move the holder 3-30 relative to the frame 3-50 along the optical axis 3-O, thereby achieving fast focusing.

In this embodiment, the holder 3-30 and the optical member therein are movably disposed in the frame 3-50. More specifically, the holder 3-30 is suspended in the frame 3-50 by the first elastic member 3-70 and the second elastic member 3-72 made of a metal material (FIG. 3). When a current is supplied to the first magnetic driving component 3-40, the first magnetic driving component 3-40 can act with the magnetic field of the second magnetic driving components 3-60 to generate an electromagnetic force to move the holder 3-30 and the optical member therein along the optical axis 3-O direction with respect to the frame 3-50 to achieve auto focusing. For example, the second magnetic driving components 3-60 may include at least one multipole magnet which is used to electromagnetically act with the first magnetic driving component 3-40 to move the holder 3-30 and the optical member along the optical axis 3-O so as to perform image focusing.

The circuit board 3-80, such as a flexible printed circuit board (FPC), may be fixed to the base 3-20 by adhesion. In this embodiment, the circuit board 3-80 is electrically connected to a driving unit (not shown) placed outside the driving mechanism 3-1 to perform functions such as AF or OIS.

In this embodiment, a position sensor 3-81 for detecting a sensed object 3-82 is disposed on and is electrically connected to the circuit board 3-80, thereby detecting the location offset of the frame 3-50 and the holder 3-30 with respect to the base 3-20. The position sensor 3-81 may be, for example, a Hall effect sensor, a MR sensor or a fluxgate, etc., and the sensed object 3-82 may be a magnetic member.

In this embodiment, the metal circuit 3-90 may be disposed on the base 3-20, such as be formed on or formed in the base 3-20 by insert molding or molded interconnect object technology, such as laser direct structuring (LDS), microscopic integrated processing technology (MIPTEC), laser induced metallization (LIM), laser restructuring print (LRP), aerosol jet process, or two-shot molding method, etc.

It should be realized that the circuit board 3-80 may transmit electrical signals to the metal circuit 3-90, and the circuit board 3-80 may also transmit electrical signals to the first magnetic driving component 3-40 through the first elastic member 3-70, thereby controlling the movement of the holder 3-30 along the X-axis, Y-axis 3-Or Z-axis.

Referring to FIGS. 3-4A to 3-4C, which are a perspective view, an exploded view and a cross-segmental view of a driving mechanism 3-2 according to another embodiment of the present disclosure, respectively. The driving mechanism 3-2 mainly includes a case 3-100, a plurality of second magnetic driving components 3-110, a first elastic member 3-120, a holder 3-130, a first magnetic driving component 3-135, a second elastic member 3-140, and a bottom 3-150. It should be noted that some elements which are the same or similar as those of the driving mechanism 3-1 are omitted herein. The difference between the driving mechanism 3-2 in this embodiment and the driving mechanism 3-1 in the previous embodiment is that the length of two adjacent sides of the driving mechanism 3-2 are not equal. In other words, the driving mechanism 3-2 is not a square.

Referring to FIG. 3-5A, which is a top view of the case 3-100 of the driving mechanism 3-2. The case 3-100 includes a first side 3-101 and a second side 3-102 having a first length 3-L1 and a second length 3-L2, respectively. In this embodiment, the first length 3-L1 is greater than the second length 3-L2. In other words, the case 3-100 of the driving mechanism 3-2 is a rectangle. Through arranging the driving mechanism 3-2 as a rectangle, dimension of the driving mechanism 3-2 along the second side 3-102 may be effectively reduced to achieve mechanical miniaturization.

In FIG. 3-5A, a plurality of protruding first positioning parts 3-103 are formed on the first side 3-101 of the case 3-100, a plurality of protruding second positioning parts 3-104 are formed on the second side 3-102. The material of the case 3-100 is, for example, plastic, and the case 3-100, the first positioning parts 3-103, and the second positioning parts 3-104 are integrally formed as one piece by, for example, plastic injection. As a result, as shown in FIGS. 3-5B and 3-5C, the trapezoidal first magnetic driving components 3-110 may be disposed at the corners of the case 3-100, and a first corner 3-111 and a second corner 3-112 of the first magnetic driving component 3-110 abut the first positioning part 3-103 and the second positioning part 3-104, respectively. As a result, the first magnetic driving components 3-110 may be fixed at the corners of the case 3-100 by the first side 3-101, the second side 3-102, the first positioning part 3-103, and the second positioning part 3-104, thereby enhancing the accuracy of assembly and the mechanical strength of the driving mechanism 3-2. Furthermore, the material of the case 3-100 is plastic, signal of a mobile device may not be interfered, and therefore quality and stability of communication may be enhanced.

Referring to FIGS. 3-6A to 3-6C, which are top views of the first elastic member 3-120 of the driving mechanism 3-2. The first elastic member 3-120 is mainly formed by a first outer circumferential part 3-121A, a second outer circumferential part 3-121B and an inner circumferential part 3-122. The first outer circumferential part 3-121A and the second outer circumferential part 3-121B are connected by a corner part 3-123. Two first strings 3-124 and two second strings 3-125 are disposed between first, second circumferential parts 3-121A, 3-121B and the inner circumferential part 3-122 in an alternate manner. It should be noted that the area in a top view (e.g. FIG. 3-6A) and the structure of the first strings 3-124 and the second strings 3-125 are different. Furthermore, the two first strings 3-124 are symmetric with respect to the optical axis 3-O of the optical member (not shown), such as rotational symmetry or reflectional symmetry, and so as the two second strings 3-125. Unwanted tilting of the holder 3-130 may be reduced during moving by the first strings 3-124 and the second strings 3-125 having different characteristics, and is especially effective in the asymmetric driving mechanism 3-2 in this embodiment. Furthermore, elastic coefficients of the first strings 3-124 and the second strings 3-125 may be adjusted separately using this method, thereby achieving different characteristic requirements.

In this embodiment, axis 3-C1 is where the centers of two opposite second sides 3-102 of the case 3-100 are connected, and axis 3-C2 is where the centers of two opposite first sides 3-101 of the case 3-100 are connected. In other words, axis 3-C1 is parallel to the first side 3-101, axis 3-C2 is parallel to the second side 3-102, and axes 3-C1 and 3-C2 intersect at the optical axis 3-O of the optical member. A first curved part 3-126 and a second curved part 3-127 are arranged at the first, second circumferential parts 3-121A, 3-121B of the first elastic member 3-120, and are deviated from the axes 3-C1, 3-C2, respectively. As shown in FIGS. 3-6B and 3-6C, the first curved part 3-126 and the second curved part 3-127 of the first elastic member 3-120 abut the first positioning part 3-103 and the second positioning part 3-104, respectively. As a result, a positioning function may be performed during assembly, thereby increasing accuracy of assembly. However, the present disclosure is not limited thereto. For example, other elements may be disposed at the first, second curved parts 3-126, 3-127.

Two first connecting sites 3-128 and two second connecting sites 3-129 are further disposed at the inner circumferential part 3-122 of the first elastic member 3-120. The first strings 3-124 and the second strings 3-125 are connected to the inner circumferential part 3-122 through the first connecting sites 3-128 and the second connecting sites 3-129, respectively. The axis 3-C1 pass through two second connecting sites 3-129, but the axis 3-C2 does not pass through the first connecting site 3-128. In other words, the connection of the two second connecting sites 3-129 may be parallel to the first side 3-101. Furthermore, when the driving mechanism 3-2 facing impact, the first, second curved parts 3-126, 3-127 and the first, second connecting sites 3-128, 3-129 may be deformed to absorb energy of the impact and thus dispersing the stress to protect the driving mechanism 3-2.

Referring to FIG. 3-7A, the first elastic member 3-120 and the holder 3-130 of the driving mechanism 3-2 are illustrated therein. Two protruding first linking parts 3-131 and two protruding second linking parts 3-132 are at outer sides of the holder 3-130, and the first linking parts 3-131 and the second linking parts 3-132 are corresponding to and directly connected to the first connecting sites 3-128 and the second connecting sites 3-129 of the first elastic member 3-120, respectively. It should be noted that an axis 3-C3 may pass through the two first linking parts 3-131 and the optical axis 3-O of the optical member, and the axis 3-C1 may pass through the two second linking parts 3-132. In other words, the two first linking parts 3-131 are symmetric with respect to the optical axis 3-O of the optical member disposed in the holder 3-130, so as the two second linking parts 3-132, but the first linking parts 3-131 are deviated from the axis 3-C2. Furthermore, an angle 3-θ between the axes 3-C1 and 3-C3 is not a right angle. With this arrangement, the space in the driving mechanism 3-2 may be effectively utilized to achieve mechanism miniaturization.

The holder 3-130 further includes two first stopping parts 3-133 and two second stopping parts 3-134, arranged to be symmetric with respect to the center of the holder 3-130 (i.e. symmetric with respect to the optical axis 3-O of the optical member), respectively. As shown in FIG. 3-7A, the first and second stopping parts 3-133, 3-134 are disposed close to the corner parts 3-123, i.e. close to corners of the driving mechanism 3-2. As a result, the space at the corner of the driving mechanism 3-2 may be effectively utilized to achieve mechanism miniaturization.

Referring to FIG. 3-7B, the case 3-100 and the holder 3-130 are illustrated therein. The case 3-100 has first concave parts 3-105 and second concave parts 3-106 corresponding to the first linking parts 3-131 and the second linking parts 3-132 of the holder 3-130. In a top view, a portion of the first linking parts 3-131 and a portion of the second linking parts 3-132 are exposed by the first concave parts 3-105 and the second concave parts 3-106, respectively, thereby enhancing the convenience during assembly. The first concave part 3-105 and the second concave part 3-106 are corresponding to the first linking part 3-131 and the second linking part 3-132, an angle of a connection between the two first concave parts 3-105 and a connection between the second concave parts 3-106 is also the angle 3-θ which is not a right angle, so mechanism miniaturization may be further achieved.

It should be noted that if any stopping parts are formed between the linking parts of the holder 3-130, there may be at least two stopping parts. However, it is also possible not to form any stopping part between the linking parts. For example, as shown in FIG. 3-7A, the first stopping part 3-133 and the second stopping part 3-134 are disposed between the first linking part 3-131 and the second linking part 3-132.

Referring to FIGS. 3-8A and 3-8B, which are a bottom view and a perspective view of some elements of the driving mechanism 3-2 according to an embodiment of the present disclosure, respectively. As shown in FIGS. 3-8A and 3-8B, the case 3-100 and the holder 3-130 when assembled are illustrated therein. A first magnetic driving component 3-135 is wound around the holder 3-130, and the holder 3-130 has a plurality of protruding parts 3-136, which are protruding toward the second side 3-102 of the case 3-100, and the holder 3-130 further has a plurality of first positioning bumps 3-137, which are protruding parallel to the optical axis 3-O, and the case 3-100 has recesses 3-107 corresponding to the protruding parts 3-136. The protruding parts 3-136 are closer to the second sides 3-102 than to the first sides 3-101. Although the second magnetic driving component 3-110 is not shown in FIG. 3-8B, the protruding parts 3-136 may be located between two second magnetic driving components 3-110 when the second magnetic driving components 3-110 are disposed at the corners of the driving mechanism 3-2.

It should be noted that the first magnetic component 3-135 (the portion defined by dashed line in FIG. 3-8A) may be formed from a first segment 3-135A adjacent to the first side 3-101, a second segment 3-135B adjacent to the second side 3-102, and a third segment 3-135C adjacent to the corners of the case 3-100. The distance between the first side 3-101 and the first segment 3-135A is 3-D1, and the distance between the second side 3-102 and the second segment 3-135B is 3-D2 which is different from 3-D1. As a result, the space in the driving mechanism 3-2 may be effectively utilized to achieve mechanism miniaturization.

Referring to FIG. 3-8C, which is a perspective view of the driving mechanism 3-2 according to an embodiment of the present disclosure. The second elastic member 3-140 having a plurality of first positioning holes 3-141 and a plurality of second positioning holes 3-142 is further disposed on the holder 3-130. The first positioning bumps 3-137 of the holder 3-130 are disposed in the first positioning holes 3-141 of the second elastic member 3-140 to fix the relative positions of the holder 3-130 and the second elastic member 3-140, thereby increasing the accuracy of assembly. The second elastic member 3-140 has an end 3-143 corresponding to the protruding part 3-136. As a result, the first magnetic driving component 3-135 (FIG. 3-4B) wound around the holder 3-130 may be wound around the protruding part 3-136 and the end 3-143, and they may be fixed by soldering and be electrically connected to the second elastic member 3-140. Furthermore, the protruding part 3-136 may be used for limiting the moving of the holder 3-130 in the driving mechanism 3-2, thereby preventing unwanted collision between the elements.

Referring to FIGS. 3-9A to 3-9D, an assembly method of the driving mechanism 3-2 is illustrated therein. As shown in FIG. 3-9A, the first magnetic driving component 3-135 is wound around the holder 3-130, and the first magnetic driving component 3-135 and the holder 3-130 are disposed on the second elastic member 3-140, wherein the first positioning bumps 3-137 of the holder 3-130 (FIGS. 3-8B and 3-8C) are connected to the first positioning holes 3-141 of the second elastic member 3-140 by, for example, engaging or adhesion. And then as shown in FIG. 3-9B, the holder 3-130 and the second elastic member 3-140 are assembled on the base 3-150, wherein the second positioning holes 3-142 of the second elastic member 3-140 are connected to second positioning bumps 3-151 of the base 3-150 by, for example, engaging or adhesion, too. It should be noted that as shown in FIG. 3-9B, the second positioning bumps 3-151 are not disposed at every corners of the base 3-150, thereby not every corners of the second elastic member 3-140 has the second positioning holes 3-142, and their amount may be varied depending on design requirement.

Afterwards, as shown in FIG. 3-9C, the case 3-100, the second magnetic driving component 3-110 and the first elastic member 3-120 are assembled together, wherein the first elastic component 3-120 is disposed between the case 3-100 and the second magnetic driving component 3-110, and the first positioning parts 3-103 and the second positioning parts 3-104 are corresponding to the first corners 3-111 and the second corners 3-112 of the second magnetic driving component 3-110. As a result, the second magnetic driving component 3-110 may be engaged at the corners of the case 3-100, and the first elastic member 3-120 is sandwiched therein. Next, the case 3-100, the second magnetic driving component 3-110 and the first elastic member 3-120 are fixed by adhesion, such as by using thermal curable adhesives or UV curable adhesives, etc. At last, as shown in FIG. 3-9D, the case 3-100 is set on the base 3-150 and then fixed by adhesion or engaging. As a result, the assembly of the driving mechanism 3-2 is finished.

Figures 1, 4:
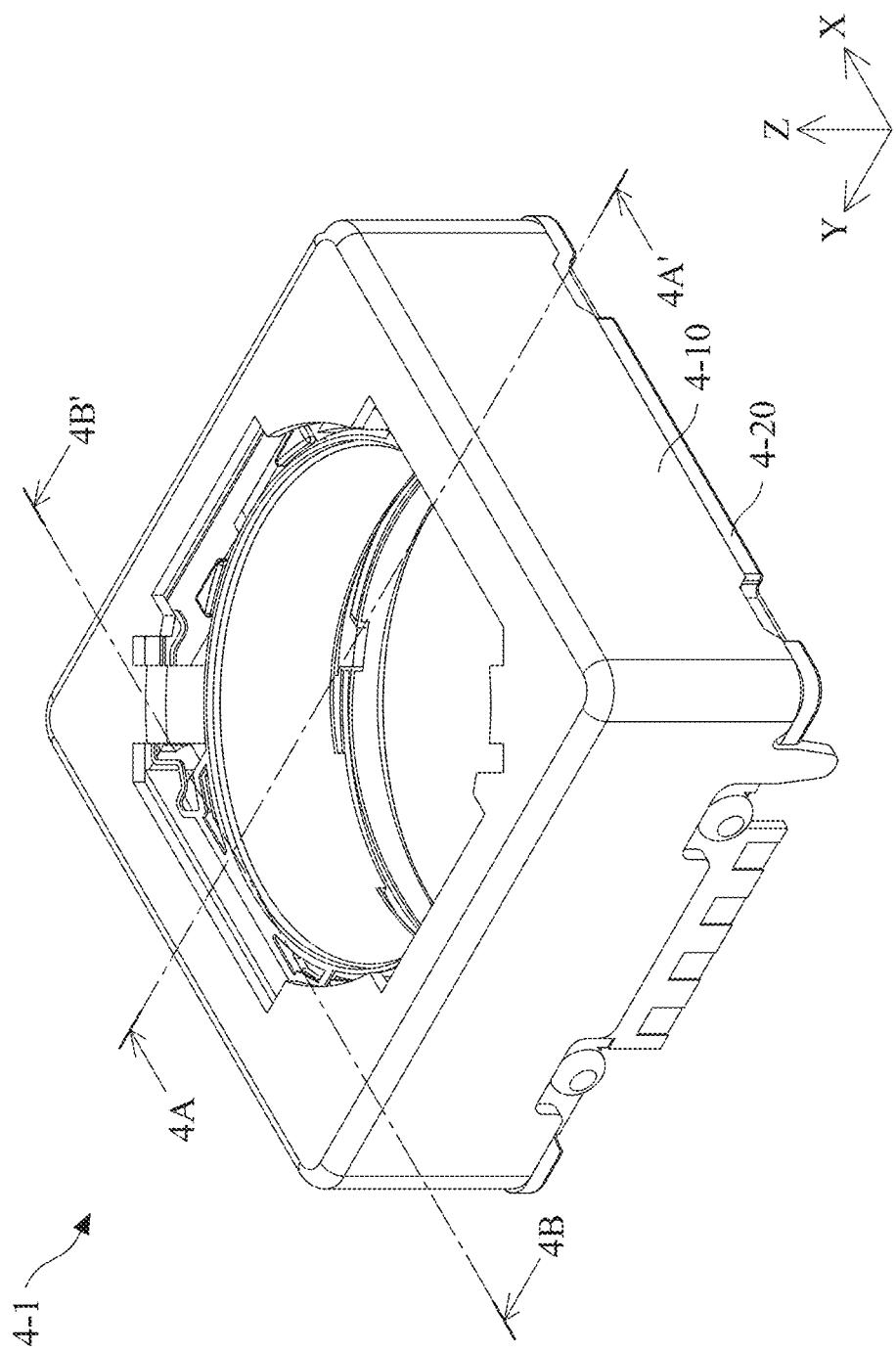
Figures 2, 4:
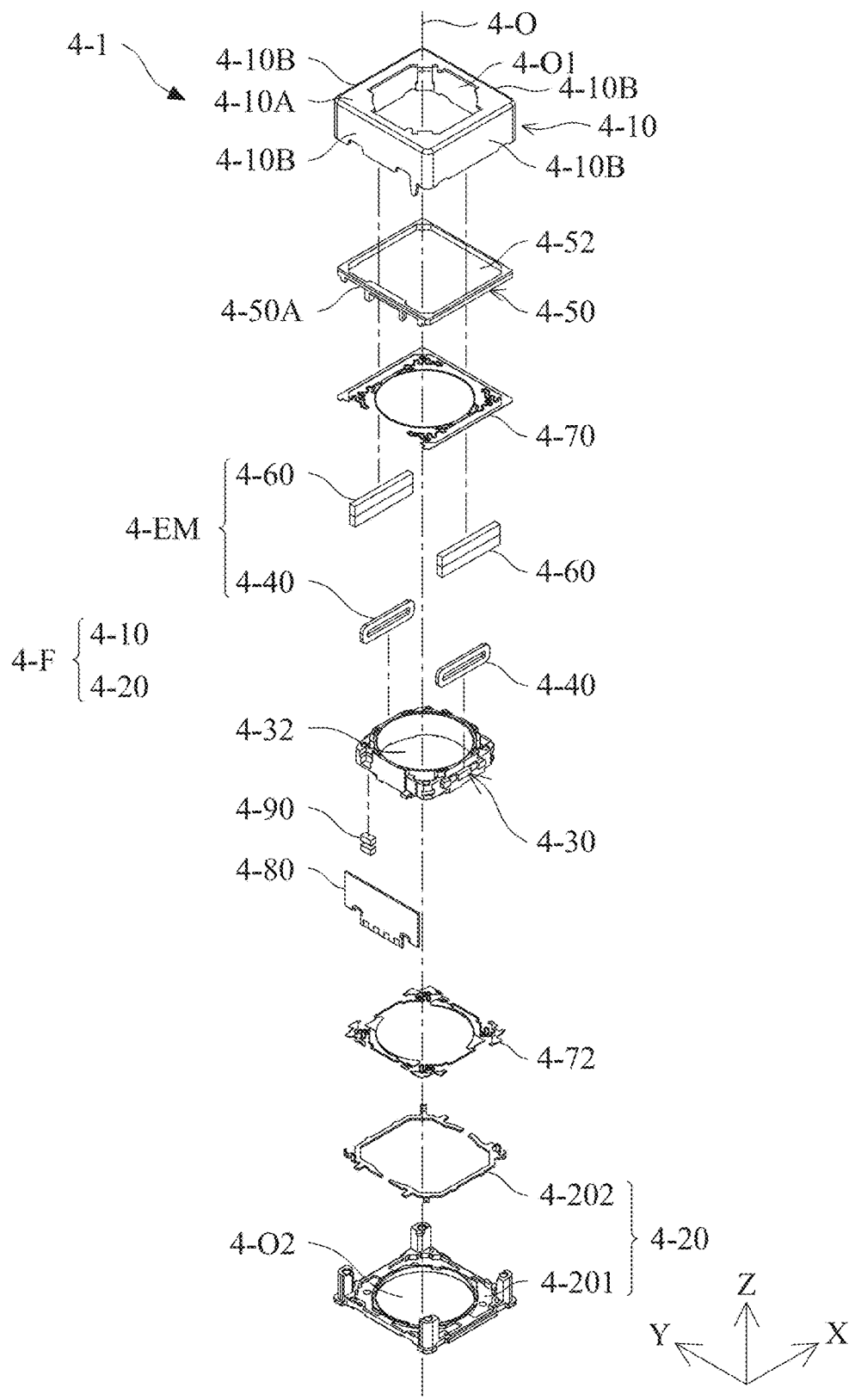
Figures 3A, 4:
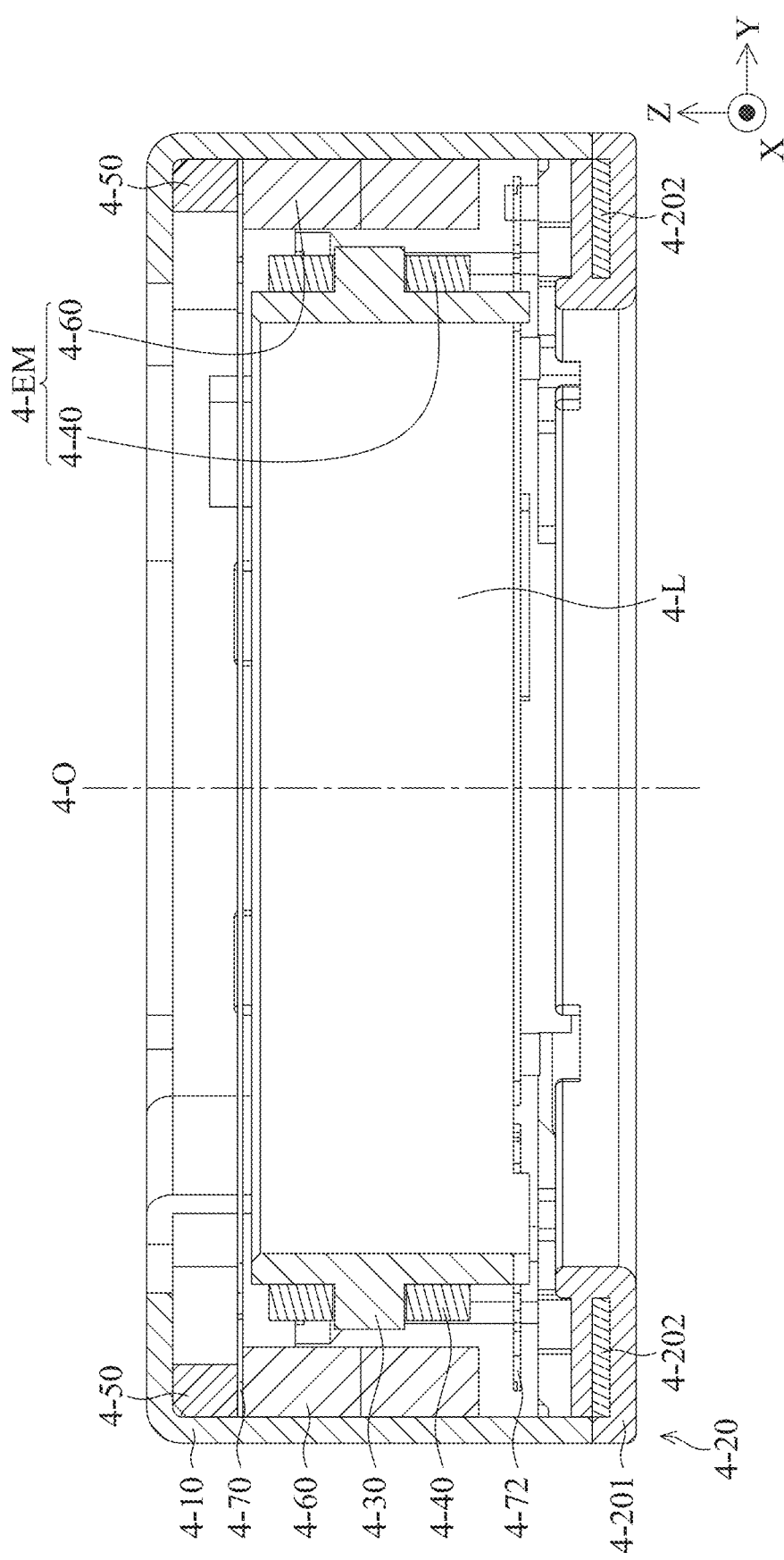
Figures 3B, 4:
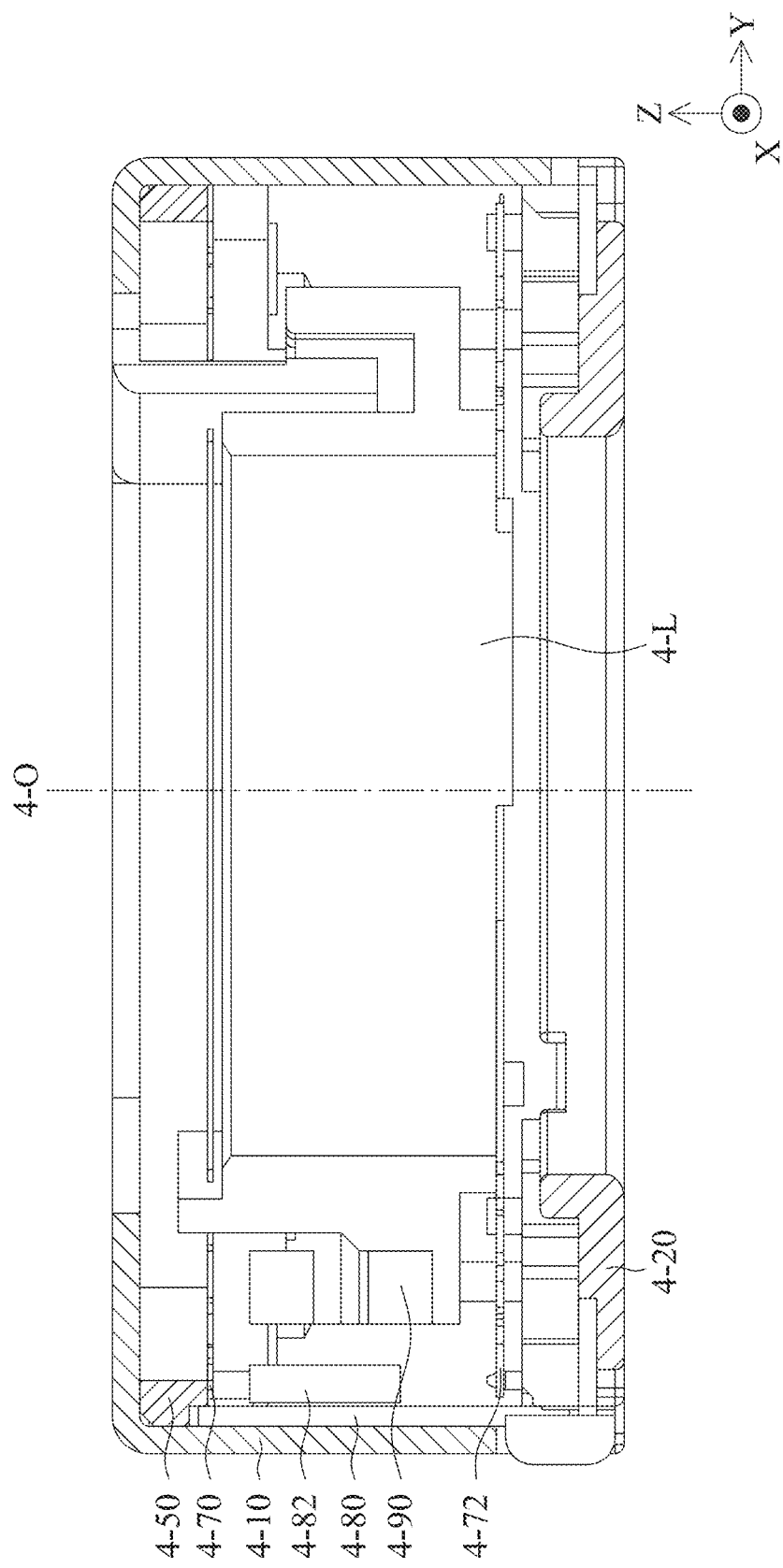
Figures 4, 4A:
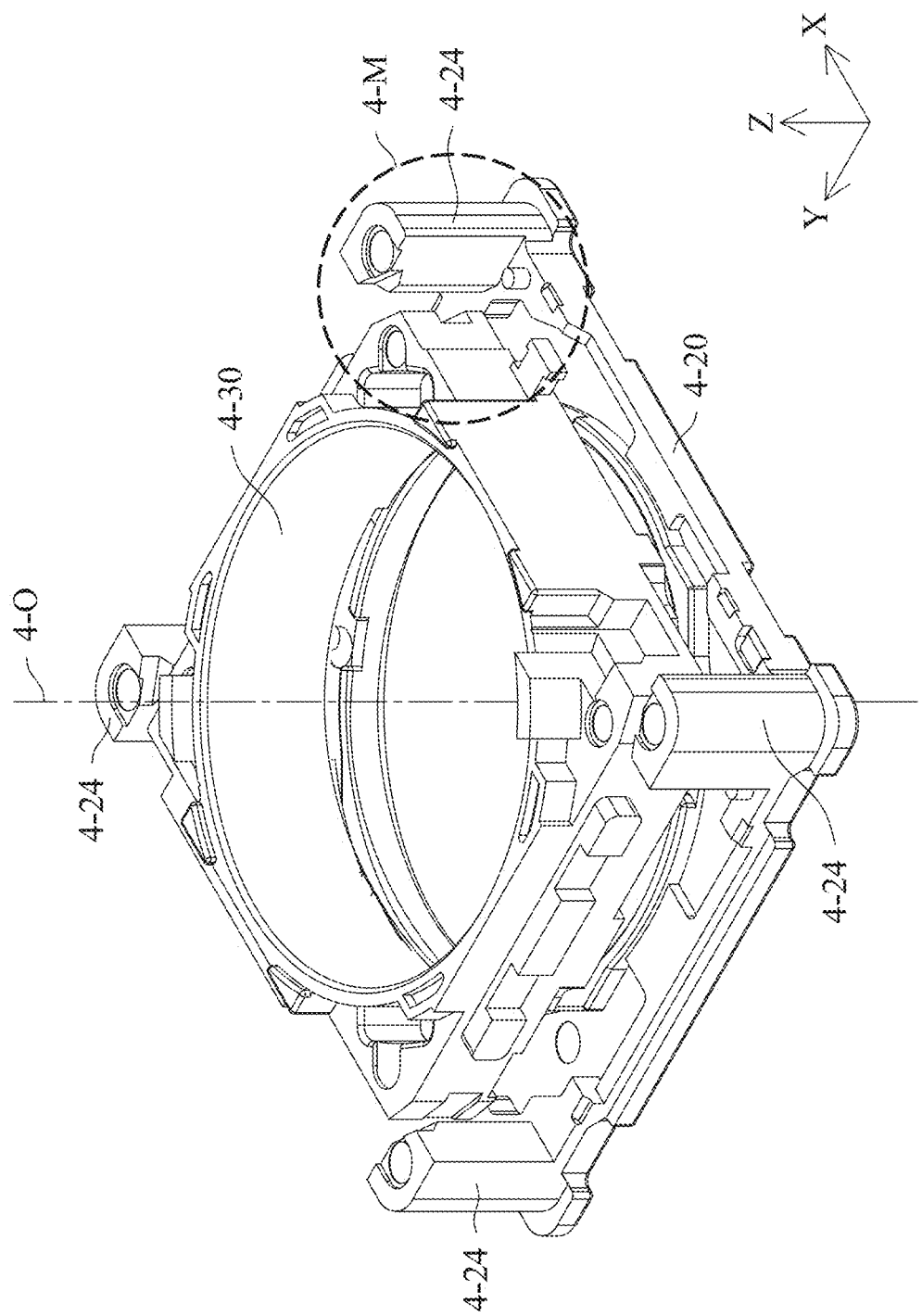
Figures 4, 4B:
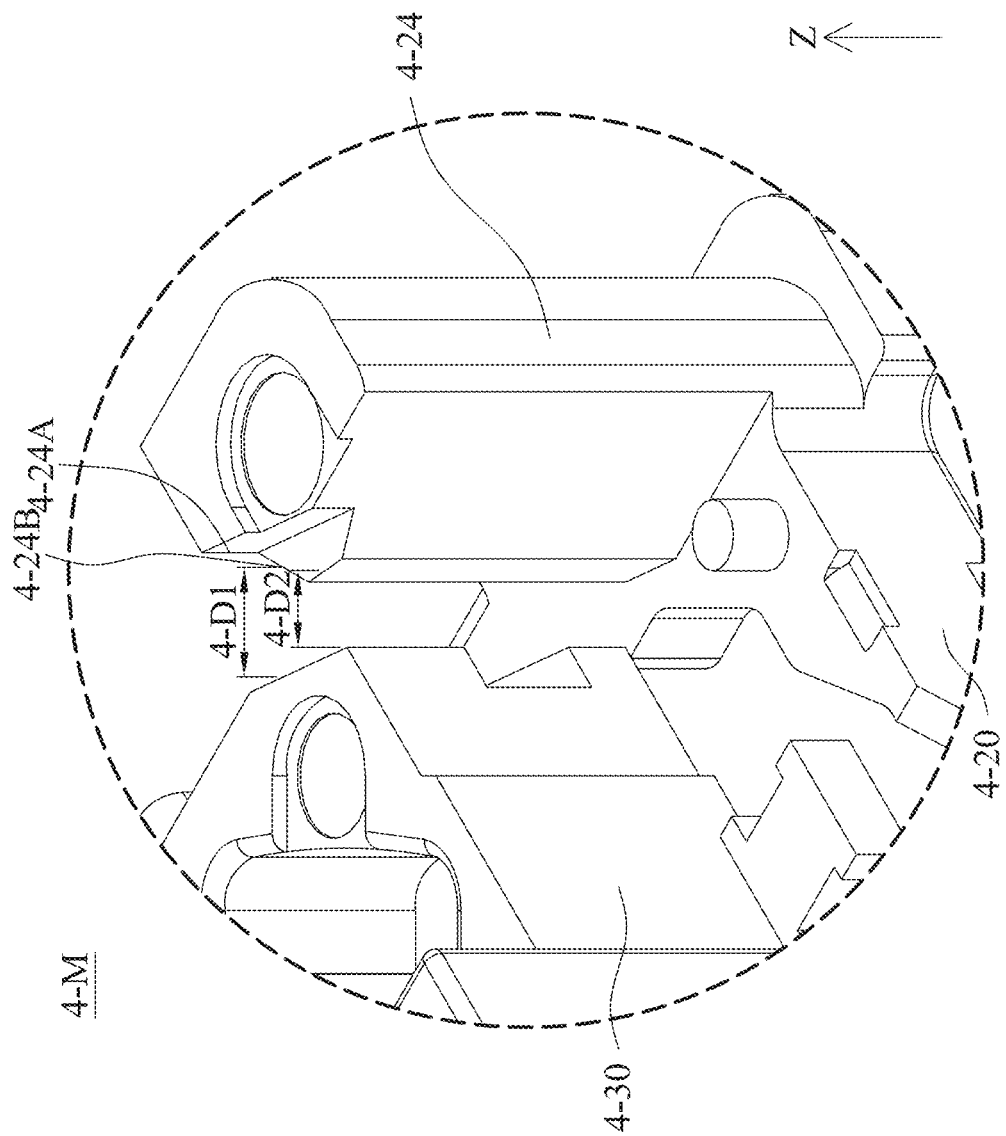
Figures 4, 4C:
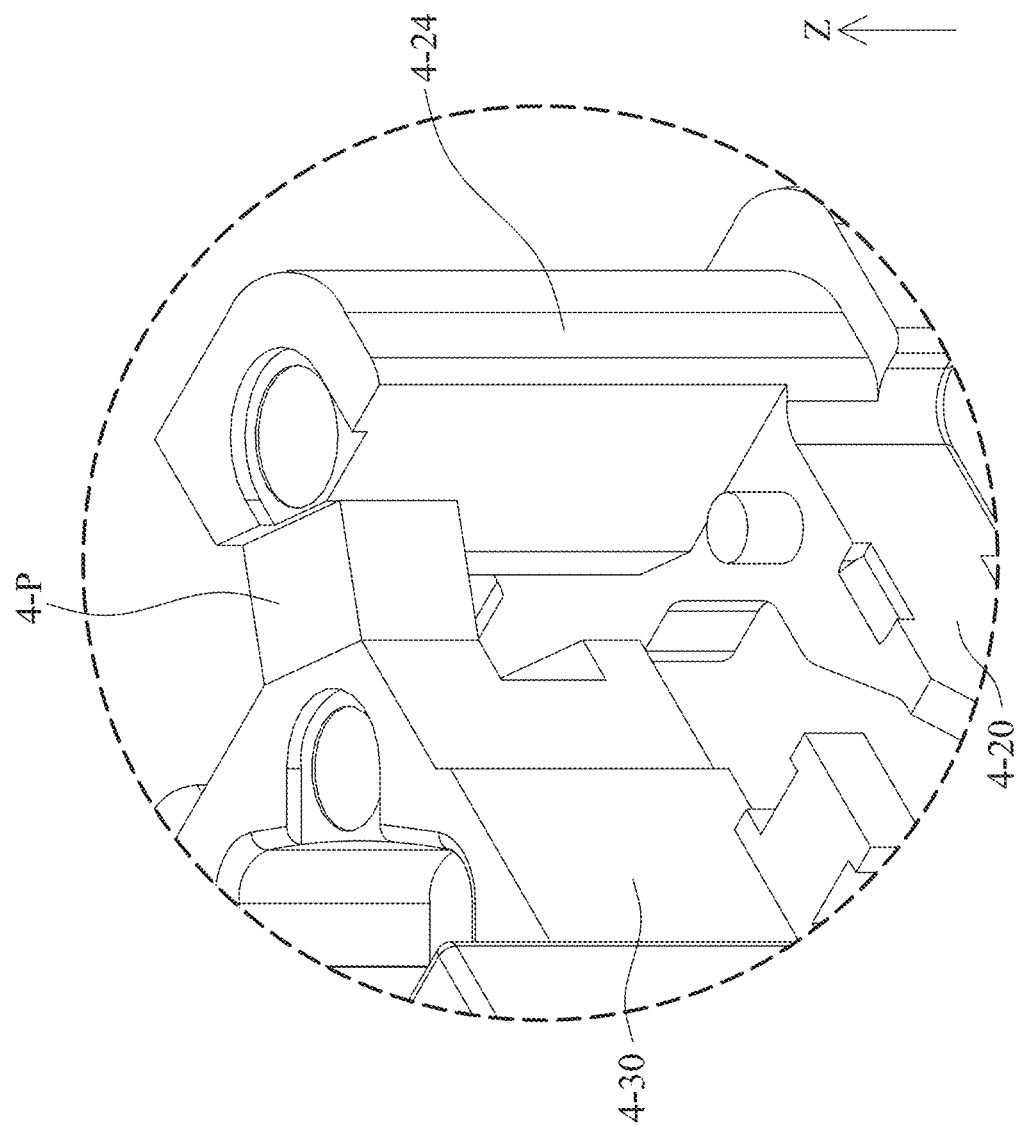
Figures 4, 5, 5A:
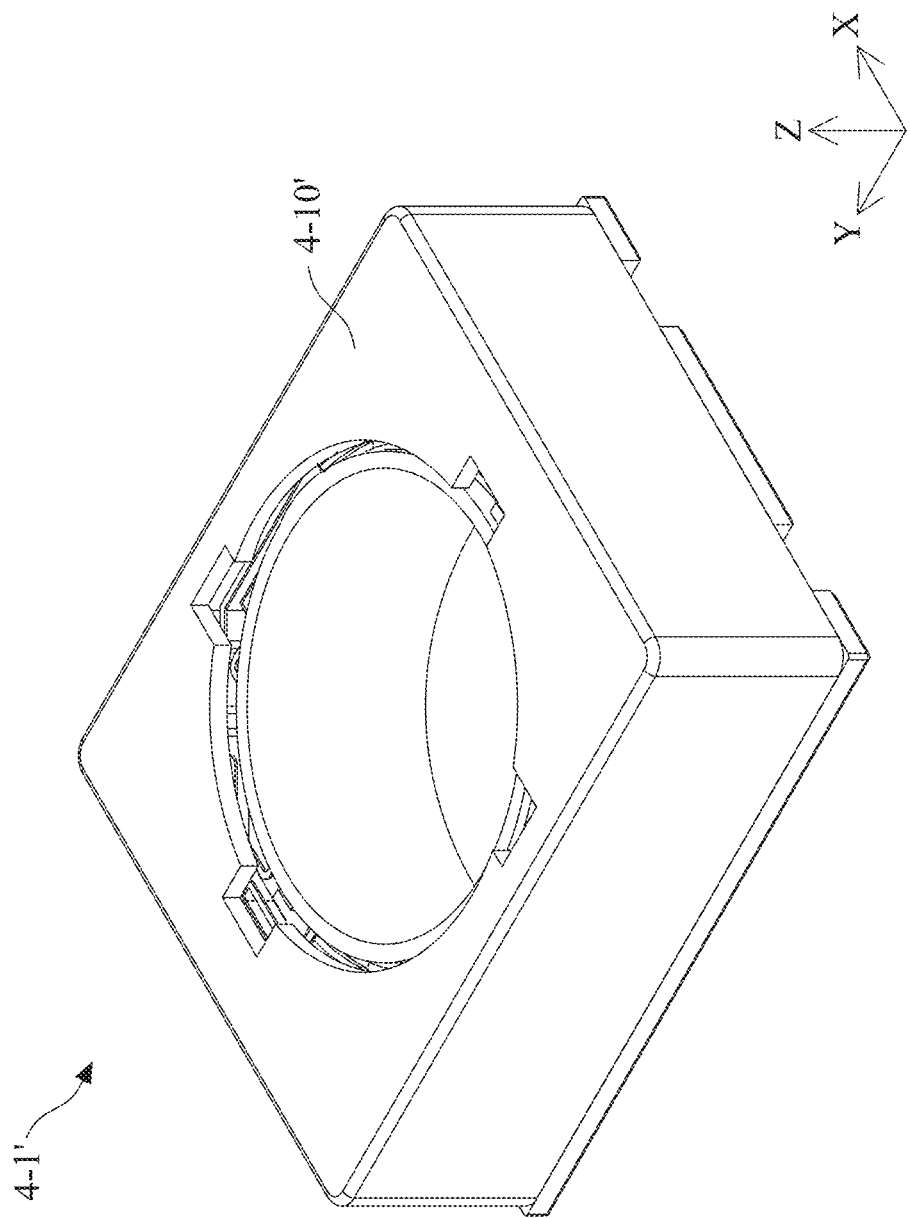
Figures 4, 5, 5B:
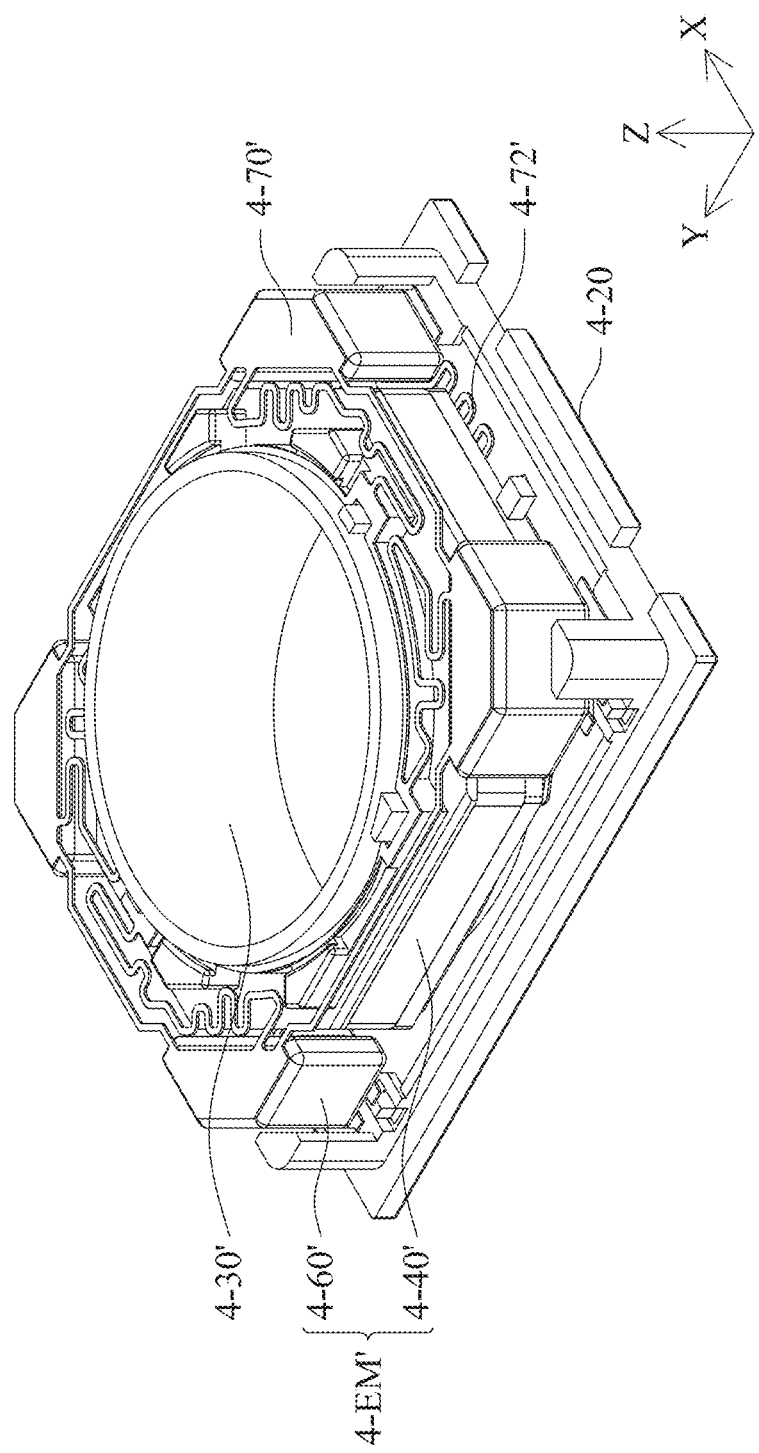
Figures 4, 5, 5C:
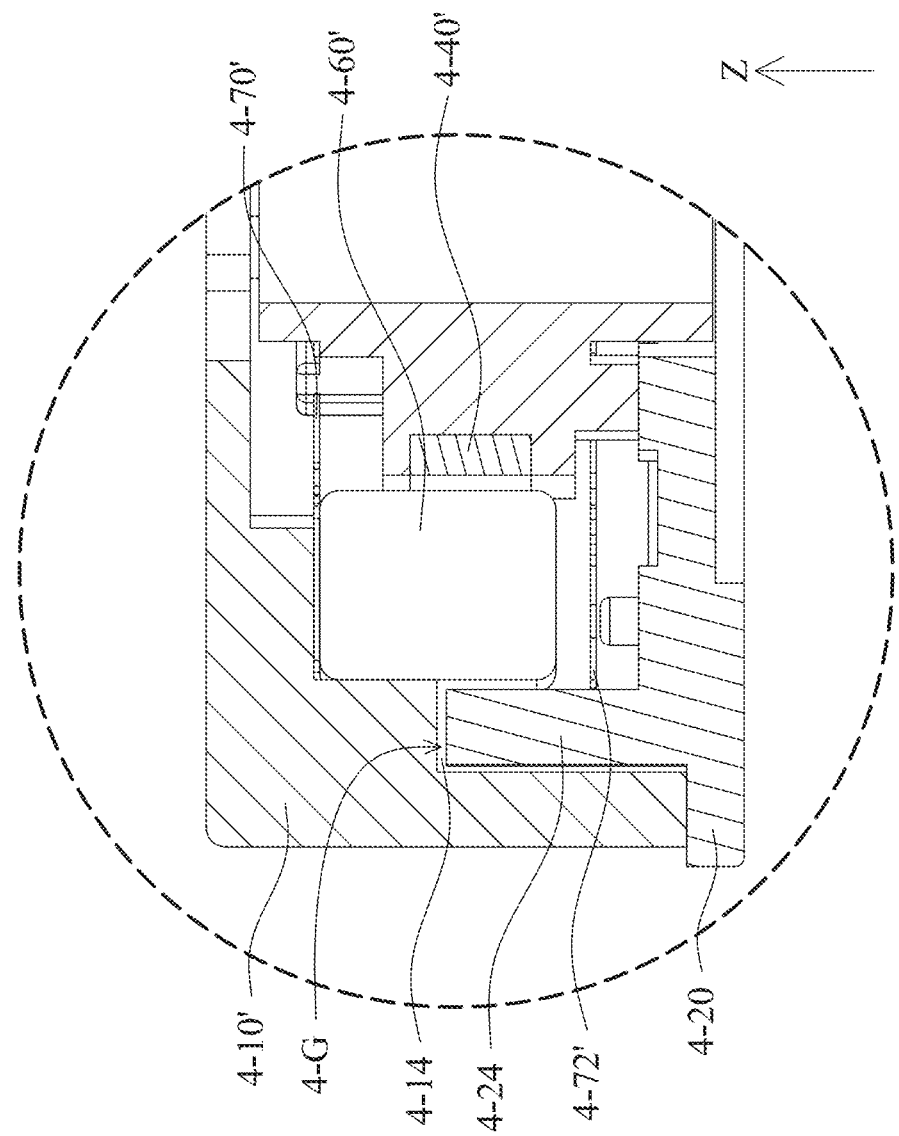
Figures 4, 5, 6, 6A:
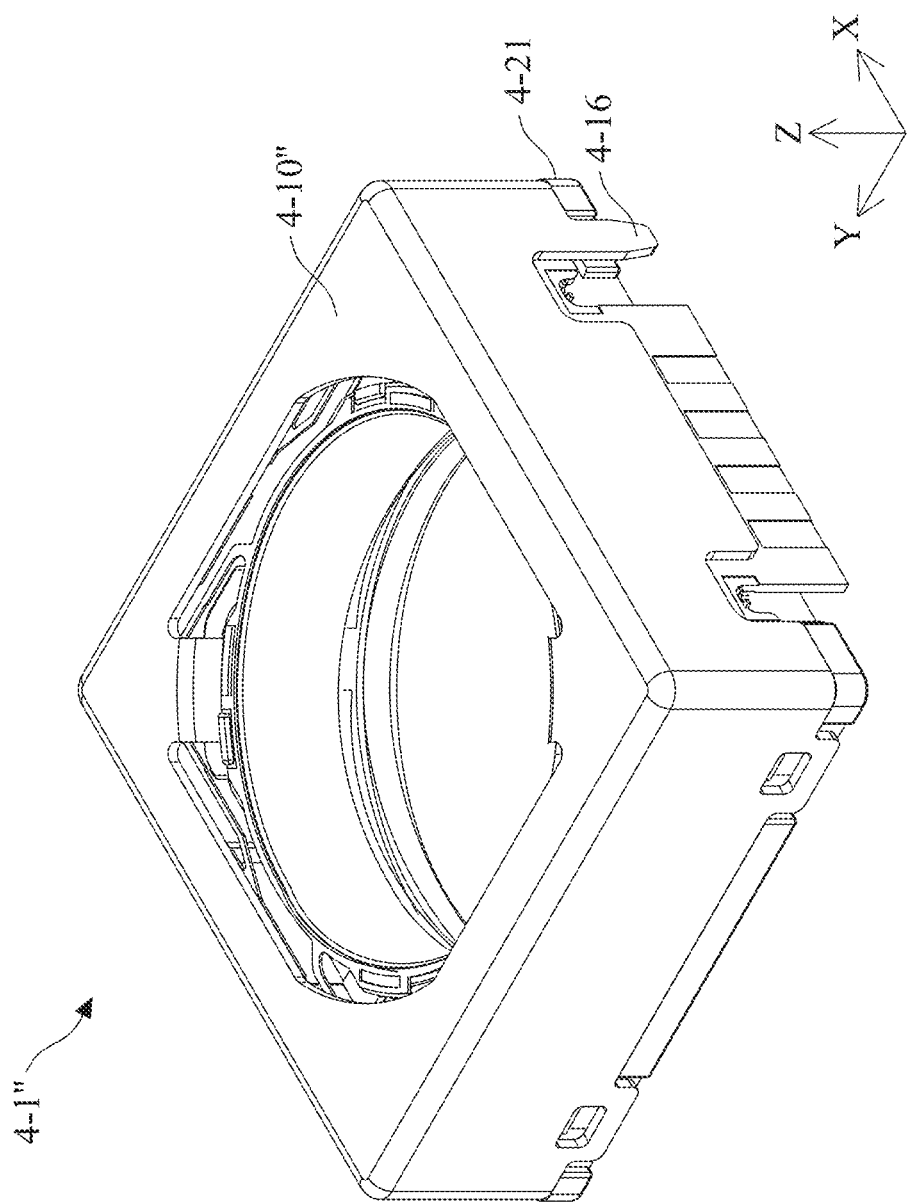
Figures 4, 5, 6, 6B:
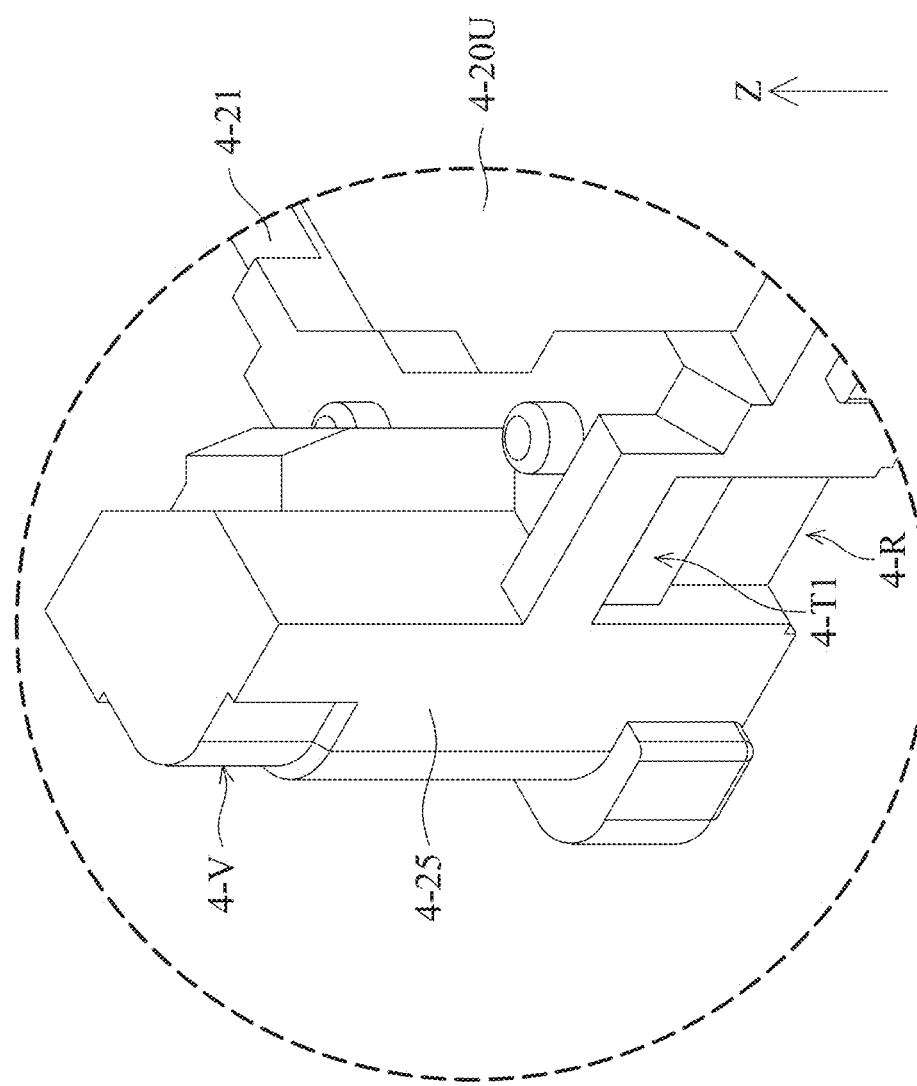
Figures 4, 5, 6, 6C:
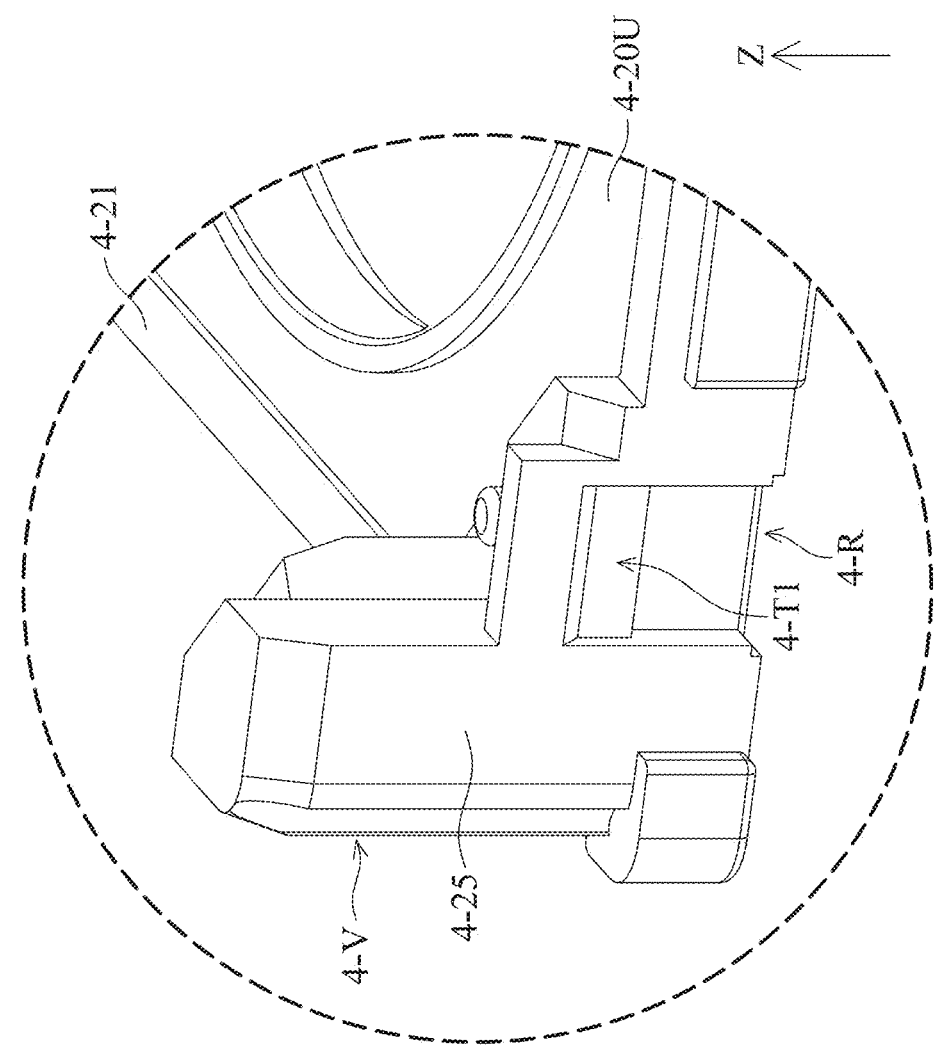

Referring to FIGS. 4-1 to 4-3B, wherein FIG. 4-1 is a schematic perspective view illustrating a driving mechanism 4-1 in accordance with an embodiment of the present disclosure, FIG. 4-2 is an exploded view illustrating the driving mechanism 4-1 in FIG. 4-1, FIG. 4-3A is a cross-sectional view illustrating the driving mechanism 4-1 along line 4A-4A' in FIG. 4-1, and FIG. 4-3B is a cross-sectional view illustrating the driving mechanism 4-1 along line 4B-4B' in FIG. 4-1. It should be noted that, in this embodiment, the driving mechanism 4-1 may be, for example, a voice coil motor (VCM), which may be disposed in the electronic devices with camera function for driving an optical member (such as a lens), and can perform an autofocus (AF) function.

It is shown in FIG. 4-2 that the driving mechanism 4-1 has a substantial rectangular structure, which mainly includes a fixed portion 4-F, a carrier 4-30, a plurality of driving coils 4-40, a frame 4-50, a plurality of magnetic members 4-60, a first elastic member 4-70, a second elastic member 4-72, a circuit board 4-80, and at least one sensing magnet 4-90. The fixed portion 4-F includes a housing 4-10 and a base 4-20, both of which may be assembled as a hollow case. The carrier 4-30, the driving coils 4-40, the frame 4-50, the magnetic members 4-60, the first elastic member 4-70, the second elastic member 4-72, the circuit board 4-80, and the sensing magnet 4-90 may be surrounded by the housing 4-10, and thus may be contained in the case.

The housing 4-10 has a hollow structure, which includes a top wall 4-10A, four sidewalls 4-10B, and an optical hole 4-O1. The center of the optical hole 4-O1 corresponds to an optical axis 4-O of an optical member (such as a lens 4-L; see FIGS. 4-3A and 4-3B). An optical hole 4-O2 is formed on the base 4-20, and the optical hole 4-O2 corresponds to an image-sensing member (not shown) disposed outside the driving mechanism 4-1. The housing 4-10 is connected to the base 4-20. Therefore, the optical member (the lens 4-L) disposed in the driving mechanism 4-1 can perform a focusing function with the image-sensing member in the direction of the optical axis 4-O. It should be noted that the term "the optical axis 4-O direction" may represent the direction that is along the optical axis 4-O or any direction which is parallel to the optical axis 4-O in the following description.

The base 4-20 includes a body 4-201 and a three-dimensional circuit 4-202. For example, the body 4-201 is a plastic material, and the three-dimensional circuit 4-202 is a metallic material. In this embodiment, the three-dimensional circuit 4-202 is electrically connected to a circuit unit (not shown) disposed outside the driving mechanism 4-1 through the circuit board 4-80, and the three-dimensional circuit 4-202 is configured to perform an autofocus (AF) function. In addition, the body 4-201, which is a plastic material, covers an outside of the three-dimensional circuit 4-202 by insert molding.

The carrier 4-30 carries an optical member. The carrier 4-30 has a hollow structure, and a through hole 4-32 is formed therein, wherein the optical member is secured in the through hole 4-32. The frame 4-50 has an opening 4-52, and a groove 4-50A, wherein the circuit board 4-80 may be fixed in the groove 4-50A. In this embodiment, the circuit board 4-80 is electrically connected to the circuit unit (not shown) disposed outside the driving mechanism 4-1. The circuit board 4-80 is electrically connected to the driving coils 4-40 through the three-dimensional circuit 4-202, and the circuit board 4-80 transmits the electrical signals sent from the circuit unit to the driving coils 4-40 to perform an autofocus (AF) function.

As shown in FIGS. 4-2 and 4-3A, the carrier 4-30 is movably connected to the housing 4-10 and the base 4-20. To be more specific, the carrier 4-30 may be connected to the frame 4-50 through the first elastic member 4-70, the carrier 4-30 may also be connected to the base 4-20 through the second elastic member 4-72, and the first elastic member 4-70 and the second elastic member 4-72 are metallic materials. Therefore, the carrier 4-30 is movably suspended between the frame 4-50 and the base 4-20.

Two magnetic members 4-60 and two corresponding driving coils 4-40, which are disposed outside the carrier 4-30, may constitute a driving assembly 4-EM. When a current is applied to the driving coils 4-40, an electromagnetic driving force may be generated by the driving coils 4-40 and the magnetic members 4-60 to drive the carrier 4-30 and the optical member (such as the lens 4-L) to move along Z-axis direction (the optical axis 4-O direction) relative to the base 4-20. Therefore, the autofocus (AF) function is performed.

As shown in FIG. 4-3B, a magnetic field sensing member 4-82, which is electrically connected to the circuit board 4-80, may be disposed on the base 4-20. The magnetic field sensing member 4-82 is, for example, a Hall effect sensor, a magnetoresistive (MR) sensor, such as a giant magnetoresistive (GMR) sensor or a tunnel magnetoresistive (TMR) sensor, or a fluxgate. The magnetic field sensing member 4-82 and the sensing magnet 4-90 constitute a sensing assembly. By detecting the sensing magnet 4-90, which is disposed on the carrier 4-30, the displacement of the carrier 4-30 in the Z-axis direction (the optical axis 4-O direction) relative to the base 4-20 may be obtained. The circuit board 4-80 and the driving assembly 4-EM are disposed on different sides of the driving mechanism 4-1. That way, electromagnetic interference may be avoided, and the interior space of the driving mechanism 4-1 may be fully utilized.

Referring to FIG. 4-4A, FIG. 4-4A is a schematic view illustrating the relative positions between the carrier 4-30 and the base 4-20 after assembly in accordance with an embodiment of the present disclosure. As shown in FIG. 4-4A, the base 4-20 includes four positioning members 4-24, which are respectively formed at four corners of the base 4-20, located outside the carrier 4-30. That is, the positioning members 4-24 are farther away from the optical axis 4-O than the carrier 4-30. The accuracy of assembly between the carrier 4-30 and the base 4-20 may be increased by the design of the positioning members 4-24.

Next, referring to FIG. 4-4B, FIG. 4-4B is an enlarged view illustrating a region 4-M in FIG. 4-4A. As shown in FIG. 4-4B, the distance between the positioning member 4-24 and the carrier 4-30 is narrower in the direction towards the base 4-20 (i.e. negative Z-axis direction). That is, between the positioning member 4-24 and the carrier 4-30, a first distance 4-D1 is greater than a second distance 4-D2, wherein the first distance 4-D1 is farther away from the base 4-20, and the second distance 4-D2 is closer to the base 4-20. Accordingly, during the assembly of the carrier 4-30 and the base 4-20, collision is less generated to cause the members damaged. In this embodiment, an inner surface, facing the carrier 4-30 (that is, facing the optical axis 4-O), of the positioning member 4-24 is designed to have a lateral surface 4-24A and an inclined surface 4-24B adjacent to each other. The lateral surface 4-24A is farther away from the carrier 4-30 than the inclined surface 4-24B so that the first distance 4-D1 is greater than the second distance 4-D2. In some other embodiments, the positioning member 4-24 may also be designed as a stair-like, step, or curved structure so that the first distance 4-D1 is greater than the second distance 4-D2 between the positioning member 4-24 and the carrier 4-30.

FIG. 4-4C is an enlarged view illustrating the positioning member 4-24 and the carrier 4-30 after assembly in accordance with another embodiment of the present disclosure. As shown in FIG. 4-4C, a damping member 4-P may be disposed between the positioning member 4-24 and the carrier 4-30. The damping member 4-P concurrently contacts the positioning member 4-24 and the carrier 4-30. Therefore, during the operation of the driving mechanism 4-1, the carrier 4-30 may be stabilized sooner. At the same time, the positioning member 4-24 is disposed at the corner of the driving mechanism 4-1 so that the stability of the mechanism can be further enhanced, and the goal of miniaturization is achieved. It should be noted that, in this embodiment, the damping member 4-P does not contact the driving assembly 4-EM (i.e. the driving coil 4-40 and the magnet members 4-60).

Referring to FIGS. 4-5A and 4-5B, FIG. 4-5A is a schematic perspective view illustrating a driving mechanism 4-1' in accordance with another embodiment of the present disclosure, and FIG. 4-5B is a schematic perspective view illustrating interior components of the driving mechanism 4-1' in FIG. 4-5A. The driving mechanism 4-1' may include members the same as or similar to the driving mechanism 4-1, the same or similar members will be denoted as the same or similar numerals, and the detailed description will be omitted. It should be noted that for clearly illustrating the interior structure of the driving mechanism 4-1', a housing 4-10' of the driving mechanism 4-1' is not shown in FIG. 4-5B. The difference between the driving mechanism 4-1' in this embodiment and the driving mechanism 4-1 shown in FIG. 4-1 is that a driving assembly 4-EM' of the driving mechanism 4-1' includes a driving coil 4-40' and four magnetic members 4-60'. The driving coil 4-40' is disposed around a carrier 4-30', and the magnetic members 4-60' are respectively disposed at four corners of the driving mechanism 4-1'.

Next, referring to FIG. 4-5C, FIG. 4-5C is a partial cross-sectional view illustrating the driving mechanism 4-1' in FIG. 4-5A. As shown in FIG. 4-5C, the housing 4-10' is disposed on the positioning member 4-24. The housing 4-10' has a protruding bearing surface 4-14, facing the positioning member 4-24 and protruding towards the base 4-20. The protruding bearing surface 4-14 is perpendicular to the Z-axis direction (the optical axis 4-O direction). There is a gap 4-G between the protruding bearing surface 4-14 of the housing 4-10' and the positioning member 4-24. An adhesive is filled into the gap 4-G to bond the housing 4-10' and the base 4-20. The bearable pressure of the mechanism may be enhanced by forming the protruding bearing surface 4-14, which is perpendicular to the Z-axis direction, and corresponds to the positioning member 4-24. Therefore, the driving mechanism 4-1' may bear greater external strength and not be damaged.

Referring to FIG. 4-6A, FIG. 4-6A is a schematic perspective view illustrating a driving mechanism 4-1" in accordance with another embodiment of the present disclosure. The driving mechanism 4-1" may include members the same as or similar to the driving mechanisms 4-1 and 4-1', the same or similar members will be denoted as the same or similar numerals, and the description will not be repeated. It should be noted that a housing 4-10" of the driving mechanism 4-1" is made of a conductive material (such as metal), and has an extending portion 4-16. The extending portion 4-16 may extend to a bottom surface of a base 4-21 of the driving mechanism 4-1". The extending portion 4-16 is configured to be electrically connected to a circuit unit outside the driving mechanism 4-1". In addition, the extending portion 4-16 may be used for grounding so that the driving mechanism 4-1" is electrically connected to the exterior more easily, and the process can be further simplified.

Furthermore, the difference between the driving mechanism 4-1" in FIG. 4-6A and the driving mechanisms 4-1 and 4-1' is that each of the positioning members 4-25 has a trench 4-V, and a first groove 4-T1 and a recess portion 4-R are formed on the lateral side of the base 4-21. As shown in FIG. 4-6B, the trench 4-V is located outside the positioning member 4-25, and is adjacent to the housing 4-10" (See FIG. 4-6A). The trench 4-V is provided for filling an adhesive to bond the base 4-21 and the housing 4-10". Arranging the trench 4-V may facilitate applying the adhesive, and provide space for the adhesive to flow. Simultaneously, the contact area between the adhesive and the base 4-21, the housing 4-10" may also be increased to enhance the bonding capacity.

FIG. 4-6C is a partial schematic perspective view illustrating the base 4-21 in accordance with another embodiment of the present disclosure. The difference between FIGS. 4-6C and 4-6B is that the trench 4-V extends towards a foot of the positioning member 4-25 to a top surface 4-20U of the base 4-21, and the top surface 4-20U is perpendicular to the optical axis 4-O direction (Z-axis direction). Therefore, the contact area between the adhesive and the base 4-21, and that between the adhesive and the housing 4-10" may be further increased to strengthen the bonding effect. It should be noted that, in this embodiment, the trench 4-V has a curved profile so that more adhesive may be filled into the corner, and bonding effect may be partially strengthened. In addition, the trench 4-V may be designed to have different shapes or depths as required.

FIG. 4-6D is a partial schematic perspective view illustrating the base 4-21 in FIG. 4-6B. The difference between FIGS. 4-6D and 4-6B is that it is observed from the base 4-21 in the optical axis 4-O direction (Z-axis direction) in FIG. 4-6D, wherein the first groove 4-T1 and the recess portion 4-R formed on the lateral surface of the base 4-21 are adjacent to the housing 4-10" (see FIG. 4-6A), and the recess portion 4-R surrounds the first groove 4-T1. In other words, when observed from the base 4-21 in the optical axis 4-O direction, the width of the recess portion 4-R is greater than the width of the first groove 4-T1. That is, the area of the recess portion 4-R is greater than the area of the first groove 4-T1. When the adhesive is filled into the first groove 4-T1 and the recess portion 4-R to bond the base 4-21 and the housing 4-10", the adhesive is sequentially filled into the first groove 4-T1 and the recess portion 4-R. The adhesive would less overflow from the bottom surface of the base 4-21 by forming the recess portion 4-R with a greater area on the first groove 4-T1. Thus, the driving mechanism 4-1" is assembled on general electronic devices with a camera or video function without any interference.

Then, referring to FIG. 4-7A, FIG. 4-7A is a partial schematic perspective view illustrating a base 4-22 in accordance with another embodiment of the present disclosure. The difference between the base 4-22 in this embodiment and the base 4-21 shown in FIG. 4-6B is that the base 4-22 further includes a base plate 4-20A and a wall 4-20B. The wall 4-20B is formed on the base plate 4-20A, and abuts the housing 4-10 (see FIGS. 4-7B and 4-7C). As shown in FIG. 4-7A, a second groove 4-T2 is formed on the base plate 4-20A, located outside the wall 4-20B, and is adjacent to the housing 4-10. When an adhesive is applied to bond the base 4-22 and the housing 4-10, the adhesive flows along the second groove 4-T2. Therefore, the adhesive may be prevented from overflowing to affect the assembly of the driving mechanism. Meanwhile, the wall 4-20B is designed to ensure the lateral surface of the wall 4-20B is opposite to the lateral surface of the housing 4-10, and thereby foreign objects may be prevented from entering the interior of the driving mechanism. The bonding capacity between the base 4-22 and the housing 4-10 is enhanced. It should be noted that the term "groove" recited hereinafter may include the first groove 4-T1 and/or the second groove 4-T2.

FIG. 4-7B is a partial cross-sectional view illustrating the base 4-22 in FIG. 4-7A and the housing 4-10 after assembly. As shown in FIG. 4-7B, the second groove 4-T2 is formed on a surface, which is perpendicular to the optical axis 4-O, of the base 4-22. In other words, the second groove 4-T2 is formed on the base plate 4-20A.

FIG. 4-7C is a partial cross-sectional view illustrating the base 4-22 in FIG. 4-7A and the housing 4-10 after assembly in accordance with another embodiment of the present disclosure. As shown in FIG. 4-7C, the second groove 4-T2 may also be formed on a surface, which is parallel to the optical axis 4-O, of the base 4-22. That is, the second groove 4-T2 is formed on the wall 4-20B. It should be noted that "sealing-all-around" can be achieved using such a design. That is, the adhesive is applied around the whole base 4-22, and the gap between the base 4-22 and the housing 4-10 is entirely occupied by the adhesive. Therefore, foreign objects may be further prevented from entering the interior of the driving mechanism.

Next, referring to FIG. 4-8A, FIG. 4-8A is a top view illustrating a first elastic member 4-70" in accordance with an embodiment of the present disclosure. As shown in FIG. 4-8A, the first elastic member 4-70" includes an inner frame body 4-75, an outer frame body 4-76, at least one string portion 4-77, and at least one notch 4-78. The inner frame body 4-75 substantially corresponds to the carrier 4-30. The outer frame body 4-76 substantially corresponds to the housing 4-10 (see FIGS. 4-2, 4-3A, and 4-3B). The string portion 4-77 is located between the inner frame body 4-75 and the outer frame body 4-76, and connects the inner frame body 4-75 and the outer frame body 4-76. The notch 4-78 is located on opposite sides of the first elastic member 4-70", and is provided for filling an adhesive. In addition, the notch 4-78 is adjacent to the housing 4-10, and located on the side of the housing 4-10. For example, the notch 4-78 may correspond to a central position of the side of the housing 4-10. That is, the notch 4-78 may correspond to the junction between the string portion 4-77 and the outer frame body 4-76. In some other embodiments, the notch 4-78 may also be disposed in another suitable position as required.

It should be noted that, in this embodiment, the first elastic member 4-70" is described as an example. However, in some other embodiments, the aforementioned features may also be applicable to the above second elastic member.

Referring to FIG. 4-8B, FIG. 4-8B is a top view illustrating the first elastic member 4-70" after filling adhesive in accordance with an embodiment of the present disclosure. In this embodiment, the adhesives 4-S1, 4-S2, and 4-S3 are respectively filled into corresponding positions of the first elastic member 4-70". As shown in FIG. 4-8B, the adhesive 4-S1 is filled into the notch 4-78. The adhesive 4-S2 is filled into the notches located at four corners of the outer frame body 4-76. Both the adhesives 4-S1 and 4-S2 are configured to bond the first elastic member 4-70" to the fixed portion 4-F (including the housing 4-10 and the base 4-20). The adhesive 4-S3 is filled into the notch around the inner frame body 4-75, and is configured to bond the first elastic member 4-70" to the carrier 4-30. It should be noted that the junction between the string portion 4-77 and the outer frame body 4-76 may be secured by arranging the adhesive 4-S1 so that the string portion 4-77 is less possibly detached during operation. In addition, the notch 4-78 is disposed as a rectangle so that the space usage efficiency in the mechanism may be increased, and the bonding strength may also be enhanced at the same time.

Referring to FIGS. 4-9A and 4-9B, FIG. 4-9A is a schematic perspective view illustrating a carrier 4-30' and a driving coil 4-40' in accordance with an embodiment of the present disclosure, and FIG. 4-9B is an enlarged view illustrating a region 4-N in FIG. 4-9A. It should be noted that the driving coil 4-40' is not illustrated in FIG. 4-9B for clearly showing the structural feature of the carrier 4-30'. As shown in FIG. 4-9A, the driving coil 4-40' is disposed around the carrier 4-30' to generate an electromagnetic force with the magnetic members 4-60 (see FIG. 4-10A). In this embodiment, a bevel surface 4-34 is formed on one side, which faces the driving coil 4-40', of the carrier 4-30', and the bevel surface 4-34 tilts relative to a plane perpendicular to the optical axis 4-O (i.e. XY-plane). A wire (not shown) extended from the driving coil 4-40' is disposed on the bevel surface 4-34, and the wire winds around a wire pillar 4-35 to be electrically connected to the circuit board 4-80. The wire of the driving coil 4-40' may be easily guided by the design of the bevel surface 4-34 so that the possibility of damaging the wire is effectively reduced.

Referring to FIG. 4-10A, FIG. 4-10A is a schematic view illustrating the relative positions between the first elastic member 4-70a, the second elastic member 4-72a, the magnetic members 4-60, and the base 4-23 after assembly in accordance with another embodiment of the present disclosure. As shown in FIG. 4-10A, four magnetic members 4-60 are disposed over the base 4-23 relative to four sides of the base 4-23. The second elastic member 4-72a is also disposed over and connected to the base 4-23. The first elastic member 4-70a is disposed over the second elastic member 4-72a, and connected to the positioning members 4-26. It should be noted that, in some other embodiments, the first elastic member 4-70a and the second elastic member 4-72a may also be connected to any member of the fixed portion 4-F.

FIG. 4-10B is a side view illustrating the relative positions between the first elastic member 4-70a, the second elastic member 4-72a, and the magnetic members 4-60 in FIG. 4-10A after assembly. As shown in FIG. 4-10B, when observed in the direction that is perpendicular to the optical axis (such as the X direction in this embodiment), the first elastic member 4-70a and the driving assembly 4-EM (the magnetic members 4-60) partially overlaps. In other words, the junctions between the first elastic member 4-70a and the positioning members 4-26 are designed at four corners of the mechanism, in order to make way for the magnetic members 4-60 which are respectively located on four sides of the mechanism. Therefore, the height of the first elastic member 4-70a in Z-axis direction may be in the range of the magnetic members 4-60. The interior space of the mechanism may be further properly used by the above structural design, and the height of the mechanism is reduced to achieve miniaturization.

FIG. 4-10C is a schematic view illustrating the relative positions between the first elastic member 4-70a, the second elastic member 4-72a, and the base 4-23 in FIG. 4-10A after assembly. As shown in FIG. 4-10C, the first elastic member 4-70a has a first contact 4-701, and the first elastic member 4-70a is connected to the positioning member 4-26 through the first contact 4-701. The second elastic member 4-72a has at least one second contact 4-721, and the second elastic member 4-72a is connected to the base 4-23 through the second contact 4-721. When observed in the direction that is parallel to the optical axis 4-O (Z-axis direction), the first contact 4-701 and the second contact 4-721 do not overlap, and thereby the interior space of the mechanism may be further effectively utilized to achieve miniaturization.

It should be noted that, in this embodiment, the positioning member 4-26 has a trench 4-V'. The difference between the trench 4-V' in FIG. 4-10C and the trench 4-V shown in FIG. 4-6B is that the trenches 4-V' and 4-V are located at different corners of the positioning member 4-26. That is, the trench 4-V' is located closer to a center of one side of the base 4-23, and corresponds to the first elastic member 4-70a. In addition, the trench 4-V' has a bottom surface that tilts relative to the XY-plane. The trench 4-V' may be provided for adjusting the position of the first elastic member 4-70a during assembly, and the accuracy of the positioning can be increased. The trench 4-V' may also be provided for filling the adhesive to enhance the bonding strength.

FIG. 4-10D is a schematic view illustrating the positioning member 4-26 in accordance with another embodiment of the present disclosure. As shown in FIG. 4-10D, the positioning member 4-26 is substantially disposed as a taper so that positioning is facilitated during the assembly. In addition, the possibility that the positioning member 4-26 will collide with other components can be decreased, foreign objects generated by the collision can be reduced, and image quality will not be affected. Meanwhile, the difficulty of the process may also be reduced by the structural design used in this embodiment.

FIG. 5-1 is a perspective view of an electronic device 5-A1 in accordance with some embodiments of the disclosure. The electronic device 5-A1 may be a portable electronic device (such as a smartphone, a tablet computer, or a laptop computer) or a vehicle-type electronic device (such as driving recorder). In this embodiment, the electronic device 5-A1 is a smartphone.

The electronic device 5-A1 includes an outer housing 5-A10, a display panel 5-A20, and at least one camera module 5-A30. The outer housing 5-A10 may be a plate structure. The display panel 5-A20 is disposed on a display surface 5-A11 of the outer housing 5-A10, and configured to display an image.

The camera module 5-A30 is disposed in the outer housing 5-A10, and corresponds to a light hole 5-A12 of the outer housing 5-A10. The camera module 5-A30 generates image signals according to the incident light falling on the camera module 5-A30 via the light hole 5-A12. The display panel 5-A20 displays an image according to the image signals. In some embodiments, the camera module 5-A30 has a zoom function and optical anti-shake function.

For clarity, there are one light hole 5-A12 and one camera module 5-A30 are illustrated in the figures of the present disclosure. In some embodiments, there are light holes 5-A12 disposed on the rear surface 5-A13 and/or the display surface 5-A11 of the outer housing 5-A10, and there are light holes 5-A12 corresponding to different camera modules 5-A30.

FIG. 5-2 is a perspective view of a driving mechanism 5-1 in accordance with some embodiments of the present disclosure. FIG. 5-3 is an exploded view of the driving mechanism 5-1 in accordance with some embodiments of the present disclosure. The camera module 5-A30 includes a driving mechanism 5-1 and an optical element 5-L1. The driving mechanism 5-1 is configured to move the optical element 5-L1 along an optical axis 5-AX1. The optical element 5-L1 may include lenses 5-L11. The optical axis 5-AX1 may pass through the center of the lenses 5-L11 of the optical element 5-L1, and the lenses 5-L11 extend perpendicular to the optical axis 5-AX1 and are arranged along the optical axis 5-AX1. Moreover, the optical axis 5-AX1 may be parallel to the movement direction 5-D1.

In this embodiment, the incident light passes through the optical element 5-L1 along the optical axis 5-AX1, and falls on an image sensor (not shown in figures) of the camera module 5-A30. The driving mechanism 5-1 moves the optical element 5-L1 along the optical axis 5-AX1 to make the incident light to focus on the image sensor via the lenses 5-L11.

As shown in FIGS. 5-2 and 5-3, the driving mechanism 5-1 includes a frame 5-10, a carrying base 5-20, a drive module 5-30, elastic elements 5-40 and a base 5-60. The frame 5-10 may be a hollow structure. The frame 5-10 is disposed on the base 5-60, and a receiving space 5-S1 is formed between the frame 5-10 and the base 5-60. The carrying base 5-20 is disposed in the receiving space 5-S1 of the frame 5-10, and configured to carry the optical element 5-L1.

In this embodiment, the carrying base 5-20 has a top carrying surface 5-21 and a carrying hole 5-22. The top carrying surface 5-21 may be perpendicular to the optical axis 5-AX1.

The carrying hole 5-22 is formed on the top carrying surface 5-21, and extends the optical axis 5-AX1. In some embodiments, the optical axis 5-AX1 passes through the center of the carrying hole 5-22. The optical element 5-L1 is affixed to the carrying hole 5-22.

The drive module 5-30 is disposed between the frame 5-10 and the carrying base 5-20, and configured to drive the carrying base 5-20 to move relative to the frame 5-10. The drive module 5-30 includes drive wires 5-31 and magnetic elements 5-32. The drive wire 5-31 may be disposed on the carrying base 5-20, and correspond to the magnetic element 5-32. The magnetic element 5-32 is affixed to the frame 5-10, and located in the receiving space 5-S1.

In this embodiment, there are two drive wires 5-31 disposed on two opposite sides of the carrying base 5-20. There are two magnetic elements 5-32 corresponding to the drive wires 5-31. The magnetic elements 5-32 may be permanent magnets. The drive wires 5-31 generate a magnetic field by applying current to the drive wires 5-31, and thus a magnetic force is generated between the drive wires 5-31 and the magnetic elements 5-32. The carrying base 5-20 can be moved relative the frame 5-10 along the optical axis 5-AX1 by the magnetic force.

The elastic elements 5-40 may be elastic sheets disposed on the top carrying surface 5-21 and the bottom carrying surface 5-21a of the carrying base 5-20. The elastic elements 5-40 are elastically connected to the frame 5-10 and the carrying base 5-20, and configured to apply an elastic force between the frame 5-10 and the carrying base 5-20. When the carrying base 5-20 is moved relative to the frame 5-10 along the optical axis 5-AX1, the elastic element 5-40 can return the carrying base 5-20 to an initial position.

In some embodiments, during assembling the driving mechanism 5-1, a first glue (not shown in figures) is disposed on the edge of the upper elastic element 5-40 and the side wall of the frame 5-10. Afterwards, the base 5-60 is assembled with the frame 5-10, and a second glue (not shown in figures) is filled between the first glue and the base 5-60. Moreover, the second glue can flow into a location between the side wall and the frame 5-10 and the base 5-60. Accordingly, the assembly difficulty of driving mechanism 5-1 can be reduced.

FIG. 5-4 is a perspective view of the frame 5-10 and the carrying base 5-20 in accordance with some embodiments of the present disclosure. FIGS. 5-5A to 5-5C are schematic views of the frame 5-10 and the carrying base 5-20 in accordance with some embodiments of the present disclosure. As shown in FIG. 5-5A, the carrying base 5-20 is in an initial position relative to the frame 5-10. As shown in FIG. 5-5B, the carrying base 5-20 is in a low position relative to the frame 5-10. As shown in FIG. 5-5C, the carrying base 5-20 is in a raised position relative to the frame 5-10.

The carrying base 5-20 further has a buffer groove 5-23 and a limiting groove 5-24. The buffer groove 5-23 is formed on the top carrying surface 5-21, and the limiting groove 5-24 is formed on the bottom buffer surface 5-231 of the buffer groove 5-23. In some embodiments, the carrying base 5-20 may not include the buffer groove 5-23. The limiting groove 5-24 is formed on the top carrying surface 5-21.

The frame 5-10 includes an upper surface 5-11 and a through hole 5-12. The upper surface 5-11 is perpendicular to the optical axis 5-AX1. The through hole 5-12 is formed on the upper surface 5-11, and the optical axis 5-AX1 may pass through the center of the through hole 5-12. The through hole 5-12 is connected to the receiving space 5-S1. The frame 5-10 further includes position elements 5-13. The position elements 5-13 are connected to the upper surface 5-11 and extend to the carrying base 5-20. In other words, the position elements 5-13 extend in the movement direction 5-D1.

In this embodiment, the position element 5-13 can pass through the buffer groove 5-23 and extend into the limiting groove 5-24. According to the design of the position element 5-13 and the limiting groove 5-24, the position element 5-13 can be used to limit the rotation angle and displacement of the carrying base 5-20 relative to the frame 5-10.

The position element 5-13 includes a connection portion 5-131 and a position portion 5-132. The connection portion 5-131 is connected to the upper surface 5-11, and the position portion 5-132 is connected to the connection portion 5-131. In this embodiment, the position portion 5-132 and the connection portion 5-131 are formed in a T shape. At least one portion of the position portion 5-132 is located in the limiting groove 5-24 of the carrying base 5-20.

As shown in FIG. 5-5A, the position portion 5-132 is polygonal. In this embodiment, the position portion 5-132 is quadrilateral, but it is not limited thereto. In some embodiments, position portion 5-132 is a rectangle, but it is not limited thereto.

The position portion 5-132 includes a top surface 5-133, a bottom surface 5-134, two side surfaces 5-135, and round corners 5-136. The top surface 5-133 faces the upper surface 5-11. The bottom surface 5-134 is opposite to the top surface 5-133, and adjacent to the bottom stop surface 5-242 of the limiting groove 5-24. The side surface 5-135 is connected to the top surface 5-133 and the bottom surface 5-134 via the round corner 5-136.

In some embodiments, the frame 5-10 is made from metal materials, and the carrying base 5-20 is made from plastic. Therefore, with the round corners 5-136, the chances of scratching the carrying base 5-20 and causing contaminating particles from the carrying base 5-20 when the position portion 5-132 comes into contact with the carrying base 5-20 are lower.

The contaminating particles may be moved between the carrying base 5-20 and the frame 5-10 due to the movement of the driving mechanism 5-1, so that the carrying base 5-20 cannot be correctly moved with respect to the frame 5-10. Moreover, the contaminating particles may enter the carrying base 5-20 and attach to the lens 5-L11 or the image sensor due to the movement of the driving mechanism 5-1. Therefore, the camera quality of the camera module 5-A30 may be decreased.

In this embodiment, the carrying base 5-20 further includes stop elements 5-25 disposed on the top carrying surface 5-21. The stop elements 5-25 are separated from the frame 5-10, and extend toward the upper surface 5-11. The stop elements 5-25 are closer to the upper surface 5-11 than the bottom stop surface 5-242 of the limiting groove 5-24. When the electronic device 5-A1 is impacted or shaken, the stop element 5-25 may provide a buffer function to reduce the damage of the driving mechanism 5-1.

In some embodiments, the longest width 5-W1 of the buffer groove 5-23 is greater than the longest width 5-W2 of the limiting groove 5-24. In some embodiments, the longest width 5-W1 of the buffer groove 5-23 is equal to the longest width 5-W2 of the limiting groove 5-24. The widths 5-W1 and 5-W2 are measured in a direction that is perpendicular to the optical axis 5-AX1 (as shown in FIG. 5-4).

In this embodiment, the longest width 5-W3 of the position portion 5-132 is greater than the longest width 5-W4 of the connection portion 5-131. Moreover, the longest width 5-W2 of the limiting groove 5-24 is greater than the longest width 5-W3 of the position portion 5-132. Therefore, the position portion 5-132 can be moved in the limiting groove 5-24, and may not in contact with the bottom stop surface 5-242 and the side wall 5-243 of the limiting groove 5-24. The widths 5-W3 and 5-W4 are measured in a direction that is perpendicular to the optical axis 5-AX1.

As shown in FIG. 5-5A, when the carrying base 5-20 is in an initial position relative to the frame 5-10, the position portion 5-132 is located at the center area of the limiting groove 5-24. The side surface 5-135 of the position portion 5-132 is separated from the side wall 5-243 of the limiting groove 5-24. The bottom surface 5-134 of the position portion 5-132 is separated from the bottom stop surface 5-242 of the limiting groove 5-24. The top surface 5-133 of the position portion 5-132 is separated from the opening 5-241 of the limiting groove 5-24.

As shown in FIG. 5-5B, when the carrying base 5-20 is moved to a low position relative to the frame 5-10, the top surface 5-133 of the position portion 5-132 is adjacent to the opening 5-241, and is far from the bottom stop surface 5-242. In other words, the distance between the top surface 5-133 and the bottom stop surface 5-242 is greater than the distance between the top surface 5-133 and the opening 5-241. Moreover, the opening 5-241 of the limiting groove 5-24 is farther from the upper surface 5-11 than the top surface 5-133 of the position portion 5-132.

As shown in FIG. 5-5C, when the carrying base 5-20 is moved to a raised position relative to the frame 5-10, the bottom surface 5-134 of the position portion 5-132 is adjacent to the bottom stop surface 5-242, and far from the opening 5-241. In other words, the distance between the bottom surface 5-134 and the bottom stop surface 5-242 is shorter than the distance between the bottom surface 5-134 and the opening 5-241. Moreover, the opening 5-241 of the limiting groove 5-24 is closer to the upper surface 5-11 than the top surface 5-133 of the position portion 5-132.

As shown in FIG. 5-5A to FIG. 5-5C, in an normal case the position portion 5-132 and the connection portion 5-131 will not scratch the carrying base 5-20 when the carrying base 5-20 is moved relative to the frame 5-10, since the longest width 5-W2 of the limiting groove 5-24 is greater than the longest width 5-W3 of the position portion 5-132 and the longest width 5-W4 of the connection portion 5-131.

When the electronic device 5-A1 is impacted or shaken, the position portion 5-132 may collide with the side wall 5-243 or the bottom stop surface 5-242 of the limiting groove 5-24 so as to block excessive displacement and rotation of the carrying base 5-20 relative to the frame 5-10. Accordingly, the driving mechanism 5-1 is protected. Moreover, since the longest width 5-W3 of the position portion 5-132 is greater than the longest width 5-W4 of the connection portion 5-131, the probability that the connection portion 5-131 scratches the carrying base 5-20 can be reduced even when the carrying base 5-20 is slightly inclined with respect to the frame 5-10. Accordingly, the contaminating particles can be reduced.

FIG. 5-6 is a perspective view of a frame 5-10 in accordance with some embodiments of the disclosure. FIG. 5-7 is a top view of the frame 5-10 in accordance with some embodiments of the disclosure. As shown in FIG. 5-6, the position portion 5-132 and the connection portion 5-131 are formed in an L shape. The through hole 5-12 may be a slightly rectangle. There are four position elements 5-13 located at four corners of the through holes 5-12. The width of the connection portion 5-131 of the present embodiment may be greater than the width 5-W4 of the connection portion 5-131 of FIG. 5-5A, and thus the strength of the position element 5-13 may be enhanced.

As shown in FIG. 5-7, the position element 5-13 can be symmetrically arranged at the edge of through hole 5-12 around optical axis 5-AX1. In this embodiment, the position element 5-13 may be symmetrically arranged on the edge of the through hole 5-12 with a rotational axis symmetrically with the optical axis 5-AX1, so that the carrying base 5-20 (shown in FIG. 5-4) operates more smoothly with respect to the frame 5-10. The position element 5-13 may be symmetrically arranged on the edge of the through hole 5-12 about the optical axis 5-AX1 in a rotationally symmetric manner, so that the carrying base 5-20 (shown in FIG. 5-4) can be moved more smoothly relative to the frame 5-10.

FIG. 5-8 is a perspective view of a frame 5-10 and a combination frame 5-70 in accordance with some embodiments of the disclosure. FIG. 5-9 is a top view of the frame 5-10 and the combination frame 5-70 in accordance with some embodiments of the disclosure. The driving mechanism 5-1 further includes a combination frame 5-70 disposed on the upper surface 5-11 of the frame 5-10. The combination frame 5-70 may extend along a plane that is perpendicular to the optical axis 5-AX1, and may be a ring-like structure.

The combination frame 5-70 and the frame 5-10 may be made by metal materials. The combination frame 5-70 includes soldering holes 5-71. In some embodiments, the combination frame 5-70 is a rectangle, and the soldering holes 5-71 are located at the corners of the combination frame 5-70, and adjacent to the position elements 5-13. When the combination frame 5-70 is disposed on the upper surface 5-11 of the frame 5-10, solder materials (not shown) may be disposed within the soldering holes 5-71 so as to affix the combination frame 5-70 to the frame 5-10. In addition, an external component (not shown) can be affixed to the combination frame 5-70 by using solder materials, so that the driving mechanism 5-1 can be firmly combined with the external component.

In this embodiment, the frame 5-10 may further include dispensing holes 5-14. The dispensing holes 5-14 are connected to the through hole 5-12, and located at two opposite sides of the position element 5-13. The combination frame 5-70 covers the dispensing holes 5-14. When the combination frame 5-70 is disposed on the upper surface 5-11 of the frame 5-10, bonding glue (not shown in figures) can be filled in the dispensing holes 5-14, so as to affix the combination frame 5-70 to the frame 5-10. Moreover, the combination frame 5-70 can be affixed to the frame 5-10 more firmly by the bonding glue flowing between the combination frame 5-70 and the upper surface 5-11, and the gap between the combination frame 5-70 and the frame 5-10 can be reduced.

The shortest width 5-W5 of the combination frame 5-70 is greater than the shortest width 5-W6 of the upper surface 5-11. Therefore, in this embodiment, the intensity of the frame 5-10 can be enhanced by the combination frame 5-70. The widths 5-W5 and 5-W6 may be measured in the same direction that may be perpendicular to the optical axis 5-AX1.

FIG. 5-10 is an exploded view of a driving mechanism 5-1 in accordance with some embodiments of the present disclosure, wherein there are some elements omitted in FIG. 10. FIG. 5-11 is a perspective view of a carrying base 5-20 and an elastic element 5-40 in accordance with some embodiments of the present disclosure. FIG. 5-12 is a side view of the carrying base 5-20 and the elastic element 5-40 in accordance with some embodiments of the present disclosure.

The elastic element 5-40 may extend along a plane that is perpendicular to the optical axis 5-AX1. The elastic element 5-40 has a first fixed portion 5-41, deformation portions 5-42, and a second fixed portion 5-43. The first fixed portion 5-41 may be affixed to the top carrying surface 5-21 of the carrying base 5-20. The first fixed portion 5-41 may be a ring-like structure surrounding the optical axis 5-AX1.

The deformation portions 5-42 are connected to the first fixed portion 5-41 and the second fixed portion 5-43, and located between the first fixed portion 5-41 and the second fixed portion 5-43. The deformation portions 5-42 may be curved line structures, and may be in a suspended state. In other words, the deformation portions 5-42 may be separated from elements other than the elastic element 5-40 (such as the carrying base 5-20, the frame 5-10, and the drive module 5-30). In this embodiment, the elastic element 5-40 may be a slightly rectangle, but it is not limited thereto. The deformation portions 5-42 are located in the corners of the elastic element 5-40.

The second fixed portion 5-43 may be affixed to the frame 5-10. The second fixed portion 5-43 may be a ring-like structure surrounding the optical axis 5-AX1. The deformation portion 5-42 may apply an elastic force to the first fixed portion 5-41 and the second fixed portion 5-43. In other words, since the first fixed portion 5-41 is affixed to the carrying base 5-20, and the second fixed portion 5-43 is affixed to the frame 5-10, the reformation portion 5-42 may apply an elastic force to the carrying base 5-20 and the frame 5-10.

In some embodiments, the elastic portion of the elastic element 5-40 may be bent so that the first fixed portion 5-41 and the second fixed portion 5-43 are not on the same plane. In this way, the elastic element 5-40 can generate a pre-pressure on the carrying base 5-20 when the carrying base 5-20 is in an initial position, so as to bring the carrying base 5-20 closer to the base 5-60. Therefore, the driving mechanism 5-1 may be more stable when it does not move the carrying base 5-20.

As shown in FIGS. 5-10 to 5-12, the deformation portion 5-42 of the elastic element 5-40 corresponds to the buffer groove 5-23. The deformation portion 5-42 and the buffer groove 5-23 may be arranged in an extension direction that is parallel to the optical axis 5-AX1. In this embodiment, the extension direction of the optical axis 5-AX1 may be the movement direction 5-D1. Therefore, in this embodiment, when the carrying base 5-20 is moved relative to the frame 5-10 in the movement direction 5-D1, the deformation portion 5-42 is deformed. However, since the reformation portion 5-42 corresponds to the buffer groove 5-23, the reformation portion 5-42 does not collide with the carrying base 5-20, and thus the carrying base 5-20 can be accurately moved relative to the frame 5-10.

As shown in FIG. 5-10, the drive wire 5-31 of the drive module 5-30 surrounds the side wall of the carrying base 5-20. The drive wire 5-31 is located at the corner of the carrying base 5-20, and adjacent to the limiting groove 5-24. The deformation portion 5-42 of the elastic element 5-40 directly faces the drive wire 5-31. The deformation portion 5-42 and the drive wire 5-31 are arranged in the movement direction 5-D1, and separated from each other.

FIG. 5-13 is a top view of a frame 5-10, a carrying base 5-20 and a drive module 5-30 in accordance with embodiments of the present disclosure, wherein the upper surface 5-11 of the frame 5-10 are omitted in FIG. 5-13. As shown FIGS. 10 to 13, the frame 5-10 has a slightly quadrangular shape, and has four side walls 5-15 and four corners 5-16 connected to the side walls 5-15. The drive wire 5-31 is a slightly octagonal, and has first segments 5-311 and second segments 5-312. The first segments 5-311 are parallel to the side walls 5-15. The second segments 5-312 are connected to two adjacent first segments 5-311, and correspond to the corners 5-16.

The carrying base 5-20 further includes wire holders 5-26 holding the first segments 5-311, and the wire holders 5-26 are separated from the second segments 5-312. Moreover, there are four magnetic elements 5-32 disposed on four side walls 5-15 of the frame 5-10. The magnetic elements 5-32 correspond to the wire holders 5-26 and the first segments 5-311 of the drive wire 5-31. In some embodiments, each of the magnetic elements 5-32 is parallel to one of corresponding the first segments 5-311 and wire holders 5-26.

The separated wire holders 5-26 allow the corner spaces 5-S2 to be formed between the corners 5-16 of the frame 5-10 and the carrying base 5-20. The deformation portions 5-42 of the elastic element 5-40 can be located in the corner spaces 5-S2. Therefore, collision of the deformation portion 5-42 with the carrying base 5-20 and the frame 5-10 can be avoided, and the carrying base 5-20 can be moved more accurately relative to the frame 5-10.

In this embodiment, one end of the magnetic element 5-32 extends into the corner space 5-S2. The magnetic element 5-32 can be symmetrically arranged in the frame 5-10 about the optical axis 5-AX1 in a rotationally symmetric manner. Moreover, the carrying base 5-20 further includes winding portions 5-27 in the corner spaces 5-S2. The winding ends 5-313 of the drive wires 5-31 are disposed on the winding portions 5-27. Therefore, the design of the carrying base 5-20 better utilizes the space within the frame 5-10.

FIG. 5-14 is a side view of the carrying base 5-20 and the elastic element 5-40 in accordance with some embodiments of the present disclosure. As shown in FIG. 5-12, the bottom buffer surface 5-231 of the buffer groove 5-23 may be perpendicular to the extension direction of the optical axis 5-AX1. As shown in FIG. 5-14, at least one portion of the bottom buffer surface 5-231 of the buffer groove 5-23 is inclined relative to the extension direction of the optical axis 5-AX1. In this embodiment, the bottom buffer surface 5-231 is inclined relative to the bottom stop surface 5-242. Therefore, the volume of the buffer groove 5-23 can be increased by the inclined bottom buffer surface 5-231, thereby preventing collisions between the deformation portion 5-42 and the carrying base 5-20.

FIG. 5-15 is an exploded view of the frame 5-10 and the carrying base 5-20 in accordance with some embodiments of the present disclosure. FIG. 5-16 is a cross-sectional view of the frame 5-10 and the carrying base 5-20 in accordance with some embodiments of the present disclosure. The base 5-60 includes a base body 5-61 and a first dustproof ring 5-62. The base body 5-61 may be a ring-like structure. The base body 5-61 has a through hole 5-611 corresponding to the carrying hole 5-22. The optical axis 5-AX1 may pass through the center of the through hole 5-611. The first dustproof ring 5-62 is disposed on the base body 5-61, and surrounds to the through hole 5-611 and the optical axis 5-AX1.

The carrying base 5-20 includes a second dustproof ring 5-28 and bottom stop portions 5-29. The second dustproof ring 5-28 is disposed on the bottom carrying surface 5-21a of the carrying base 5-20, and surrounds the carrying hole 5-22 and the optical axis 5-AX1. The bottom stop portion 5-29 is disposed on the bottom carrying surface 5-21a, and arranged around the second dustproof ring 5-28. In this embodiment, the bottom stop portion 5-29 is separated from the second dustproof ring 5-28, and the bottom stop portion 5-29 is farther from the optical axis 5-AX1 than the second dustproof ring 5-28.

In this embodiment, the first dustproof ring 5-62 surrounds the second dustproof ring 5-28 and is separated from the second dustproof ring 5-28. Therefore, the surrounding contaminating particles are difficult to enter the carrying hole 5-22 and the through hole 5-611 via the gap 5-G1 between the first dustproof ring 5-62 and the second dustproof ring 5-28.

As shown in FIG. 5-16, the bottom stop portion 5-29 corresponds to the blocking portion 5-621 of the first dustproof ring 5-62, and separated from the blocking portion 5-621. Moreover, the height of the bottom stop portion 5-29 relative to the bottom carrying surface 5-21a is less than the height of the second dustproof ring 5-28 relative to the bottom ground receiving surface 5-21a. Therefore, when the electronic device 5-A1 is impacted or shaken, the stop element 5-25 may provide a buffer function to reduce the damage of the driving mechanism 5-1.

FIG. 5-17 is an exploded view of a frame 5-10 and a carrying base 5-20 in accordance with some embodiments of the present disclosure. FIG. 5-18 is a cross-sectional view of the frame 5-10 and the carrying base 5-20 in accordance with some embodiments of the present disclosure. FIG. 5-19 is a schematic view of the frame 5-10 and the carrying base 5-20 in accordance with some embodiments of the present disclosure. In this embodiment, the second dustproof ring 5-28 surrounds the first dustproof ring 5-62.

The base 5-60 further includes first protrusion portions 5-612 and first depression grooves 5-613. In this embodiment, the base 5-60 is a slightly rectangular shape. The base 5-60 has four first protrusion portions 5-612, and four first depression grooves 5-613. However, the number of the first protrusion portions 5-612 and the first depression grooves 5-613 are not limited thereto.

The first protrusion portions 5-612 and the first depression grooves 5-613 are alternately arranged along the outer side of the first dustproof ring 5-62. The first protrusion portions 5-612 are adjacent to the edges 5-614 of the base 5-60, and the first depression grooves 5-613 are located at the corners 5-615 of the base 5-60. Each of the corners 5-615 is connected to two adjacent edges. Since the first protrusion portions 5-612 are disposed on the edges 5-614 having shorter width, and the first depression grooves 5-613 are disposed on the corners 5-615 having longer width, the first protrusion portions 5-612 and the first depression grooves 5-613 do not excessively weaken the intensity of the base 5-60.

The second dustproof ring 5-28 has second depression grooves 5-281 and second protrusion portions 5-282. The second depression grooves 5-281 and the second protrusion portions 5-282 are alternately arranged in a loop path. The second depression grooves 5-281 correspond to the first protrusion portions 5-612, and second protrusion portions 5-282 correspond to the first depression grooves 5-613.

In this embodiment, when the carrying base 5-20 is in a low position, the first protrusion portion 5-612 is separated from the second depression groove 5-281, and the second protrusion portion 5-282 is separated from the first depression groove 5-613. When the carrying base 5-20 is in an initial position or a raised position, the first protrusion portion 5-612 is located in the second depression groove 5-281, and the second protrusion portion 5-282 is located in the first depression groove 5-613.

When the carrying base 5-20 is moved to a low position, the first protrusion portion 5-612 is located in the second depression groove 5-281, and the second protrusion portion 5-282 is located in the first depression groove 5-613. In this way, excessive rotation of the carrying base 5-20 relative to the base 5-60 can be prevented, and thus the driving mechanism 5-1 can be protected. In addition, with the design of the disclosed base 5-60 and the second dustproof ring 5-28, the moving range of the carrying base 5-20 relative to the frame 5-10 can be increased.

In some embodiments, the depth of the first depression groove 5-613 is greater than the depth of the second depression groove 5-281. The distance $5\text{-}d1$ between the second protrusion portion 5-282 and the first depression groove 5-613 is greater than the distance $5\text{-}d2$ between the first curve portion 5-612 and the second depression groove 5-281. Moreover, when the carrying base 5-20 is in a raised position, the first protrusion portion 5-612 may contact or abut at the bottom of the second depression groove 5-281. The second dished portion 5-282 is located within the first depression groove 5-613 and is separable from the bottom of the first depression groove 5-613. Therefore, when the electronic device 5-A1 is impacted or shaken, the second protrusion portion 5-282 may provide a buffer function to reduce the damage of the driving mechanism 5-1.

FIG. 6-1 is a perspective view of an electronic device 6-A1 in accordance with some embodiments of the disclosure. The electronic device 6-A1 may be a portable electronic device (such as a smartphone, a tablet computer, or a laptop computer) or a vehicle-type electronic device (such as driving recorder). In this embodiment, the electronic device 6-A1 is a smartphone.

The electronic device 6-A1 includes an outer housing 6-A10, a display panel 6-A20, and at least one camera module 6-A30. The outer housing 6-A10 may be a plate structure. The display panel 6-A20 is disposed on a display surface 6-A11 of the outer housing 6-A10, and configured to display an image.

The camera module 6-A30 is disposed in the outer housing 6-A10, and corresponds to a light hole 6-A12 of the outer housing 6-A10. The camera module 6-A30 generates image signals according to the incident light falling on the camera module 6-A30 via the light hole 6-A12. The display panel 6-A20 displays an image according to the image signals. In some embodiments, the camera module 6-A30 has a zoom function and optical anti-shake function.

For clarity, there are one light hole 6-A12 and one camera module 6-A30 are illustrated in the figures of the present disclosure. In some embodiments, there are light holes 6-A12 disposed on the rear surface 6-A13 and/or the display surface 6-A11 of the outer housing 6-A10, and there are light holes 6-A12 corresponding to different camera modules 6-A30.

FIG. 6-2 is a perspective view of a driving mechanism 6-1 in accordance with some embodiments of the present disclosure. FIG. 6-3 is an exploded view of the driving mechanism 6-1 in accordance with some embodiments of the present disclosure. The camera module 6-A30 includes a driving mechanism 6-1 and an optical element 6-L1. The driving mechanism 6-1 is configured to move the optical element 6-L1 along an optical axis 6-AX1. The optical element 6-L1 may include lenses 6-L11. The optical axis 6-AX1 may pass through the center of the lenses 6-L11 of the optical element 6-L1, and the lenses 6-L11 extend perpendicular to the optical axis 6-AX1 and are arranged along the optical axis 6-AX1. Moreover, the optical axis 6-AX1 may be parallel to a first direction 6-D1.

In this embodiment, the incident light passes through the optical element 6-L1 along the optical axis 6-AX1, and falls on an image sensor (not shown in figures) of the camera module 6-A30. The driving mechanism 6-1 moves the optical element 6-L1 along the optical axis 6-AX1 to make the incident light to focus on the image sensor via the lenses 6-L11.

As shown in FIGS. 6-2 and 6-3, the driving mechanism 6-1 includes a frame 6-10, a carrying base 6-20, drive modules 6-30, a top elastic element 6-40, bottom elastic elements 6-50, and a base 6-60. The frame 6-10 may be a hollow structure. The frame 6-10 is disposed on the base 6-60, and a receiving space 6-S1 is formed between the frame 6-10 and the base 6-60. The carrying base 6-20 is disposed in the receiving space 6-S1 of the frame 6-10, and configured to carry the optical element 6-L1.

In this embodiment, the carrying base 6-20 includes a carrying body 6-21, configured to carry an optical element 6-L1. The carrying body 6-21 includes a top surface 6-211, a bottom surface 6-212 and a carrying hole 6-213. The top surface 6-211 may be perpendicular to the optical axis 6-AX1. The carrying hole 6-213 is connected to the top surface 6-211 and the bottom surface 6-212, and the carrying hole 6-213 extends the optical axis 6-AX1. In some embodiments, the optical axis 6-AX1 passes through the center of the carrying hole 6-213. Moreover, the optical element 6-L1 is affixed to the carrying hole 6-213.

The drive module 6-30 is disposed in the frame 6-10, and located between the frame 6-10 and the carrying body 6-210. The drive module 6-30 is configured to move the carrying base 6-20 relative to the frame 6-10 in the first direction 6-D1.

The drive module 6-30 includes drive wires 6-31 and magnetic elements 6-32. The drive wires 6-31 are disposed on the carrying base 6-20, and correspond to the magnetic elements 6-32. The magnetic elements 6-32 are affixed to the inner side of the frame 6-10, and located in the receiving space 6-S1.

In this embodiment, there are two drive wires 6-31 disposed on two opposite sides of the carrying base 6-20. There are two magnetic elements 6-32 corresponding to the drive wires 6-31. The magnetic elements 6-32 may be permanent magnets. The drive wires 6-31 generate a magnetic field by applying current to the drive wires 6-31, and thus a magnetic force is generated between the drive wires 6-31 and the magnetic elements 6-32. The carrying base 6-20 can be moved relative the frame 6-10 along the optical axis 6-AX1 by the magnetic force.

The top elastic element 6-40 and the bottom elastic element 6-50 may be elastic sheets, disposed on the top surface 6-211 and the bottom surface 6-212 of the carrying body 6-21. The top elastic element 6-40 and the bottom elastic element 6-50 are elastically connected to the frame 6-10 and the carrying base 6-20, and configured to apply an elastic force between the frame 6-10 and the carrying base 6-20. When the carrying base 6-20 is moved relative to the frame 6-10 along the optical axis 6-AX1, the top elastic element 6-40 and the bottom elastic element 6-50 can return the carrying base 6-20 to an initial position.

FIG. 6-4 is a perspective view of the frame 6-10 and the carrying base 6-20 in accordance with some embodiments of the present disclosure, wherein the perspective of FIG. 6-4 is different from the perspective of FIG. 6-3. FIGS. 6-5A to 6-5C are schematic views of the frame 6-10 and the carrying base 6-20 in accordance with some embodiments of the present disclosure. As shown in FIG. 6-5A, the carrying base 6-20 is in an initial position relative to the frame 6-10. As shown in FIG. 6-5B, the carrying base 6-20 is in a low position relative to the frame 6-10. As shown in FIG. 6-5C, the carrying base 6-20 is in a raised position relative to the frame 6-10.

The frame 6-10 includes a top portion 6-11, a side wall 6-12, and position elements 13. The top portion 6-11 may be a plate structure, and extends perpendicular to the optical axis 6-AX1. The top elastic element 6-40 may be disposed on the carrying body 6-21, and adjacent to the top portion 6-11. The top portion 6-11 has a through hole 6-111 connected to the receiving space 6-S1. Moreover, the optical axis 6-AX1 passes through the center of the through hole 6-111. The side wall 6-12 may be a ring-like structure, connected to the edge of the top portion 6-11. The side wall 6-12 may extend along the first direction 6-D1, and surround the optical axis 6-AX1.

The position element 6-13 may be connected to the top portion 6-11, and extend toward the carrying body 6-21. In this embodiment, the position element 6-13 may extend in the first direction 6-D1. The position element 6-13 may include a narrow portion 6-131 and a position portion 6-132. The narrow portion 6-131 is connected to the edge of the through hole 6-111, and the position portion 6-132 is connected to the narrow portion 6-131. In this embodiment, the position portion 6-132 and the narrow portion 6-131 are formed in a T shape or an L shape. In this embodiment, the position portion 6-132 and the narrow portion 6-131 are formed in a T shape.

The carrying base 6-20 further includes first stop portions 6-22 and second stop portions 6-23. The first stop portions 6-22 are disposed on the top surface 6-211 of the carrying body 6-21, and configured to limit the range of motion of the carrying body 6-21 in the first direction. The first stop portions 6-22 are located between the carrying base 6-20 and the top portion 6-11 of the frame 6-10. In this embodiment, the first stop portions 6-22 are separated from the frame 6-10, and extend toward the top portion 6-11 in the first direction 6-D1.

The second stop portion 6-23 is disposed on the carrying body 6-21, and configured to limit the range of motion of the carrying body 6-21 in the first direction. The second stop portion 6-23 is formed in the carrying body 6-21. In this embodiment, the second stop portion 6-23 is formed on the top surface 6-211 of the carrying body 6-21, and extends in the first direction 6-D1. The first stop portion 6-22 is closer to the top portion 6-11 of the frame 6-10 than the second stop portion 6-23.

The second stop portion 6-23 includes a buffer groove 6-231 and a limiting groove 6-232. The buffer groove 6-231 is formed on the top surface 6-211, and the limiting groove 6-232 is formed on the bottom of the buffer groove 6-231. In some embodiments, the second stop portion 6-23 may not include the buffer groove 6-231, and the limiting groove 6-232 is formed on the top surface 6-211. As shown in FIGS. 6-5A to 6-5C, the position element 6-13 passes through the buffer groove 6-231 and extends into the limiting groove 6-232.

In some embodiments, the longest width 6-W1 of the buffer groove 6-231 is greater than or equal to the longest width 6-W2 of the limiting groove 6-232. The longest width 6-W2 of the limiting groove 6-232 is greater than the longest width 6-W3 of the position portion 6-132. The longest width 6-W3 of the position portion 6-132 is greater than the longest width 6-W4 of the narrow portion 6-131. Therefore, the second stop portion 6-23 may be moved in the limiting groove 6-232, and may not in contact with the limiting groove 6-232. The widths 6-W1, 6-W2, 6-W3 and 6-W4 are measured in direction that is perpendicular to the optical axis 6-AX1.

As shown in FIG. 6-5A, when the carrying base 6-20 is located at an initial position relative to the frame 6-10, the position portion 6-132 is located at the center of the limiting groove 6-232, and the first stop portion 6-22 is separated from the top portion 6-11 of the frame 6-10. The distance 6-d1 between the top elastic element 6-40 and the top portion 6-11 of the frame 6-10 is greater than the distance 6-d2 between the first stop portion 6-22 and the top portion 6-11 of the frame 6-10. Therefore, the first stop portion 6-22 may prevent the elastic member from colliding with the frame 6-10, and thus the carrying base 6-20 can be accurately moved relative to the frame 6-10.

In this embodiment, the distance 6-d3 between the second stop portion 6-23 and the top portion 6-11 of the frame 6-10 is greater than the distance 6-d1 between the top elastic element 6-40 and the top portion 6-11 of the frame 6-10. The top elastic element 6-40 may be located within the buffer groove 6-231 of the second stop portion 6-23 during deformation. Therefore, the second stop portion 6-23 may prevent the top elastic element 6-40 from colliding with the carrying body 6-21, and thus the carrying base 6-20 can be accurately moved relative to the frame 6-10.

As shown FIG. 6-5B, when the carrying base 6-20 is moved to a low position relative to the frame 6-10 in the first direction 6-D1, the position portion 6-132 is moved toward the opening 233 of the limiting groove 6-232, and the first stop portion 6-22 is far from the top portion 6-11 of the frame 6-10. In this embodiment, the distance 6-d4 of the first stop portion 6-22 and the top portion 6-11 of the frame 6-10 in FIG. 6-5B is greater than the distance 6-d2 between the first stop portion 6-22 and the top portion 6-11 of the frame 6-10 in FIG. 6-5A.

As shown in FIG. 6-5C, when the carrying base 6-20 is moved to a raised position relative to the frame 6-10 in the first direction 6-D1, the position portion 6-132 is moved toward the bottom of the limiting groove 6-232, and the first stop portion 6-22 is close to the top portion 6-11 of the frame 6-10. In this embodiment, the distance 6-d5 between the first stop portion 6-22 and the top portion 6-11 of the frame 6-10 in FIG. 6-5C is shorter than the distance 6-d2 between the first stop portion 6-22 and the top portion 6-11 of the frame 6-10 in FIG. 6-5A.

As shown in FIGS. 6-5A to 6-5C, the first stop portion 6-22 is separated from the top portion 6-11 of the frame 6-10, and the size of the limiting groove 6-232 is greater than the size of the second stop portion 6-23. In a normal case, when the carrying base 6-20 moves relative to the frame 6-10, the first stop portion 6-22 will not collide with the frame 6-10, and the position element 6-13 will not collide with the second stop portion 6-23.

However, in some cases, when the electronic device 6-A1 is impacted or shaken, the first stop portion 6-22 may collide with frame 6-10 in the first direction 6-D1 so as to block excessive displacement of the carrying base 6-20 relative to the frame 6-10 in the first direction 6-D1. Therefore, the first stop portion 6-22 can limit the range of motion of the carrying body 6-21 in the first direction 6-D1. Moreover, the first stop portion 6-22 can disperse the collision force of the carrying base 6-20 with respect to the frame 6-10 so as to protect the driving mechanism 6-1.

In some cases, when the electronic device 6-A1 is impacted or shaken, the second stop portion 6-23 can block the position element 6-13 in the first direction 6-D1 and the lateral direction 6-D2 so as to block excessive displacement and rotation of the carrying base 6-20 relative to the frame 6-10. Therefore, the second stop portion 6-23 can limit the range of motion of the carrying body 6-21 in the first direction 6-D1 and the lateral direction 6-D2. Moreover, the second stop portion 6-23 can disperse the collision force of the carrying base 6-20 with respect to the frame 6-10 so as to protect the driving mechanism 6-1. In this embodiment, the lateral direction 6-D2 may be any directions that are perpendicular to the first direction 6-D1.

Accordingly, with the design of the first stop portion 6-22 and the second stop portion 6-23, the rotation angle and displacement of the carrying base 6-20 relative to the frame 6-10 can be limited.

FIG. 6-6A is a perspective view of a frame 6-10 and a drive wire 6-31 in accordance with some embodiments of the present disclosure, wherein the perspective of FIG. 6-6A is different from the perspective of FIGS. 6-3 and 6-4. FIG. 6-7 is a top view of the frame 6-10, the carrying base 6-20 and the drive module 6-30 in accordance with some embodiments of the present disclosure, wherein the top portion 6-11 of the frame 6-10 is omitted.

The carrying base 6-20 further includes two wire holders 6-24 and two winding elements 6-25. The wire holders 6-24 are disposed the side surface (third side surface) 214 of the carrying body 6-21. In other words, the wire holders 6-24 are located at two opposite sides of the carrying body 6-21. The winding elements 6-25 are disposed on the side surface 6-215 and the side surface 6-216 of the carrying body 6-21. The side surface 6-215 is opposite the side surface 6-216, and is substantially perpendicular to the side surface 6-214.

The drive wire 6-31 is disposed on the wire holder 6-24, and the winding end 6-311 of the drive wire 6-31 can be wound on the winding element 6-25. The magnetic element 6-32 is disposed on the side wall 6-12 of the frame 6-10, and corresponds to the drive wire 6-31. As shown in FIG. 6-7, the wire holder 6-24 is closer to the magnetic element 6-32 than the drive wire 6-31. Therefore, the wire holder 6-24 can limit the range of motion of the carrying body 6-21 in a third direction 6-D4. The third direction 6-D4 may be a lateral direction, and may be perpendicular to the optical axis 6-AX1.

In this embodiment, when the electronic device 6-A1 is impacted or shaken, the wire holder 6-24 may collide with the frame 6-10 in the third direction 6-D4 so as to block excessive displacement of the carrying base 6-20 relative to the frame 6-10. Moreover, the wire holder 6-24 can disperse the collision force of the carrying base 6-20 with respect to the frame 6-10 so as to protect the driving mechanism 6-1.

In this embodiment, the wire holder 6-24 includes support portions 6-241 and glue grooves 6-242. The support portion 6-241 is closer to the magnetic element 6-32 than the drive wire 6-31. Therefore, the support portions 6-241 can disperse the collision force of the carrying base 6-20 with respect to the frame 6-10. The glue groove 6-242 is located between two adjacent support portions 6-241. After the drive wire 6-31 is assembled on the wire holder 6-24, the glue 6-M1 can be filled in the glue groove 6-242 and in contact with the drive wire 6-31 and the wire holder 6-24 so as to enhance the strength of the carrying base 6-20.

FIG. 6-6B is a perspective view of the frame 6-10 in accordance with some embodiments of the present disclosure. In this embodiment, the wire holder 6-24 includes reinforcing portions 6-243 disposed in the glue grooves 6-242. The reinforcing portion 6-243 may be a trapezoidal, and has an upper surface 6-2431 and two inclined surfaces 6-2432. The upper surface 6-2431 is located in the glue groove 6-242. The inclined surfaces 6-2432 are connected to the upper surface 6-2431, and are symmetrically arranged. The reinforcing portion 6-243 may gradually narrow from the bottom of the glue groove 6-242 to the upper surface 6-2431.

Accordingly, the structure of the carrying base 6-20 can be strengthened by the reinforcing portion 6-243. Moreover, by the reinforcement portion 6-243, the contact area of the glue 6-M1 (as shown in FIG. 6-6A) and the wire holder 6-24 can be increased, and thus the drive wire 6-31 can be firmly affixed to the wire holder 6-24.

The carrying base 6-20 further includes a side-stop portion 6-26 disposed on the side surface (first side surface) 6-215 of the carrying body 6-21, and is configured to limit the range of motion of the carrying body 6-21 in a second direction 6-D3. The second direction 6-D3 may be a lateral direction, and may be perpendicular to the optical axis 6-AX1. In this embodiment, when the electronic device 6-A1 is impacted or shaken, the side-stop portion 6-26 may collide with frame 6-10 in the second direction 6-D3 so as to block excessive displacement and rotation of the carrying base 6-20 relative to the frame 6-10 in the second direction 6-D3. Moreover, the side-stop portion 6-26 can disperse the collision force of the carrying base 6-20 with respect to the frame 6-10 so as to protect the driving mechanism 6-1.

In this embodiment, the side-stop portion 6-26 is closer to the side wall of the frame 6-10 than the winding element 6-25. Therefore, the side-stop portion 6-26 can prevent the winding element 6-25 disposed on the side surface 6-215 from colliding with the frame 6-10. Moreover, the winding element 6-25 disposed on the side surface 6-216 can also serve as a stop portion, and is configured to limit the range of motion of the carrying body 6-21 in the second direction 6-D3.

In this embodiment, the side-stop portion 6-26 includes a receiving groove 6-261. At least one portion of the drive module 6-30 is disposed in the receiving groove 6-261. In this embodiment, a wire 6-312 of the drive module 6-30 is located in the receiving groove 6-261, and thus the utilization of receiving space 6-S1 can be increased. Moreover, when the electronic device 6-A1 is impacted or shaken, the side-stop portion 6-26 can protect the wire 6-312. In some embodiments, the drive wire 6-31 includes the wire 6-312, and the wire 6-312 is connected to the winding end 6-311.

The driving mechanism 6-1 further includes a position sensing module 6-70 (as shown in FIG. 6-7) disposed on the side surface (second side surface) 6-216 of the carrying body 6-21. In this embodiment, the position sensing module 6-70 includes the circuit board 6-71 and the position sensor 6-72. The position sensor 6-72 may be disposed on the circuit board 6-71, and configured to detect the position of the carrying base 6-20 relative to the frame 6-10.

In this embodiment, the side-stop portion 6-26 and the position sensing module 6-70 are disposed on two opposite sides of the carrying body 6-21. Moreover, the drive module 6-30 is disposed on the side surface 6-214 of the carrying body 6-21. Miniaturization of the driving mechanism 6-1 is improved by the arrangement of the drive module 6-30, the side-stop portion 6-26 and the position sensing module 6-70.

As shown in FIG. 6-7, the side-stop portion 6-26 is adjacent to the central area 6-121 of the side wall 6-12 of the frame 6-1. Since the thickness of the side wall of the carrying body 6-21 corresponding to the central area 6-121 is thinner, the side-stop portion 6-26 can strengthen the structure of the carrying body 6-21. Moreover, the first stop portions 6-22 and 6-22a can be far from the central area 6-121 of the side wall 6-12 of the frame 6-10, and thus the thickness of the carrying body 6-21 corresponding to the side wall 6-12 in the central area 6-121 can be reduced. The central area 6-121 may be defined as the area of the side wall 6-12 of the frame 6-10 closest to the carrying hole 6-213 of the carrying body 6-21.

FIG. 6-8 is a perspective view of the carrying base 6-20 and the bottom elastic element 6-50 in accordance with some embodiments of the present disclosure. FIG. 6-9 is a bottom view of the carrying base 6-20 and the bottom elastic element 6-50 in accordance with some embodiments of the present disclosure. The bottom elastic element 6-50 is disposed on the bottom surface 6-212 of the carrying body 6-21. In this embodiment, there are two bottom elastic elements 6-50 arranged surrounding the carrying hole 6-213.

The bottom elastic element 6-50 extends a plane that is perpendicular to the optical axis 6-AX1. The bottom elastic element 6-50 includes a first fixed portion 6-51, a first deformation portion (deformation portion) 6-52, a second fixed portion 6-53, a connection portion 6-54, a third fixed portion 6-55, a second deformation portion 6-56 and a fourth fixed portion 6-57. The first fixed portion 6-51 is affixed to the frame 6-10 (as shown in FIGS. 6-2 and 6-3).

The first deformation portion 6-52 is connected to the first fixed portion 6-51 and the second fixed portion 6-53, and the second fixed portion 6-53 is affixed to the carrying body 6-21. The first deformation portion 6-52 may be a curved line structure. The first deformation portion 6-52 may be in a suspended state, and separated from the carrying body 6-21 and the frame 6-10. The first deformation portion 6-52 is configured to apply an elastic force to the first fixed portion 6-51 and the second fixed portion 6-53. In other words, since the first fixed portion 6-51 is affixed to the frame 6-10, and the second fixed portion 6-53 is affixed to the carrying body 6-21, the first deformation portion 6-52 may apply an elastic force to the frame 6-10 and the carrying base 6-20.

The connection portion 6-54 is connected to the second fixed portion 6-53 and the third fixed portion 6-55, and the third fixed portion 6-55 is affixed to the carrying body 6-21. The connection portion 6-54 may be a curved line structure and may correspond to the shape of the carrying hole 6-213. The connection portion 6-54 is in contact with the carrying body 6-21 and extends along the edge of the carrying hole 6-213.

The second deformation portion 6-56 is connected to the third fixed portion 6-55 and the fourth fixed portion 6-57, and the fourth fixed portion 6-57 is affixed to the frame 6-10. The second deformation portion 6-56 is adjacent to the connection portion 6-54, and separated from the connection portion 6-54. The second deformation portion 6-56 is farther from the optical axis 6-AX1 than the connection portion 6-54. The second deformation portion 6-56 may be a curved line structure. The second deformation portion 6-56 may be a suspended state, and separated from the carrying body 6-21 and the frame 6-10.

In this embodiment, the second deformation portion 6-56 is configured to apply an elastic force to the third fixed portion 6-55 and the fourth fixed portion 6-57. In other words, since the fourth fixed portion 6-57 is affixed to the frame 6-10, and the third fixed portion 6-55 is affixed to the carrying body 6-21, the second deformation portion 6-56 may apply an elastic force to the frame 6-10 and the carrying base 6-20.

With the design of the bottom elastic element 6-50, the mechanical strength and stability of the driving mechanism 6-1 can be enhanced. Moreover, the design of the top elastic element 6-40 may be modified based on the design of the bottom elastic element 6-50.

The carrying base 6-20 further includes third stop portions 6-27 and fourth stop portions 6-28. The third stop portions 6-27 and the fourth stop portions 6-28 are disposed on the bottom surface 6-212 of the carrying body 6-21. The third stop portion 6-27 and the fourth stop portion 6-28 may be opposite the first stop portion 6-22 and the second stop portion 6-23 relative to the carrying body 6-21. The third stop portion 6-27 and the fourth stop portion 6-28 may be arranged along the edge of the carrying hole 6-213. The third stop portion 6-27 and the fourth stop portion 6-28 may have a curved structure.

Third stop portion 6-27 and the fourth stop portion 6-28 are configured to limit the range of motion of the carrying body 6-21 in the first direction. In this embodiment, the third stop portion 6-27 and the fourth stop portion 6-28 collide with the base 6-60 in the first direction 6-D1 (as shown in FIGS. 6-2 and 6-3) so as to block excessive displacement of the carrying base 6-20 relative to the frame 6-10 in the first direction 6-D1. Moreover, the third stop portion 6-27 and the fourth stop portion 6-28 disperse the collision force of the carrying base 6-20 with respect to the frame 6-10 so as to protect the driving mechanism 6-1.

As shown in FIG. 6-9, the width 6-W5 of the third stop portion 6-27 is shorter than the width 6-W6 of the fourth stop portion 6-28. The widths 6-W5 and 6-W6 are measured on a plane that is perpendicular to the optical axis 6-AX1. The third stop portion 6-27 is adjacent to the connection portion 6-54 and the second deformation portion 6-56, and the third stop portion 6-27 is closer to the optical axis 6-AX1 than the connection portion 6-54 and the second deformation portion 6-56. The fourth stop portion 6-28 is adjacent to the first deformation portion 6-52, and the fourth stop portion 6-28 is closer to the optical axis 6-AX1 than the first deformation portion 6-52. With the third stop portion 6-27 and the fourth stop portion 6-28, the strength of the carrying base 6-20 can be enhanced.

As shown in FIG. 6-9, the carrying body 6-21 further includes an identification portion 6-217 disposed on one of the side surface of the carrying body 6-21. In this embodiment, the identification portion 6-217 may be a groove. With the identification portion 6-217, the carrying base 6-20 can be formed into an asymmetrical structure, and thus the orientation of the carrying base 6-20 may be identified when the driving mechanism 6-1 is assembled.

As shown in FIG. 6-9, the carrying body 6-21 further includes restriction portions 6-218 and overflow grooves 6-219. In this embodiment, the restriction portion 6-218 and the overflow groove 6-219 are disposed on the bottom surface 6-212 of the carrying body 6-21. Each of the overflow grooves 6-219 is adjacent to a restriction portion 6-218. The overflow groove 6-219 is closer to the optical axis 6-AX1 than the restriction portion 6-218. The second fixed portion 6-53 and the third fixed portion 6-55 of the bottom elastic element 6-50 is affixed to the restriction portion 6-218.

Accordingly, when the bottom elastic element 6-50 is affixed to the carrying body 6-21, glue 6-M1 may be disposed in the restriction portion 6-218 and in contact with the second fixed portion 6-53 and the third fixed portion 6-55. If too much glue 6-M1 is set, the glue 6-M1 flowing toward the carrying hole 6-213 may flow into the overflow groove 6-219. Therefore, the overflow groove 6-219 can prevent the glue 6-M1 from flowing into the carrying hole 6-213, thereby causing an abnormality of the driving mechanism 6-1.

FIG. 6-10 is a perspective view of the carrying base 6-20, the bottom elastic element 6-50, and the base 6-60 in accordance with some embodiments of the present disclosure. FIG. 6-11 is a cross-sectional view of the frame 6-10, the carrying base 6-20, and the base 6-60 in accordance with some embodiments of the present disclosure. FIG. 6-12 is a cross-sectional view of the carrying base 6-20 and the bottom elastic element 6-50 in accordance with some embodiments of the present disclosure.

In this embodiment, the carrying base 6-20 further includes bottom stop portions 6-29 disposed on the side surface 6-214 and the bottom surface 6-212 of the carrying body 6-21, and separated from the frame 6-10 and the base 6-60. As shown in FIG. 6-12, the bottom stop portion 6-29 is distributed on the side surface 6-214 of the carrying body 6-21, but it is not limited to the side surface 6-214. The bottom elastic element 6-50 is disposed between the bottom stop portions 6-29, and thus the bottom elastic element 6-50 can be protected.

The bottom stop portion 6-29 is configured to limit the range of motion of the carrying body 6-21 in the first direction 6-D1 and the lateral direction 6-D2. In this embodiment, the lateral direction 6-D2 is defined as any directions that are perpendicular to the first direction 6-D1.

In this embodiment, when the electronic device 6-A1 is impacted or shaken, the bottom stop portion 6-29 may collide with the base 6-60 in the first direction 6-D1 so as to block excessive displacement of the carrying base 6-20 relative to the base 6-60 in the first direction 6-D1. Moreover, the bottom stop portion 6-29 may collide with the frame 6-10 in the lateral direction 6-D2 so as to block excessive displacement of the carrying base 6-20 relative to the frame 6-10 in the lateral direction 6-D2. In addition, the bottom stop portion 6-29 can disperse the collision force of the carrying base 6-20 with respect to the frame 6-10 or the base 6-60 so as to protect the driving mechanism 6-1.

In this embodiment, the base 6-60 includes a base body 6-61 and blocking walls 6-62. The base body 6-61 may be a ring-like structure, and corresponds to the carrying base 6-20. The blocking walls 6-62 are disposed on two opposite edges of the base body 6-61, and located between the frame 6-10 and the carrying body 6-21. The blocking walls 6-62 extend linearly in the same direction and are parallel to each other. Moreover, each of the tops of the blocking walls 6-62 has a groove 6-63, extending along the extension direction of the blocking walls 6-62.

When the frame 6-10 is assembled on the base 6-60, the blocking walls 6-62 may be adjacent to or in contact with the frame 6-10, and the grooves 6-63 may be adjacent or connected to the frame 6-10. Therefore, when the glue 6-M1 is disposed on the frame 6-10, the excess glue 6-M1 may flow into the grooves 6-63 to prevent the glue 6-M1 from flowing to elements such as the bottom elastic element 6-50 or the carrying base 6-20.

FIG. 6-13 is a perspective view of the carrying base 6-20 in accordance with some embodiments of the present disclosure. In this embodiment, hollows 6-B1 are formed on the side surface 6-214 of the carrying base 6-20. The side-stop portions 6-26 are formed on the side surface 6-214. Each of the side-stop portions 6-26 is adjacent to two adjacent hollows 6-B1. Moreover, the side-stop portions 6-26 and the hollows 6-B1 are adjacent to the bottom surface 6-212 of the carrying body 6-21. With the setting of the hollows 6-B1, the collision of the carrying base 6-20 on the edge of the carrying base 6-20 with other elements (for example, the base 6-60) can be prevented.

Referring to FIG. 7-1, in an embodiment of the disclosure, a driving mechanism 7-10 may be disposed in an electronic device 7-20. For example, the electronic device 7-20 may be a digital camera or a smartphone that is able to take photographs or record video. When taking photographs or recording video, an external light can pass through the driving mechanism 7-10 and form an image on an image sensor (not shown) in the electronic device 7-20.

Referring to FIGS. 7-2 and 7-3, the driving mechanism 7-10 primarily comprises a fixed portion 7-100, a first elastic member 7-200, a second elastic member 7-300, a movable portion 7-400, and a driving module 7-500. The fixed portion 7-100 has a base 7-110 and a frame 7-120, wherein the base 7-110 and the frame 7-120 can be assembled to form a hollow box. The first elastic member 7-200, the second elastic member 7-300, the movable portion 7-400, and the driving module 7-500 are surrounded by the frame 7-120 and accommodated in the box.

The base 7-110 and the frame 7-120 respectively has optical holes 7-O1 and 7-O2 corresponding to each other, and the optical holes 7-O1 and 7-O2 are respectively adjacent to a light-emitting side 7-11 and a light-entering side 7-12 of the driving mechanism 7-10. The external light can pass the movable portion 7-400 through the optical holes 7-O1 and 7-O2 and reach the image sensor in the electronic device 7-20. Furthermore, a plurality of wires may be formed on the base 7-110, so as to electrically connect the first elastic member 7-200, the second elastic member 7-300, and/or the driving module 7-500.

The aforementioned wires may be formed on the base 7-110 by using the molded interconnect device (MID), for example, by laser direct structuring (LDS), microscopic integrated processing technology (MIPTEC), laser induced metallization (LIM), laser restructuring print (LRP), an aerosol jet process, or a two-shot molding method. In some embodiments, the base 7-110 may be constituted by a flat plate and a flexible printed circuit board (FPC).

The first elastic member 7-200 and the second elastic member 7-300 are connected to the fixed portion 7-100 and the movable portion 7-400, and the movable portion 7-400 may be hung in the box by the first elastic member 7-200 and the second elastic member 7-300. Referring to FIG. 7-4, the first elastic member 7-200 has at least one first engaging portion 7-210, at least one second engaging portion 7-220, and a plurality of string portions 7-230. The first engaging portion 7-210 is affixed to the movable portion 7-400 and forms an inner diameter 7-D1 of the first elastic member 7-200. The second engaging portion 7-220 is affixed to the fixed portion 7-100 and forms an outer diameter 7-D2 of the first elastic member 7-200. The string portions 7-230 connect the first engaging portion 7-210 to the second engaging portion 7-220.

As shown in FIG. 7-5, the second elastic member 7-300 has at least one first connecting portion 7-310, at least one second connecting portion 7-320, and a plurality of string portions 7-330. The first connecting portion 7-310 is affixed to the movable portion 7-400 and forms an inner diameter 7-D3 of the second elastic member 7-300. The second connecting portion 7-320 is affixed to the fixed portion 7-100 and forms an outer diameter 7-D4 of the second elastic member 7-300. The string portions 7-330 connect the first connecting portion 7-310 to the second connecting portion 7-320.

It should be noted that the inner diameter 7-D1 of the first elastic member 7-200 is less than the inner diameter 7-D3 of the second elastic member 7-300, and the outer diameter 7-D2 of the first elastic member 7-200 is substantially the same as the outer diameter 7-D4 of the second elastic member 7-300.

Figures 3, 4, 5, 6, 6C:
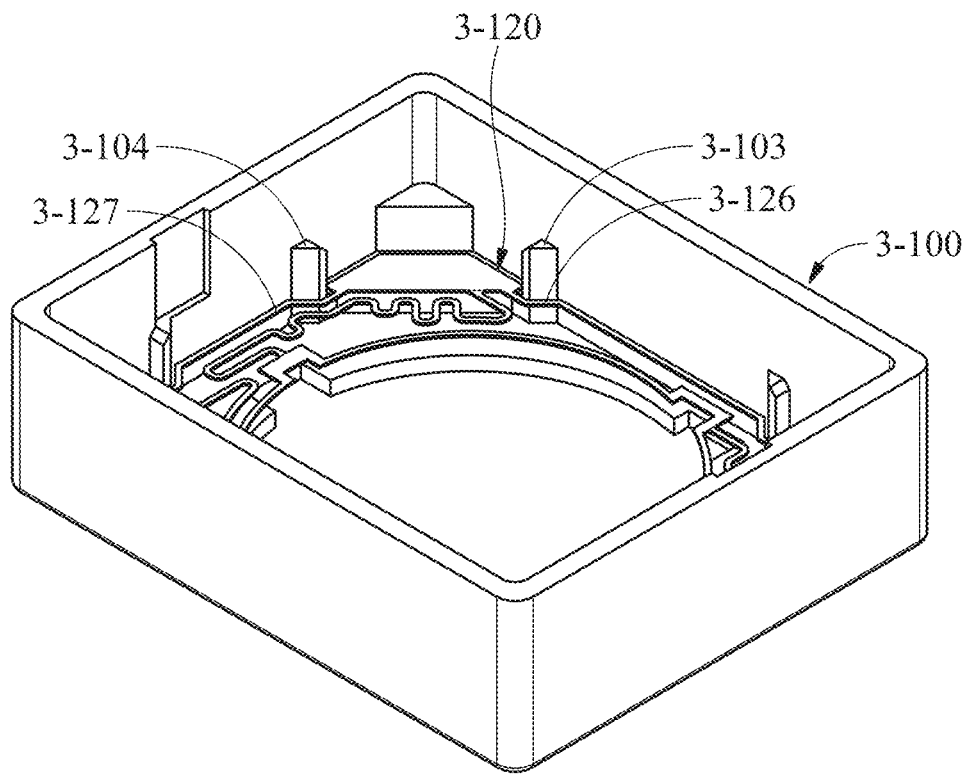

Referring to FIGS. 7-6A to 7-6C, the movable portion 7-400 includes a carrier 7-410 and at least one optical lens 7-420. The carrier 7-410 has an accommodating space 7-412 surrounded by its side wall 7-411. The optical lens 7-420 may be in contact with the side wall 7-411 in the accommodating space 7-412, so as to be affixed to the carrier 7-410. In this embodiment, the cross-section area of the accommodating space 7-412 adjacent to the light-emitting side 7-11 is less than that adjacent to the light-entering side 7-12. In other words, the accommodating space 7-412 has a step-shaped structure or a tapered structure.

In this embodiment, a protruding portion 7-413 is formed on the side wall 7-411 of the carrier 7-410. The protruding portion 7-413 protrudes away from the optical axis 7-T of the optical lens 7-420, and has a first surface 7-413a facing the light-entering side 7-12 (i.e. the light-entering direction of the optical axis 7-T). Furthermore, the protruding portion 7-413 further comprises a recess 7-414. The recess 7-414 has a second surface 7-414a facing the light-emitting side 7-11 (i.e. the light-emitting direction of the optical axis 7-T), and a protrusion 7-415 extending toward the recess 7-414 is formed on the second surface 7-414a.

Figures 4, 5, 6, 6D:
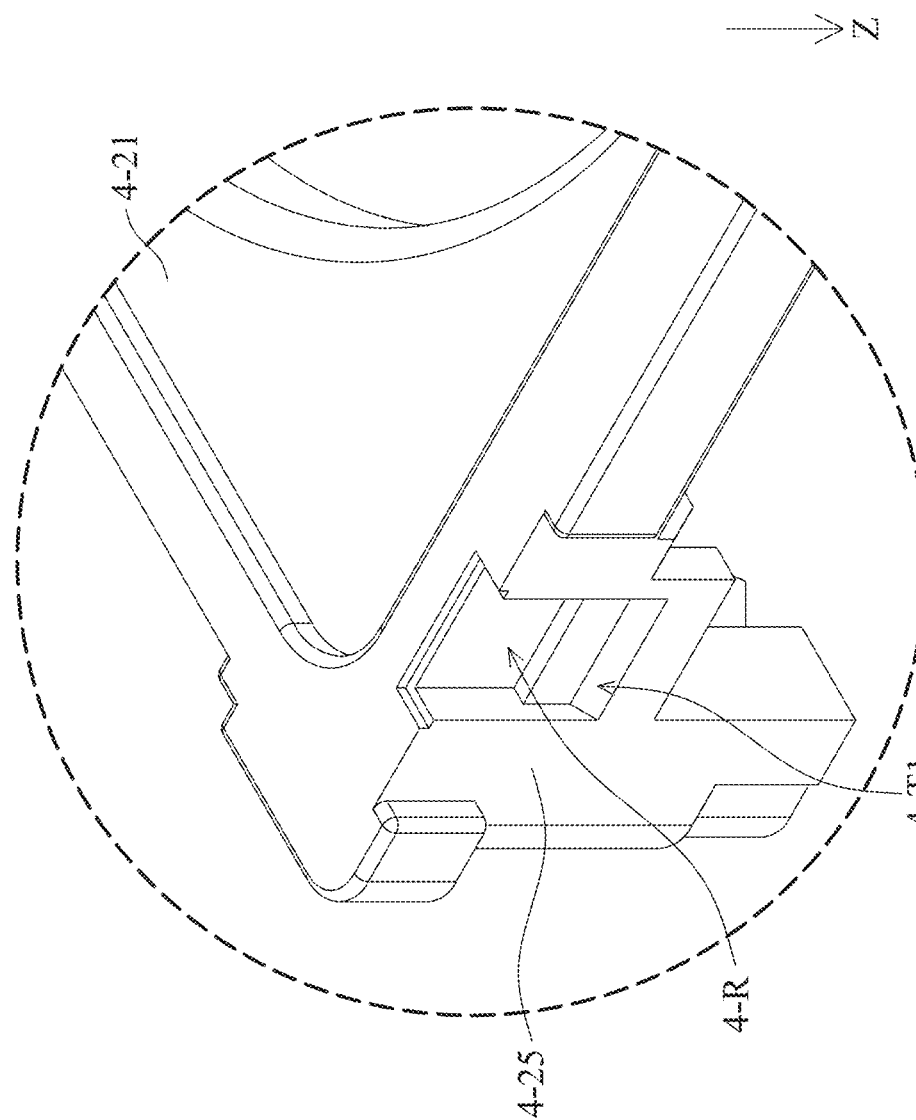
Figures 4, 5, 6, 7, 7A:
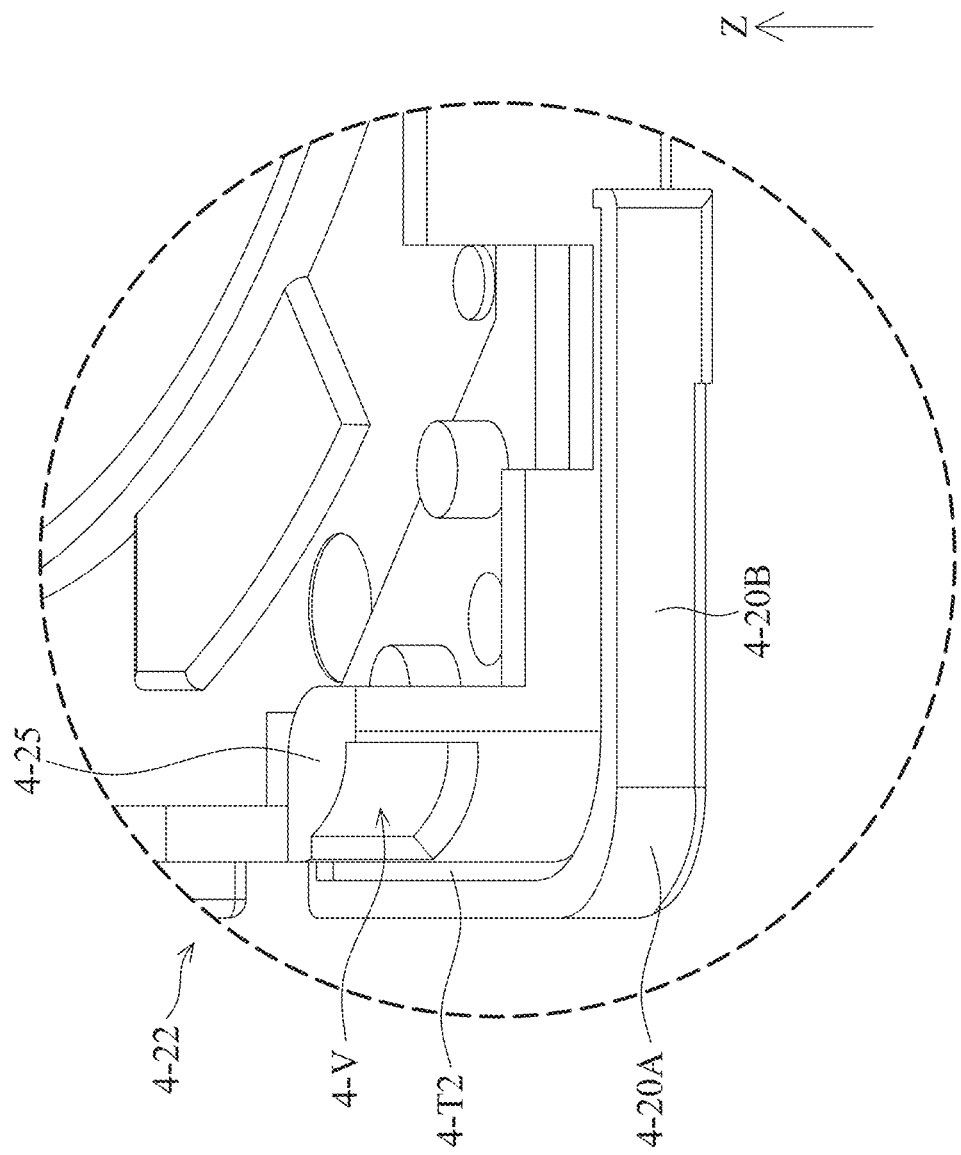
Figures 4, 5, 6, 7, 7B:
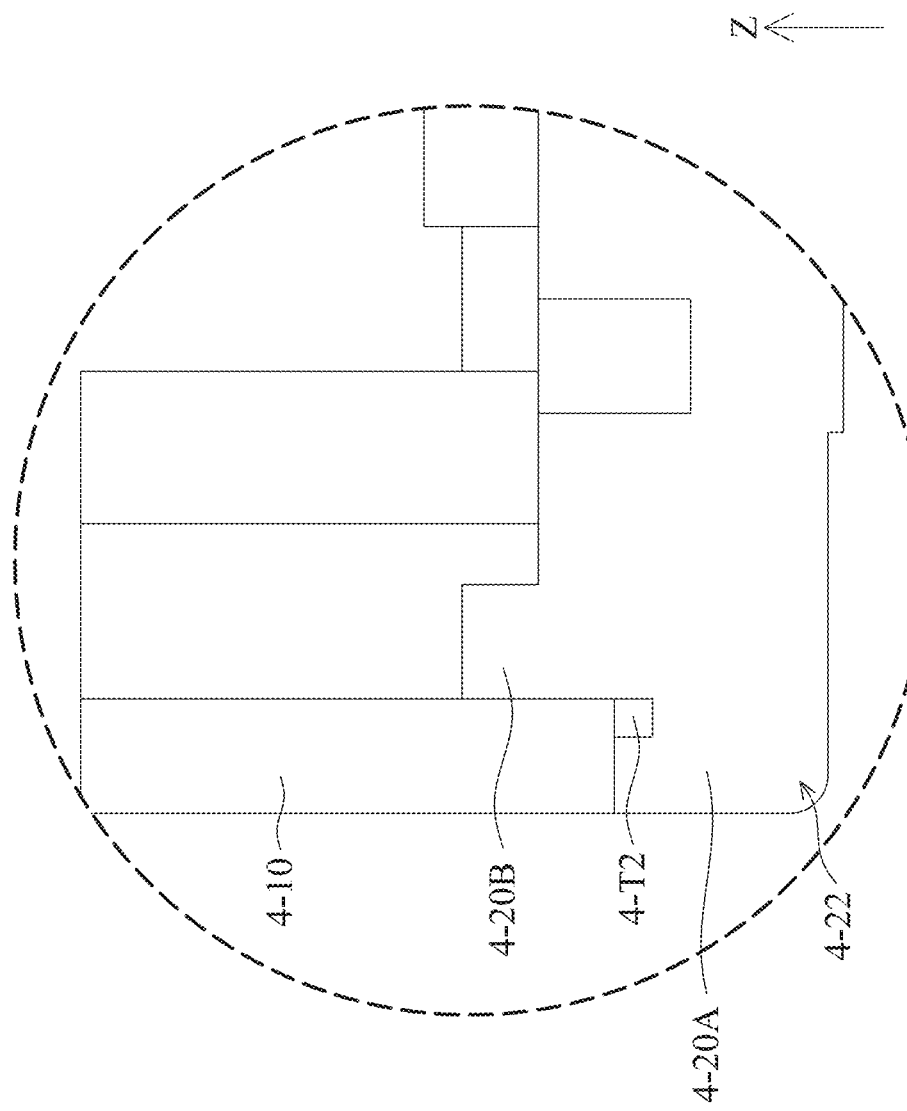

FIG. 7-6D is an enlarged diagram of a 7-S region in FIG. 7-6B. As shown in FIG. 7-6D, a slot 7-416 and two pillars 7-417 disposed on a side of the slot 7-416 may be formed on the protruding portion 7-413.

Referring to FIG. 7-3, the driving module 7-500 may comprise at least one first electromagnetic driving assembly 7-510 disposed on the carrier 7-410 of the movable portion 7-400 and at least one second electromagnetic driving assembly 7-520 disposed on the fixed portion 7-100 for driving the movable portion 7-400 to move relative to the fixed portion 7-100 along the optical axis 7-T of the optical lens 7-420. For example, the first electromagnetic driving assembly 7-520 may be a driving coil surrounding the carrier 7-410, and the second electromagnetic driving assembly 7-520 may be a magnet. When current flows through the driving coil (the first electromagnetic driving assembly 7-510), electromagnetic effect is generated between the driving coil and the magnet. Thus, the carrier 7-410 and the optical lens 7-420 disposed thereon may be driven to move upwardly or downwardly relative to the fixed portion 7-100 and the image sensor along the optical axis 7-T of the optical lens 7-420, and the purpose of focus adjustment can be achieved.

In this embodiment, the driving module 7-500 comprises four second electromagnetic driving assemblies 7-520, respectively disposed on the four corners of the driving mechanism 7-10. In some embodiments, the first electromagnetic driving assembly 7-510 may be a magnet, and the second electromagnetic driving assembly 7-520 may be a driving coil.

Figures 3, 4, 5, 6, 7, 7A:
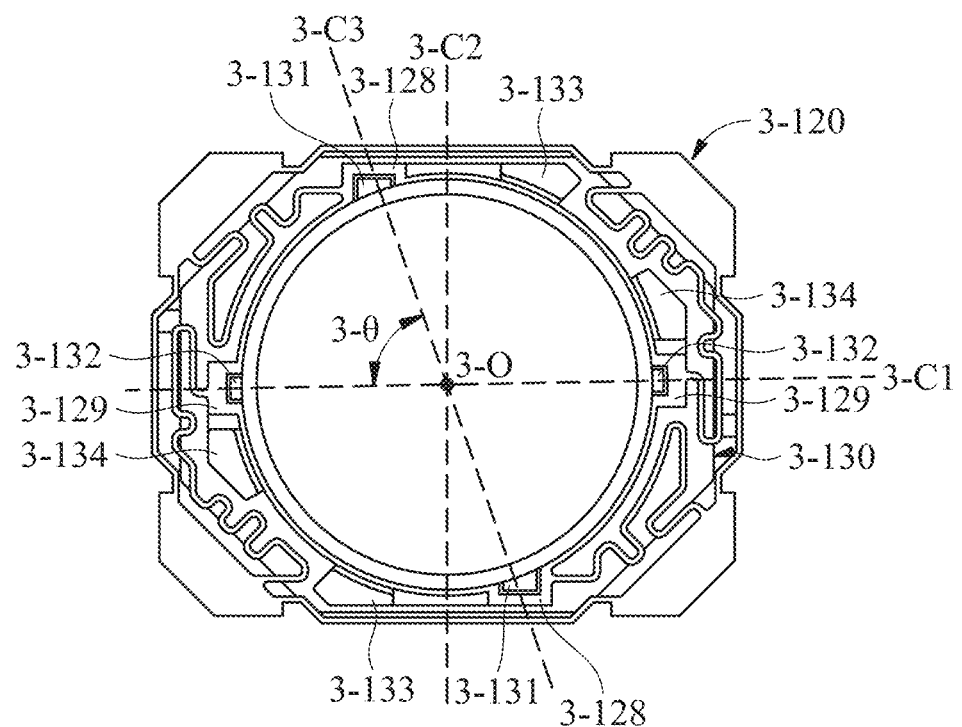
Figures 3, 4, 5, 6, 7, 7B:
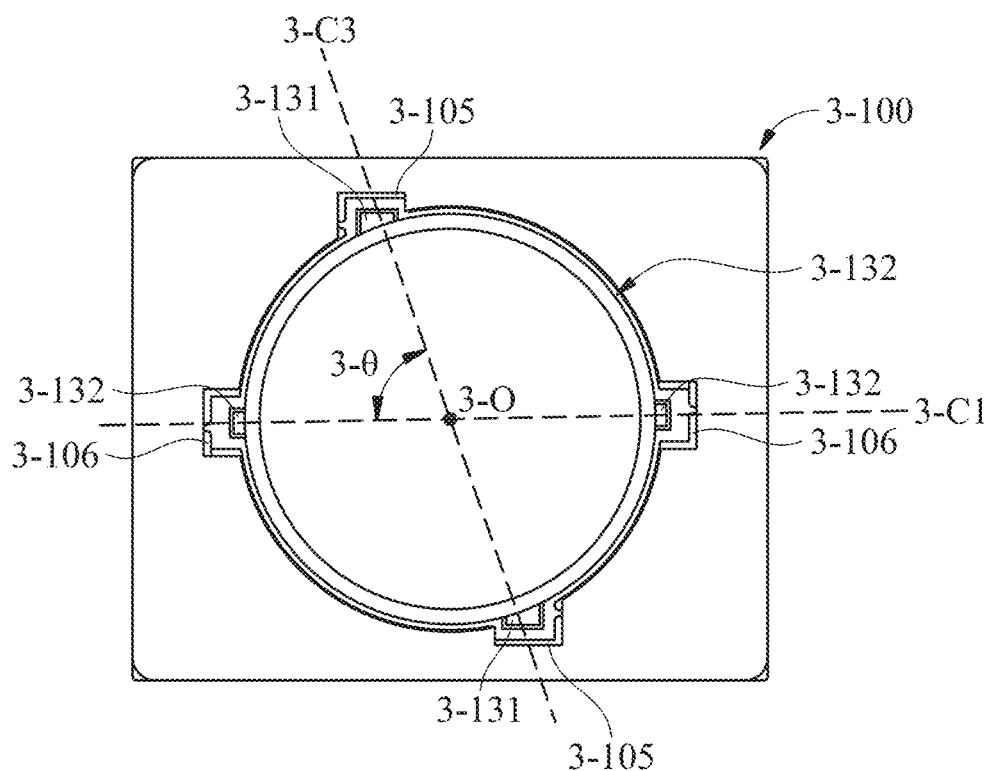

FIG. 7-7A is a cross-sectional view along line 7A-7A in FIG. 7-2, and FIG. 7-7B is a cross-sectional view along line 7B-7B in FIG. 7-2. As shown in FIGS. 7-7A and 7-7B, when the aforementioned members of the driving mechanism 7-10 are assembled, the first electromagnetic driving assembly 7-510 is in contact with the side wall 7-411 of the carrier 7-410. Therefore, the driving module 7-500 can directly drive the carrier 7-410 with the optical lens 7-420, and the precision of the movement of the optical lens 7-420 can be increased.

The first electromagnetic driving assembly 7-510 is in contact with the first surface 7-413a of the protruding portion 7-413, and an adhesive member 7-P may be filled into the recess 7-414 of the carrier 7-410, so as to attach the first electromagnetic driving assembly 7-510 onto the carrier 7-410. It should be noted that the adhesive member 7-P disposed in the recess 7-414 is in contact with the second surface 7-414a. Since the first surface 7-413a and the second surface 7-414a face opposite directions, and are respectively in contact with the first electromagnetic driving assembly 7-510 and the adhesive member 7-P, the fixing force for affixing the first electromagnetic driving assembly 7-510 can be increased. Moreover, since the protrusion 7-415 extending toward the recess 7-414 is formed on the second surface 7-414a, the adhesive area is increased, and the fixing force for affixing the first electromagnetic driving assembly 7-510 is therefore increased.

Referring to FIGS. 7-7A and 7-7B, in this embodiment, a portion of the frame 7-120 of the fixed portion 7-100 is extended into a depression portion 7-R between the first electromagnetic driving assembly 7-510 and the carrier 7-410, so as to prevent rotation of the carrier 7-410 when the driving mechanism 7-10 is collided. Furthermore, the second electromagnetic driving assembly 7-520 is in contact with the first elastic member 7-200, and is separated from the second elastic member 7-300.

Figures 4, 5, 6, 7, 7C:
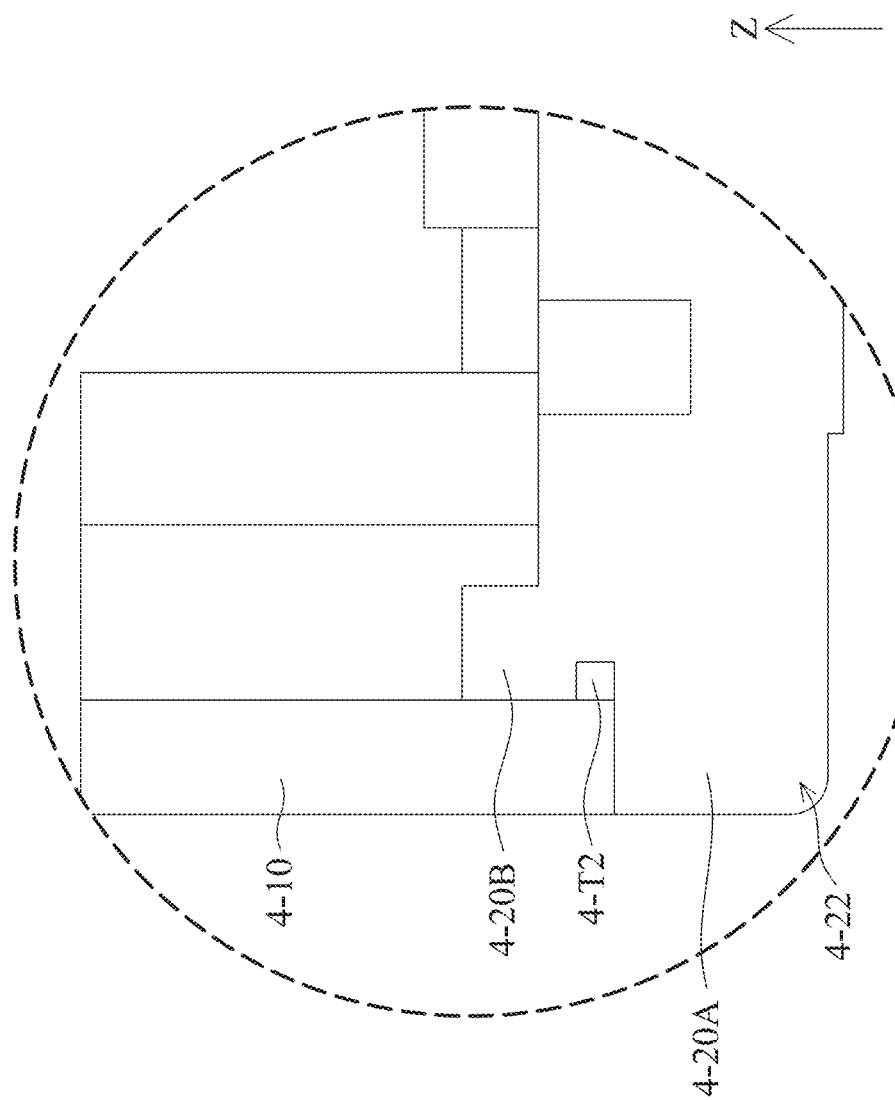
Figures 4, 5, 6, 7, 8, 8A:
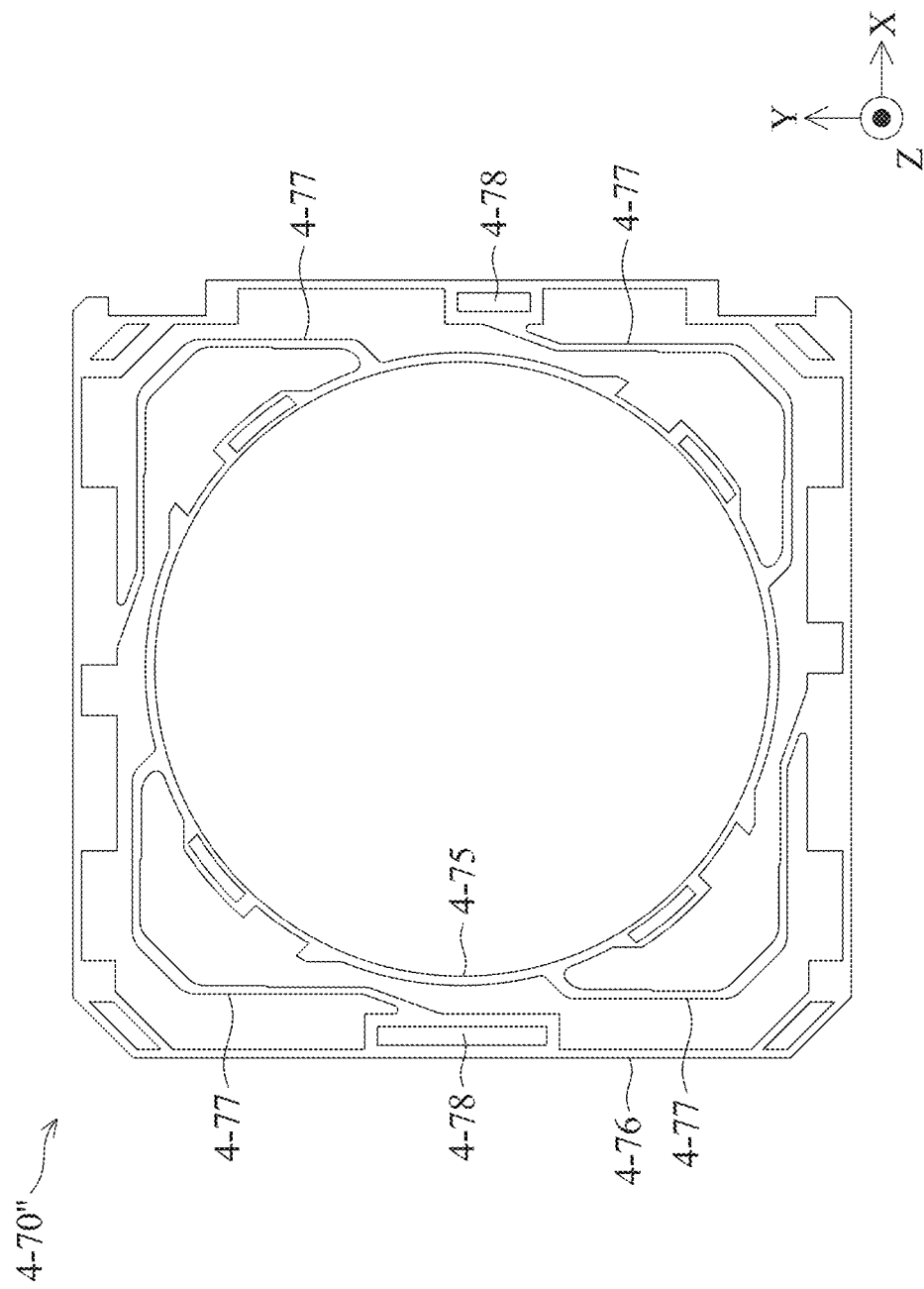
Figures 4, 5, 6, 7, 8, 8B:
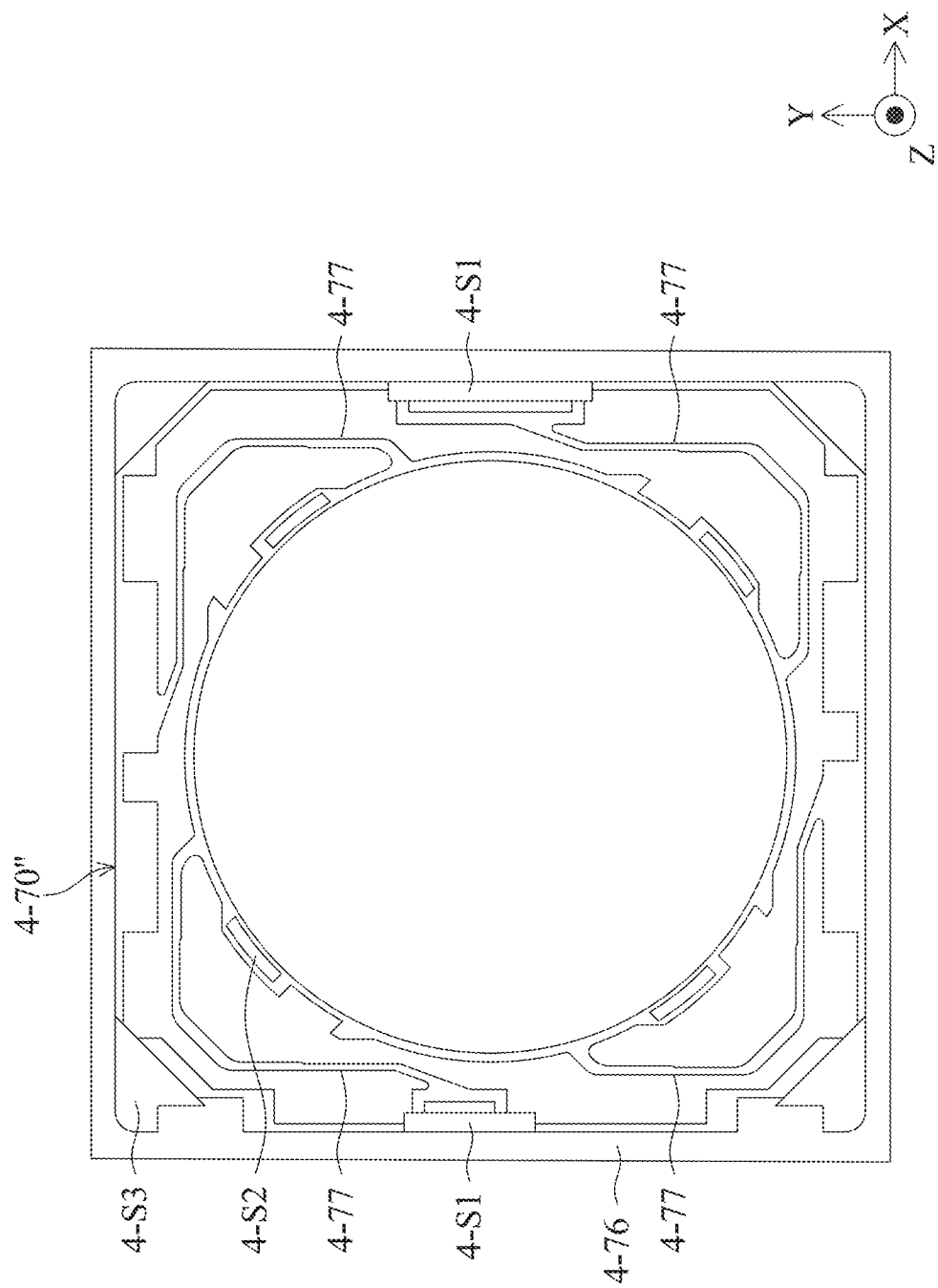
Figures 4, 5, 6, 7, 8, 9, 9A:
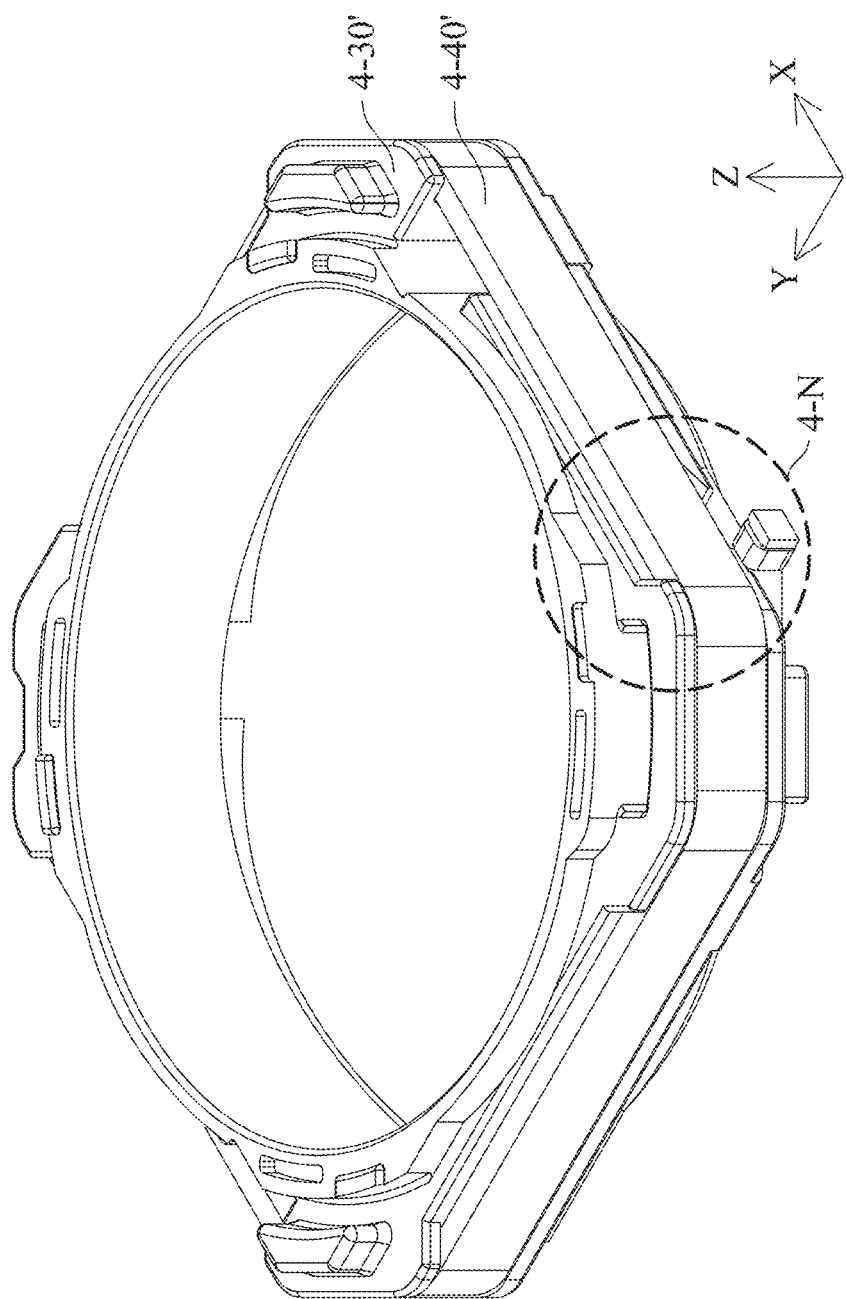
Figures 4, 5, 6, 7, 8, 9, 9B:
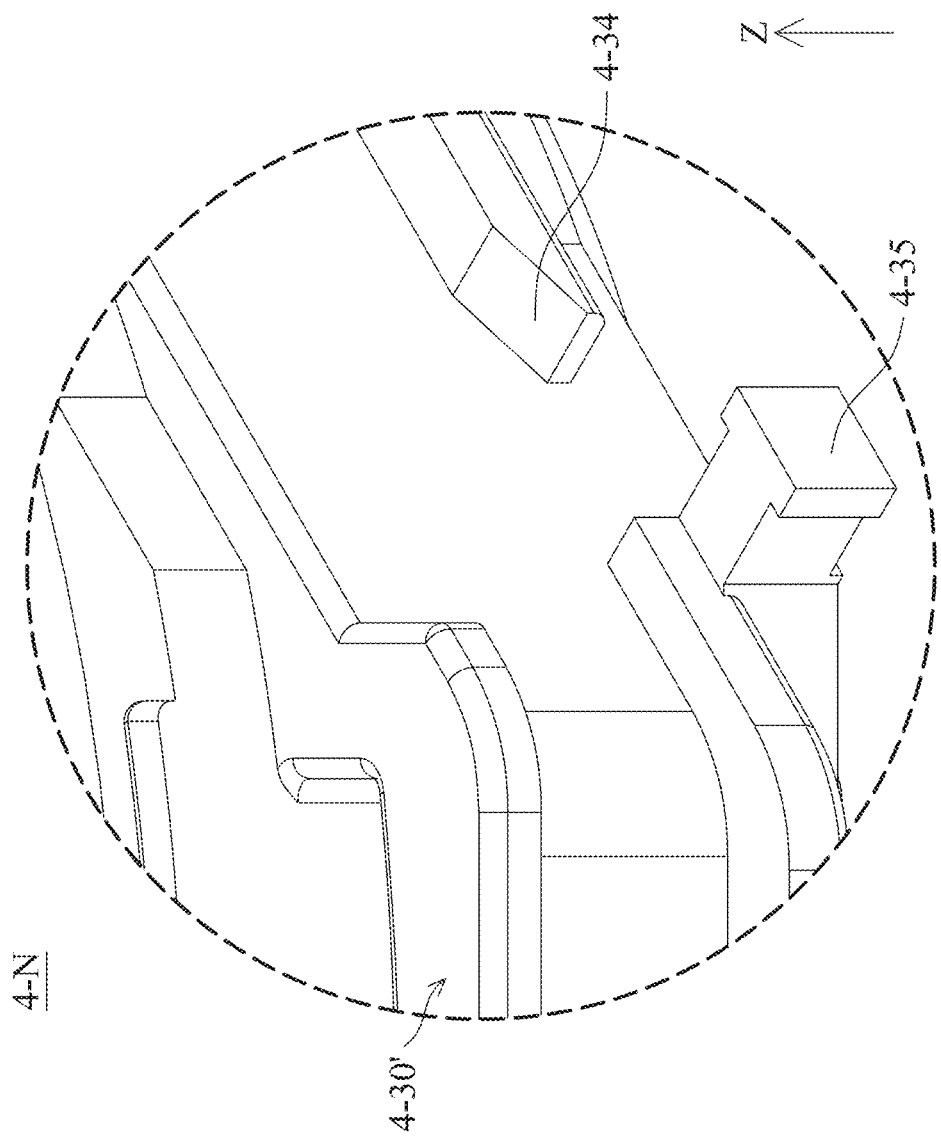
Figures 4, 5, 6, 7, 8, 9, 10, 10A:
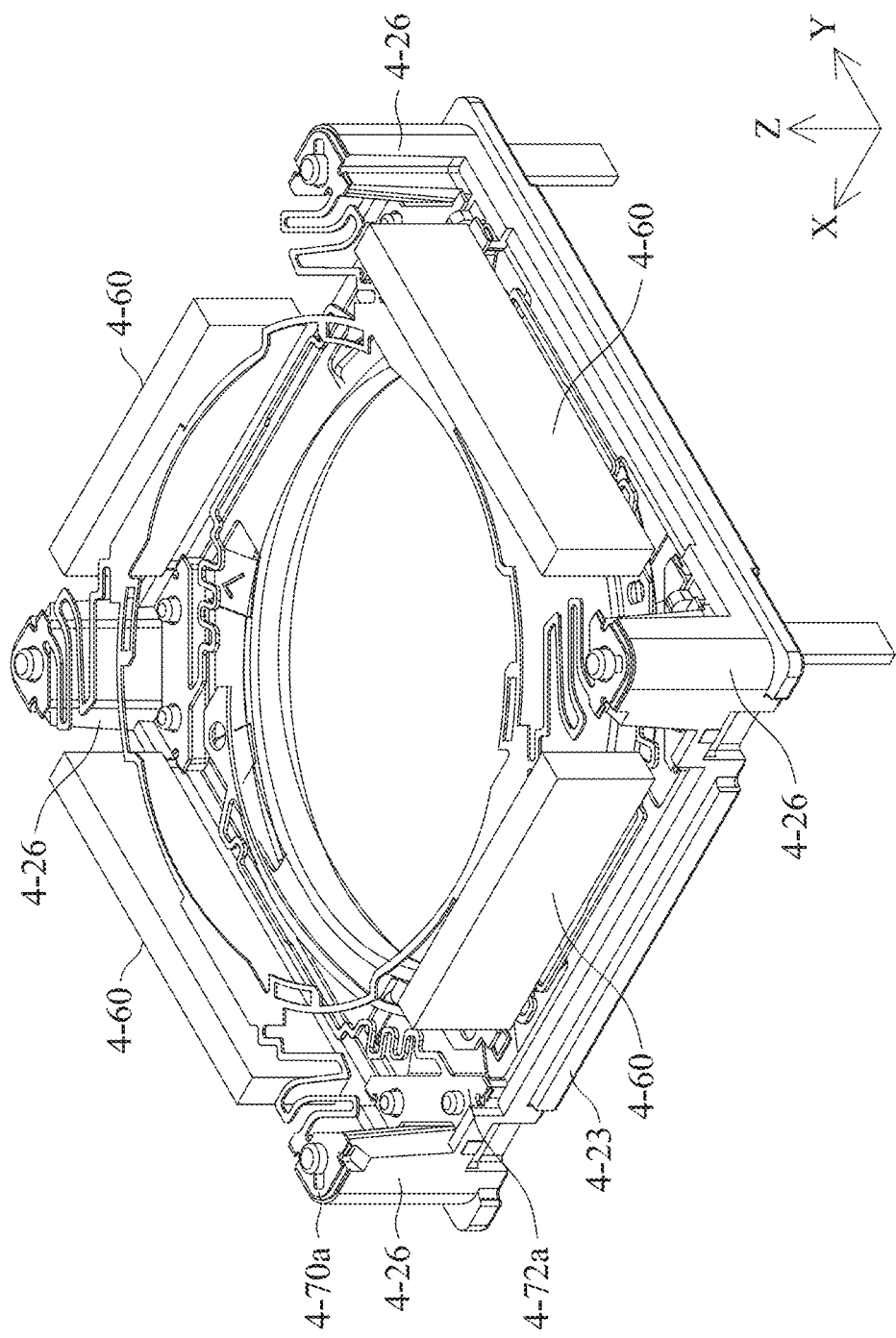
Figures 4, 5, 6, 7, 8, 9, 10, 10B:
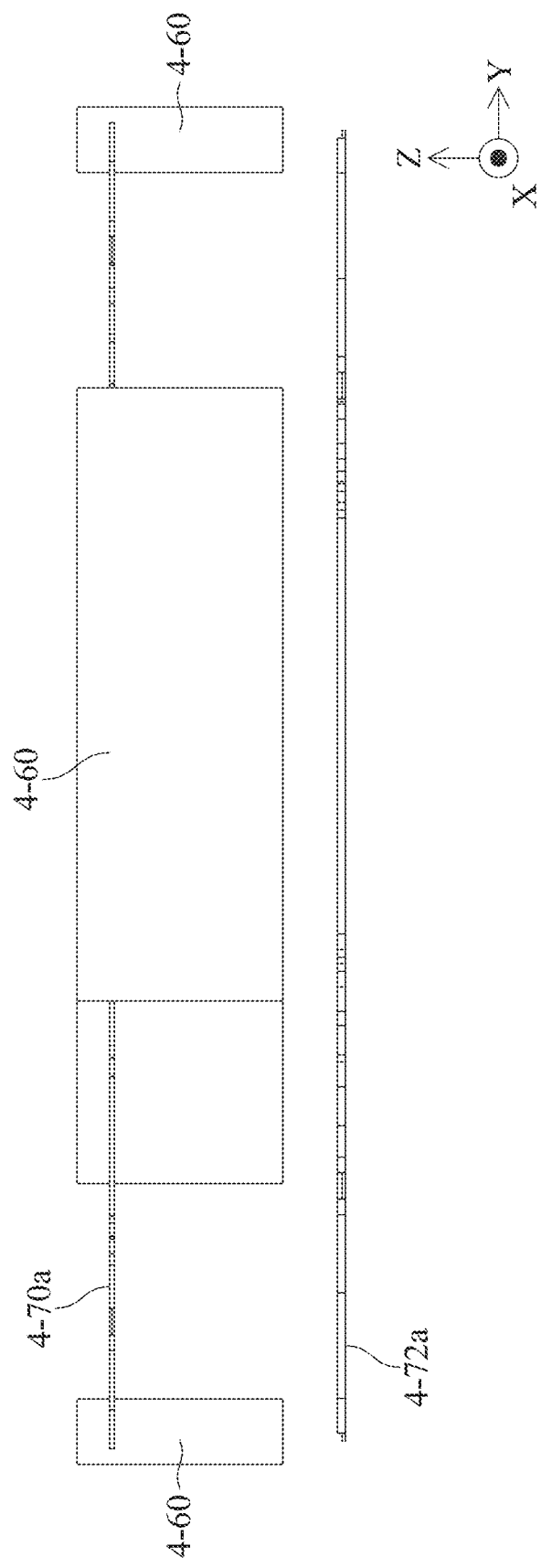
Figures 4, 5, 6, 7, 8, 9, 10, 10C:
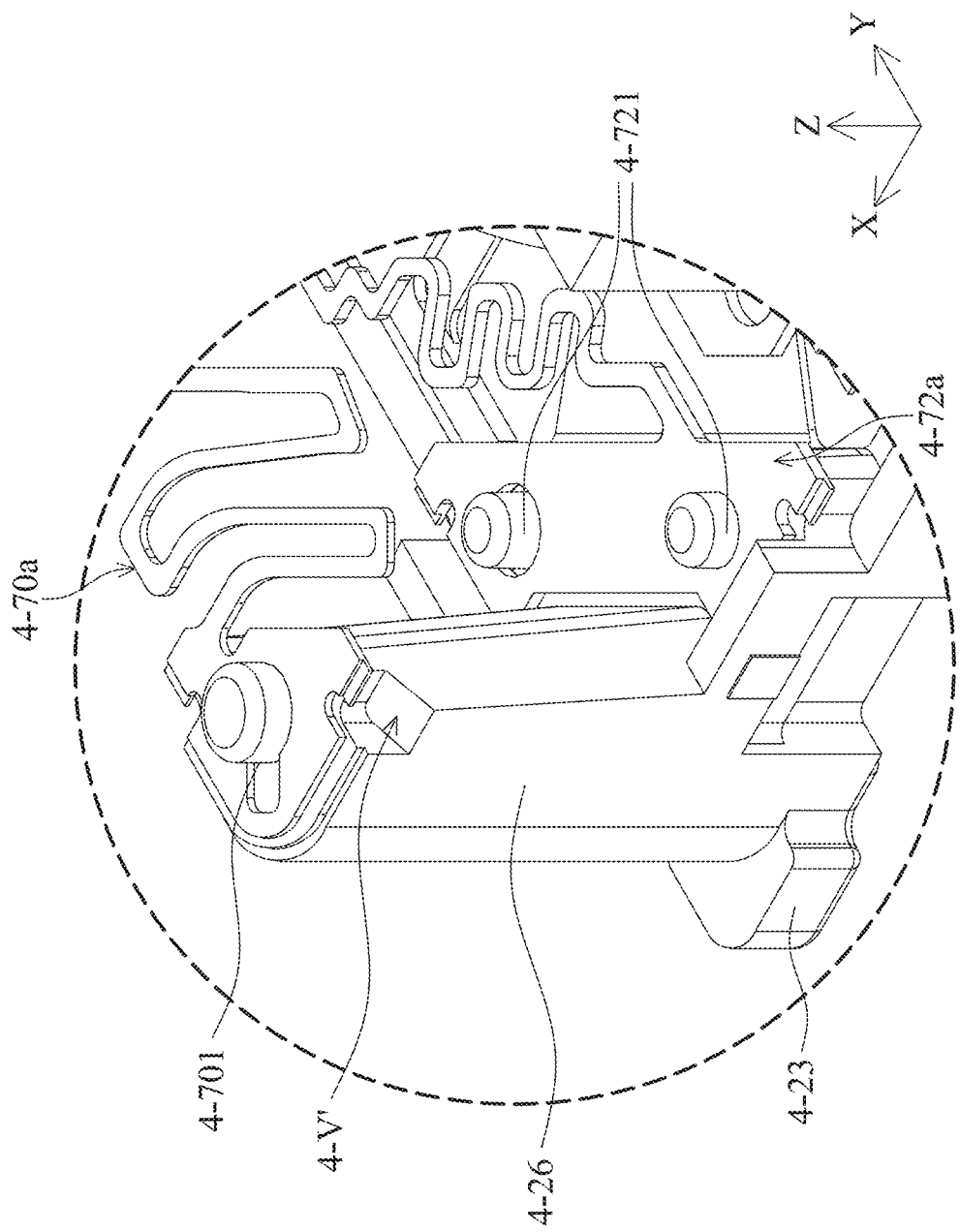
Figures 4, 5, 6, 7, 8, 9, 10, 10D:
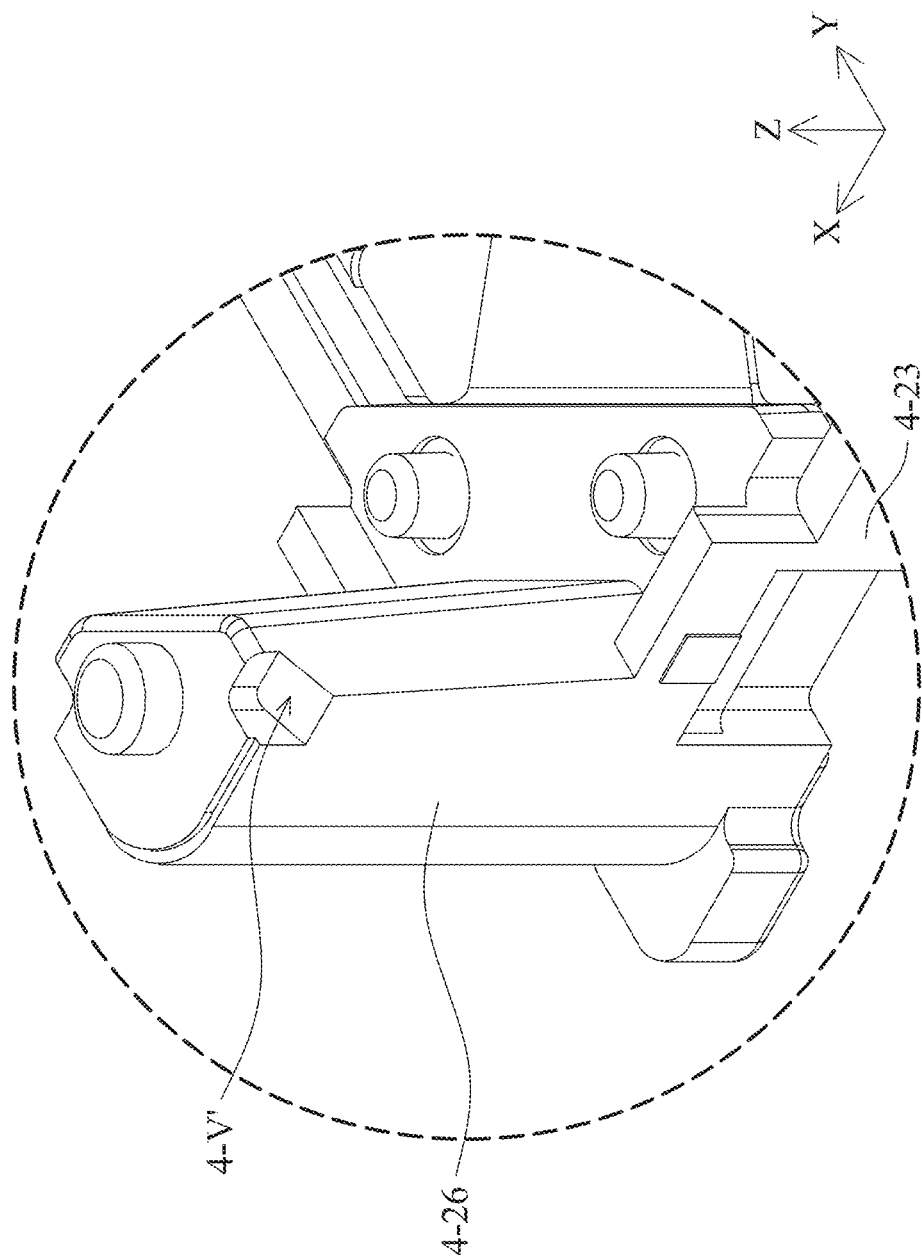
Figures 1, 5:
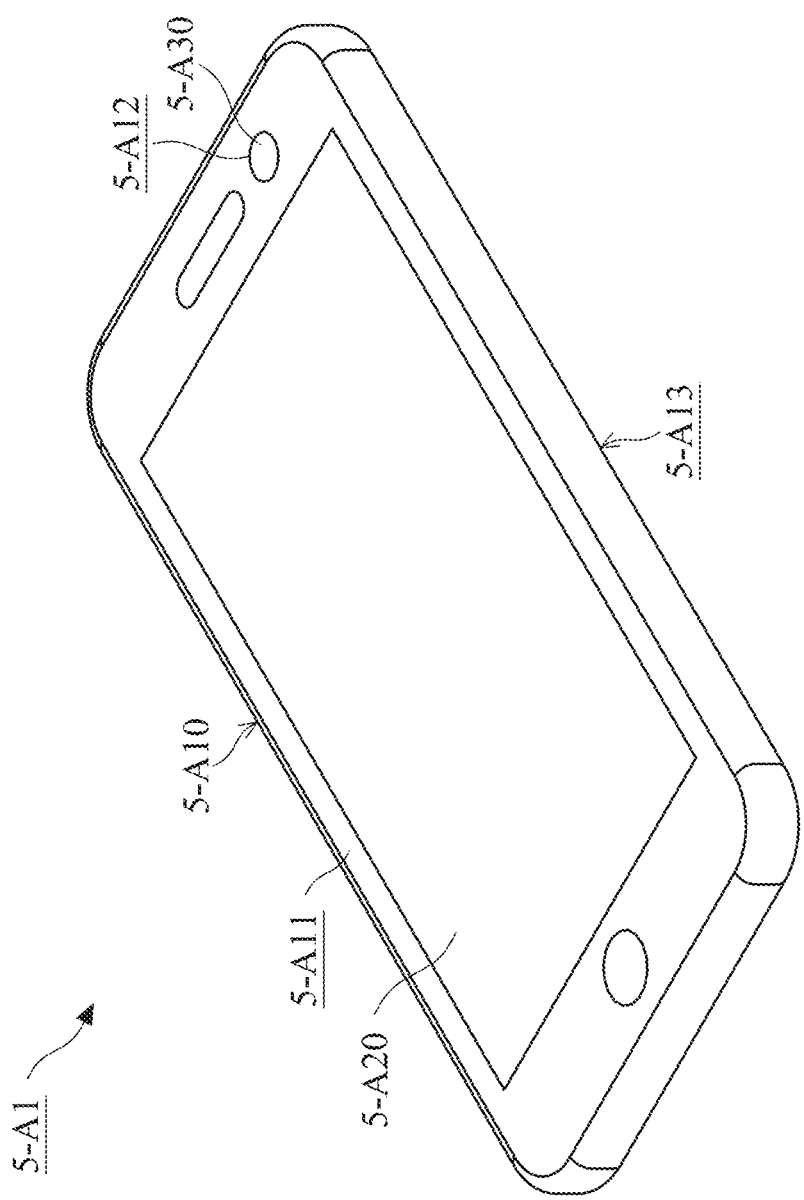
Figures 2, 5:
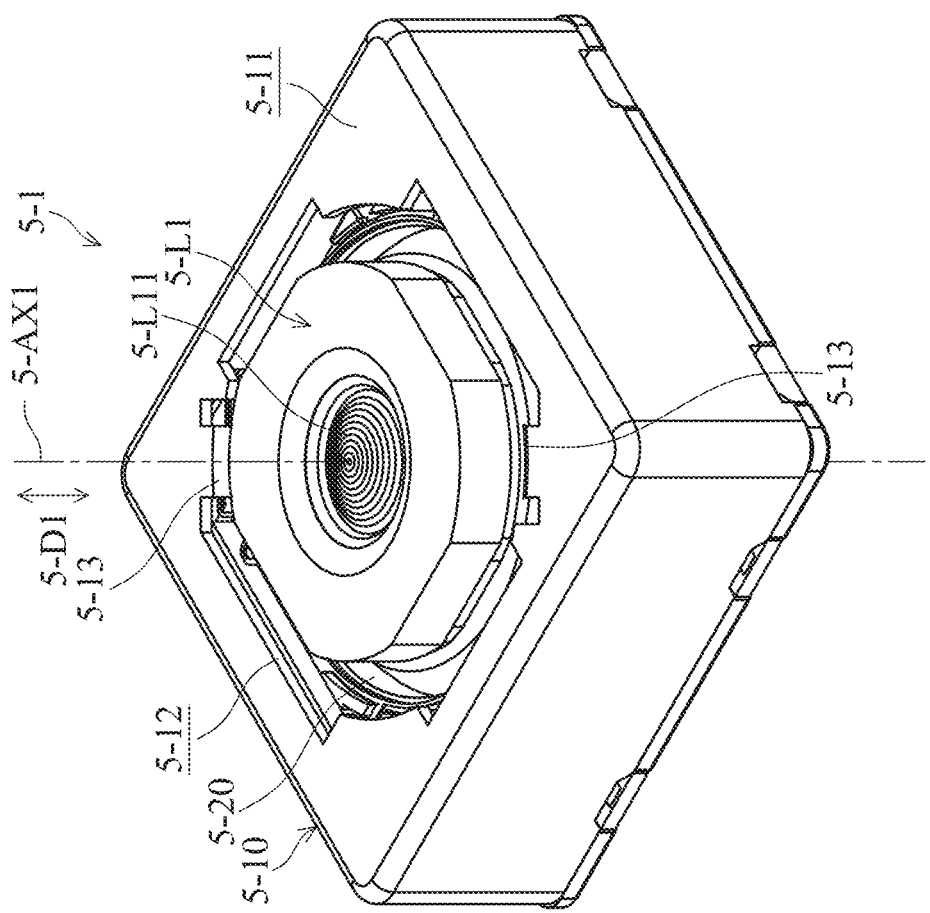
Figures 3, 5:
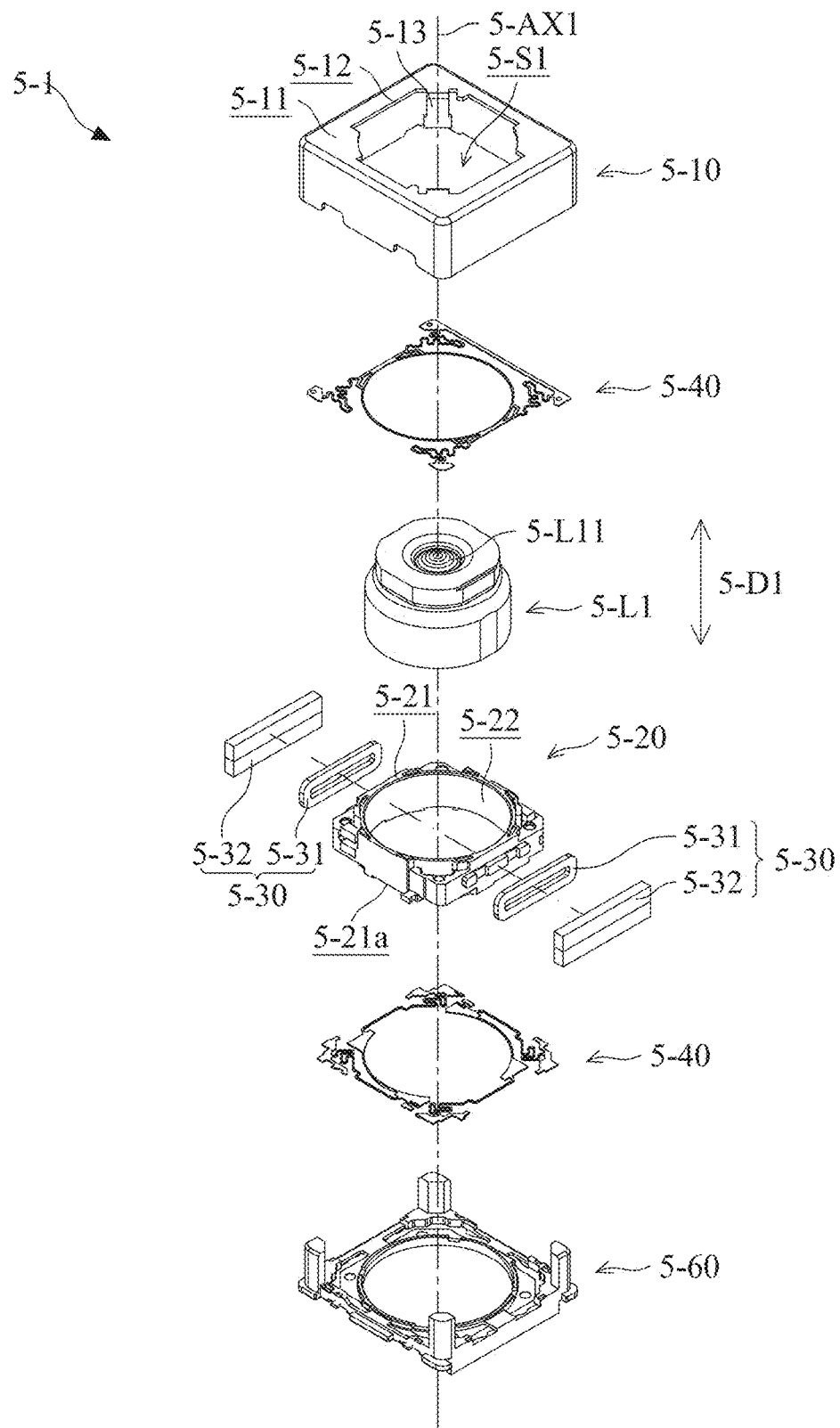
Figures 4, 5:
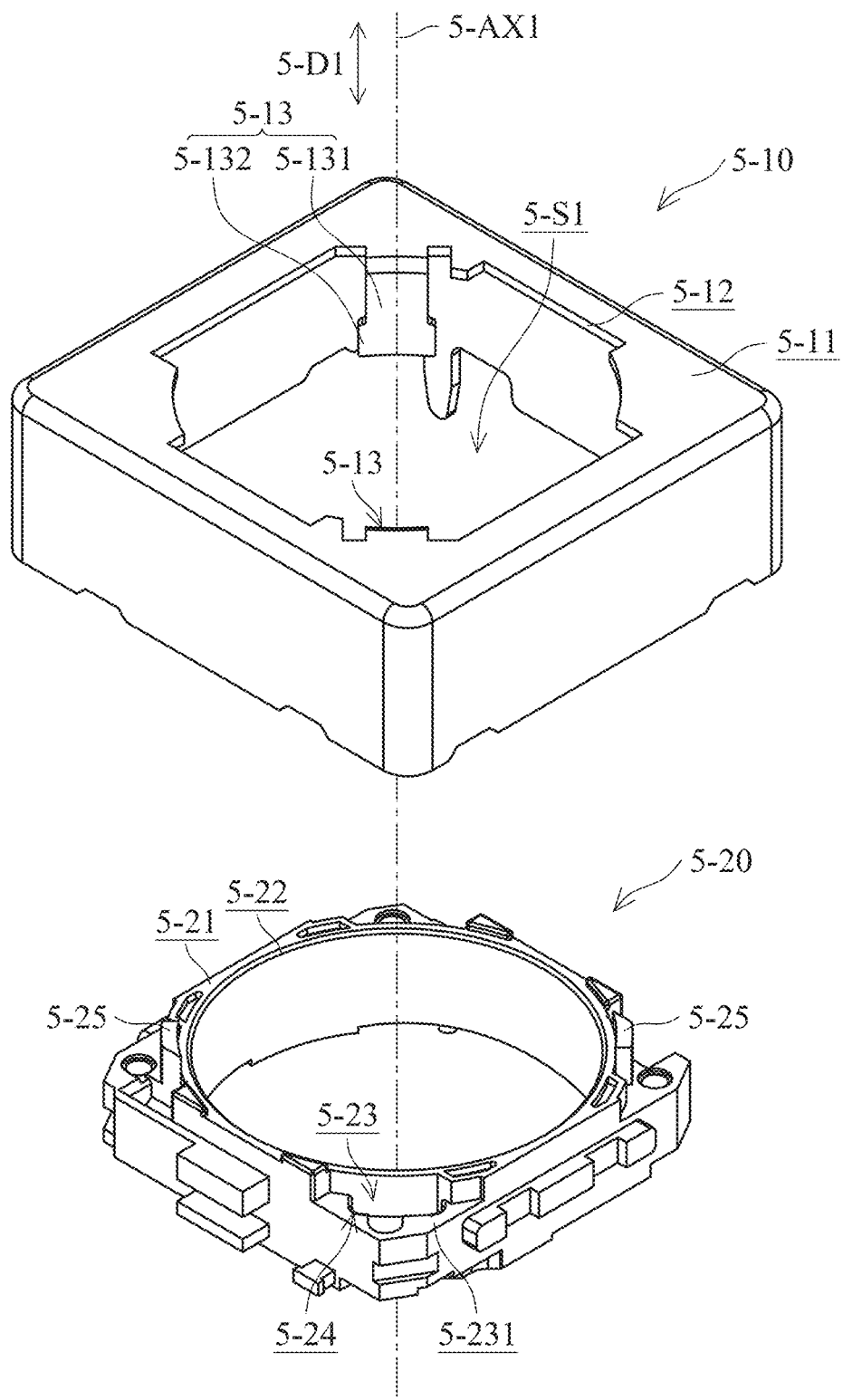
Figures 5, 5A:
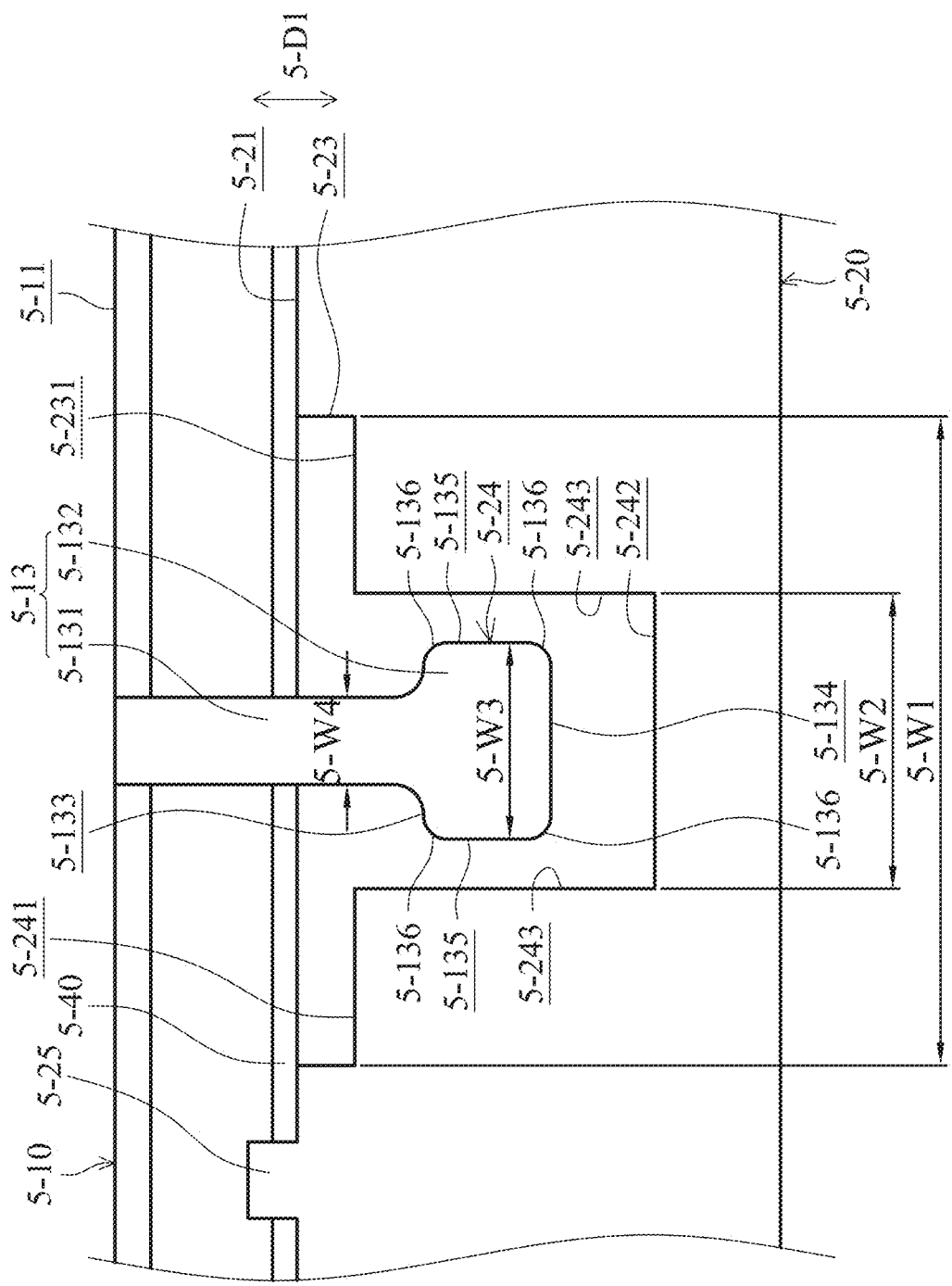
Figures 5, 5B:
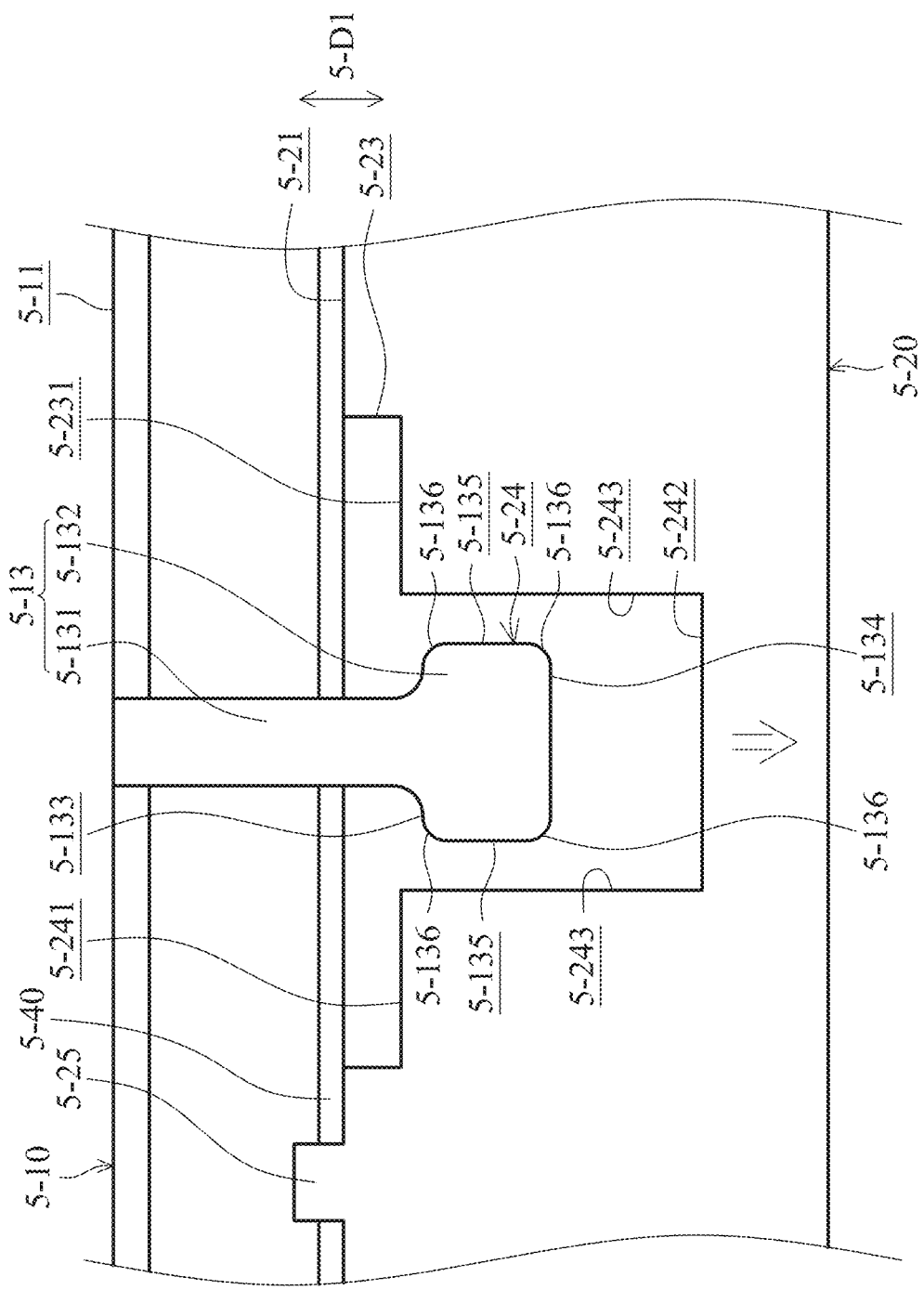
Figures 5, 5C:
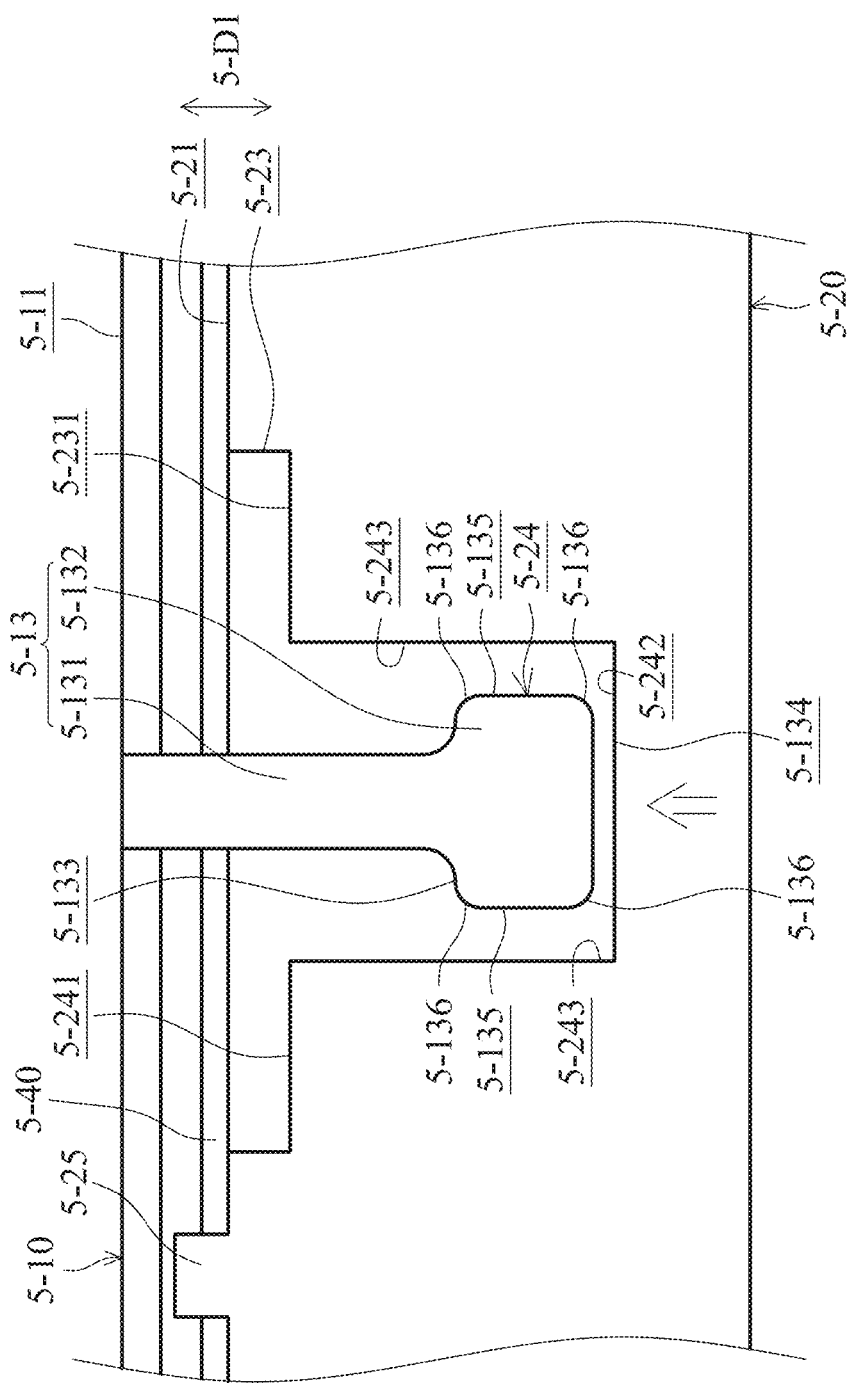
Figures 5, 6:
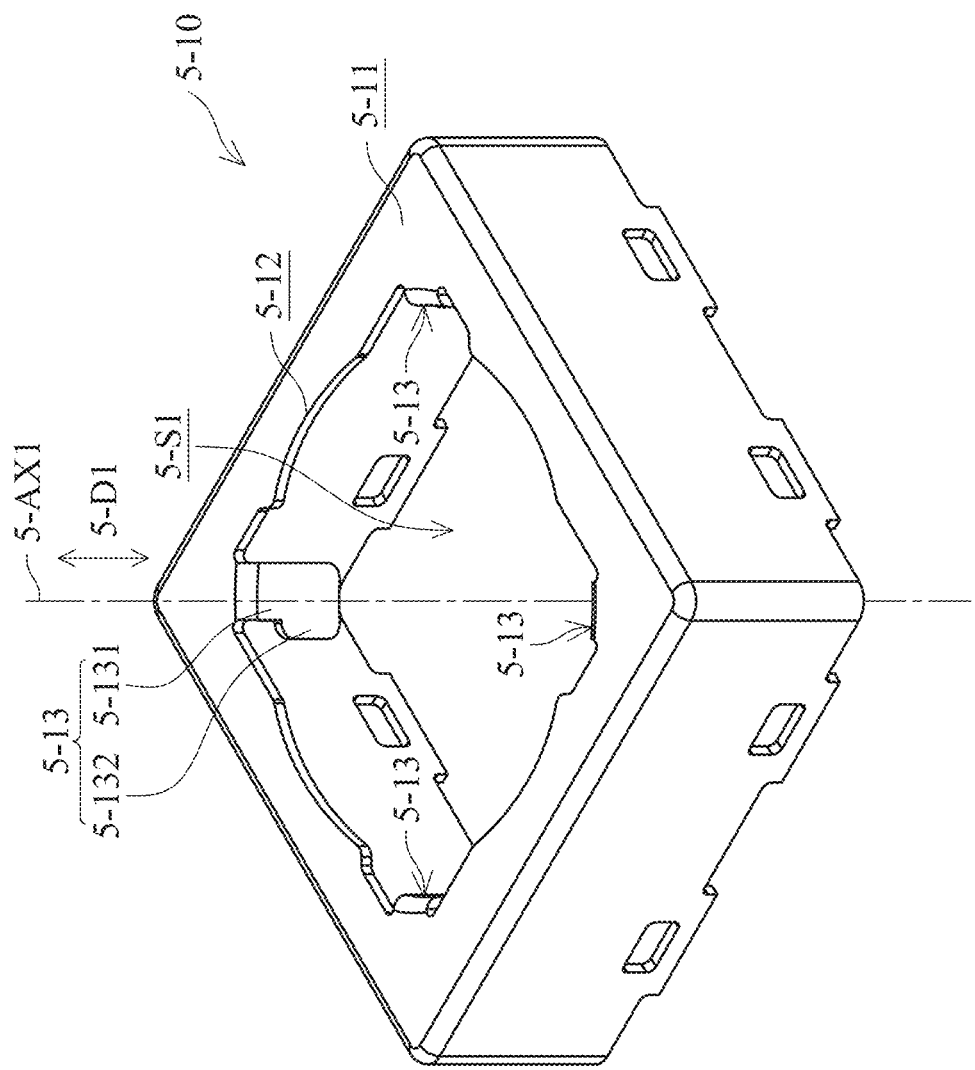
Figures 5, 6, 7:
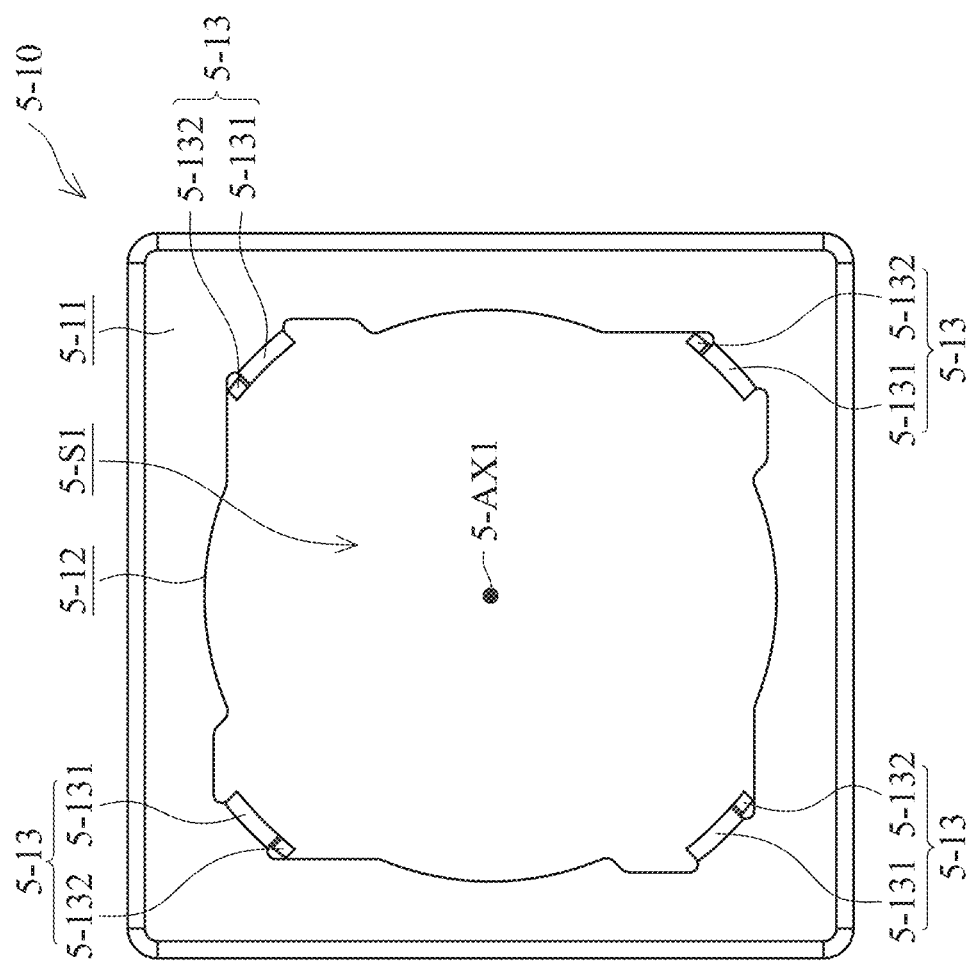
Figures 5, 6, 7, 8:
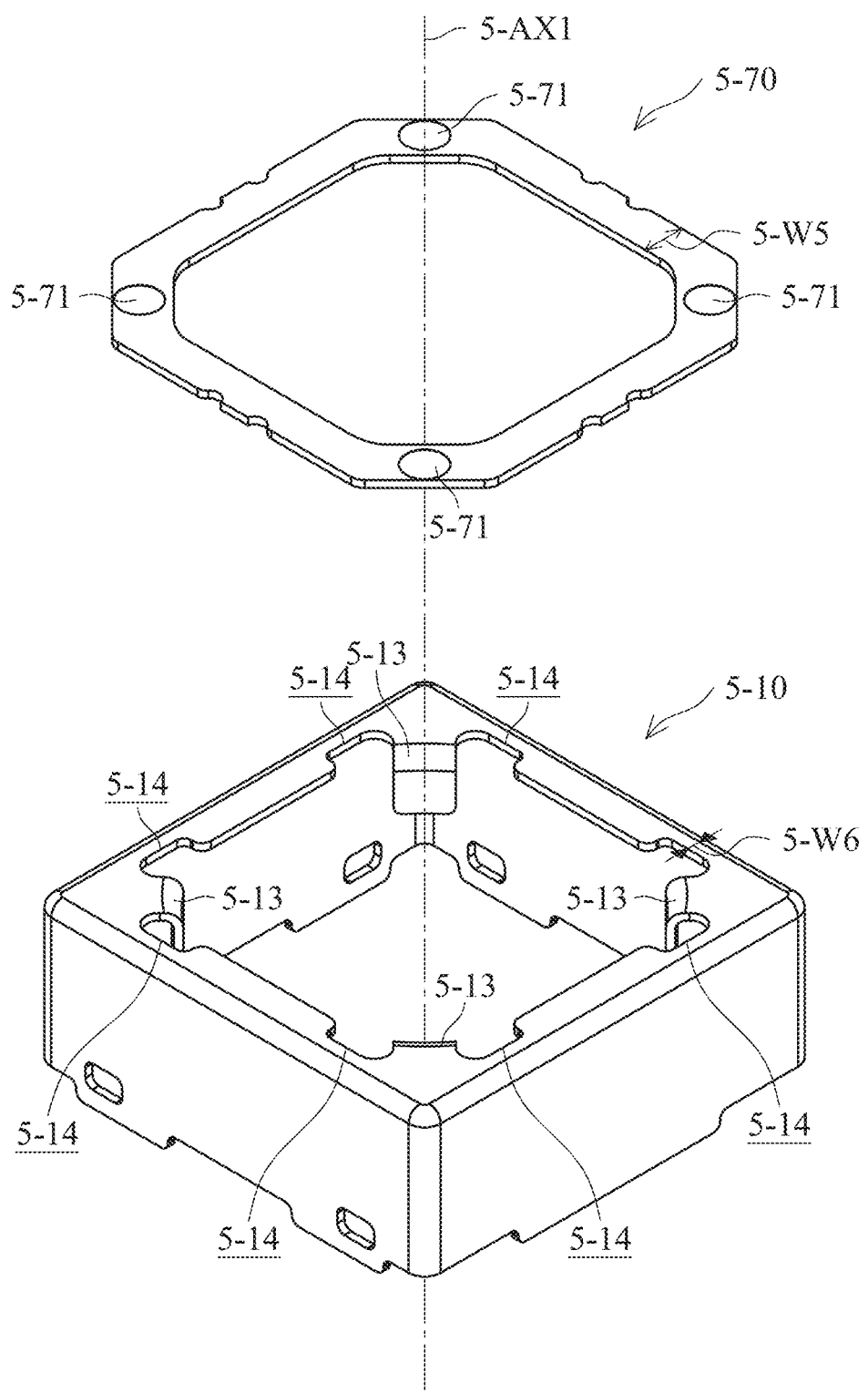
Figures 5, 6, 7, 8, 9:
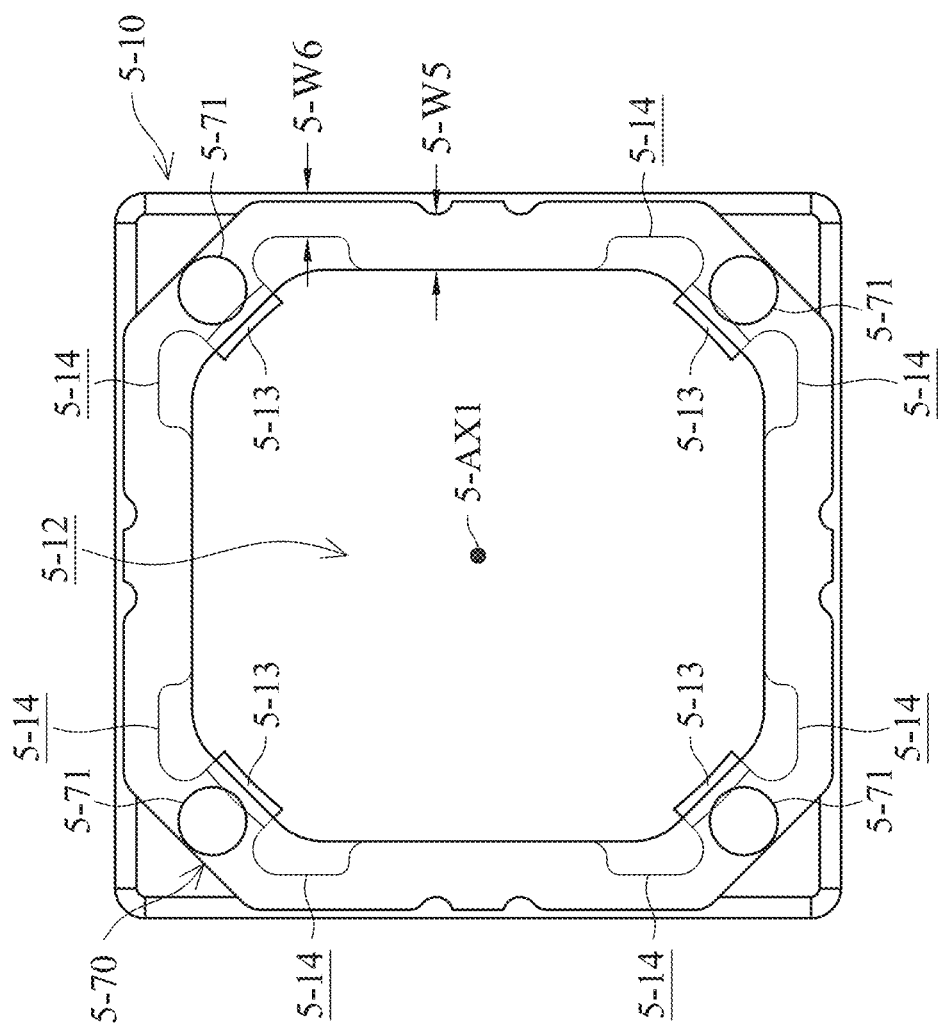
Figures 5, 6, 7, 8, 9, 10:
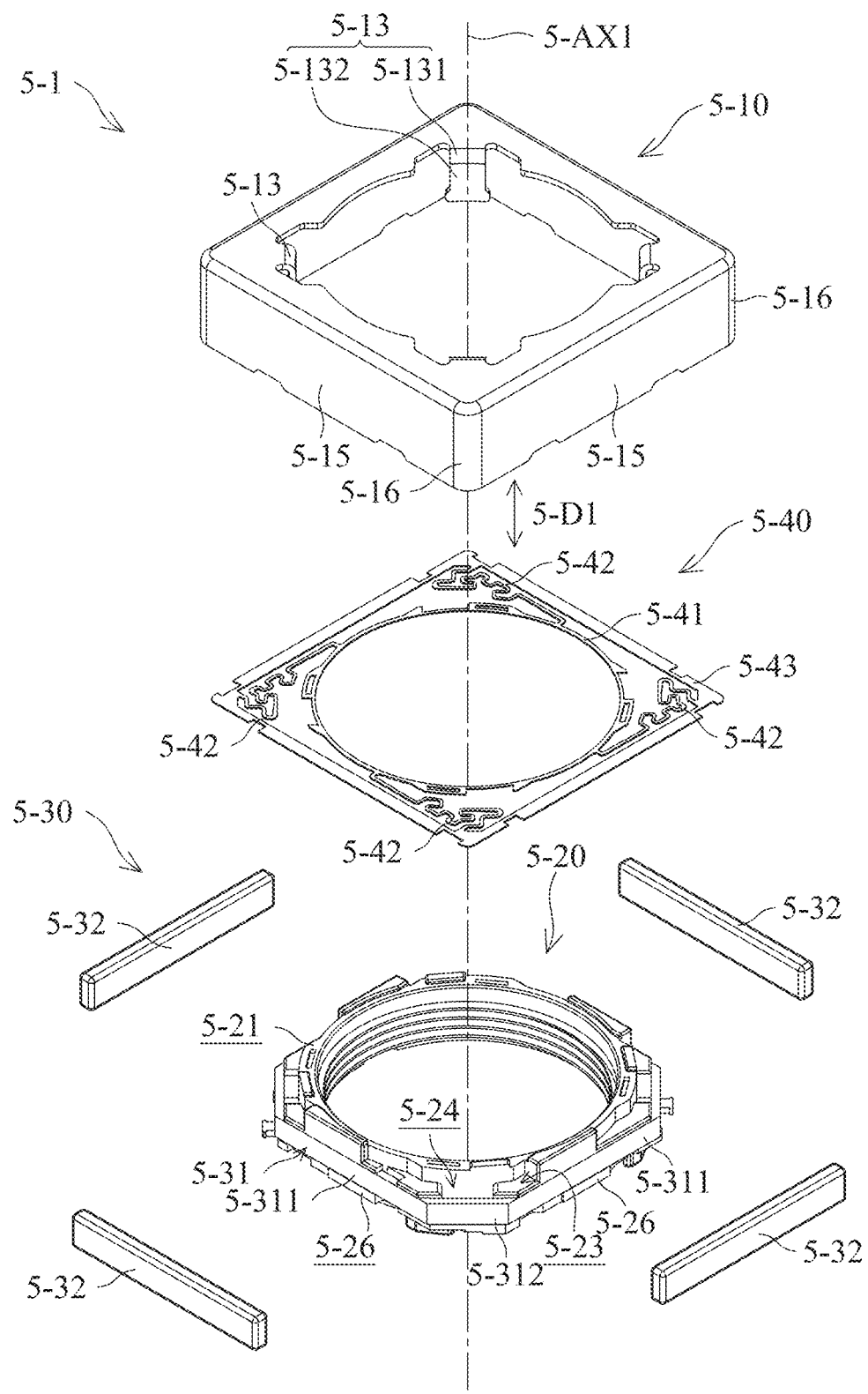
Figures 5, 6, 7, 8, 9, 10, 11:
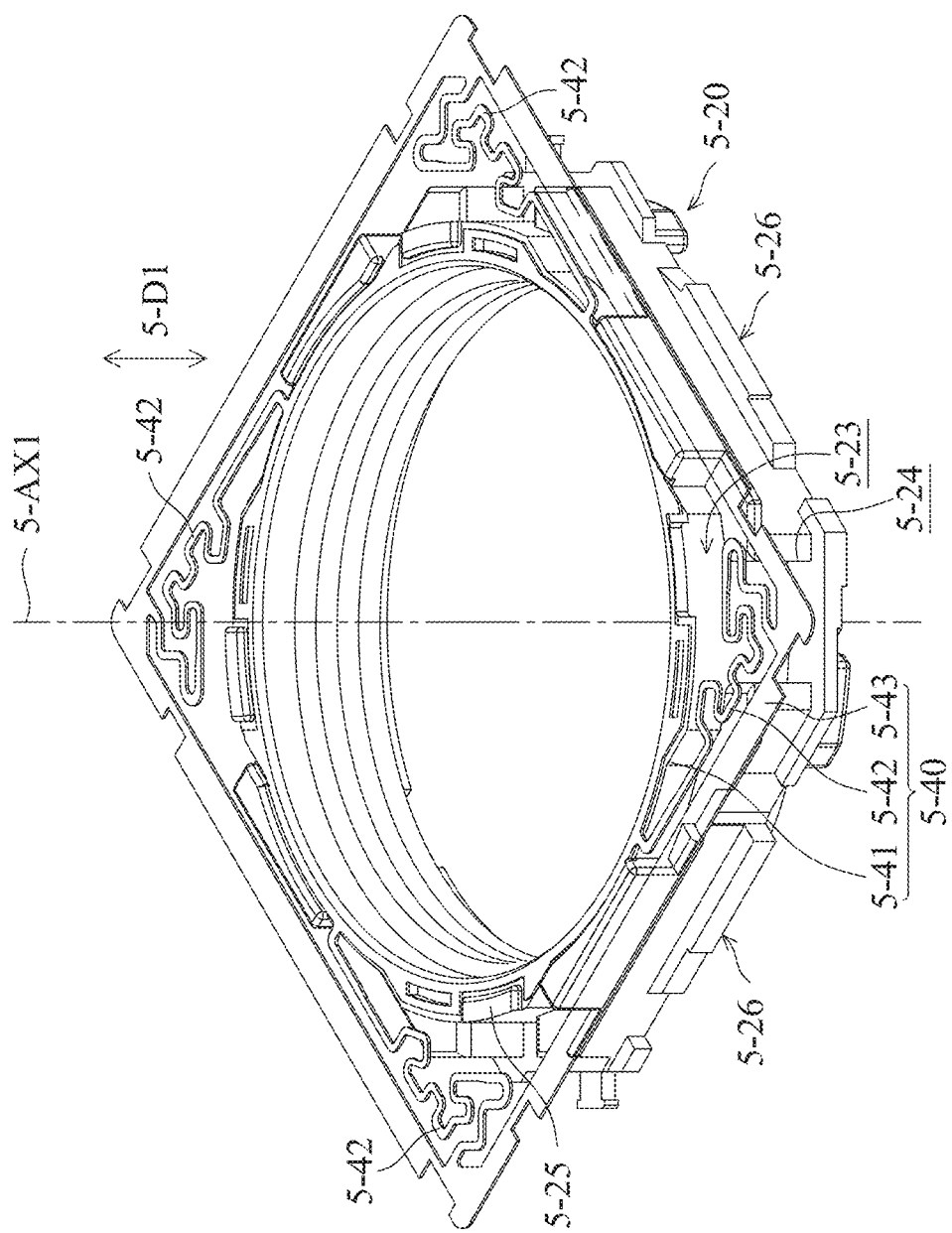
Figures 5, 6, 7, 8, 9, 10, 11, 12:
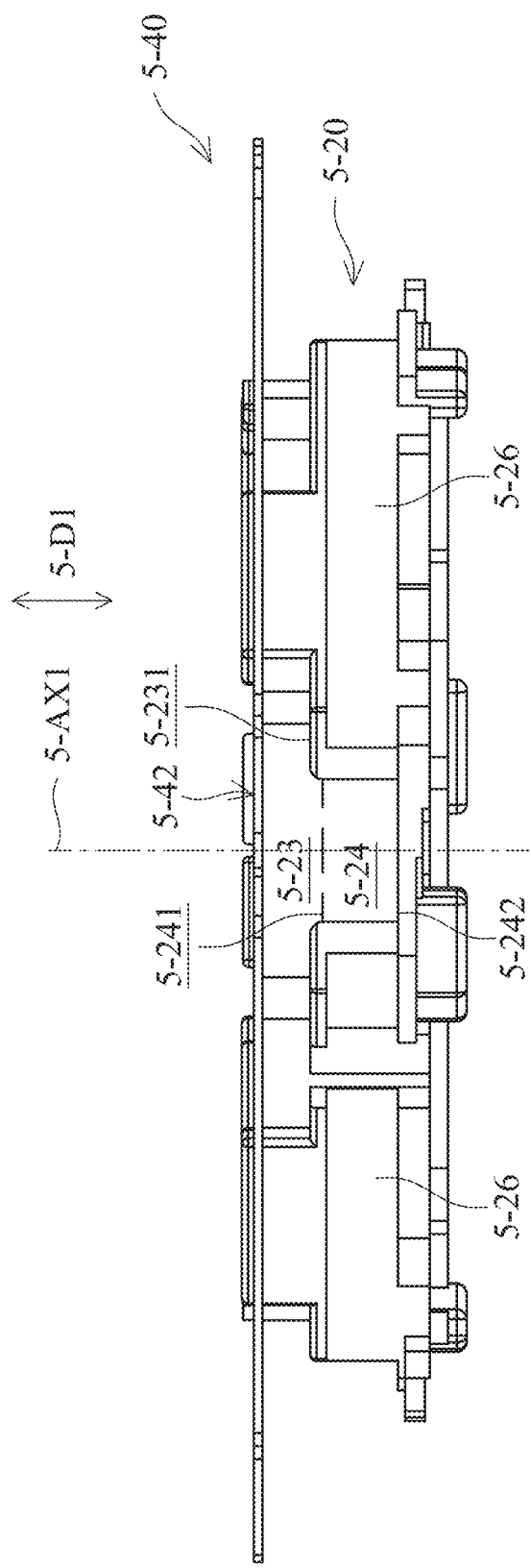
Figures 5, 6, 7, 8, 9, 10, 11, 12, 13:
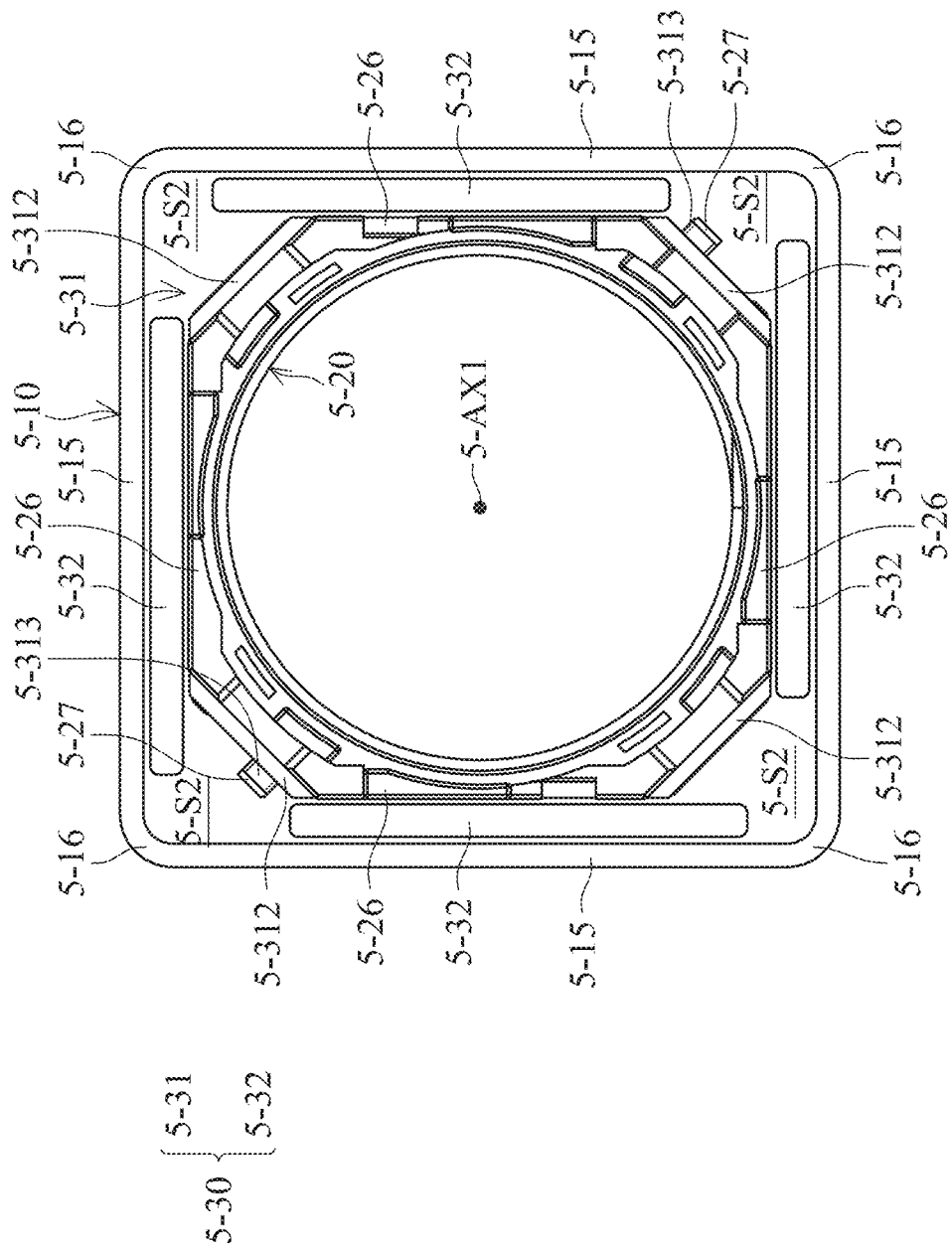
Figures 5, 6, 7, 8, 9, 10, 11, 12, 13, 14:
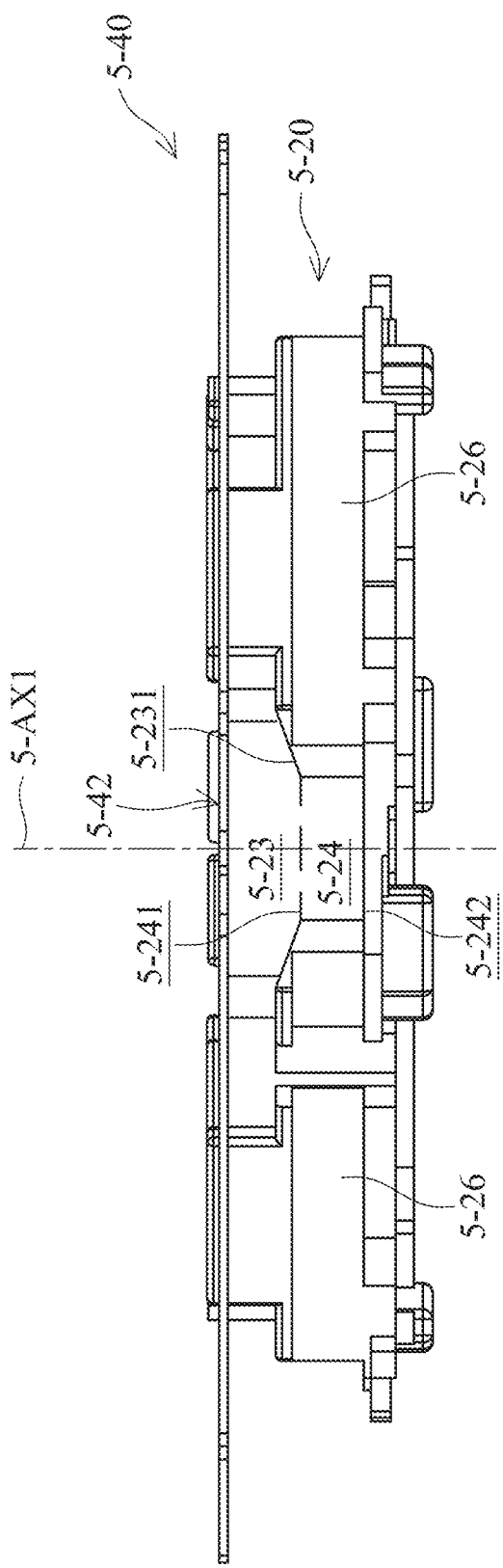
Figures 5, 6, 7, 8, 9, 10, 11, 12, 13, 14, 15:
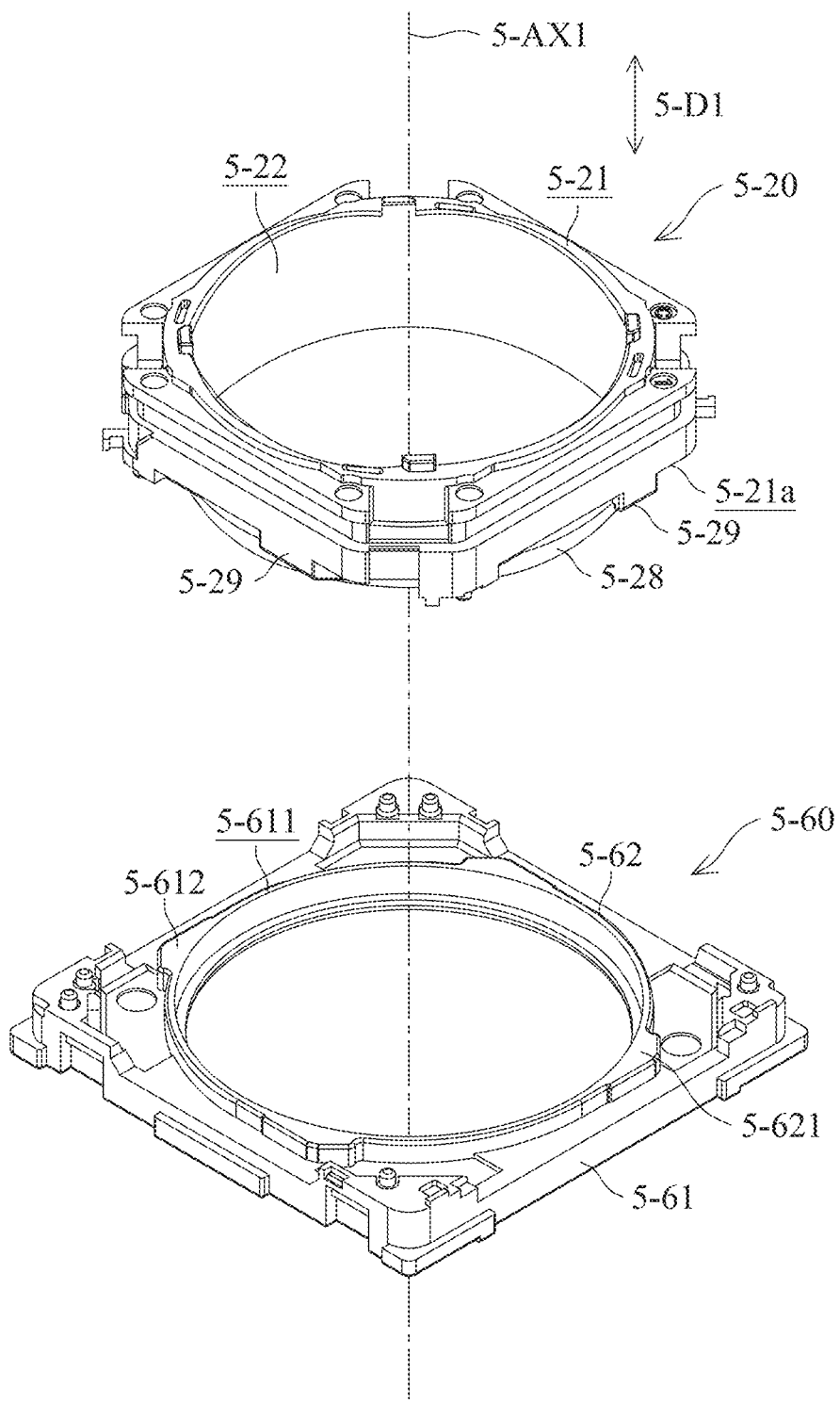
Figures 5, 6, 7, 8, 9, 10, 11, 12, 13, 14, 15, 16:
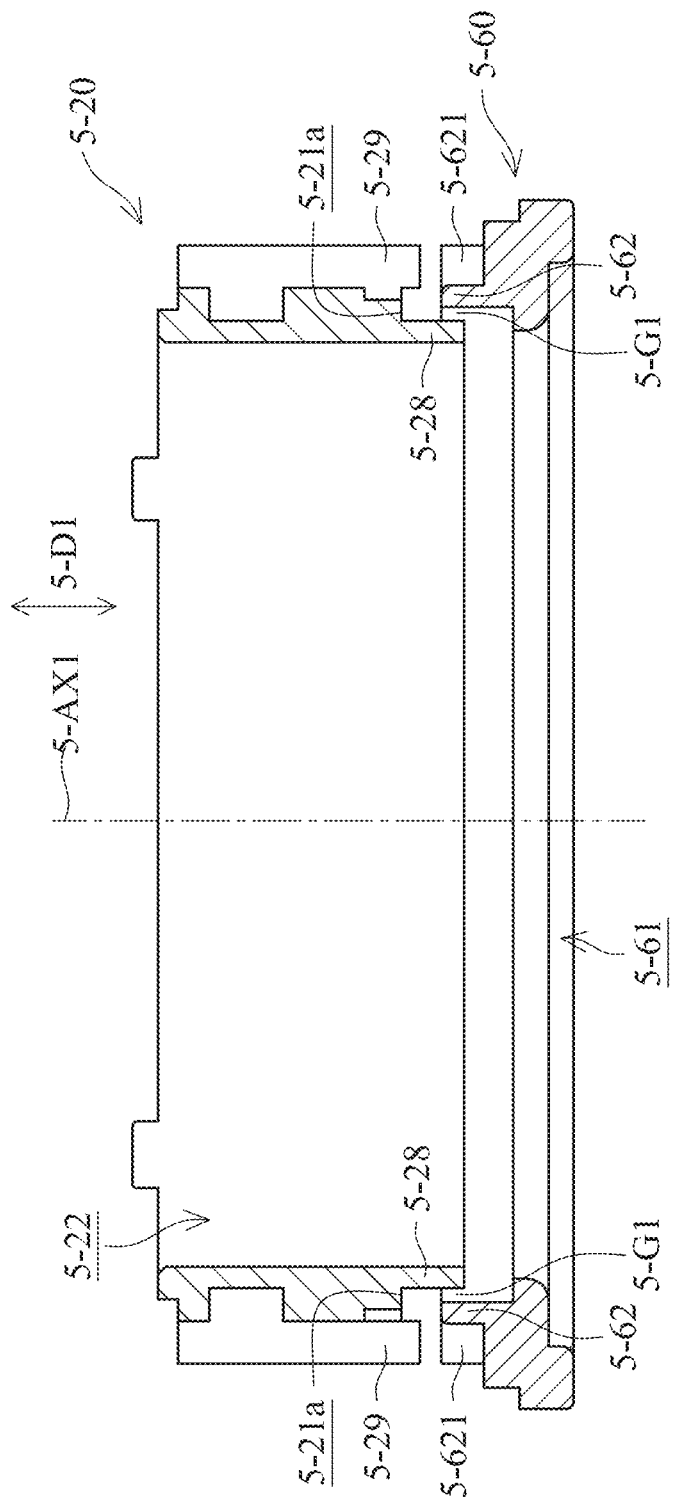
Figures 5, 6, 7, 8, 9, 10, 11, 12, 13, 14, 15, 16, 17:
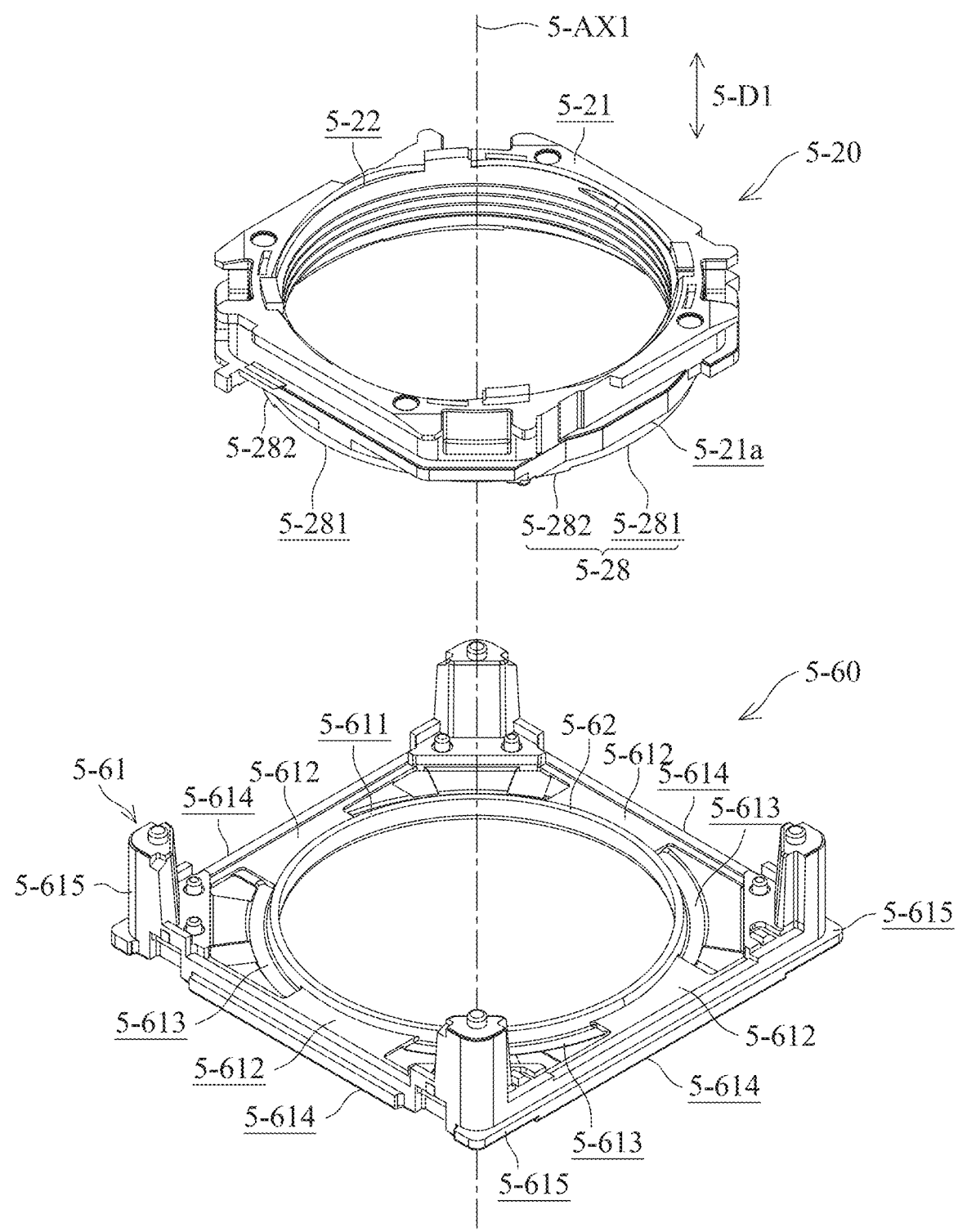
Figures 5, 6, 7, 8, 9, 10, 11, 12, 13, 14, 15, 16, 17, 18:
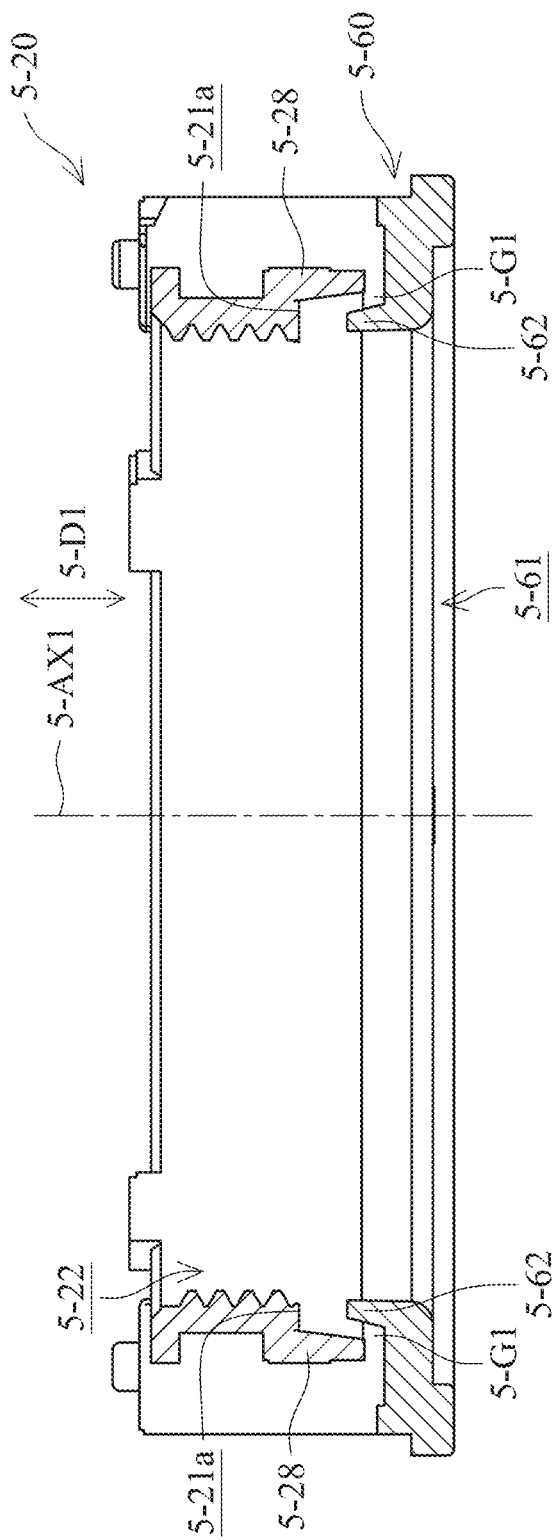
Figures 5, 6, 7, 8, 9, 10, 11, 12, 13, 14, 15, 16, 17, 18, 19:
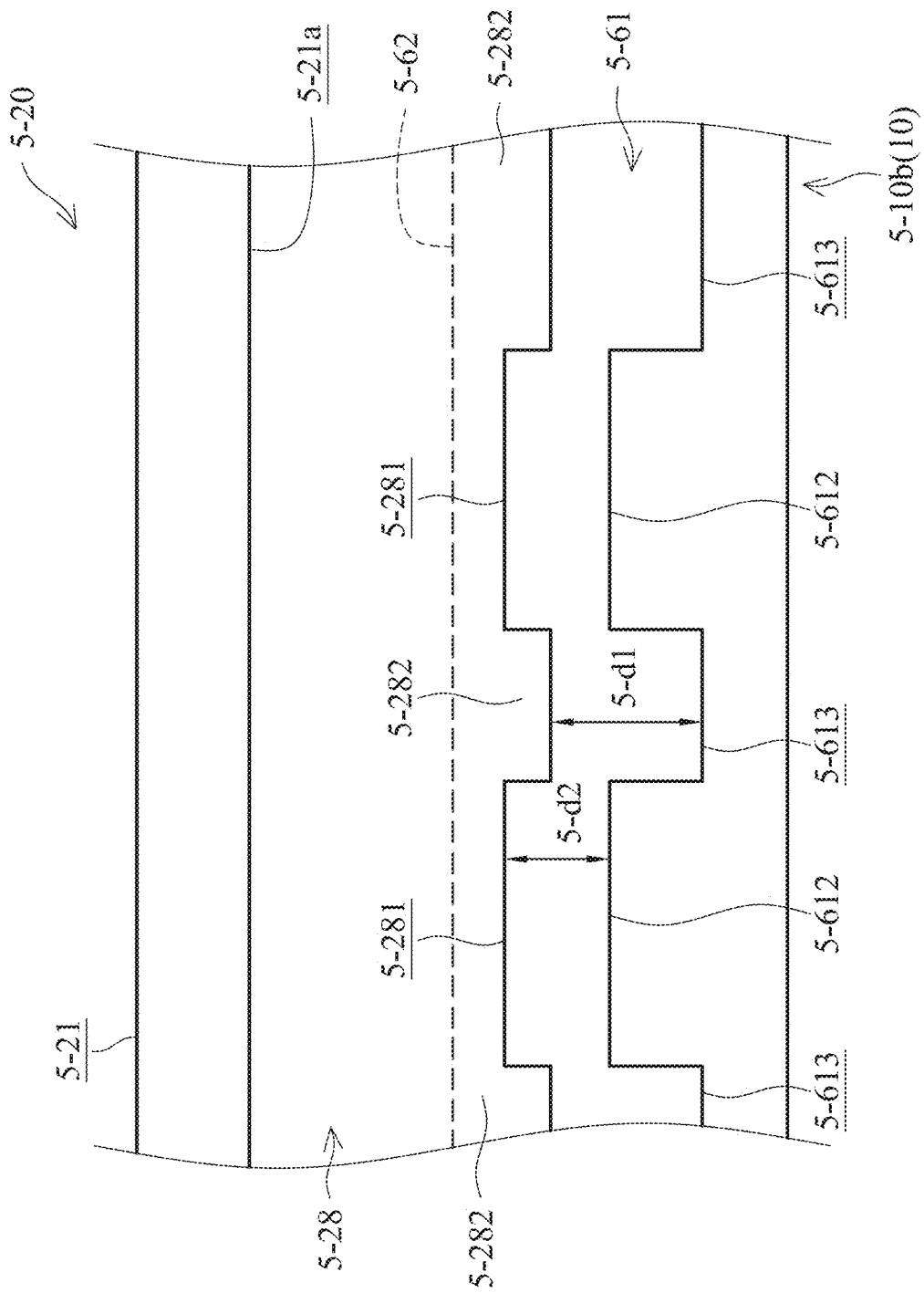
Figures 1, 6:
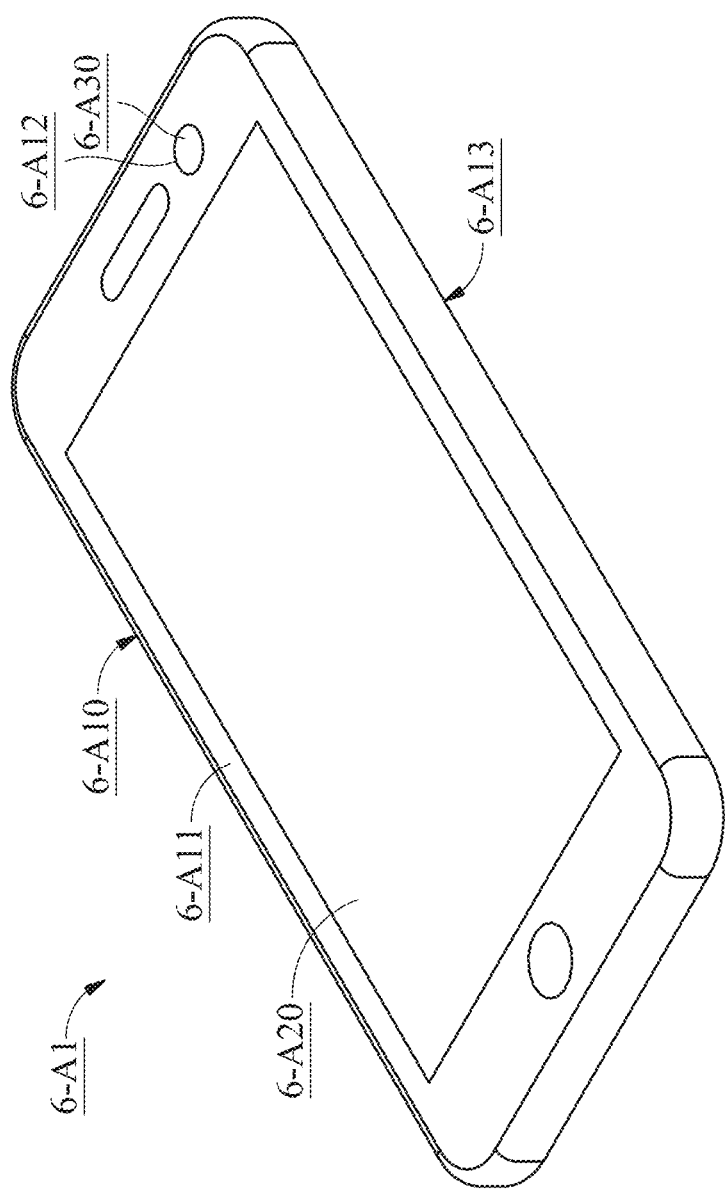
Figures 2, 6:
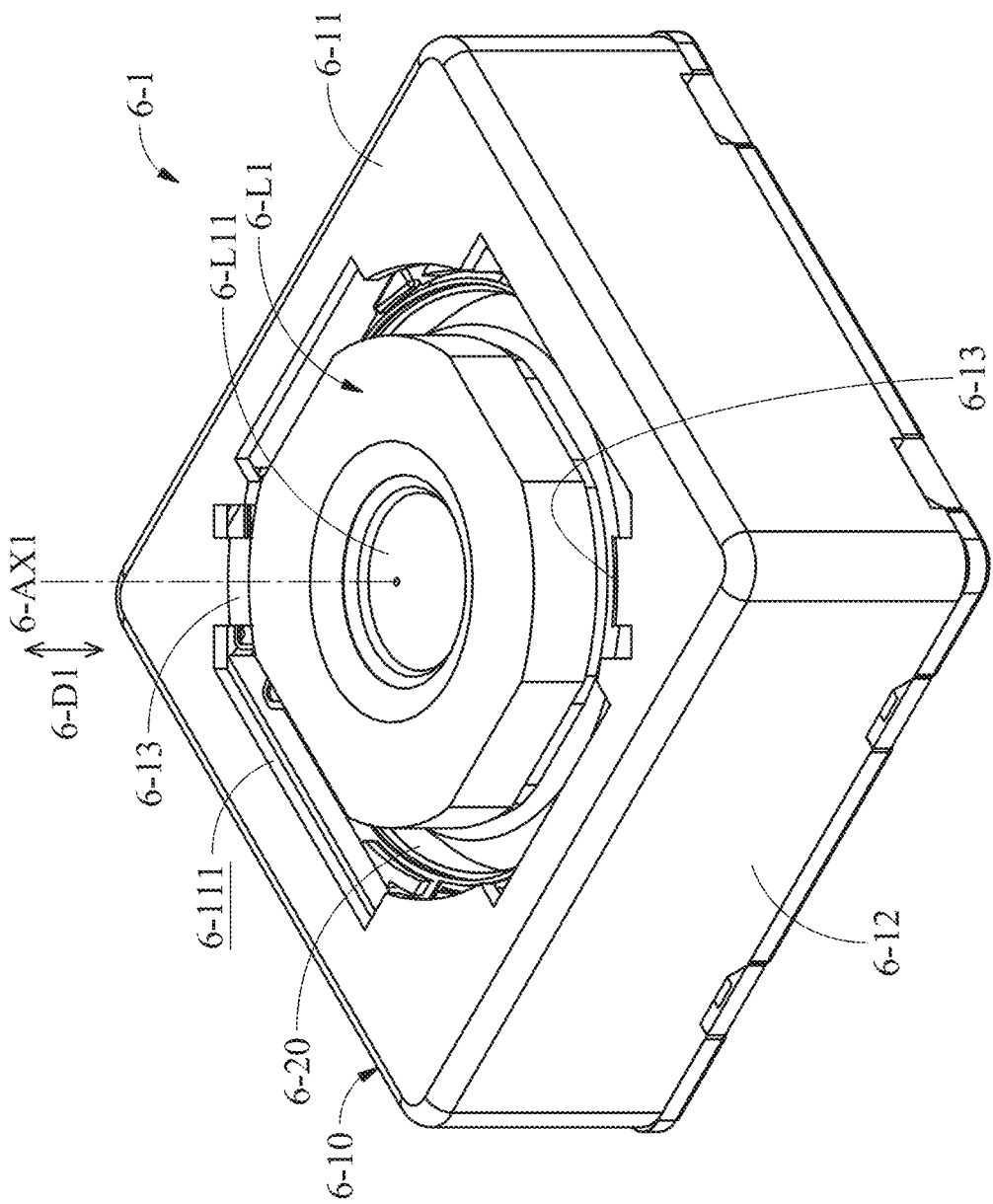
Figures 3, 6:
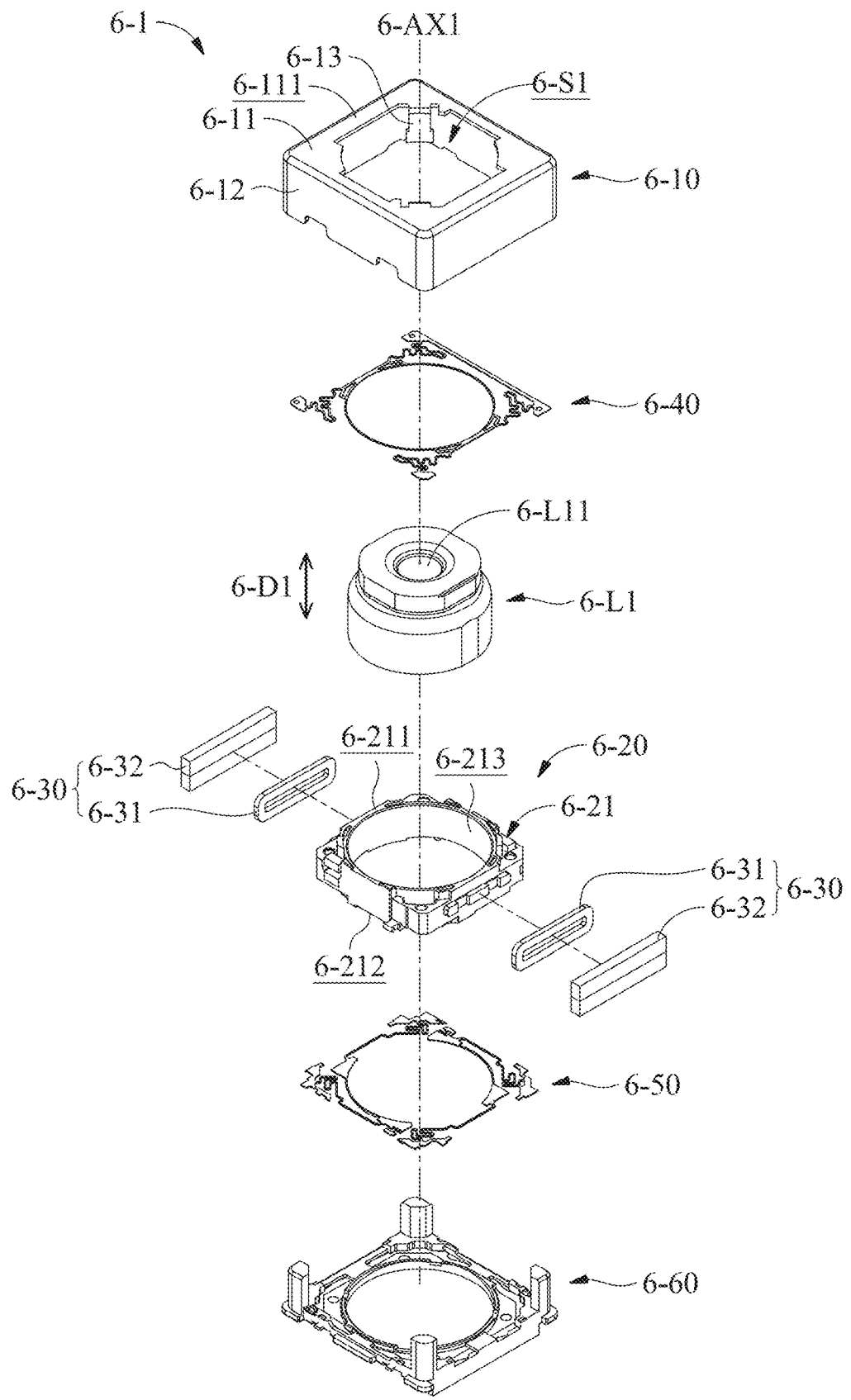
Figures 4, 6:
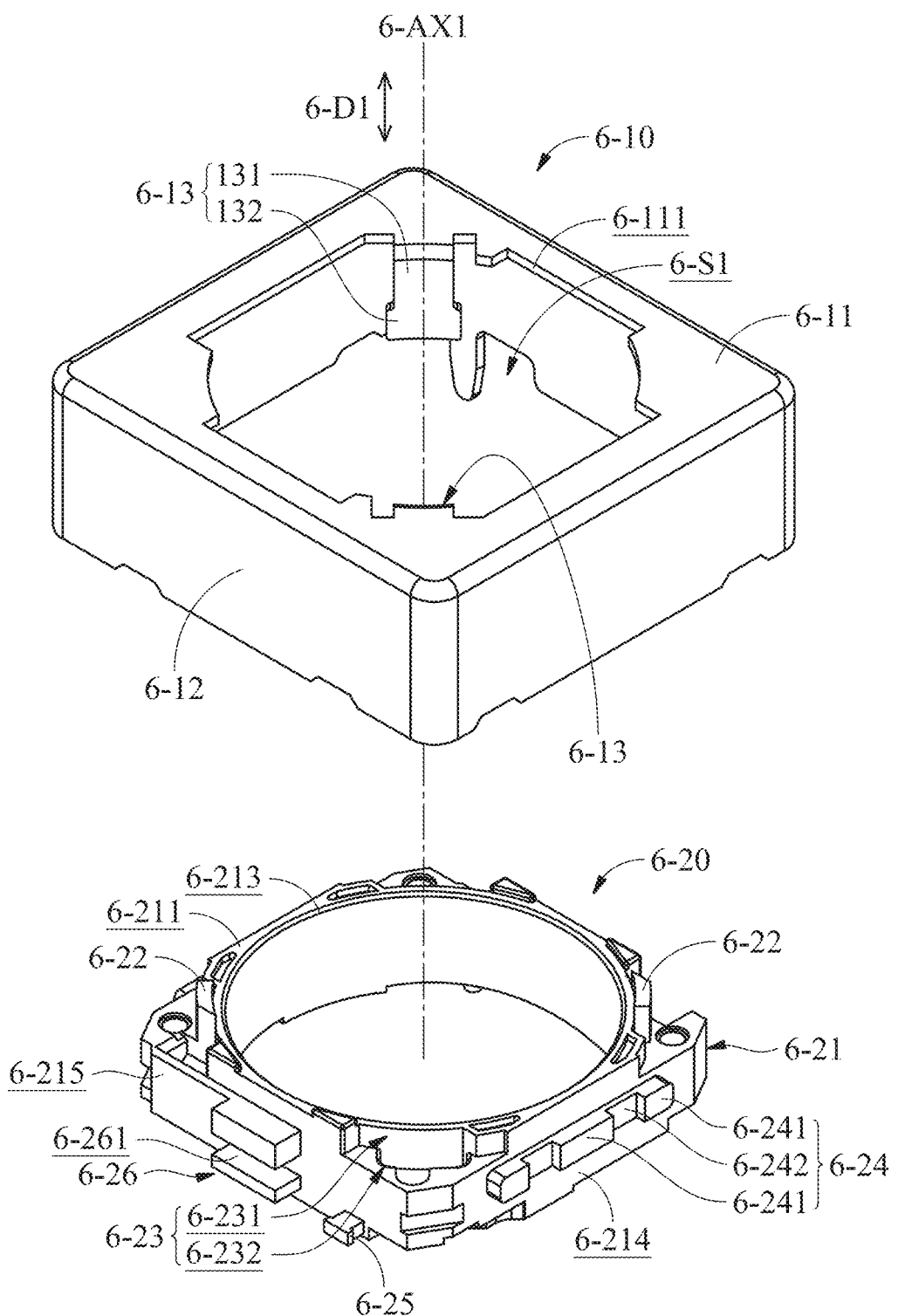
Figures 5A, 6:
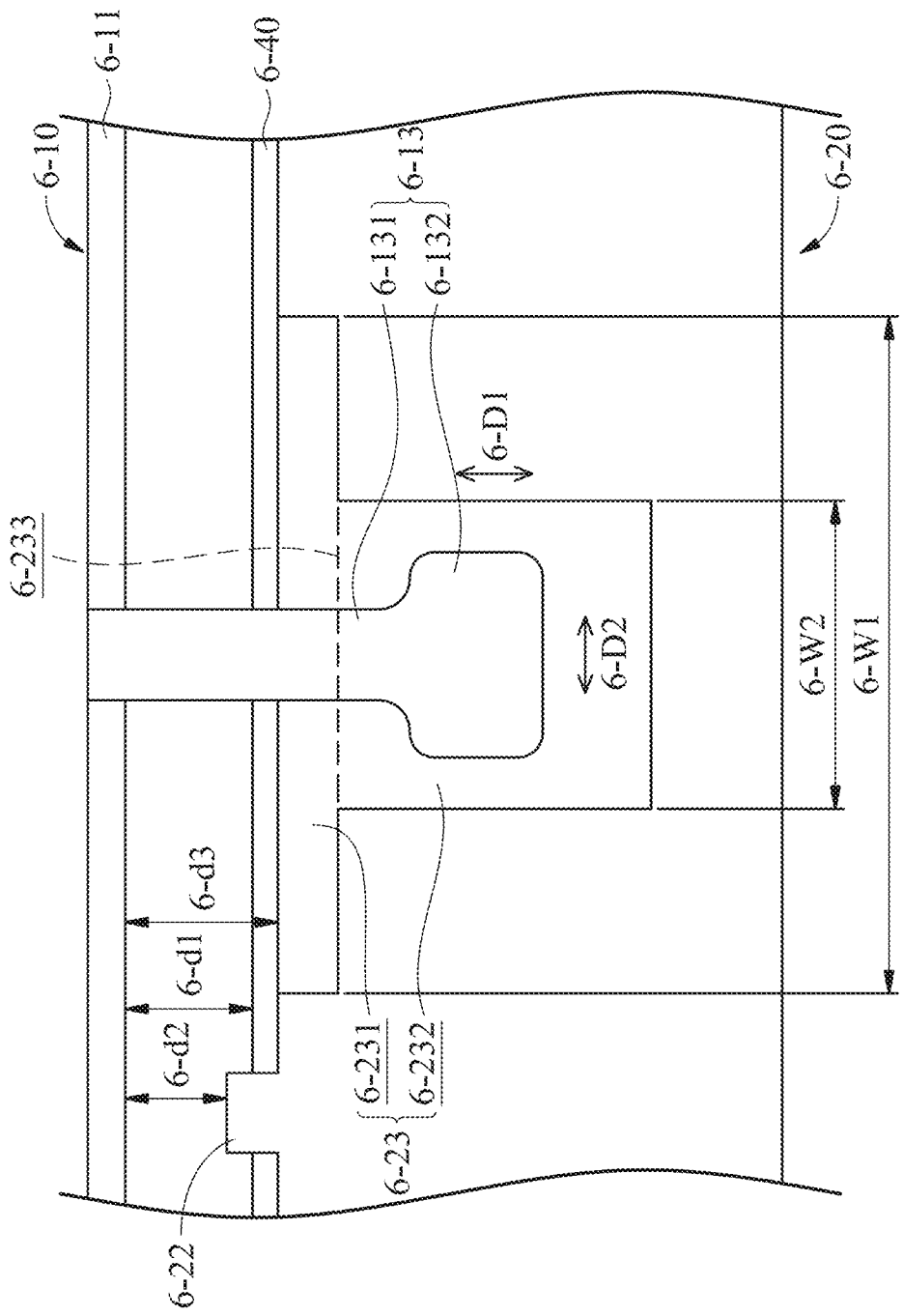
Figures 5B, 6:
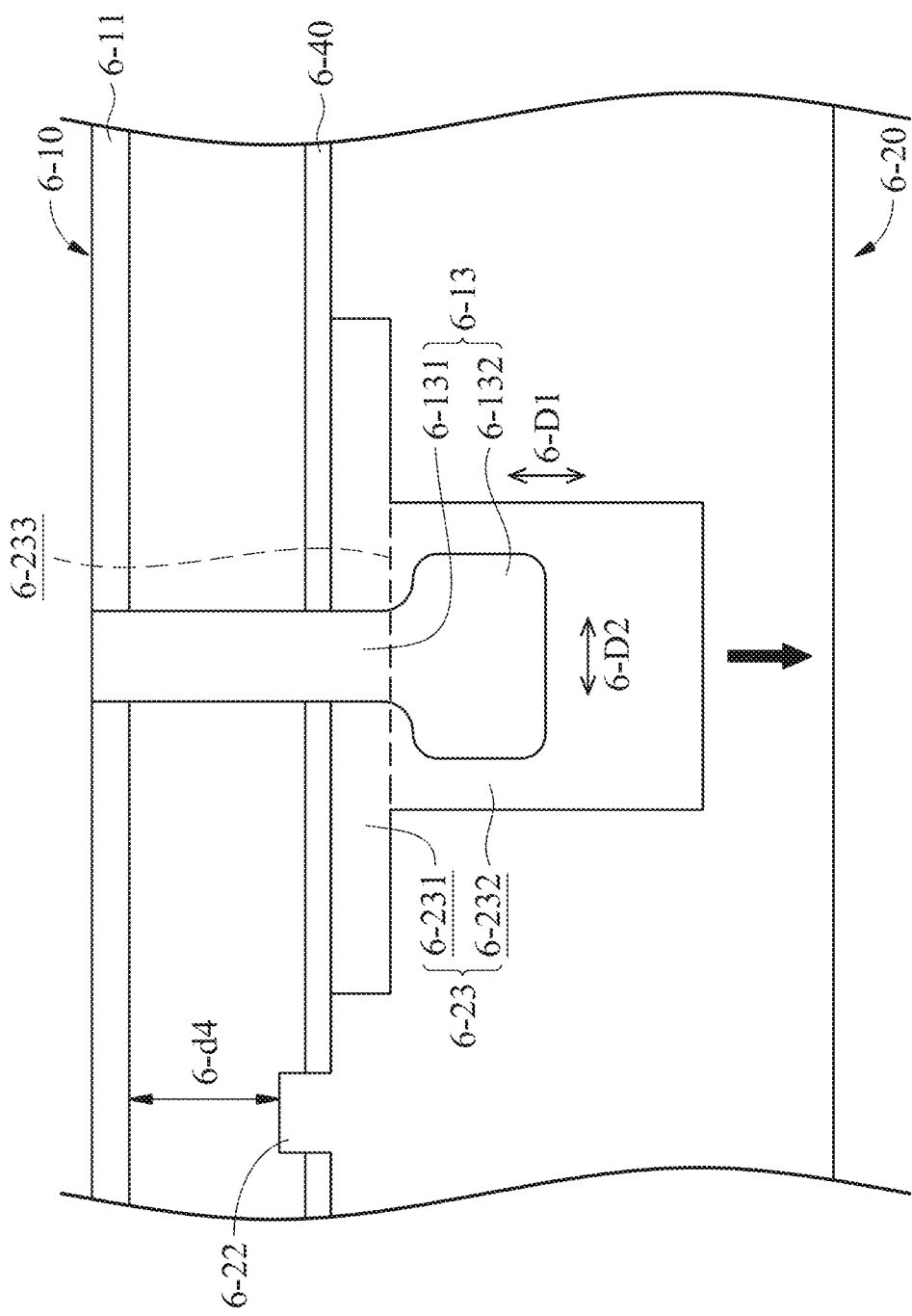
Figures 5C, 6:
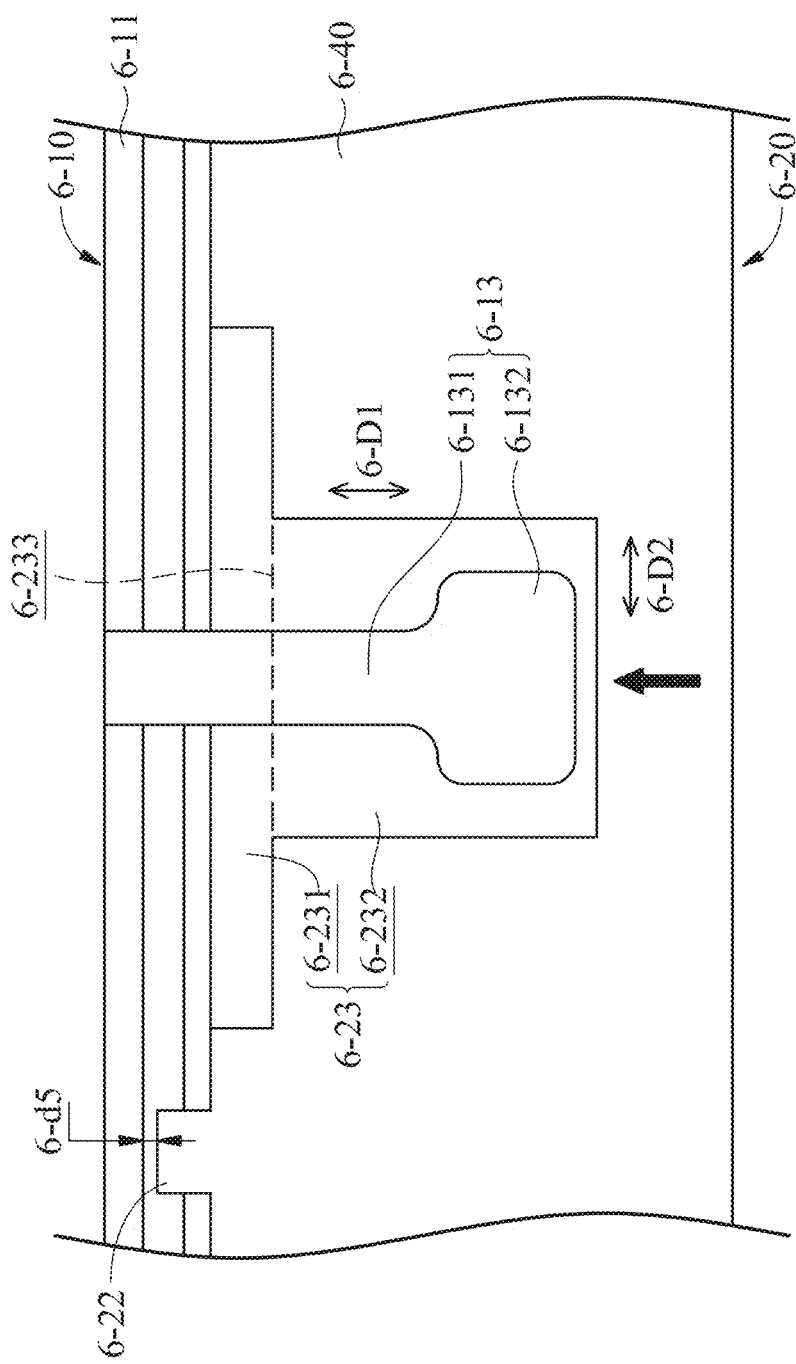
Figures 6, 6A:
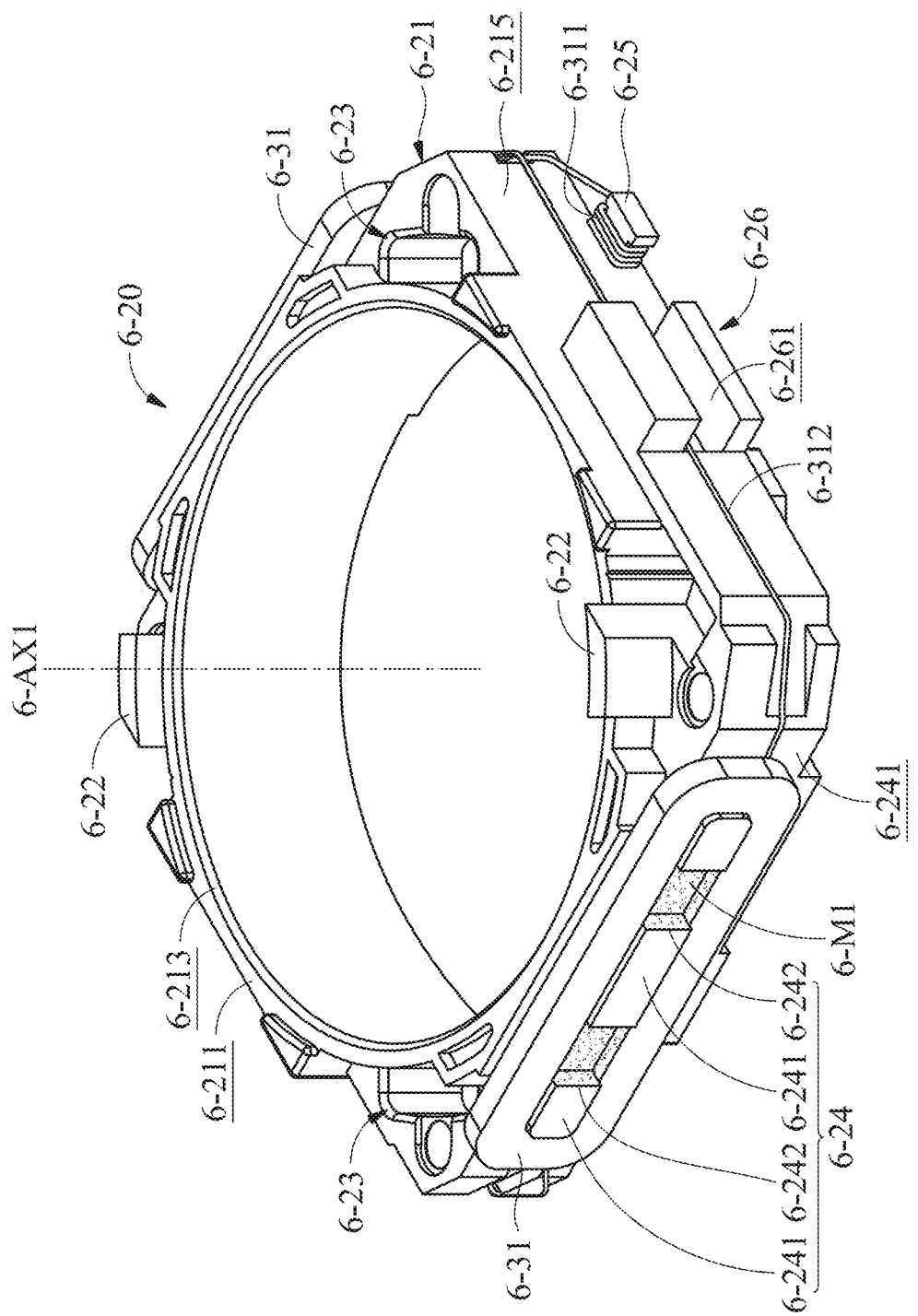
Figures 6, 6B:
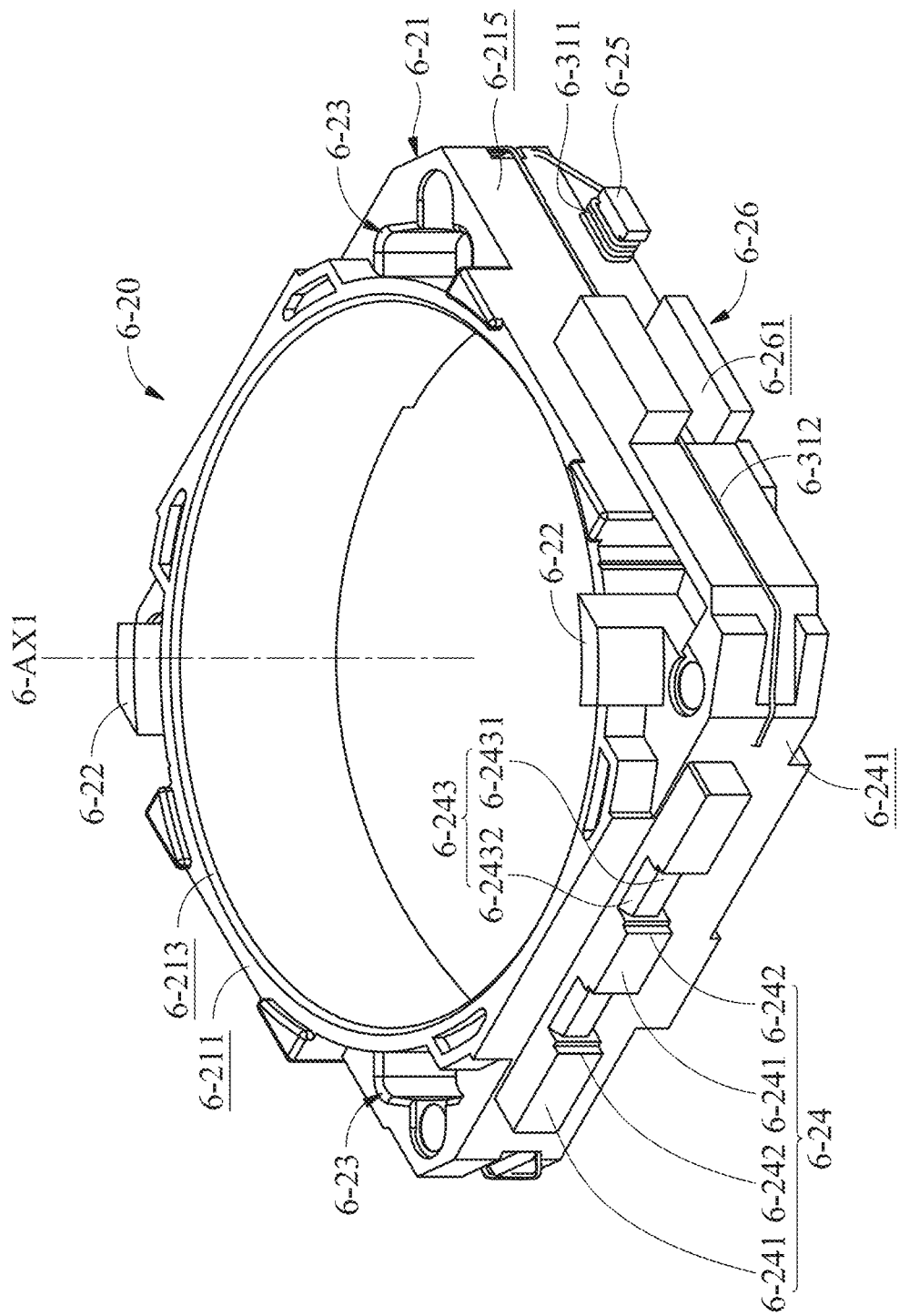
Figures 6, 7:
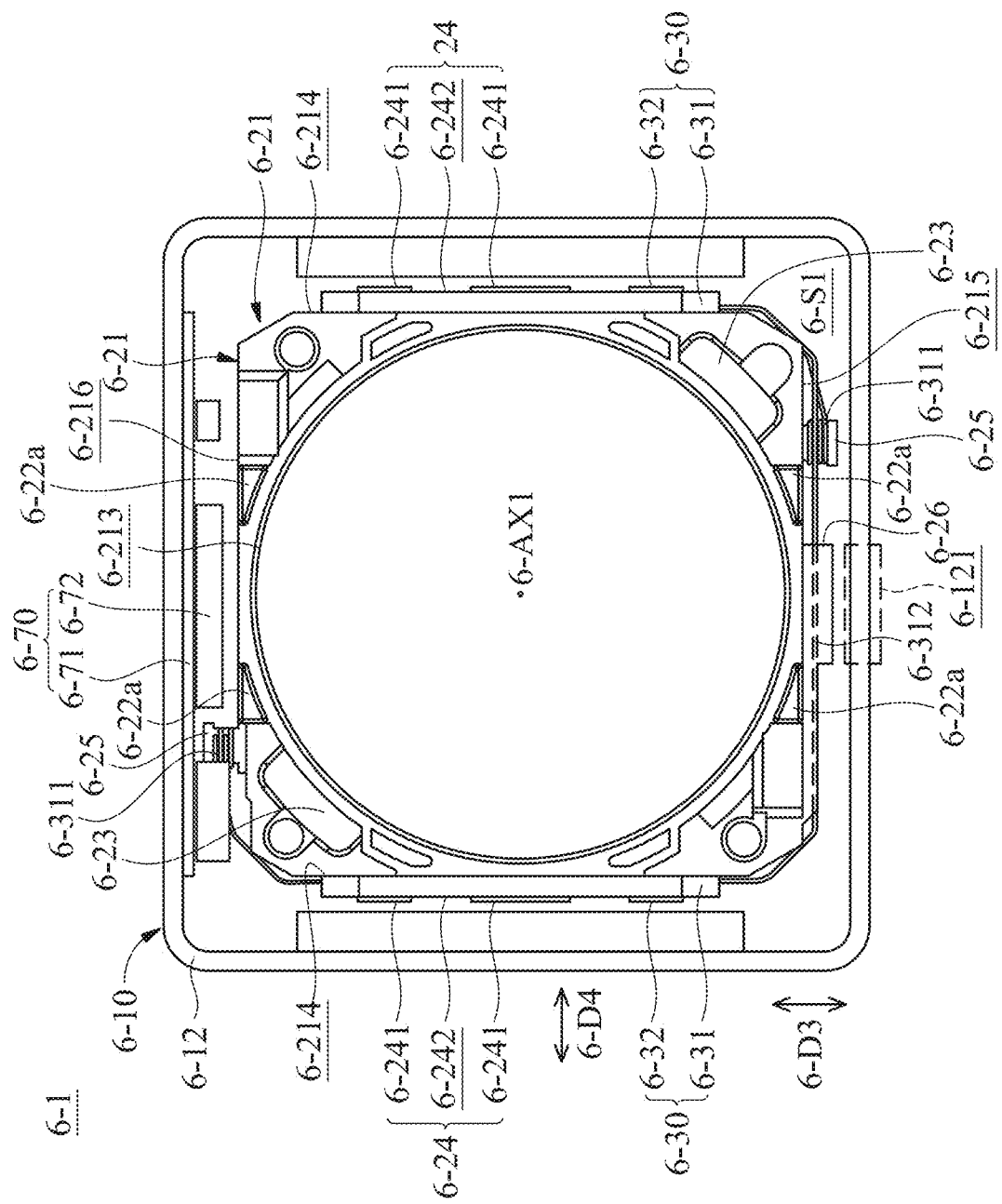
Figures 6, 7, 8:
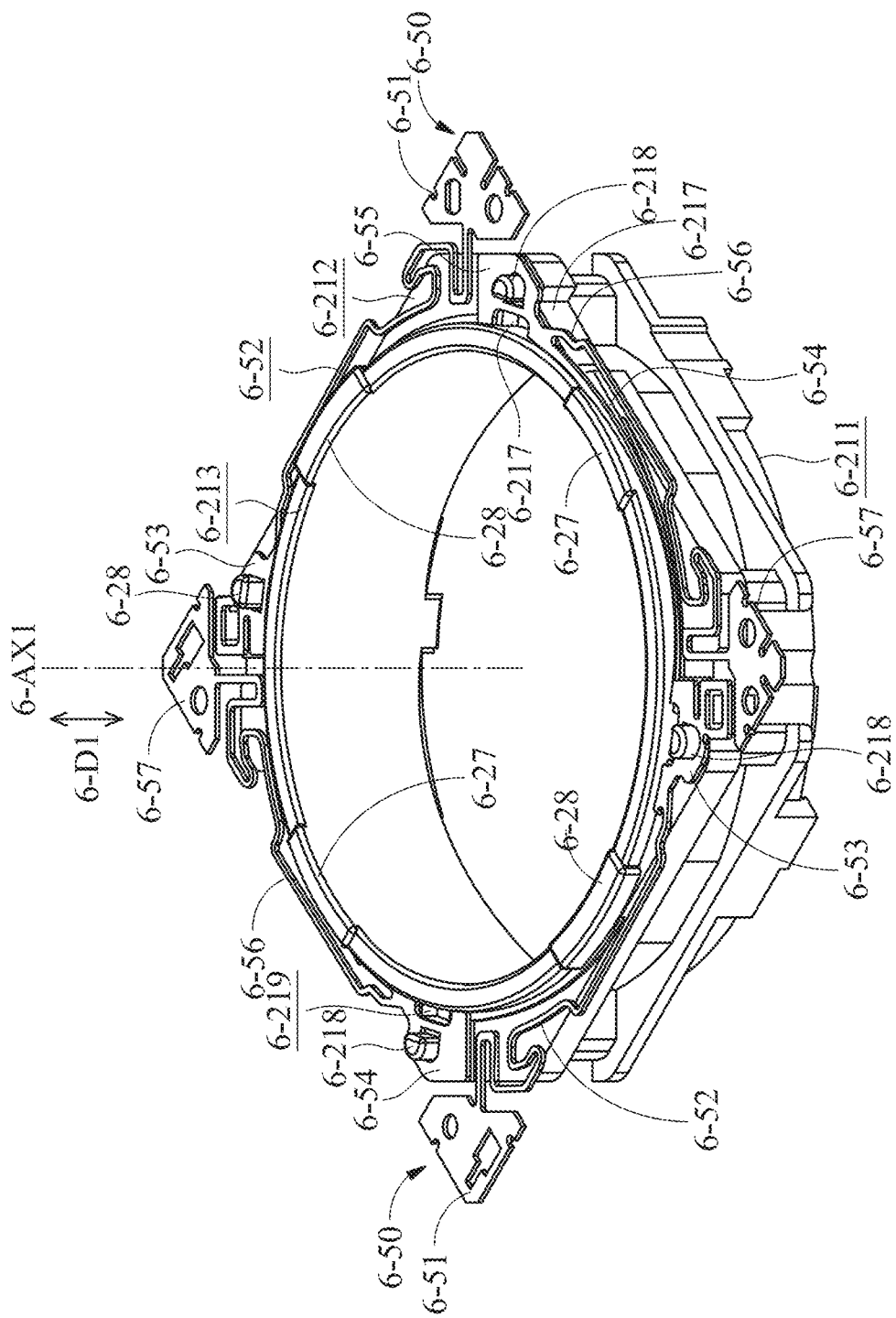
Figures 6, 7, 8, 9:
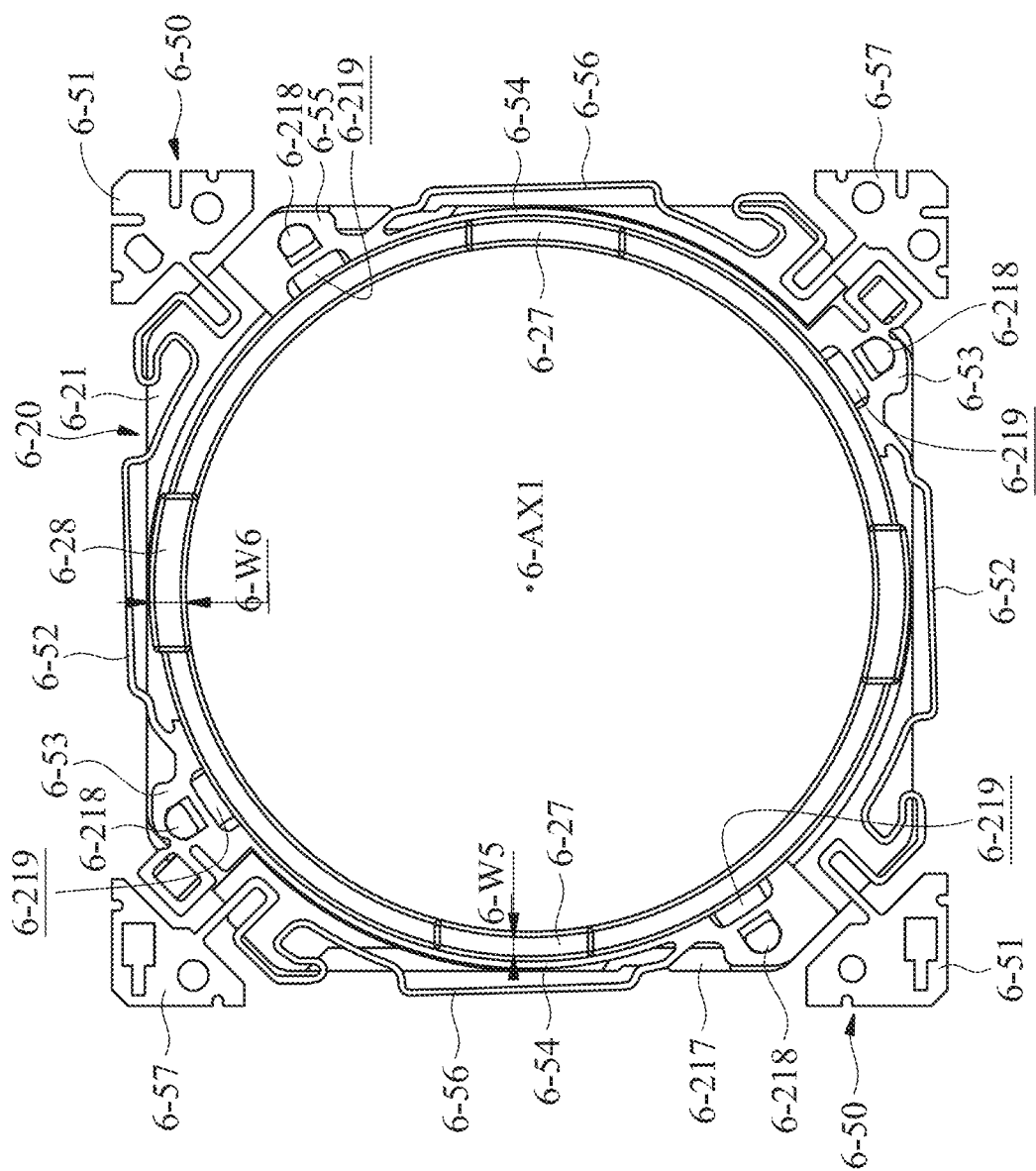
Figures 6, 7, 8, 9, 10:
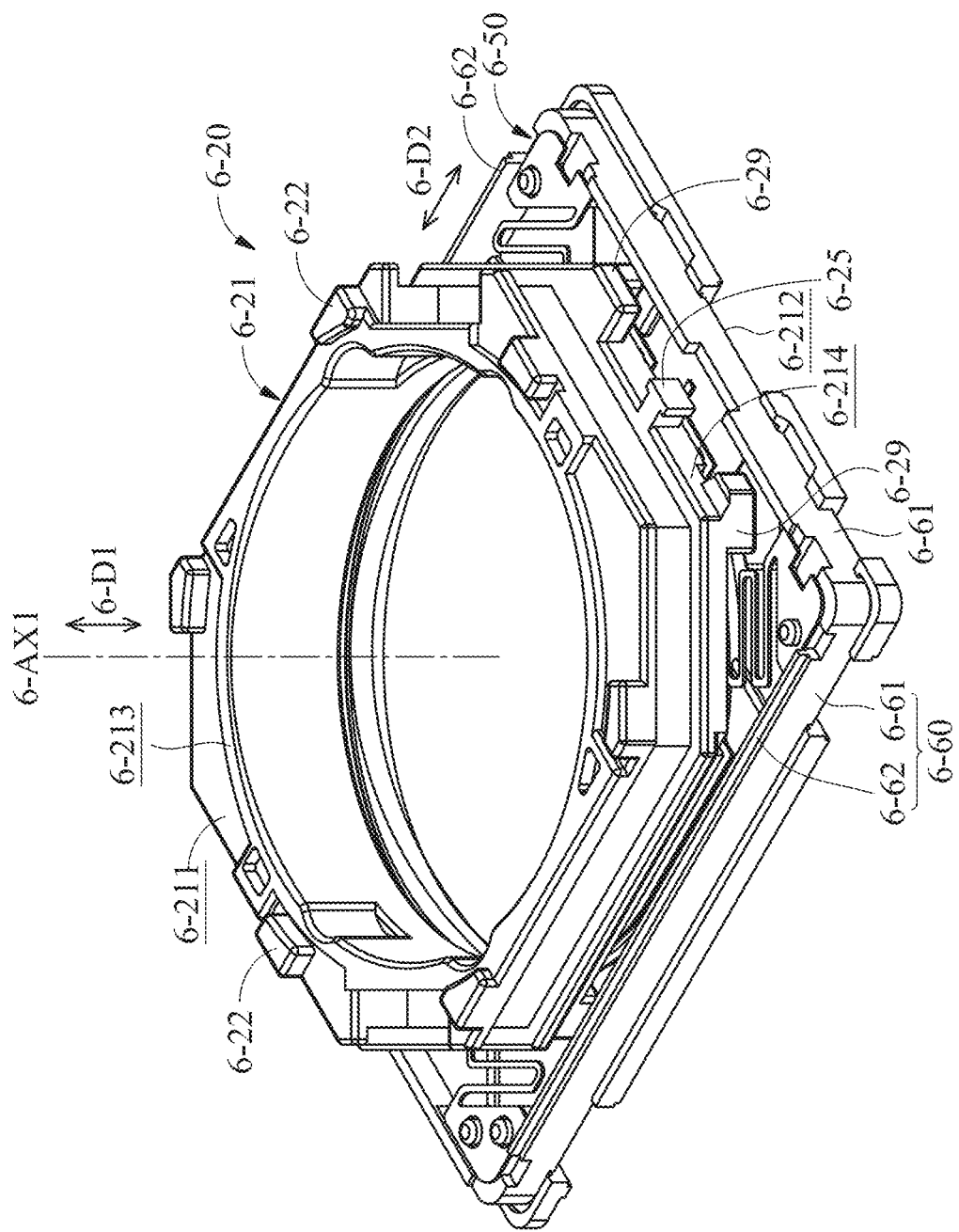
Figures 6, 7, 8, 9, 10, 11:
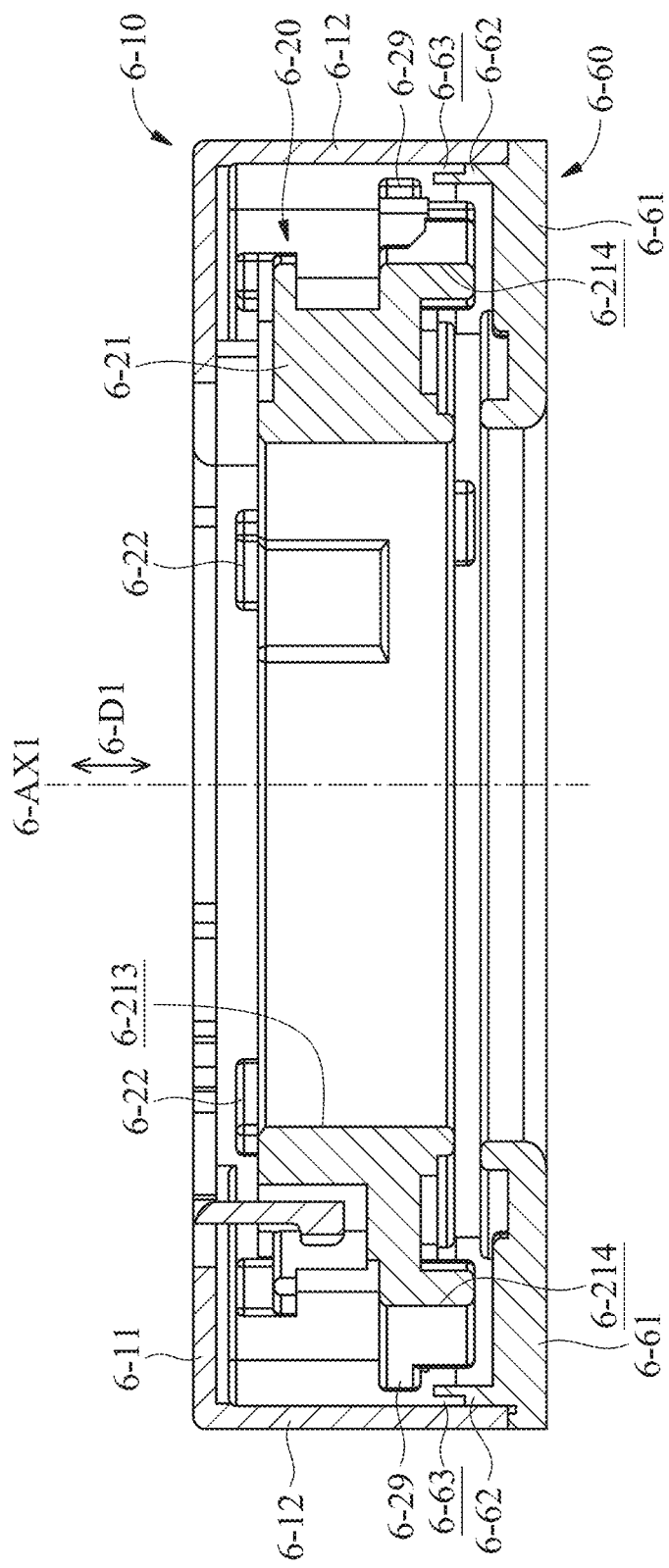
Figures 6, 7, 8, 9, 10, 11, 12:
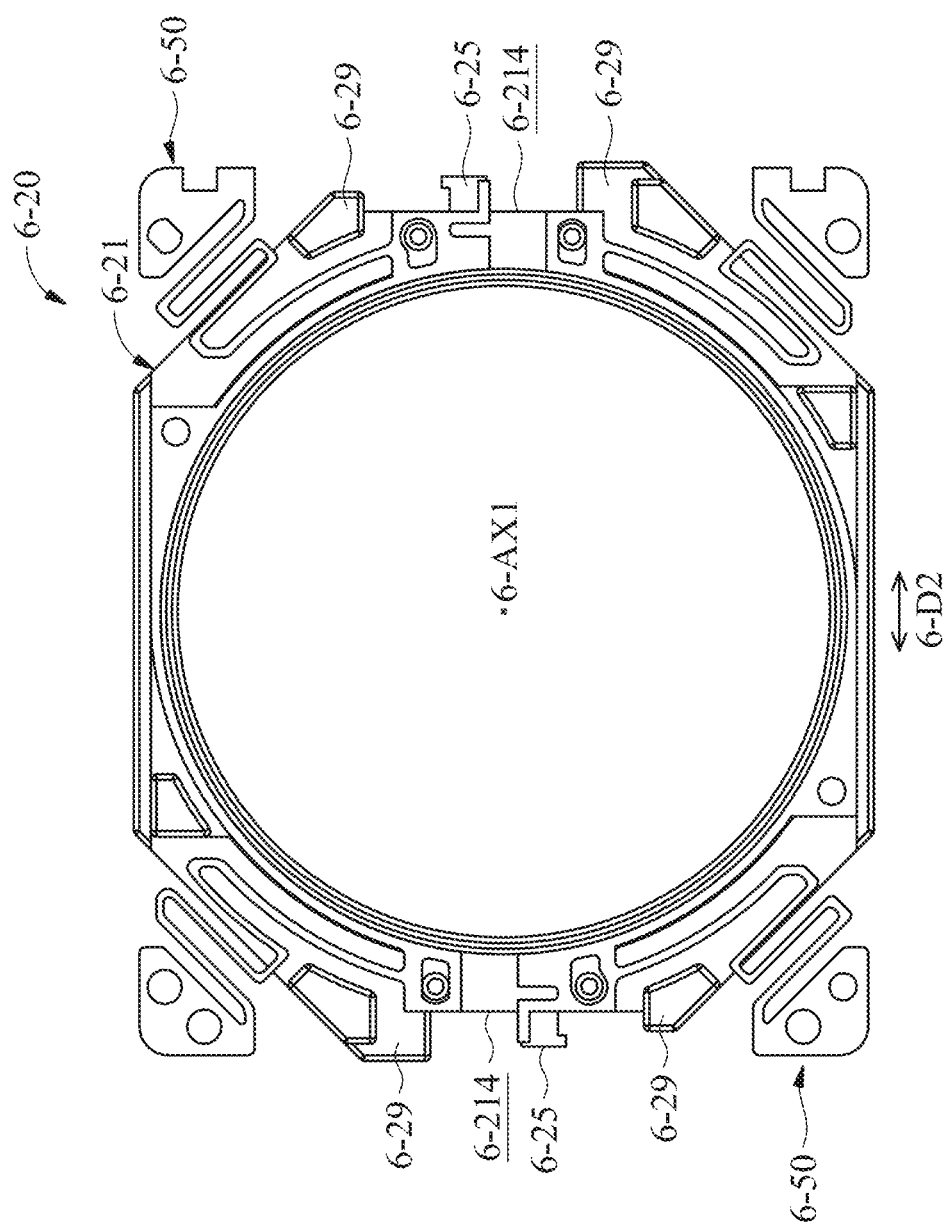
Figures 6, 7, 8, 9, 10, 11, 12, 13:
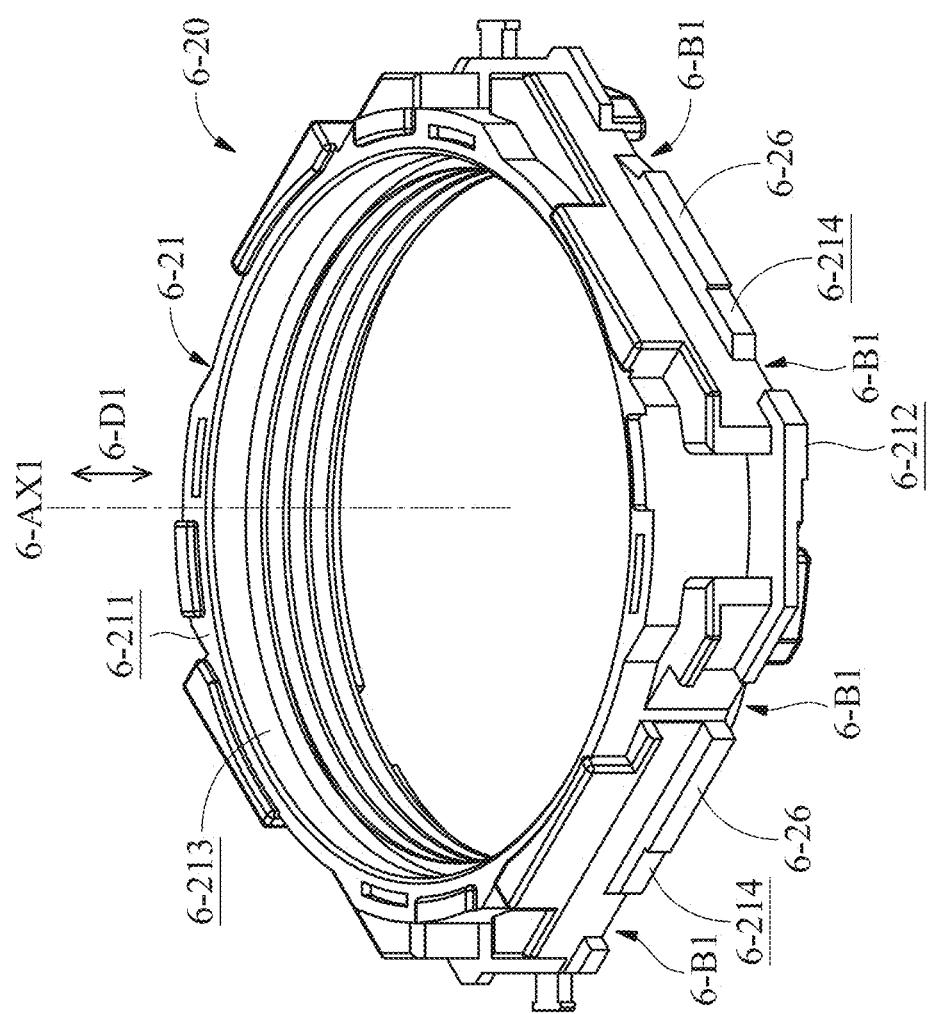

As shown in FIGS. 7-7A to 7-7C, as observed from the optical axis 7-T of the optical lens 7-420, at least a portion of the first elastic member 7-200 overlaps the side wall 7-411 of the carrier 7-410. Because the inner diameter 7-D1 of the first elastic member 7-200 is less than the inner diameter 7-D3 of the second elastic member 7-300, and the outer diameter 7-D2 of the first elastic member 7-200 is substantially the same as the outer diameter 7-D4 of the second elastic member 7-300, when the driving mechanism 7-10 is assembled, the first engaging portion 7-210 does not overlap the first connecting portion 7-310, and the second engaging portion 7-220 overlaps the second connecting portion 7-320.

Figures 1, 7:
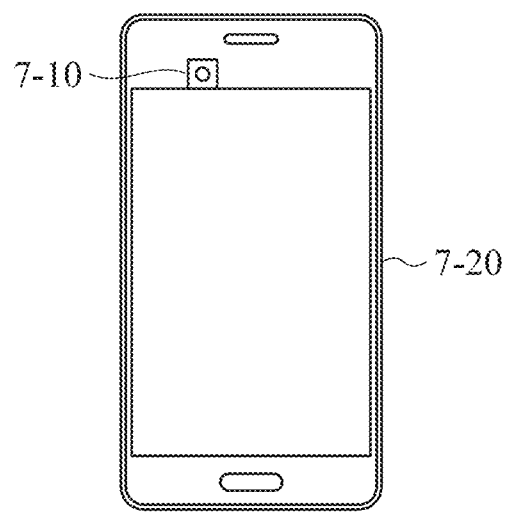
Figures 2, 7:
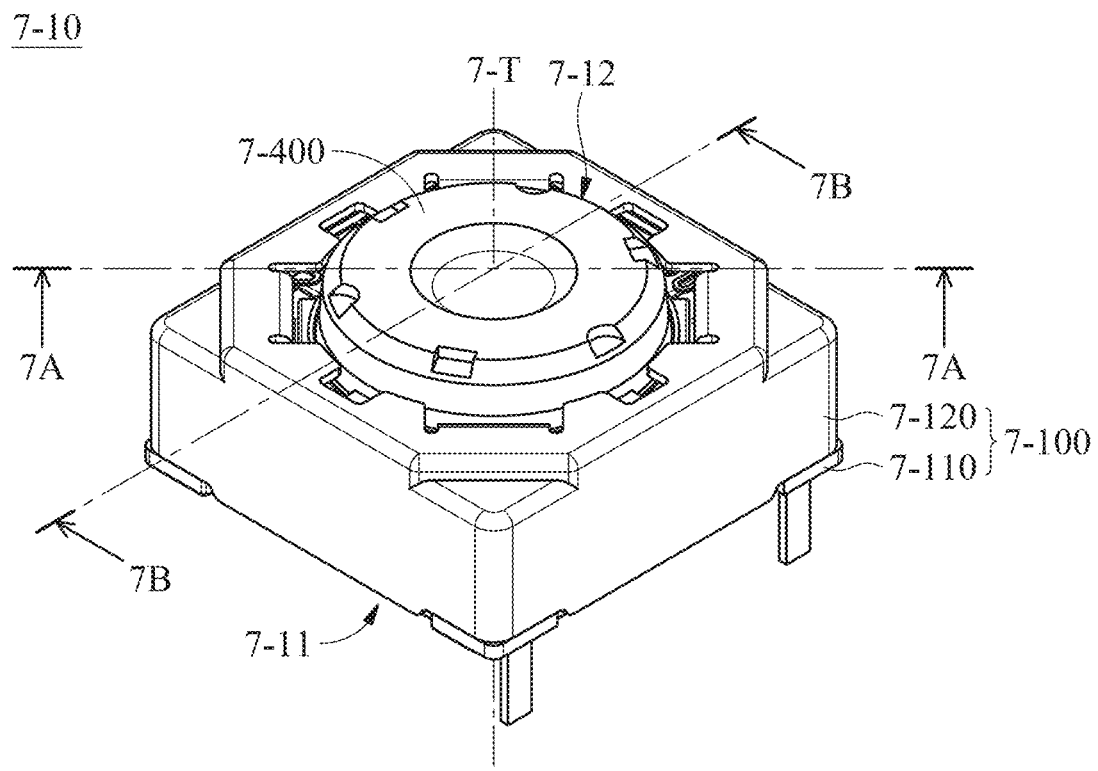
Figures 3, 7:
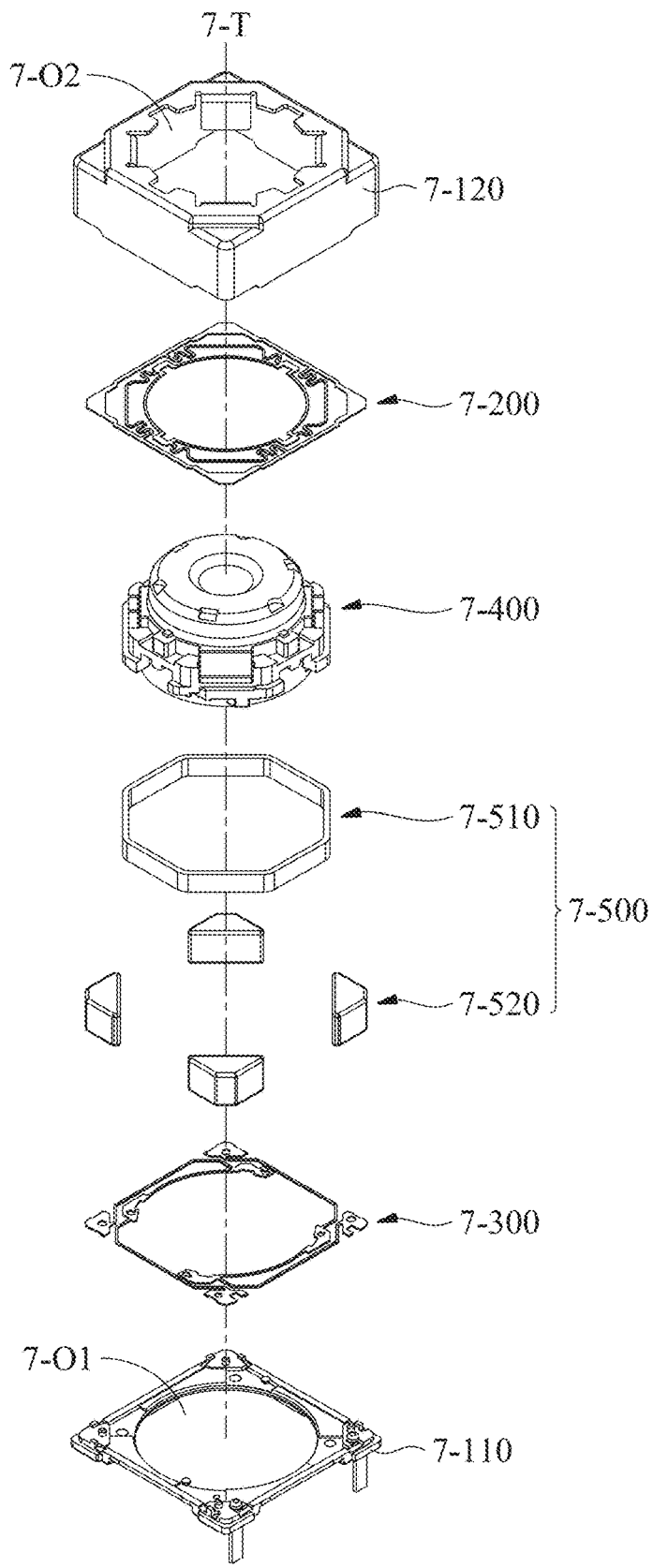
Figures 4, 7:
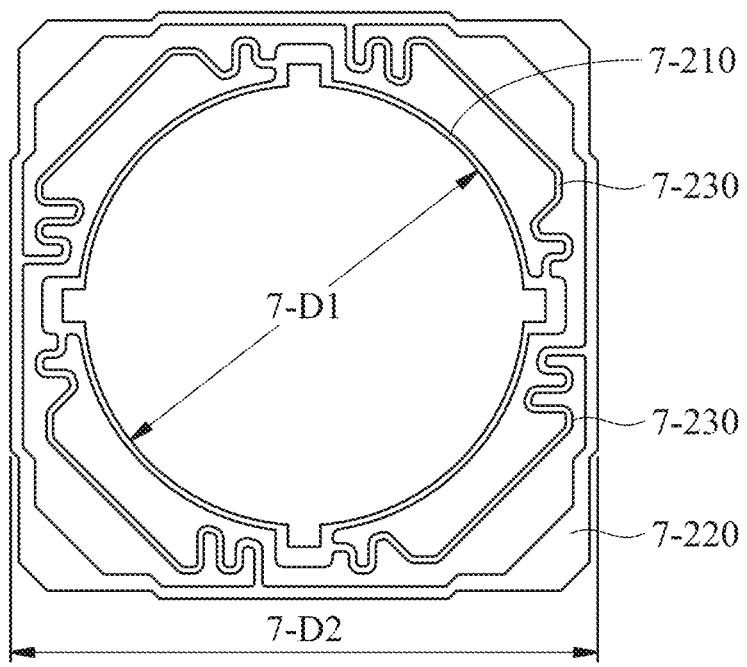
Figures 5, 7:
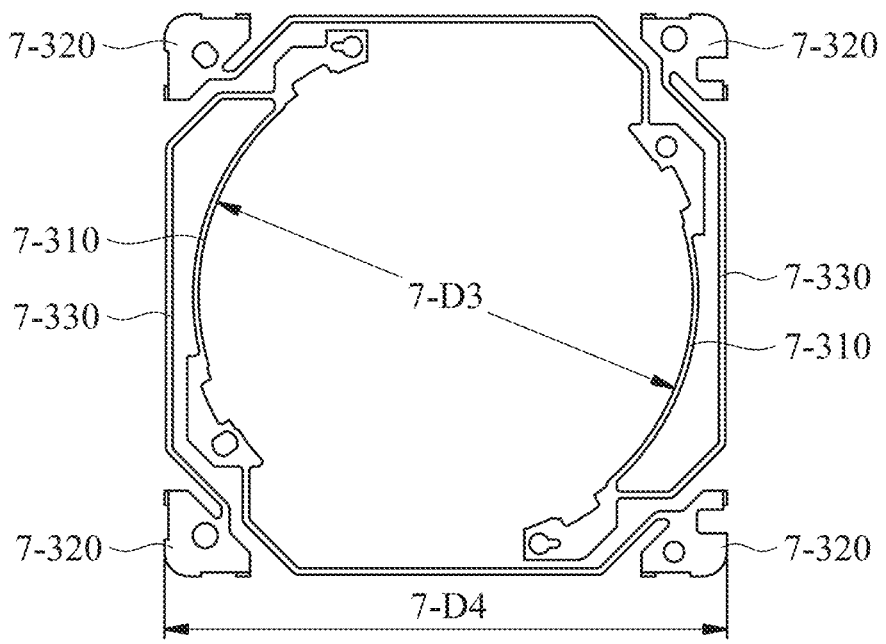
Figures 6A, 7:
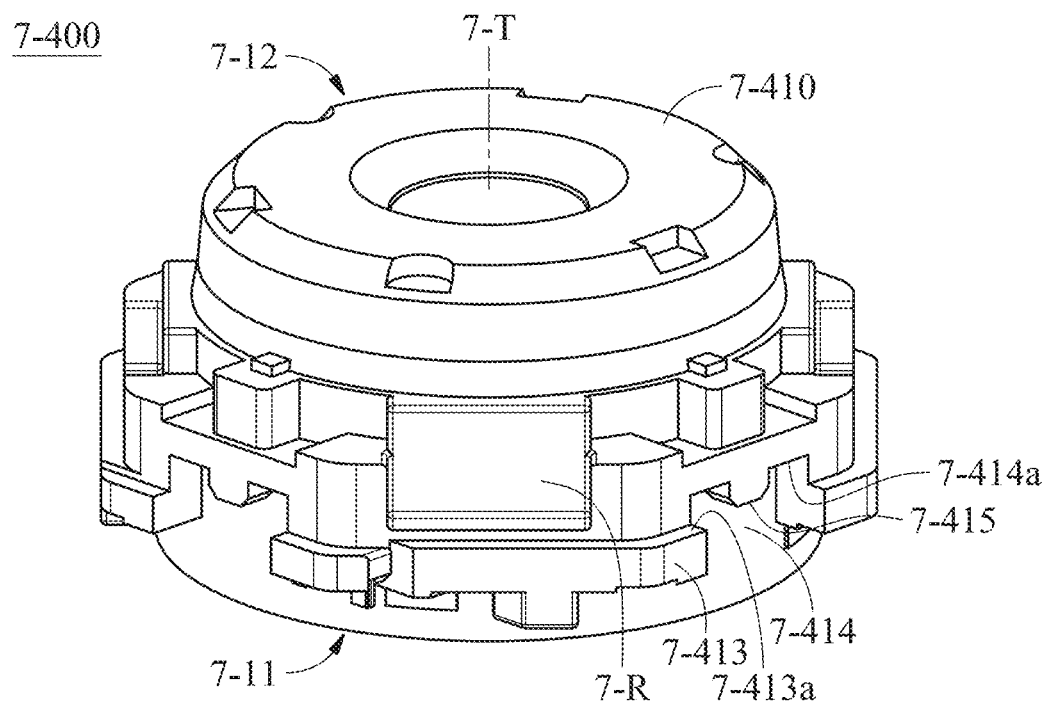
Figures 6B, 7:
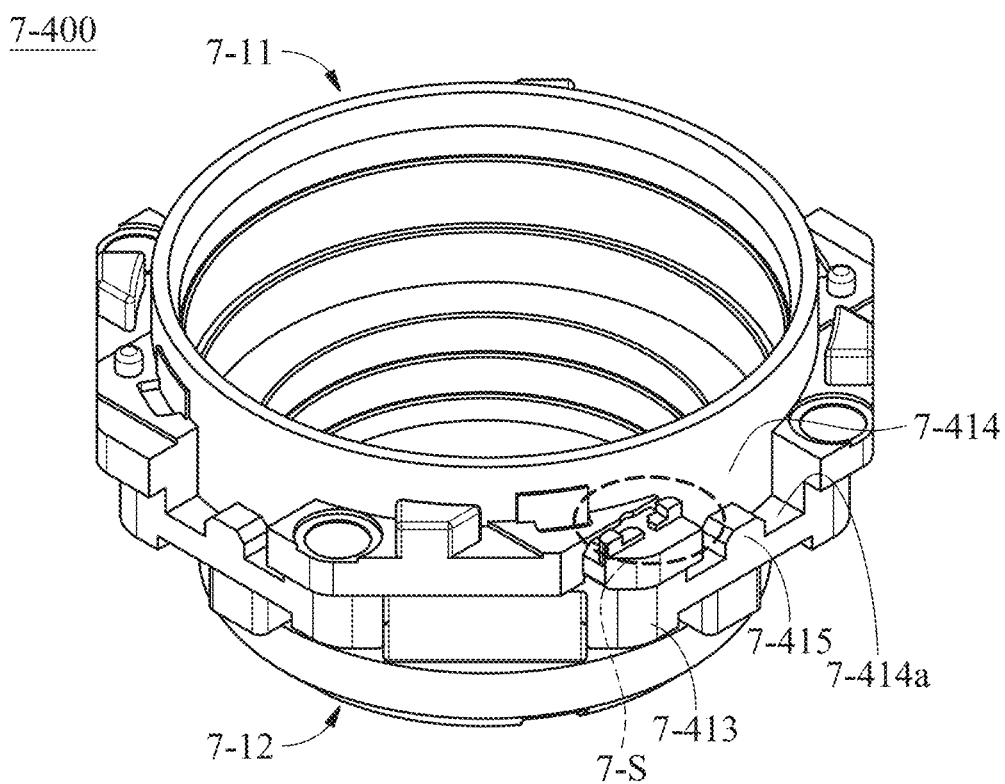
Figures 6C, 7:
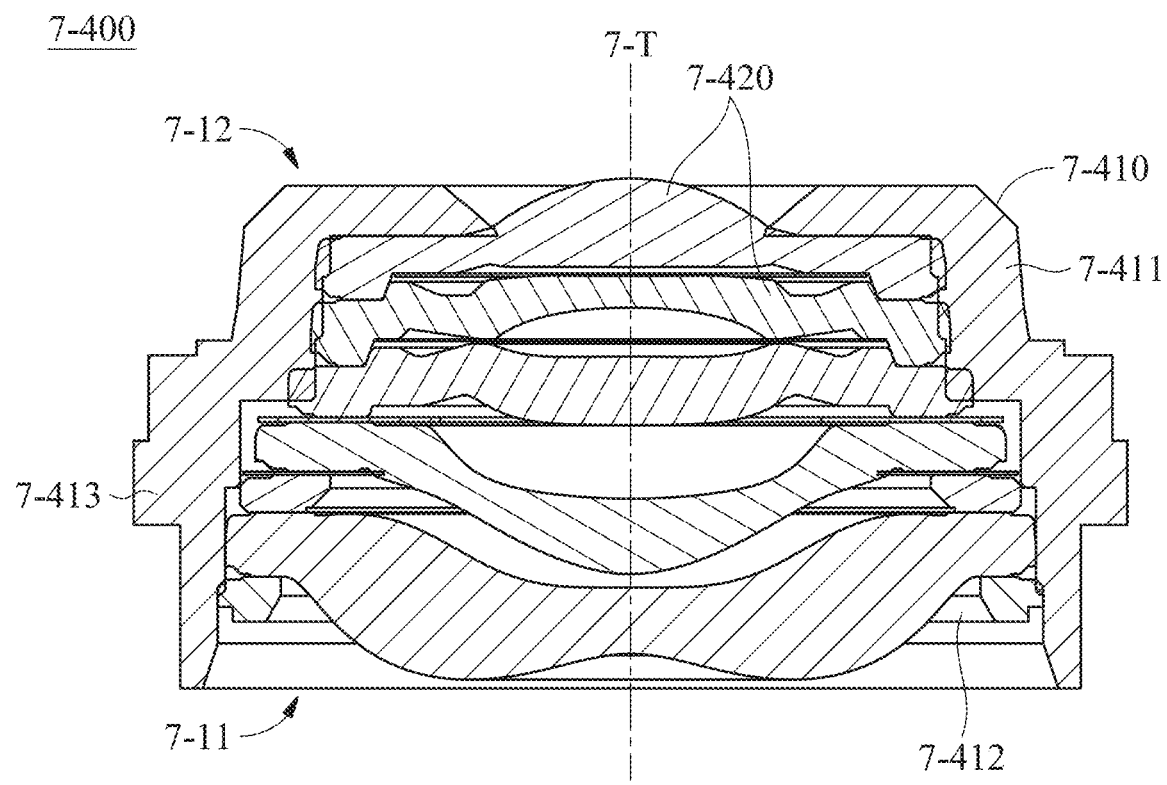
Figures 6D, 7:
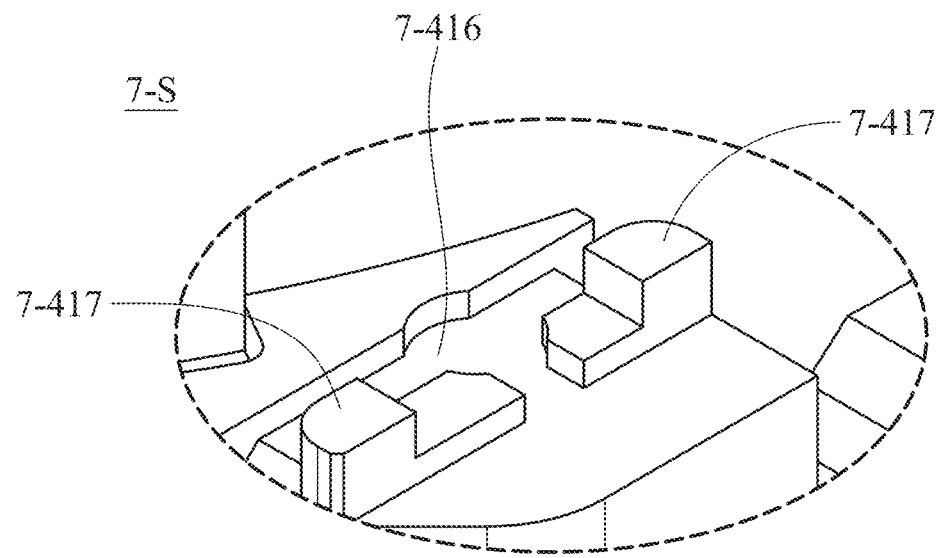
Figures 7, 7A:
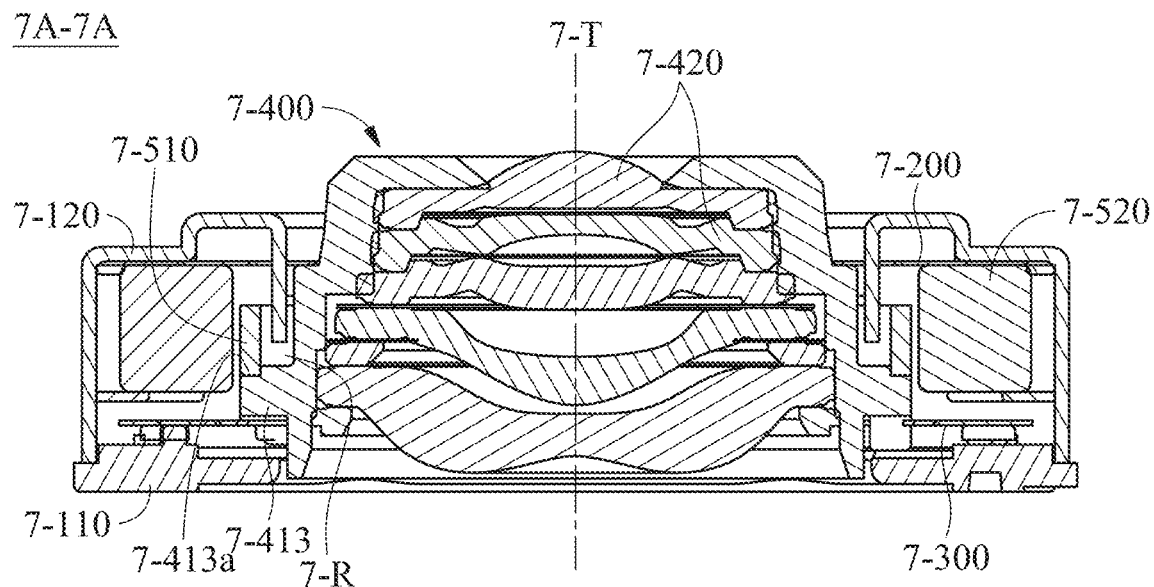
Figures 7, 7B:
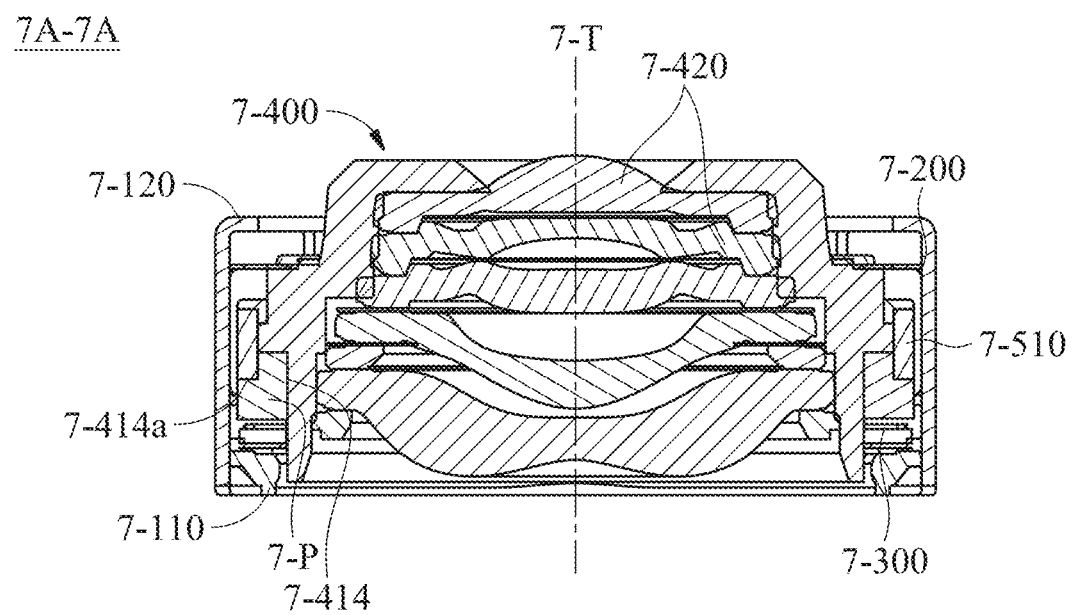
Figures 7, 7C:
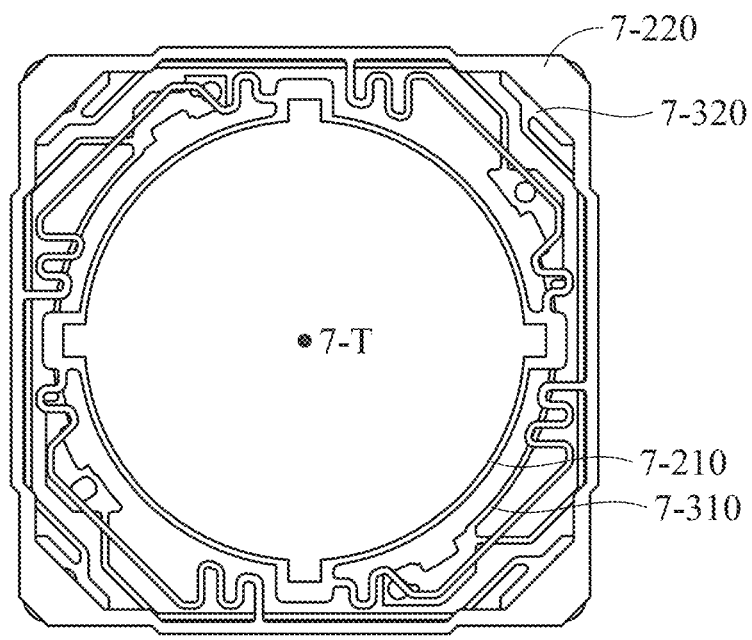
Figures 7, 7D:
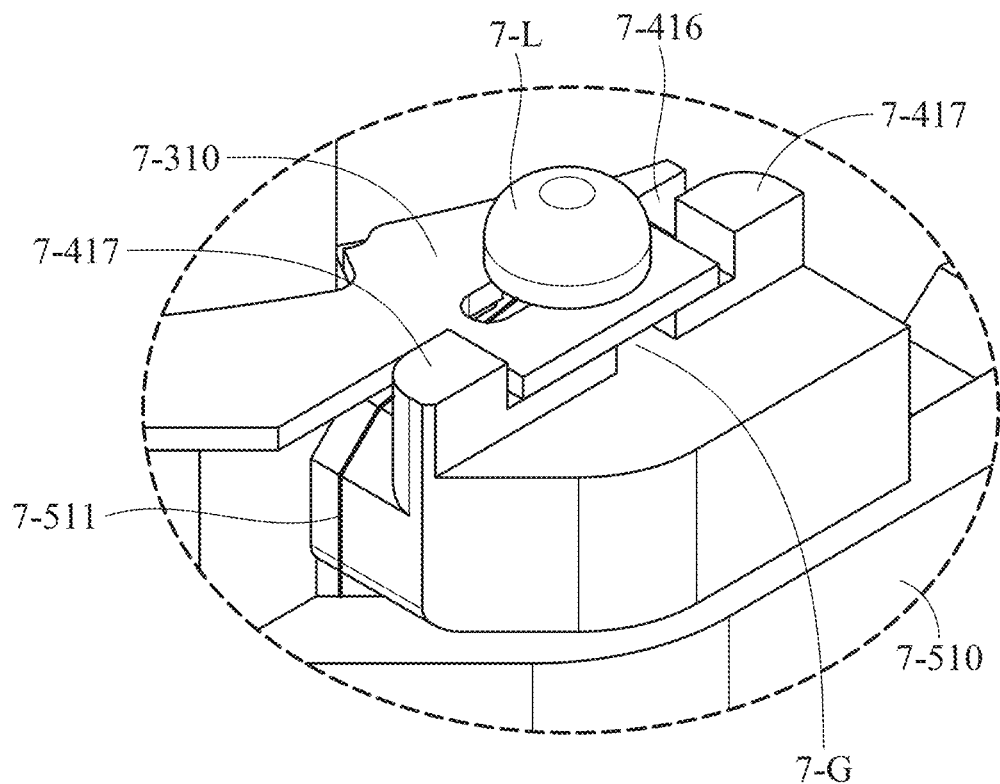
Figures 1, 8:
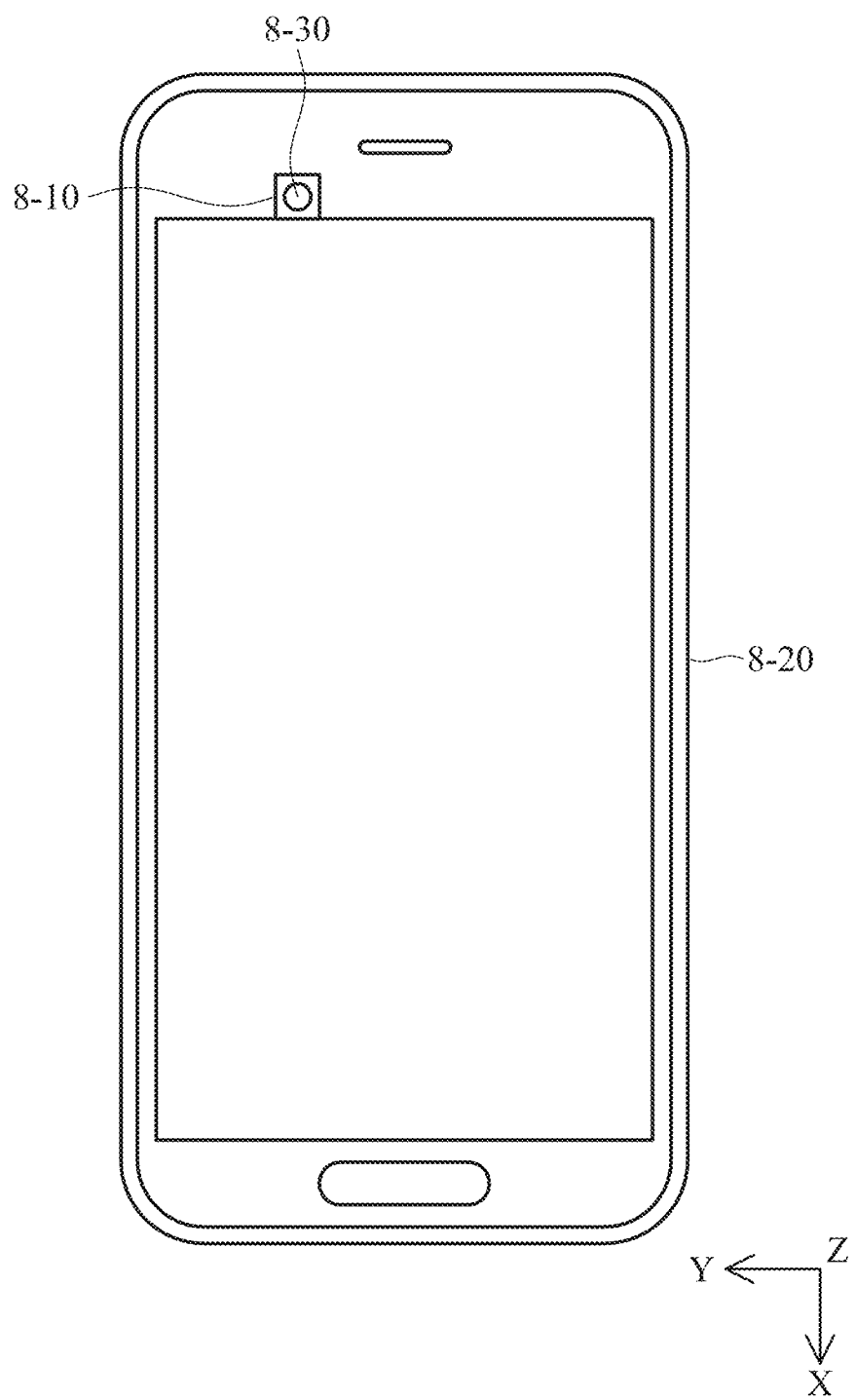
Figures 2, 8:
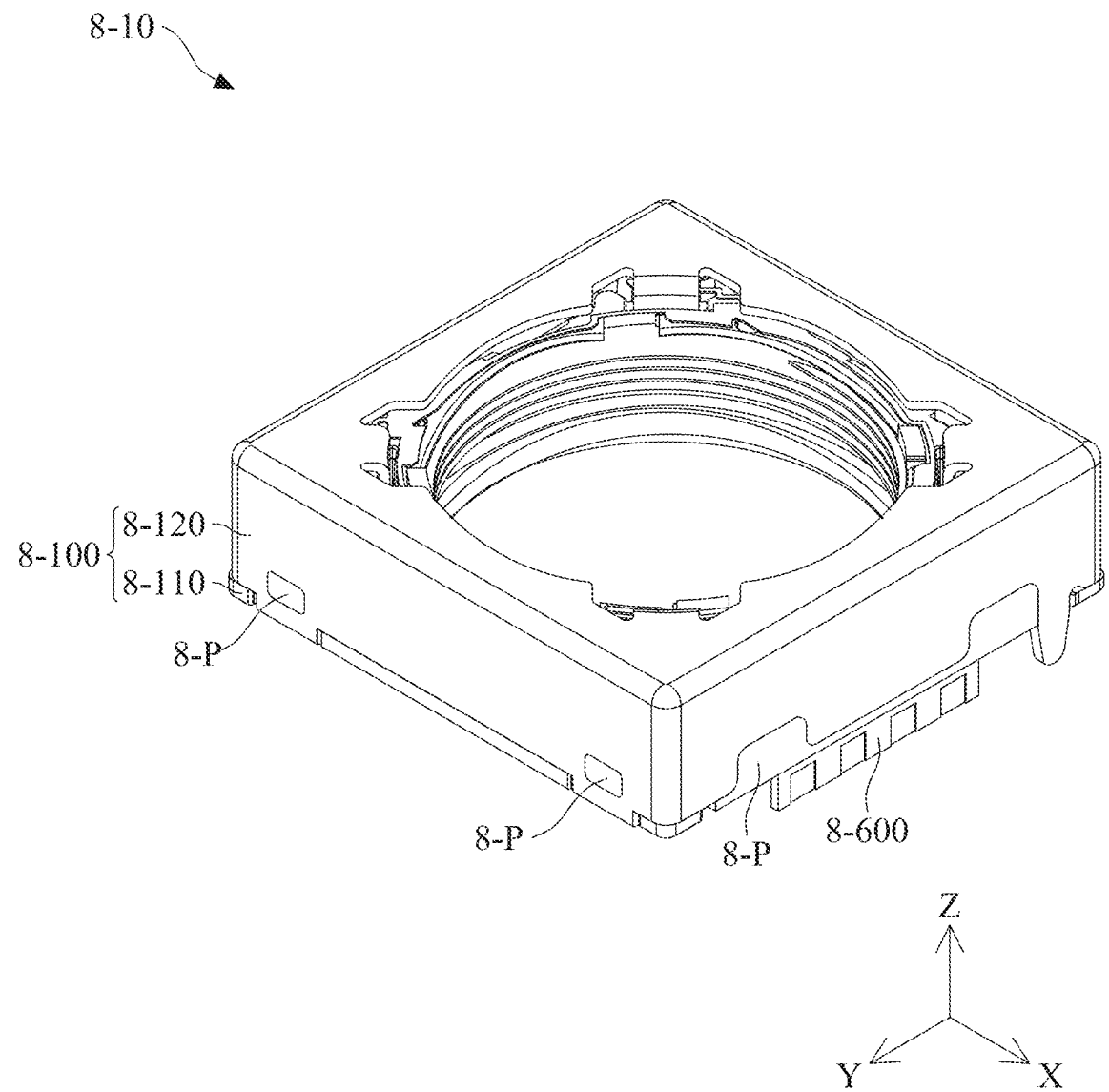
Figures 3, 8:
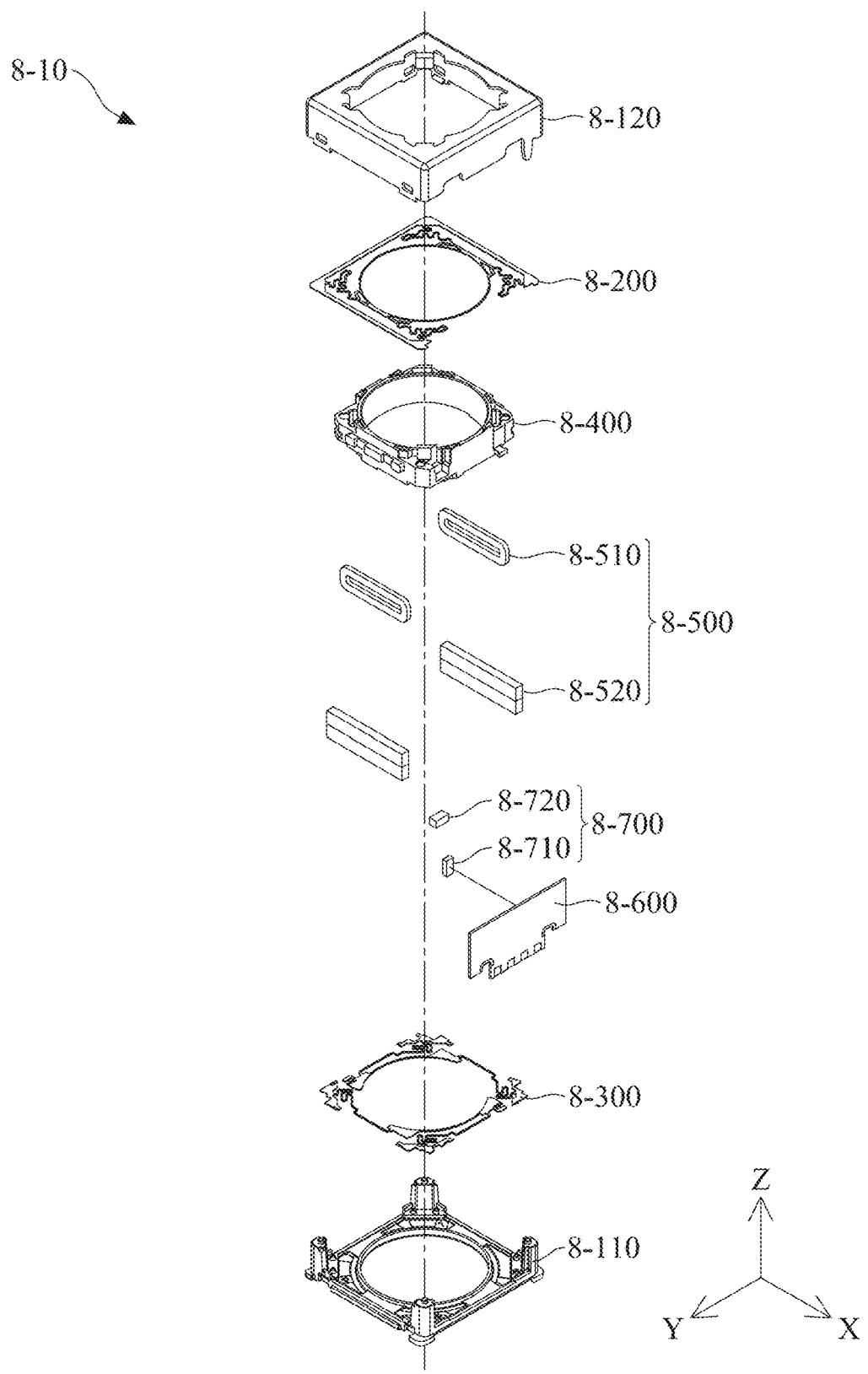
Figures 4A, 8:
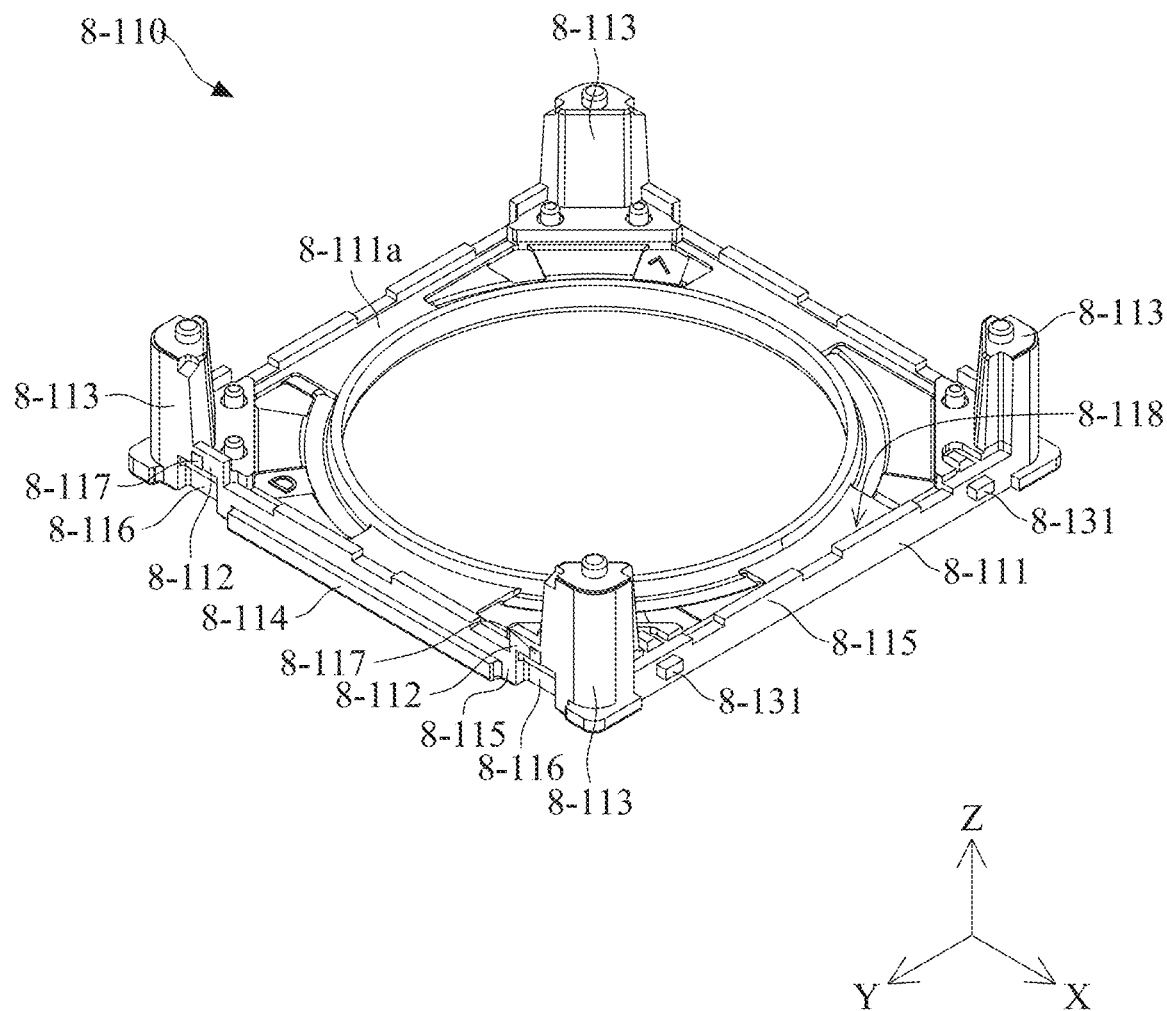
Figures 4B, 8:
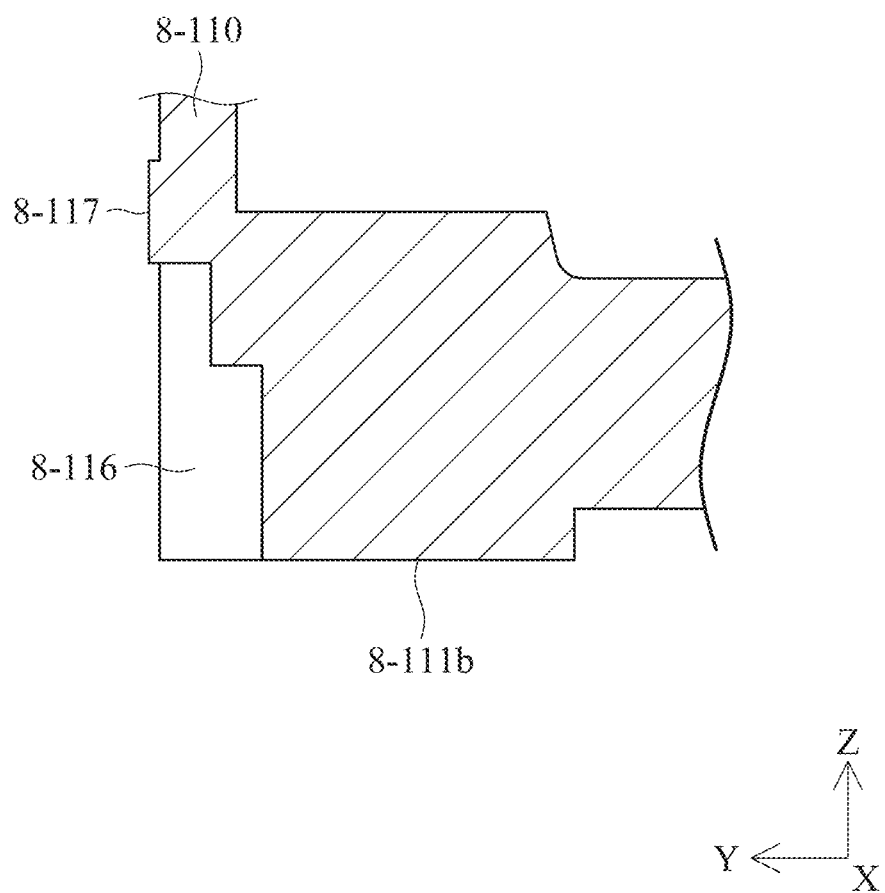
Figures 4C, 8:
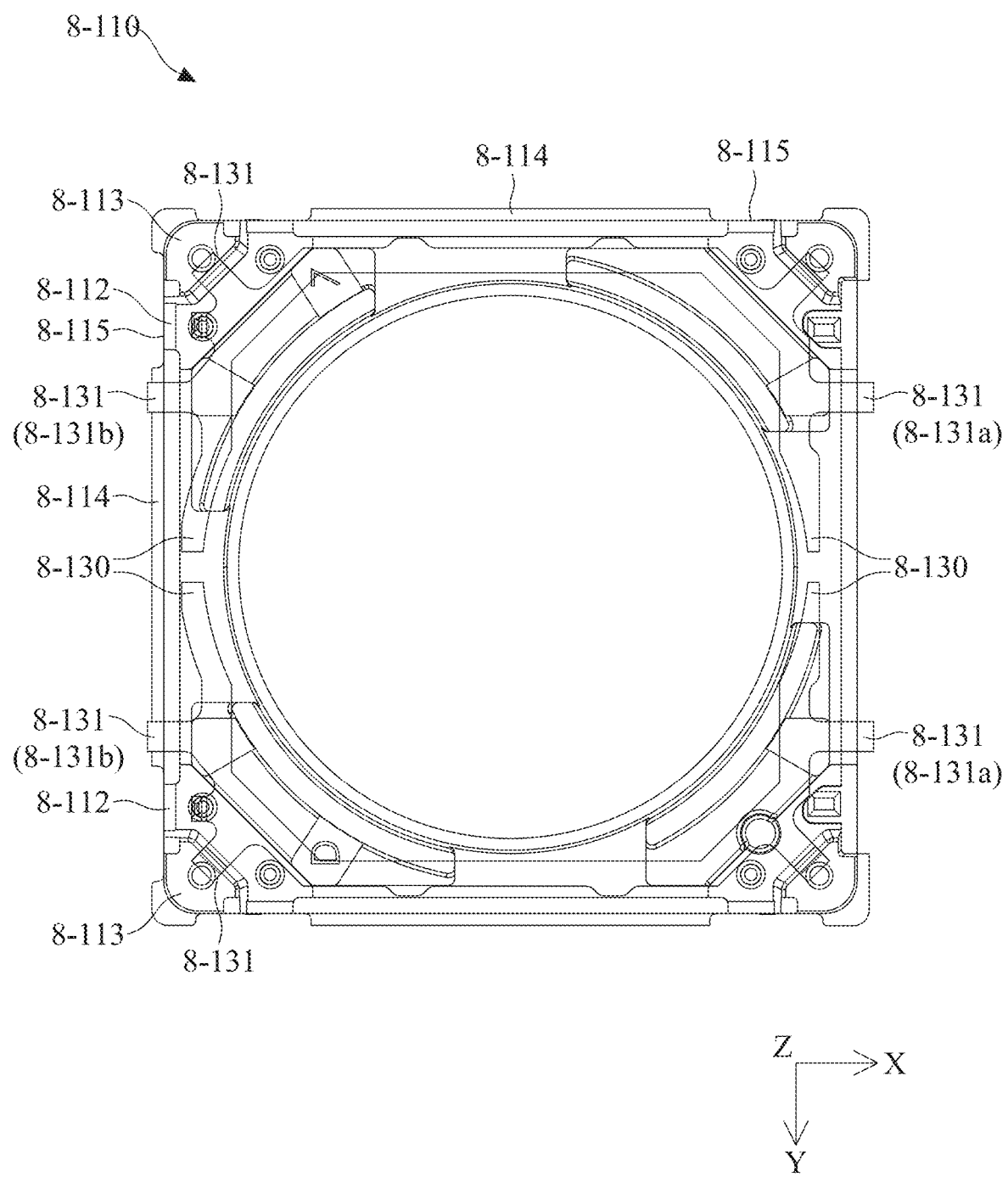
Figures 5, 8:
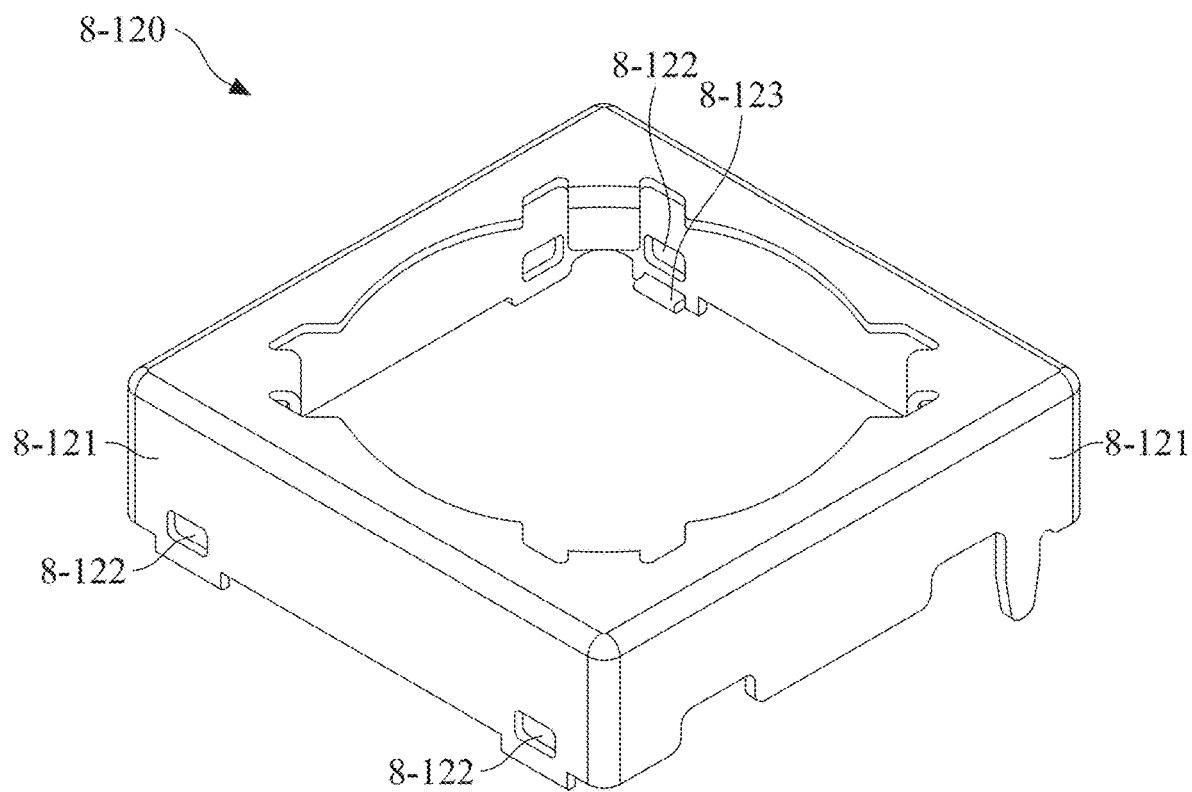
Figures 6, 8:
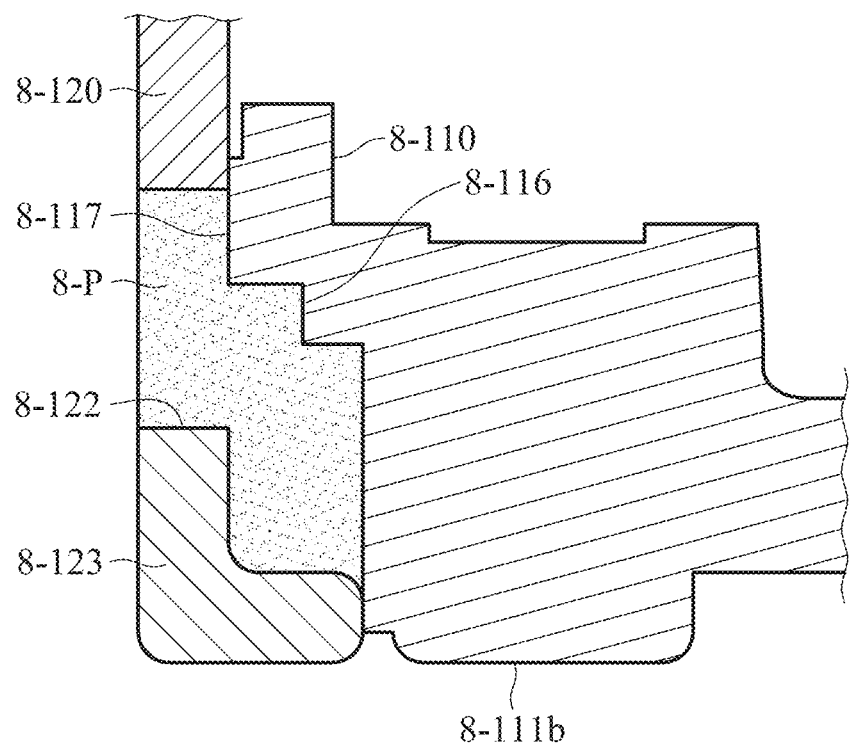
Figures 7, 8:
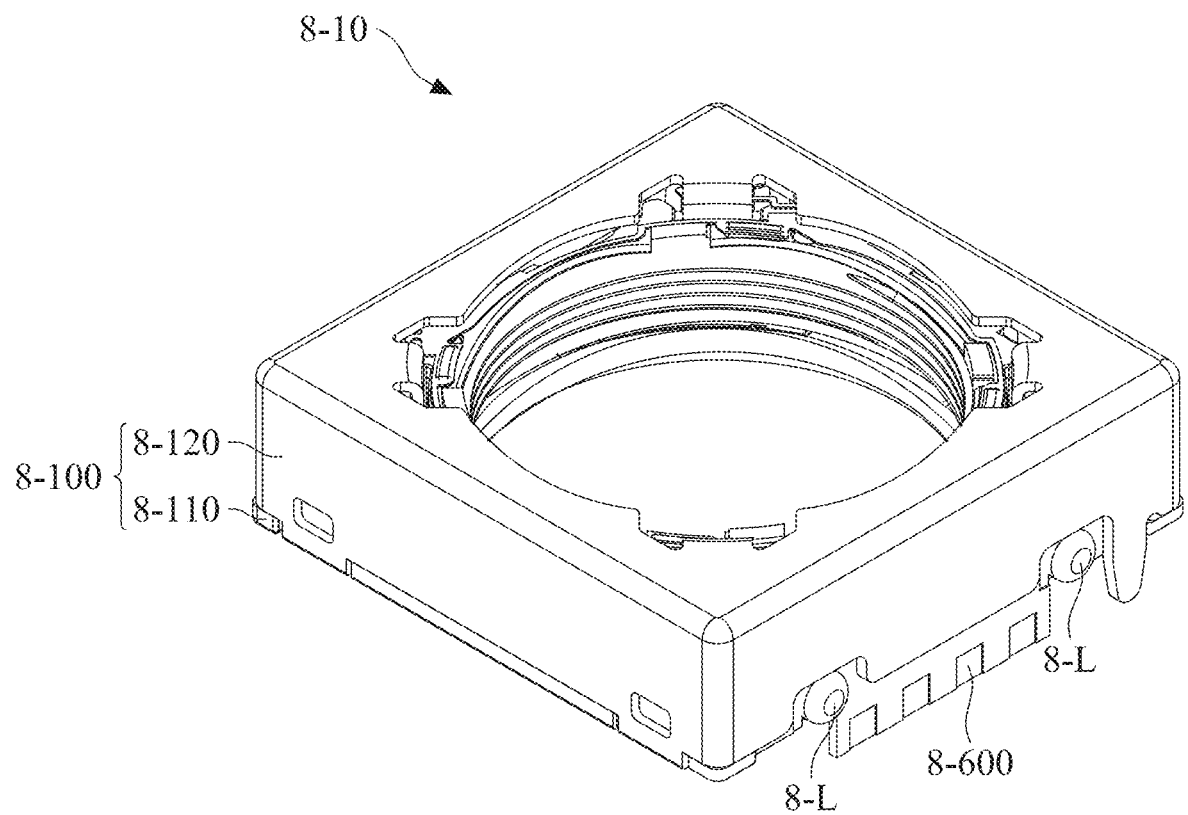
Figures 8, 8A:
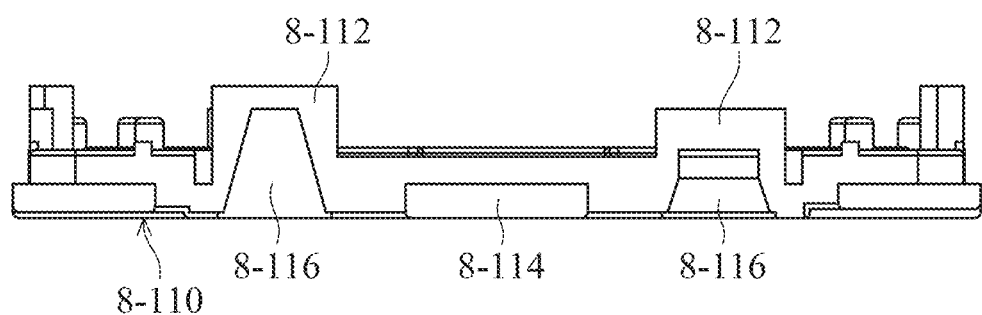
Figures 8, 8B:
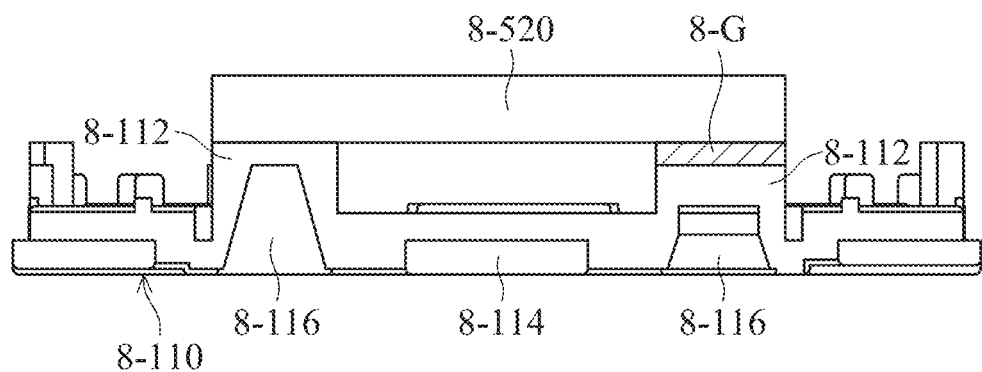
Figures 8, 9:
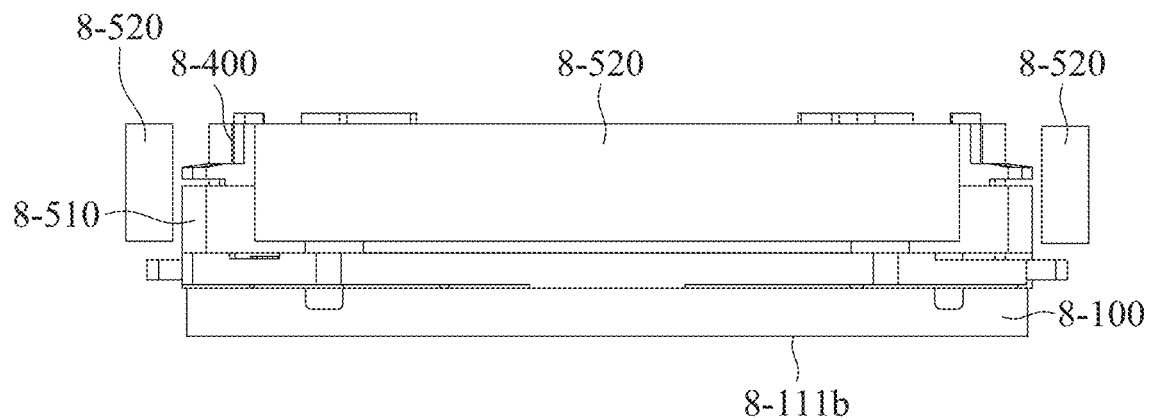
Figures 8, 9, 10, 10A:
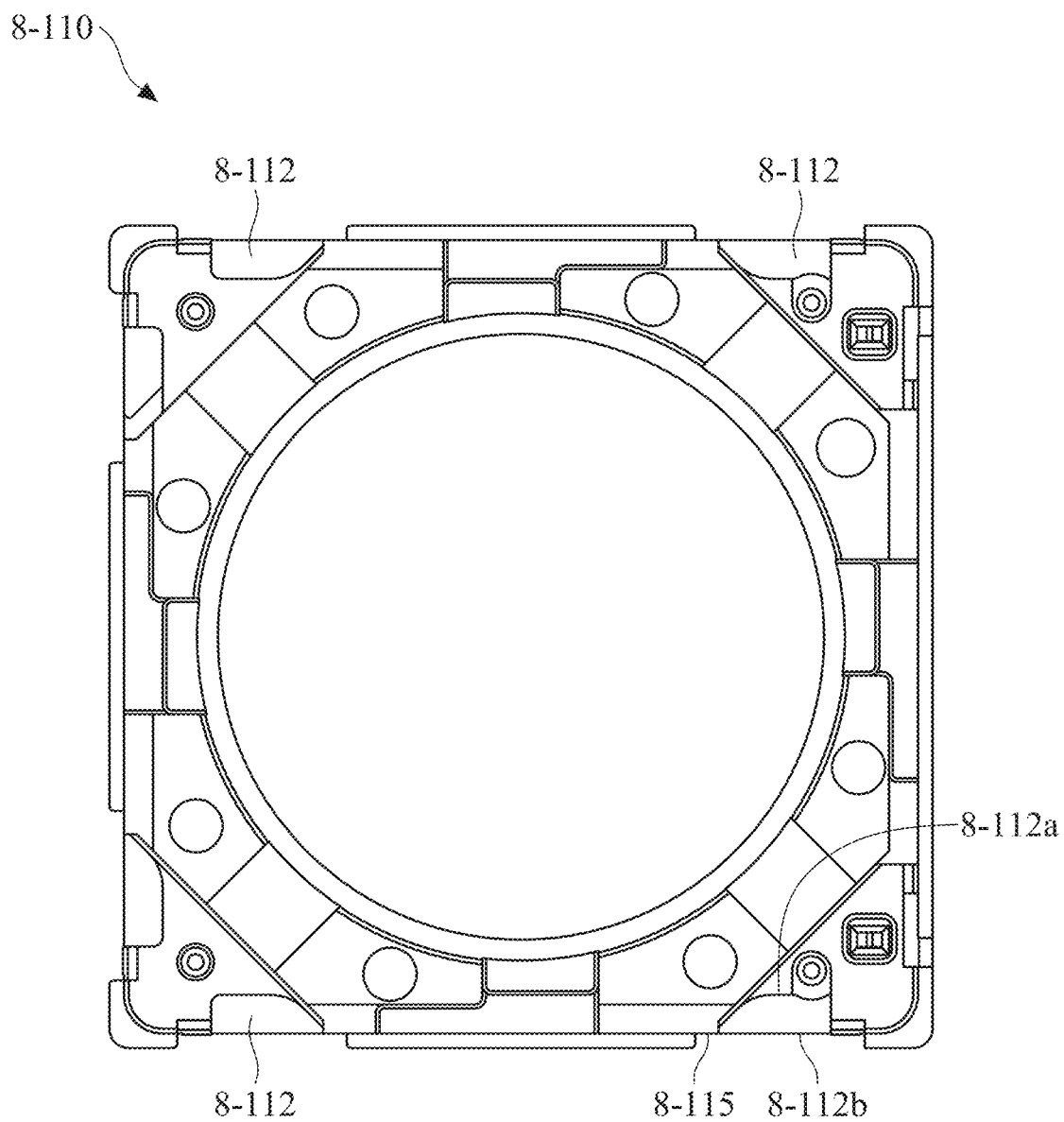
Figures 8, 9, 10, 10B:
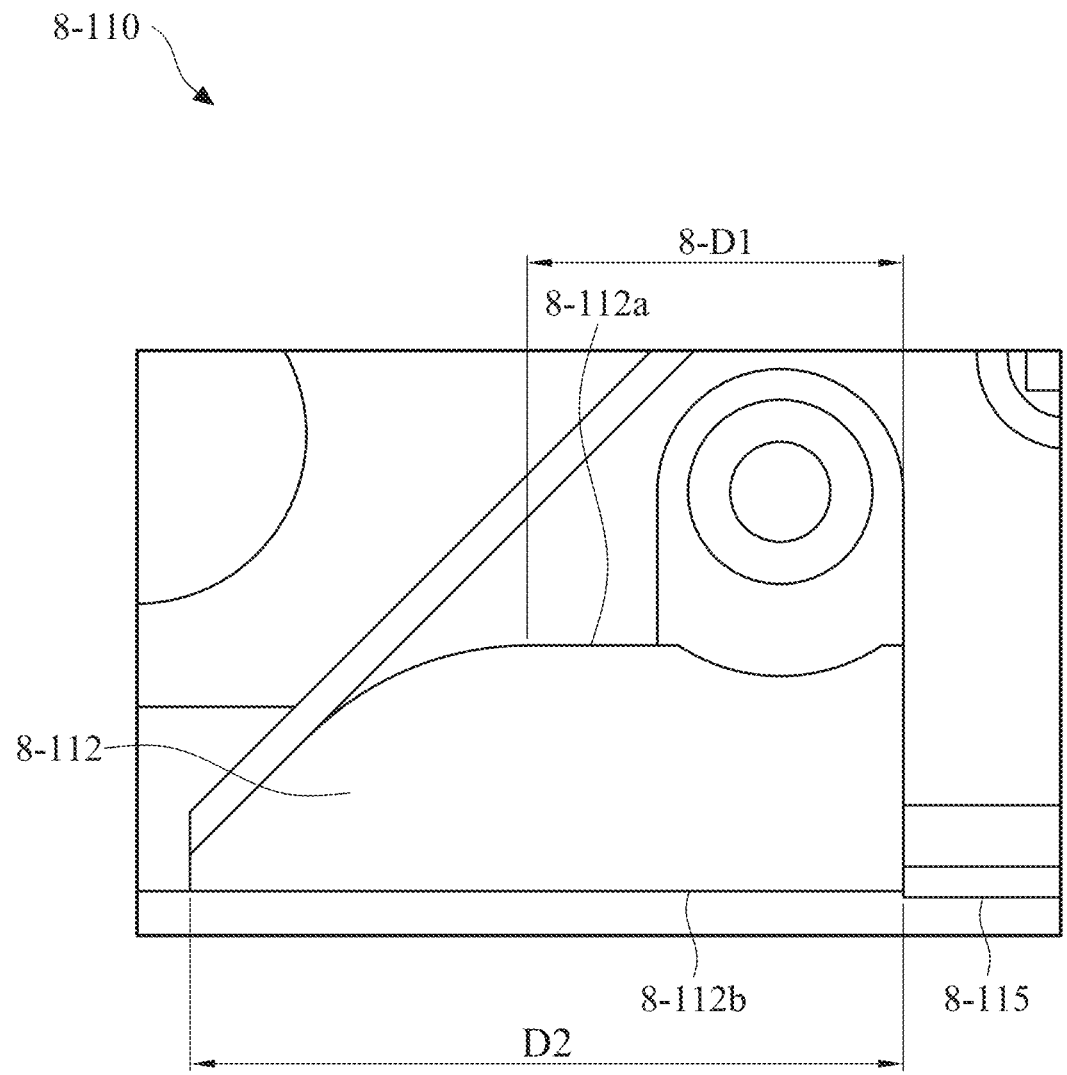
Figures 8, 9, 10, 11:
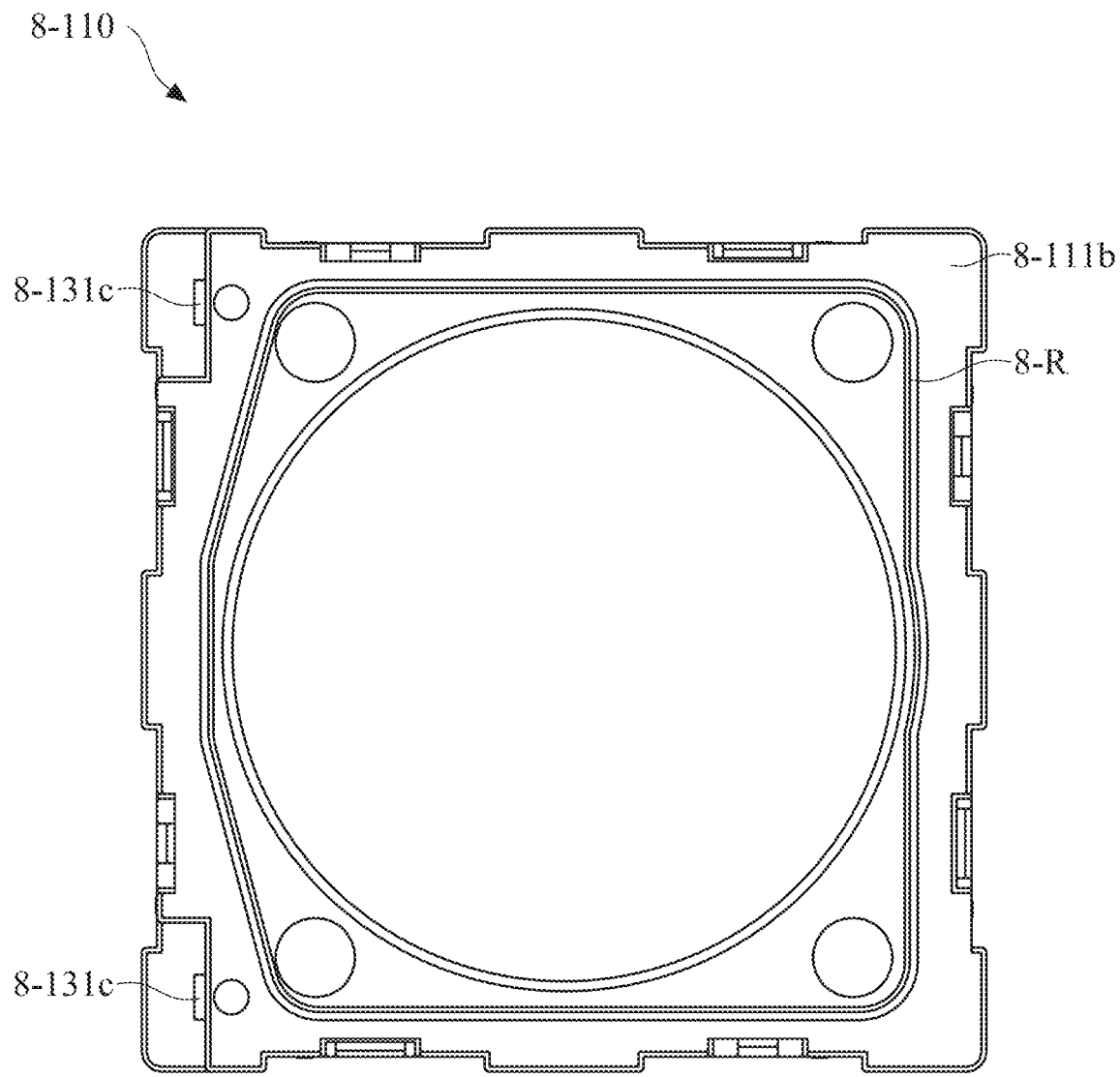
Figures 8, 9, 10, 11, 12:
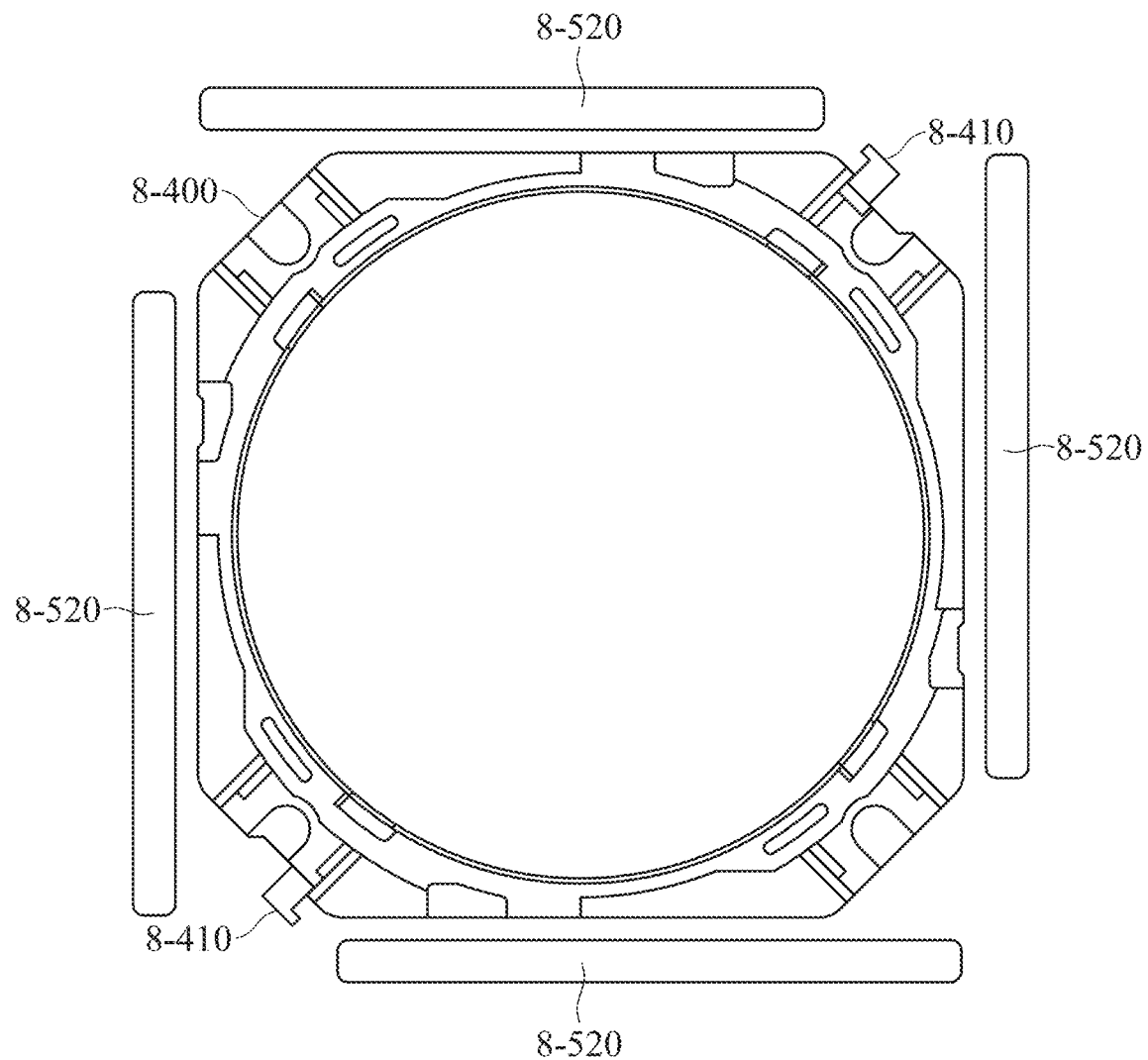
Figures 8, 9, 10, 11, 12, 13, 13A:
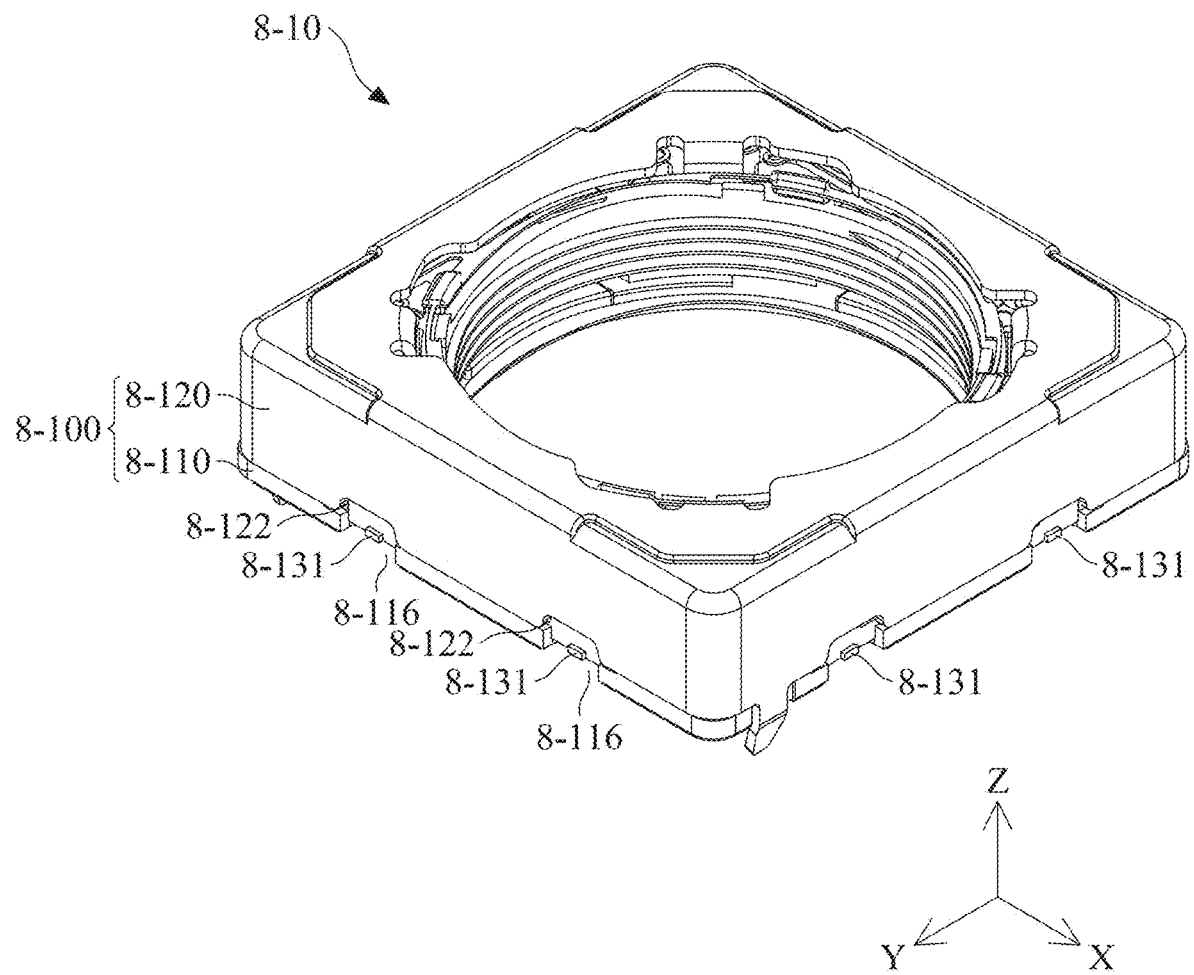
Figures 8, 9, 10, 11, 12, 13, 13B:
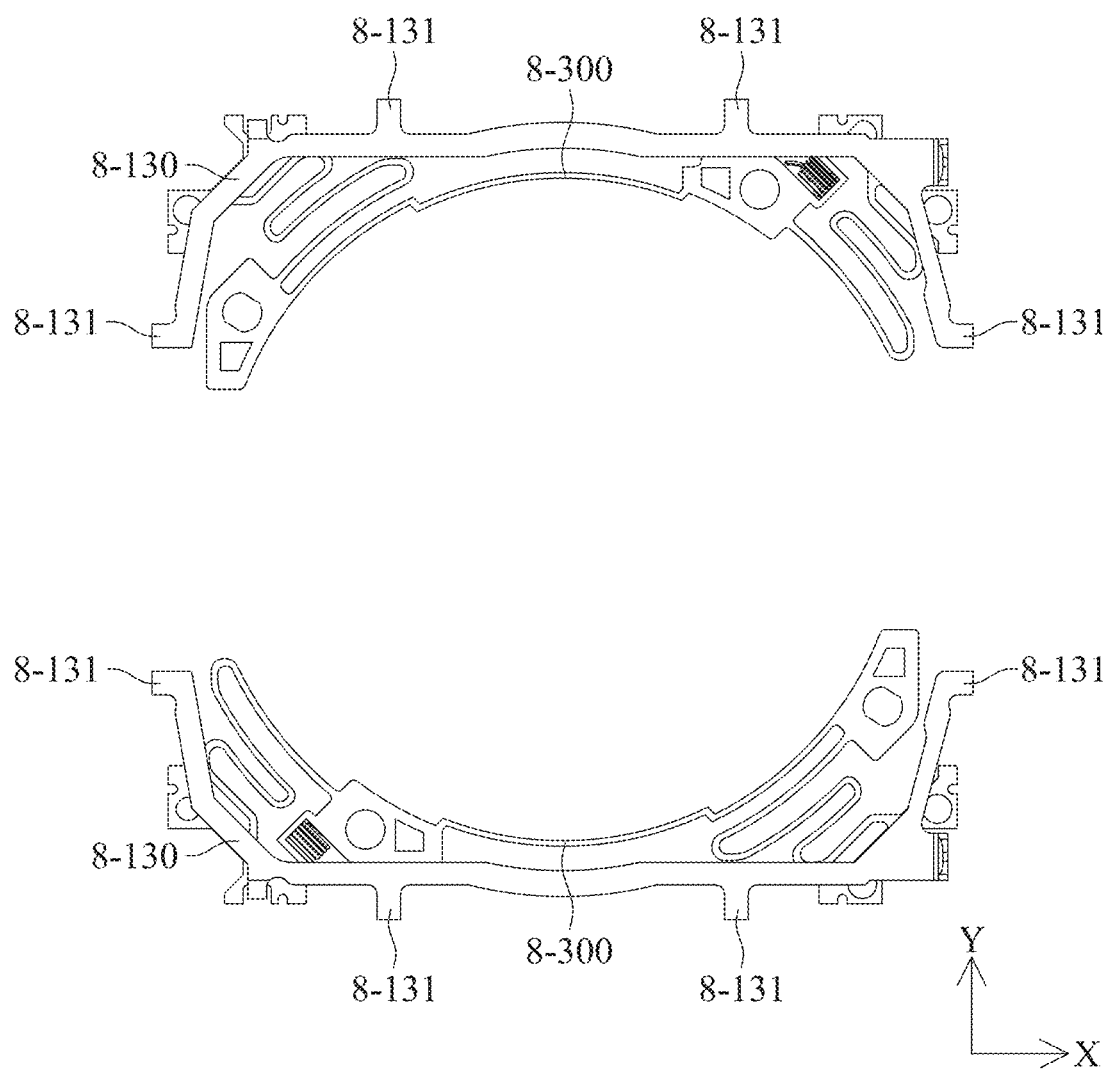
Figures 1, 9:
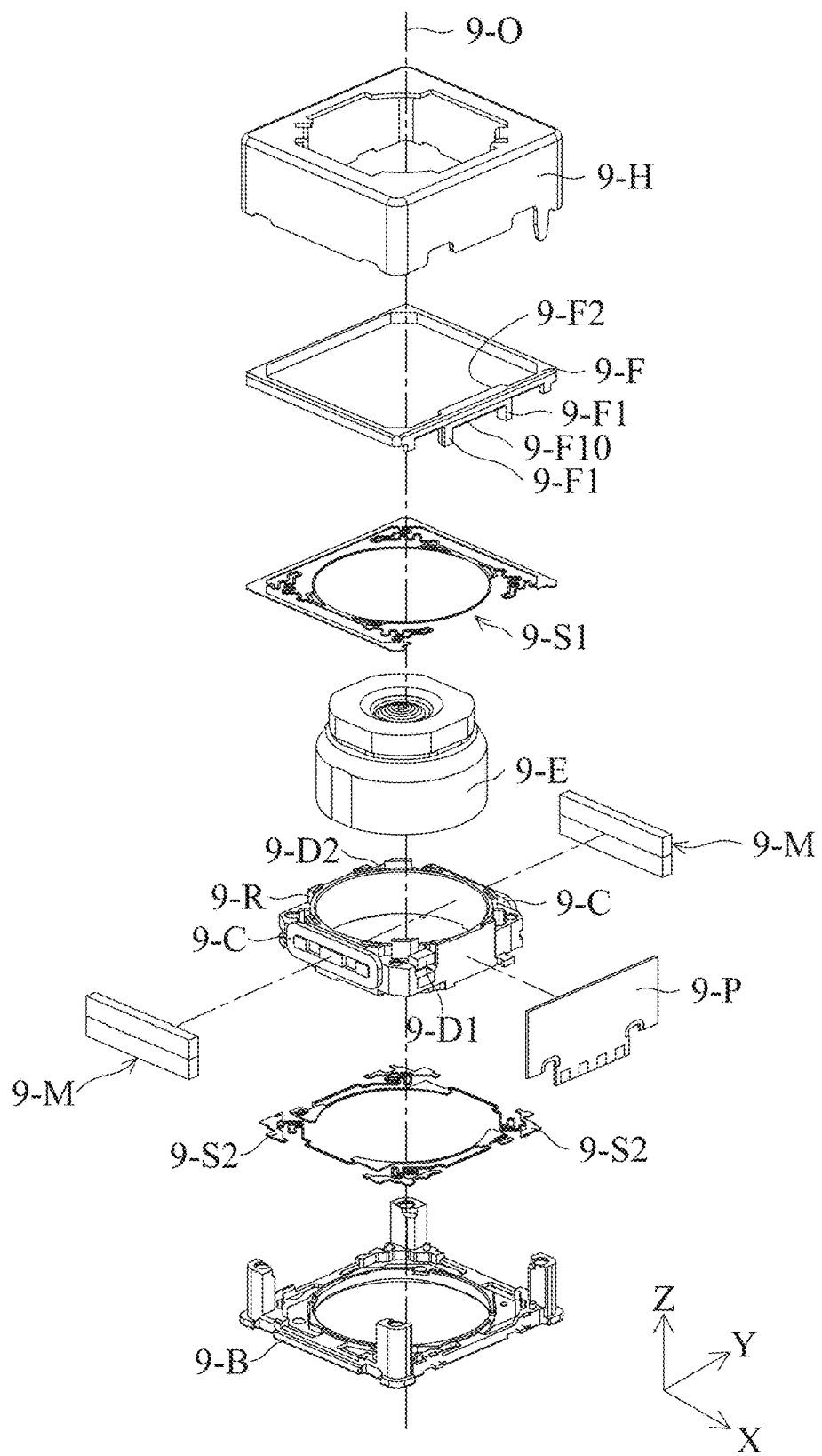
Figures 2, 9:
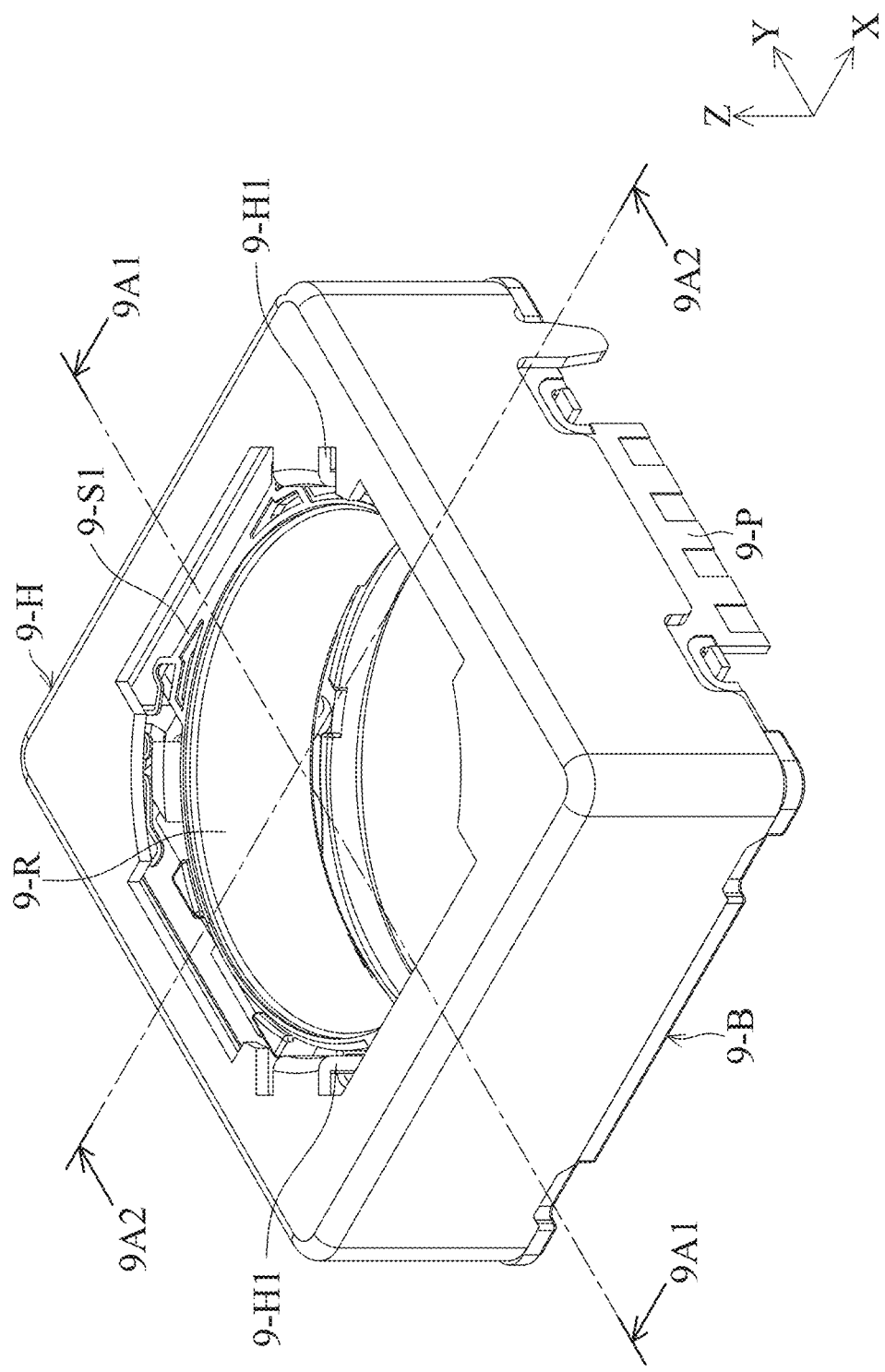
Figures 3, 9:
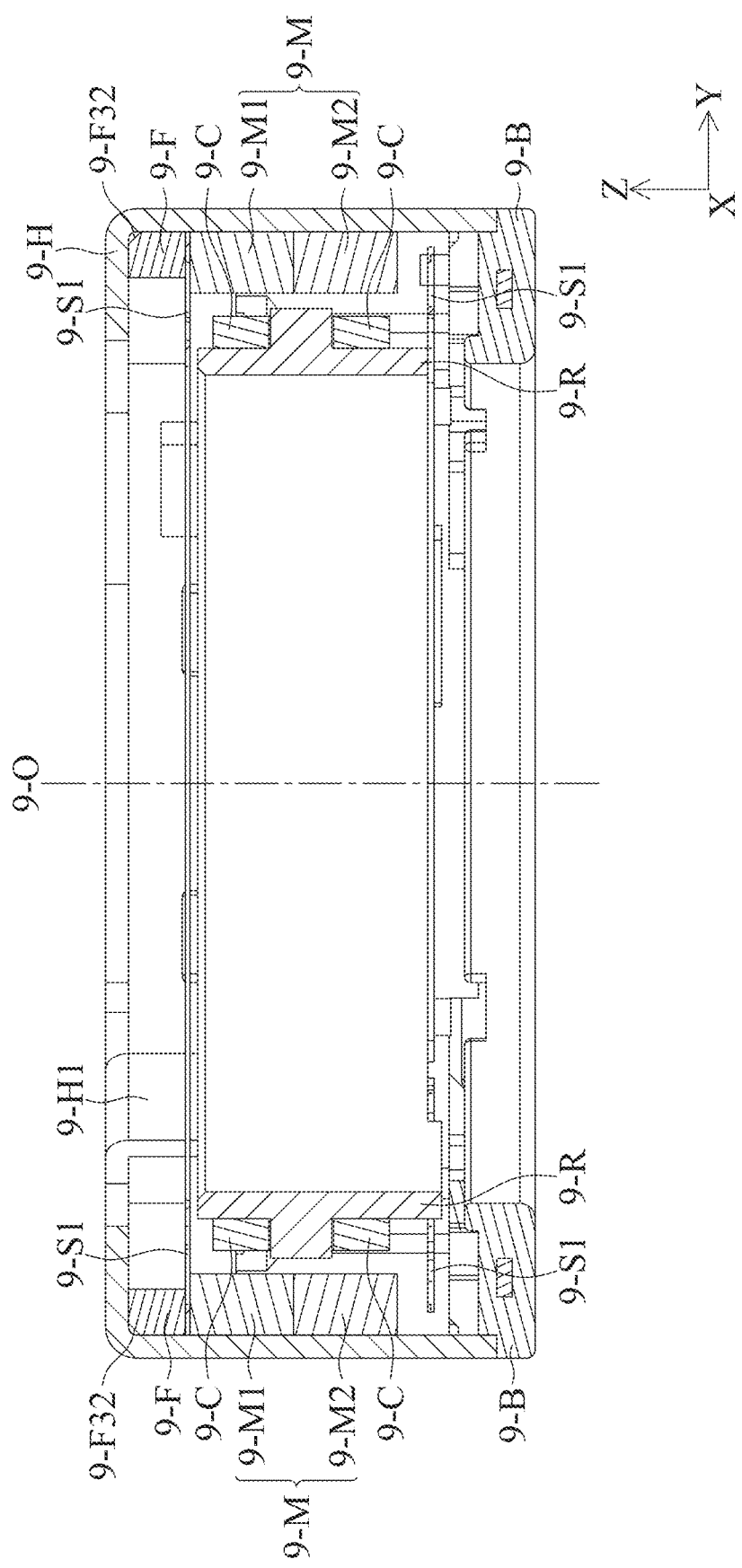
Figures 4, 9:
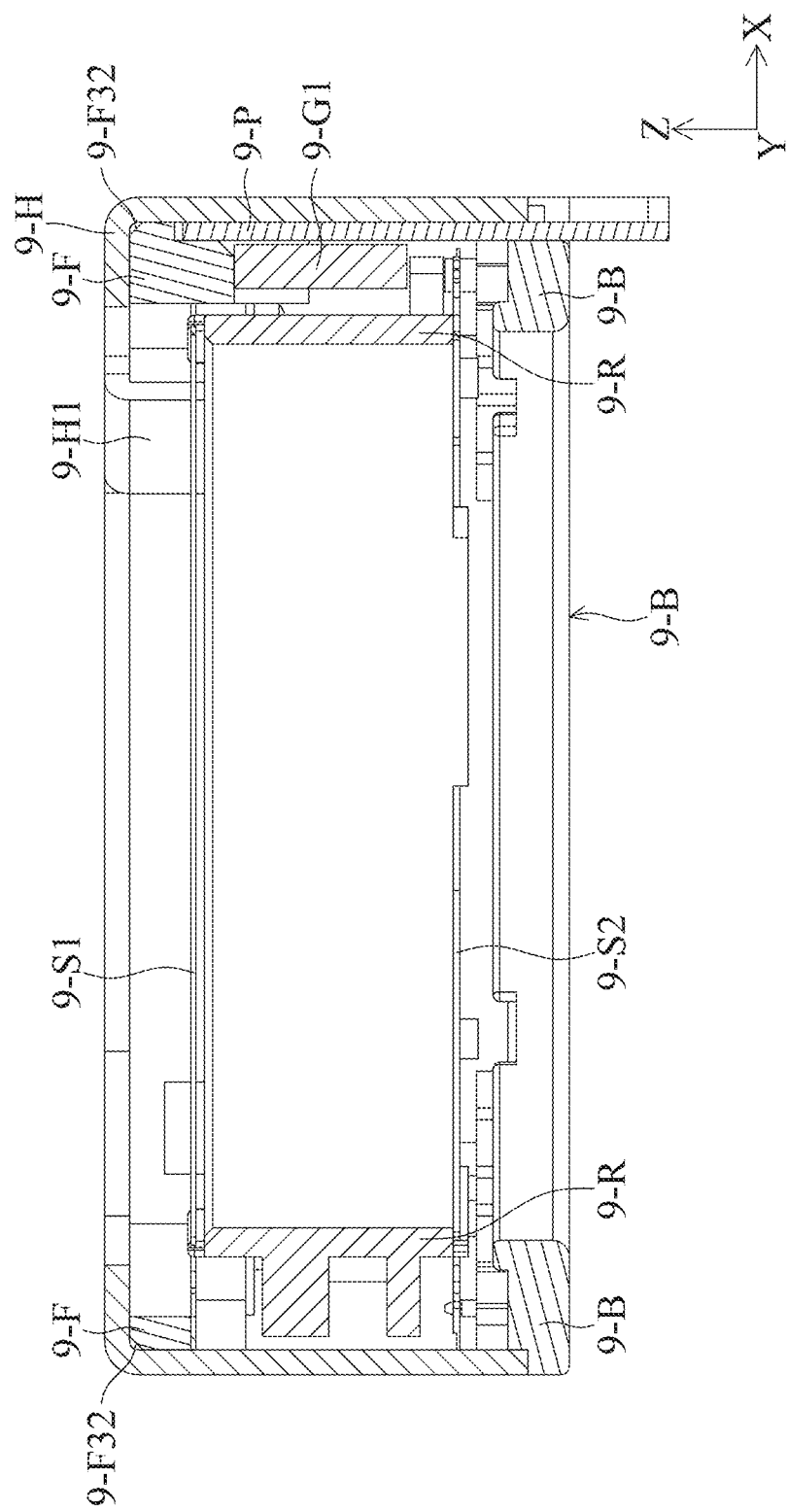
Figures 5, 9:
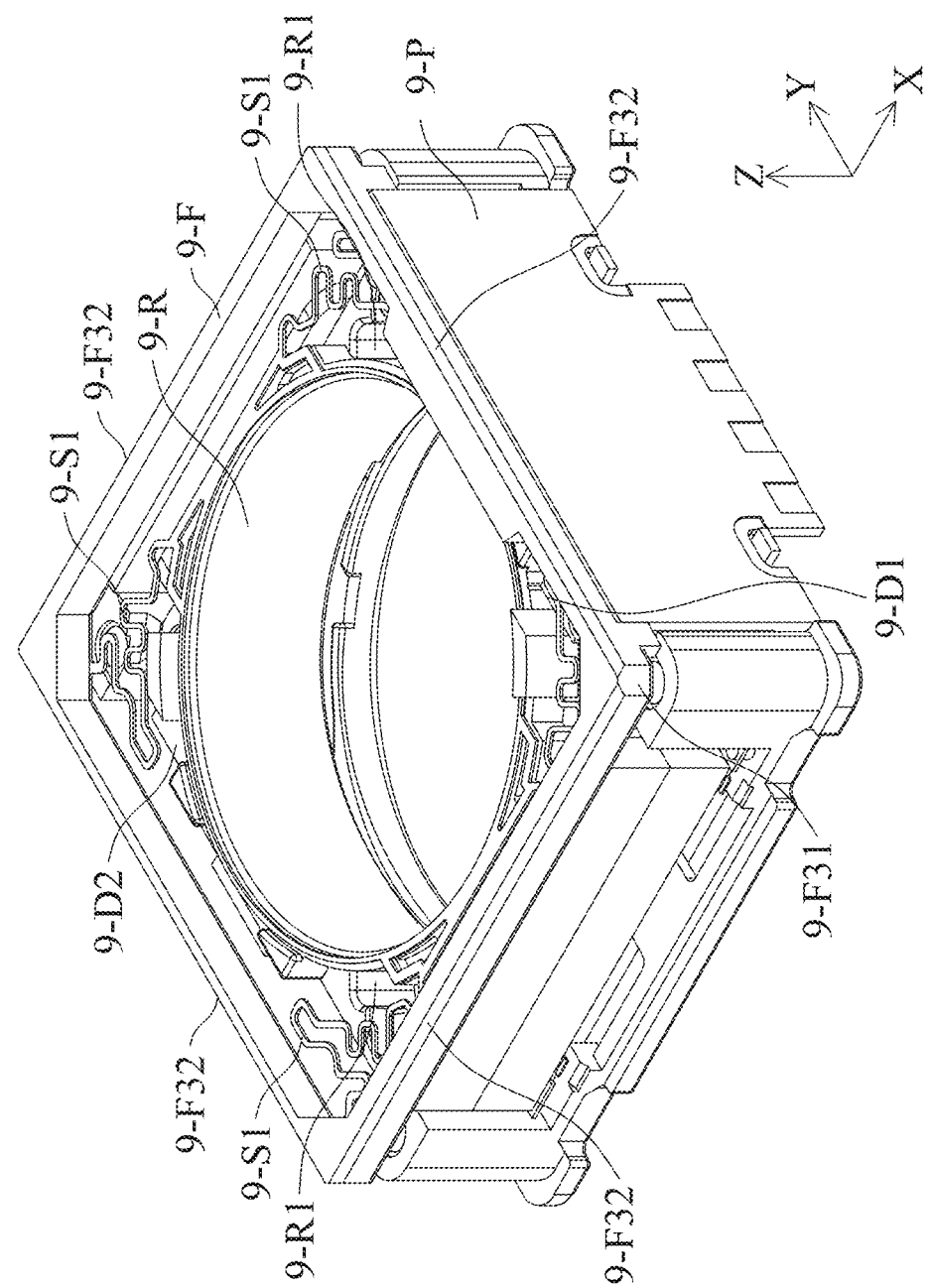
Figures 6A, 9:
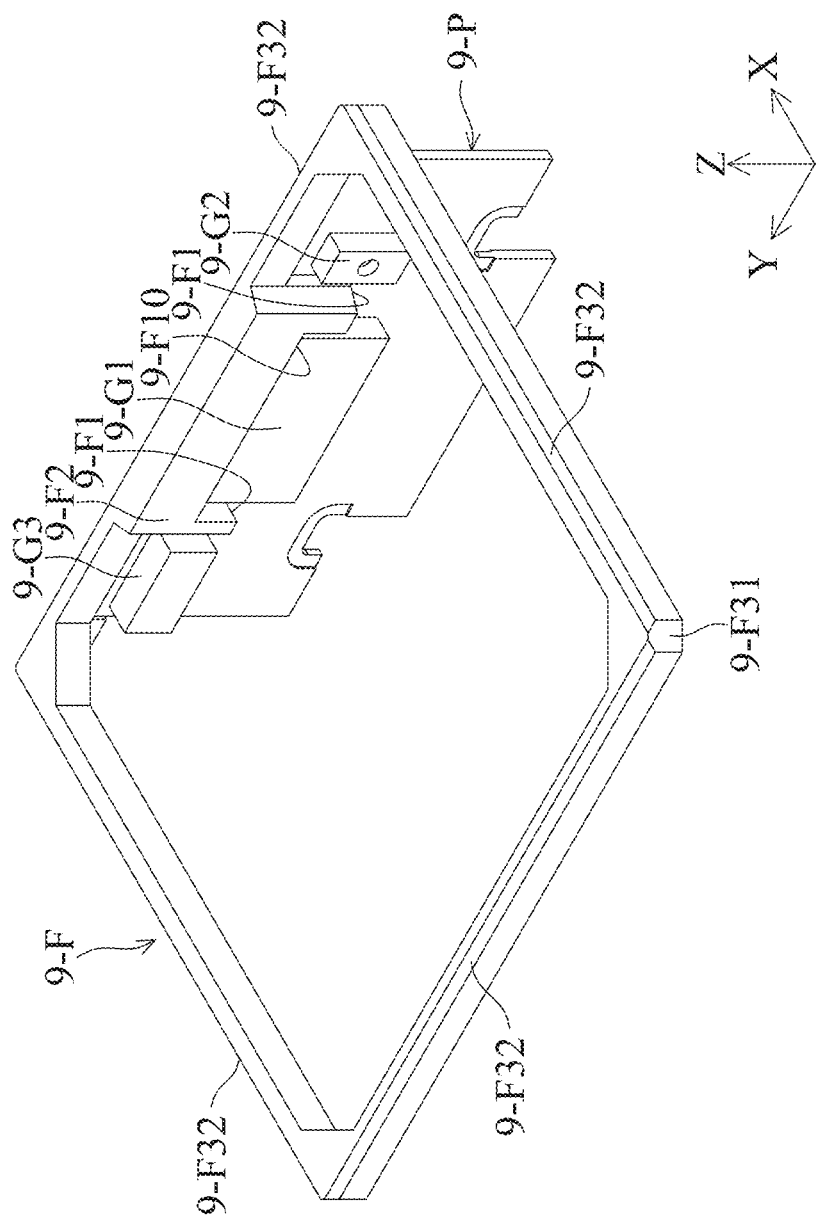
Figures 6B, 9:
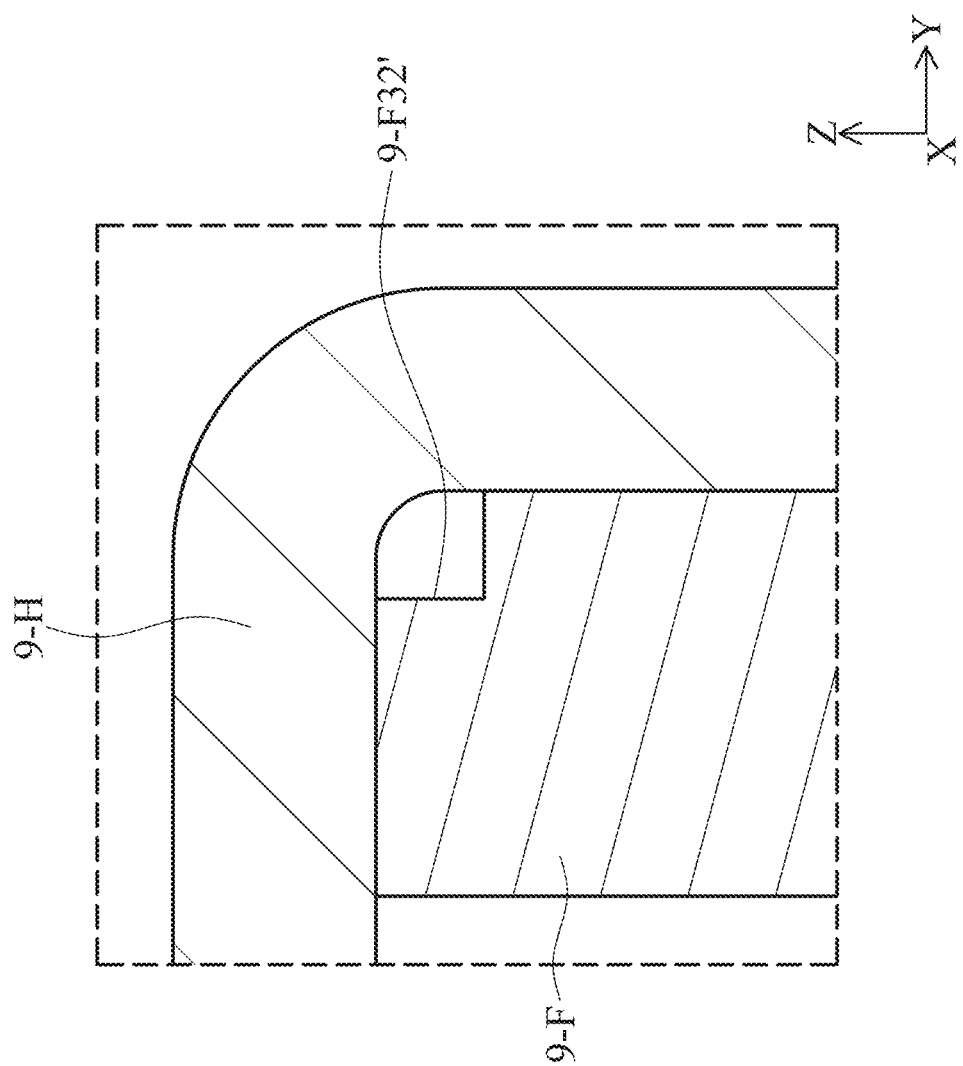
Figures 7, 9:
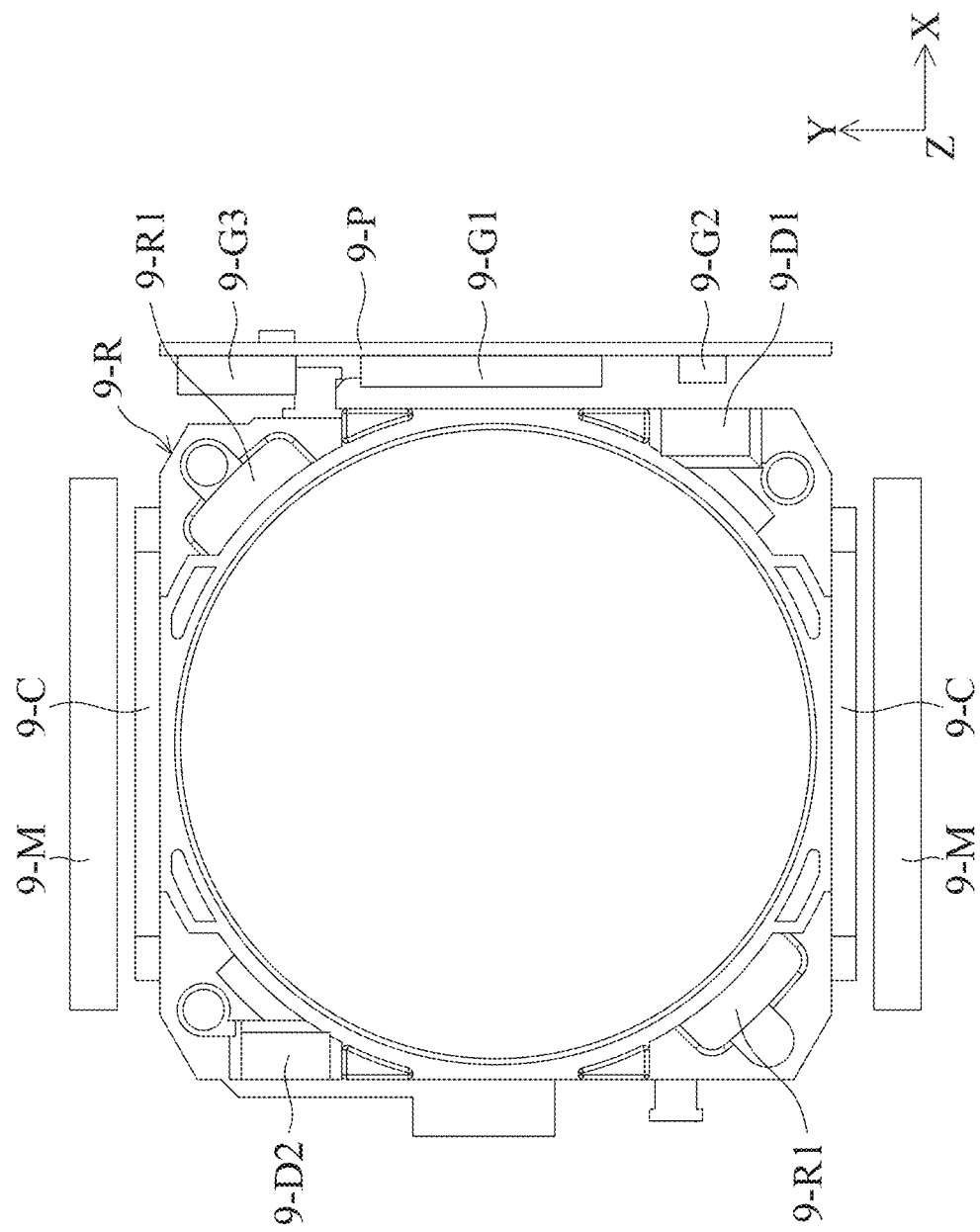
Figures 8, 9:
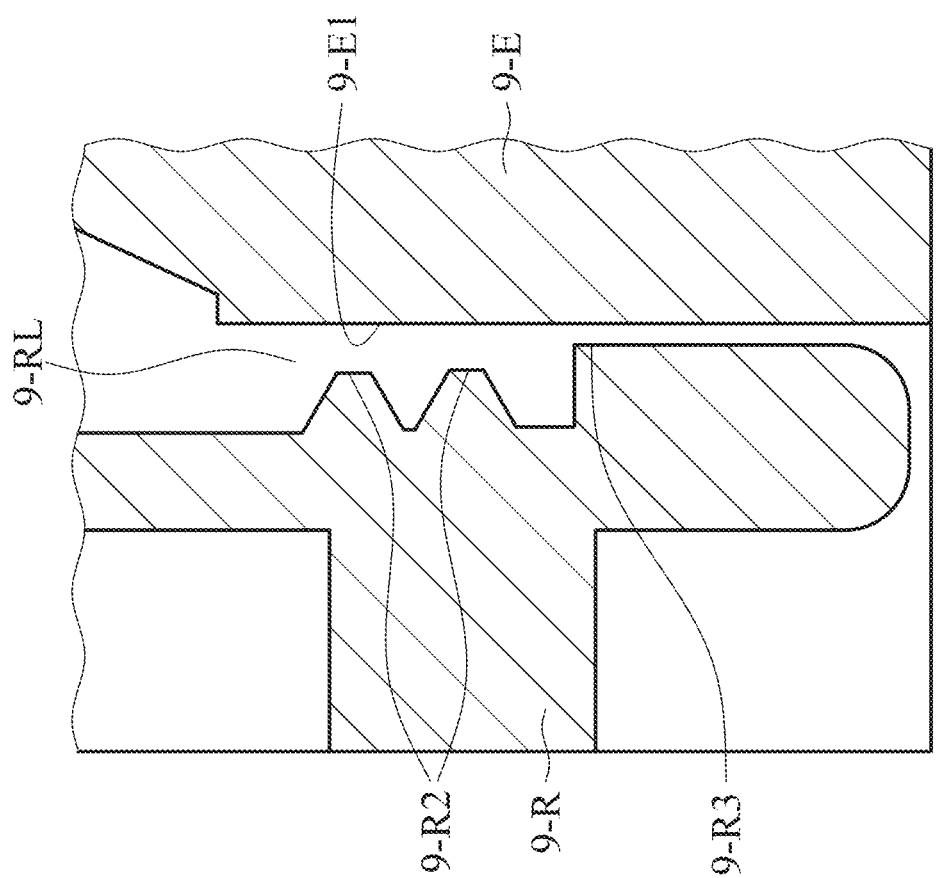
Figure 9:
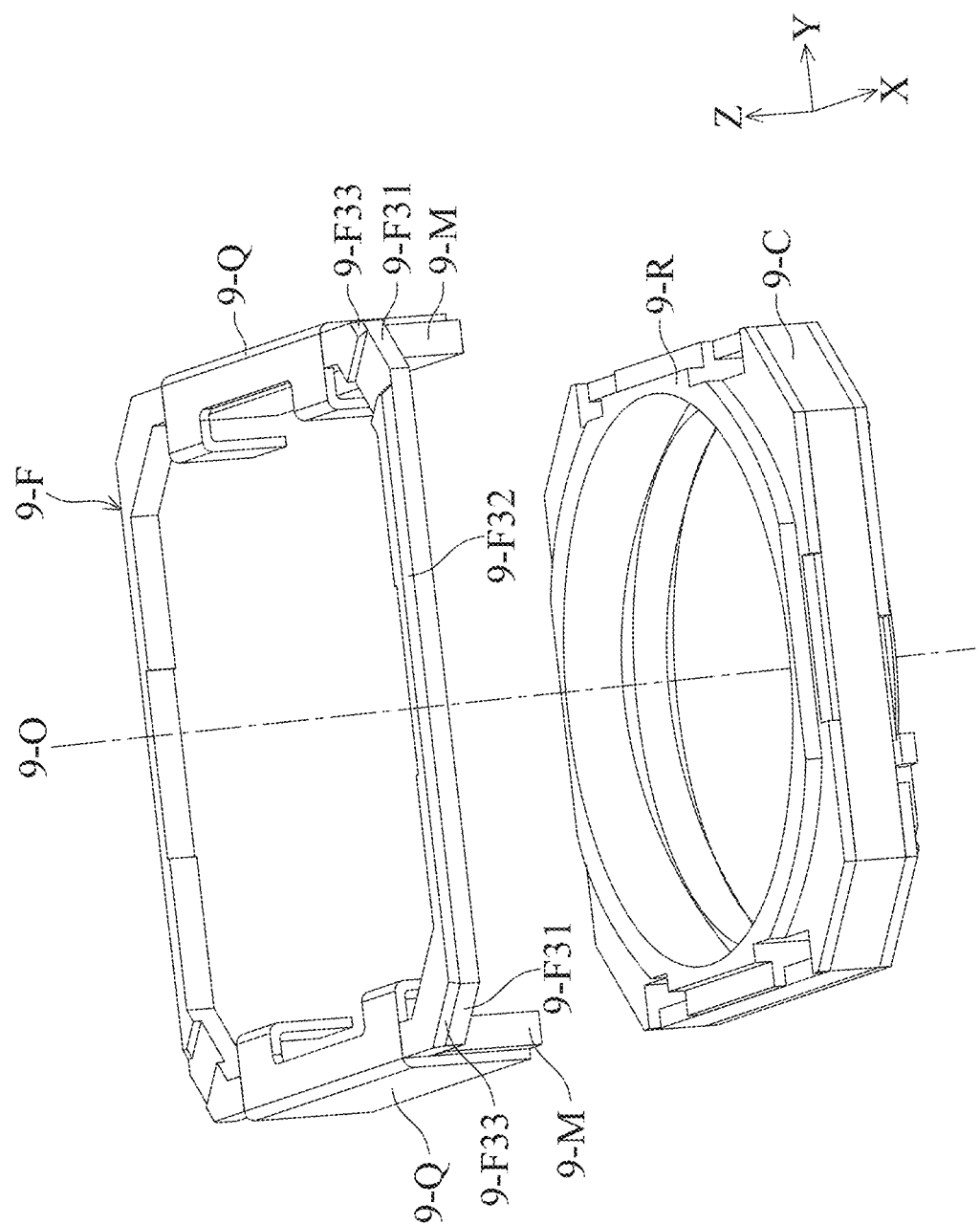
Figures 9, 10:
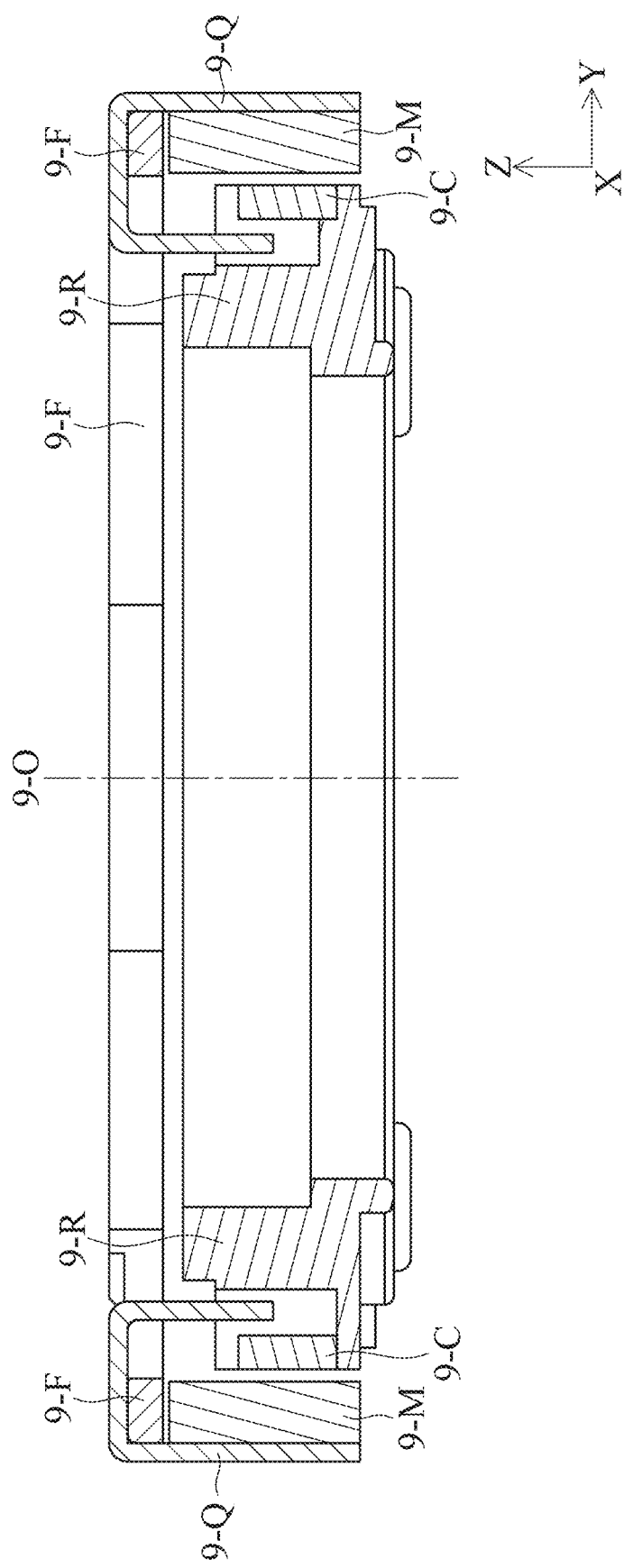
Figures 9, 10, 11:
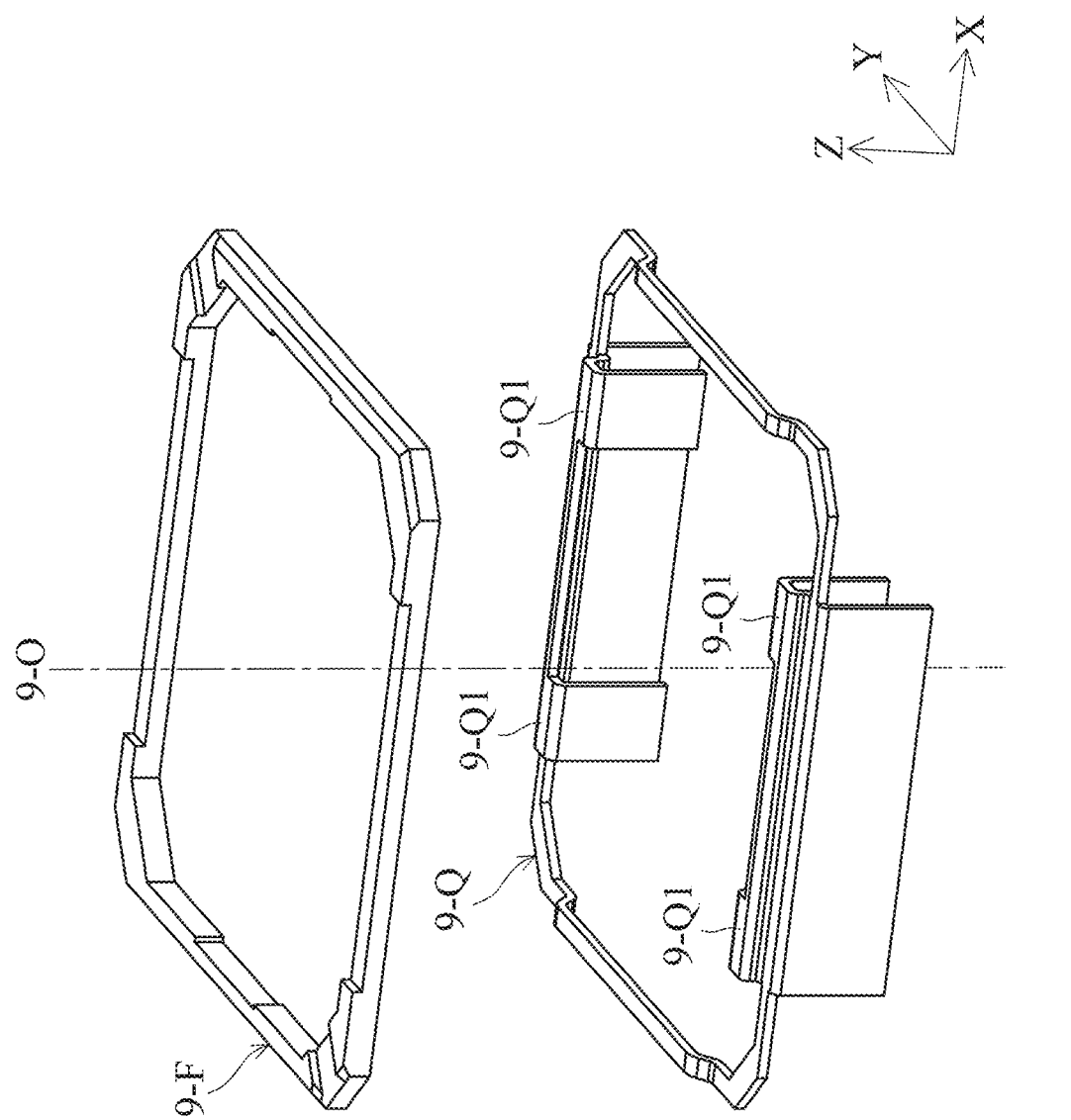
Figures 9, 10, 11, 12:
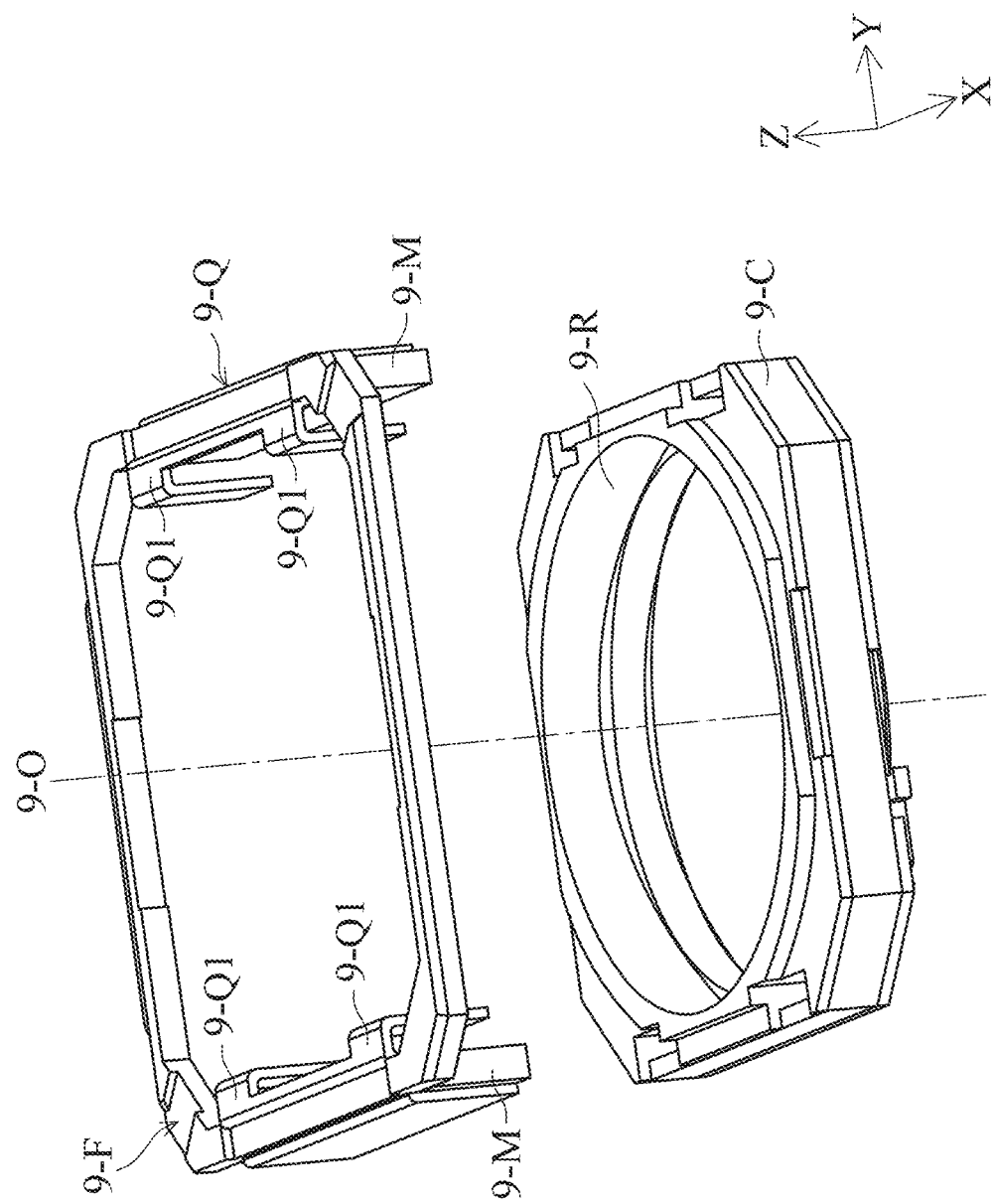
Figures 9, 10, 11, 12, 13:
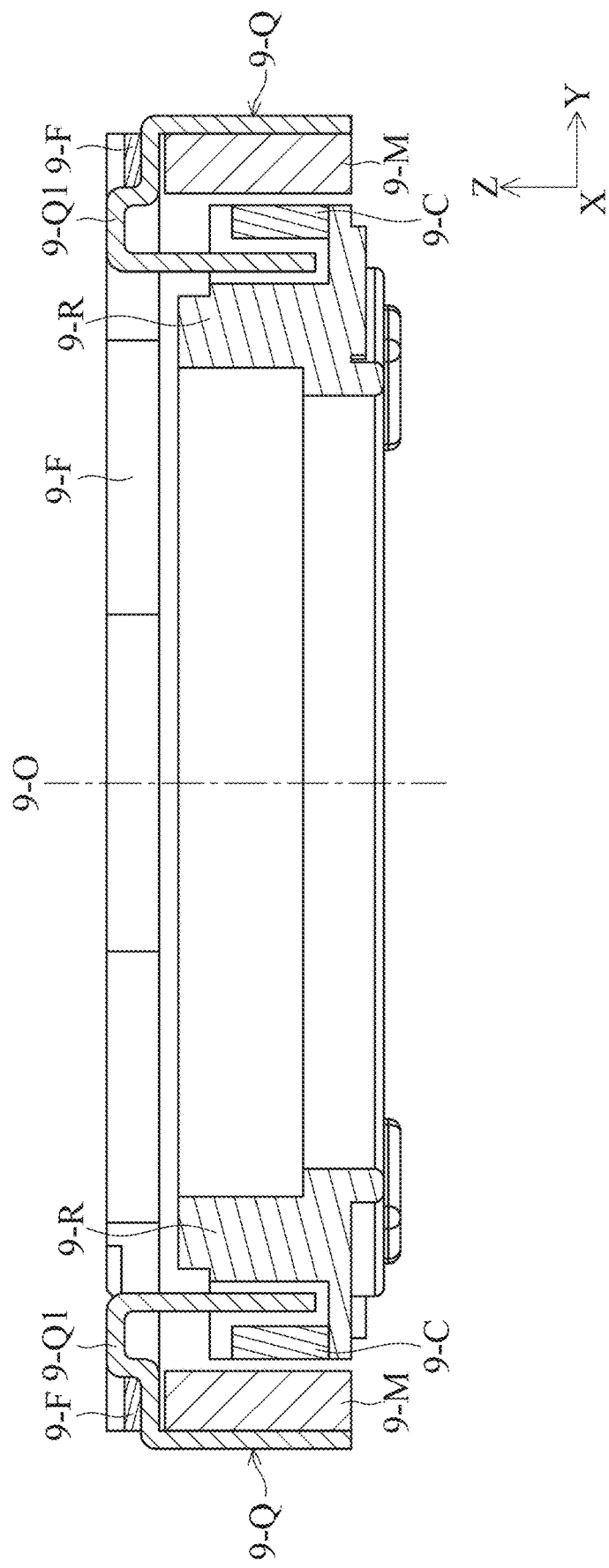
Figures 9, 10, 11, 12, 13, 14:
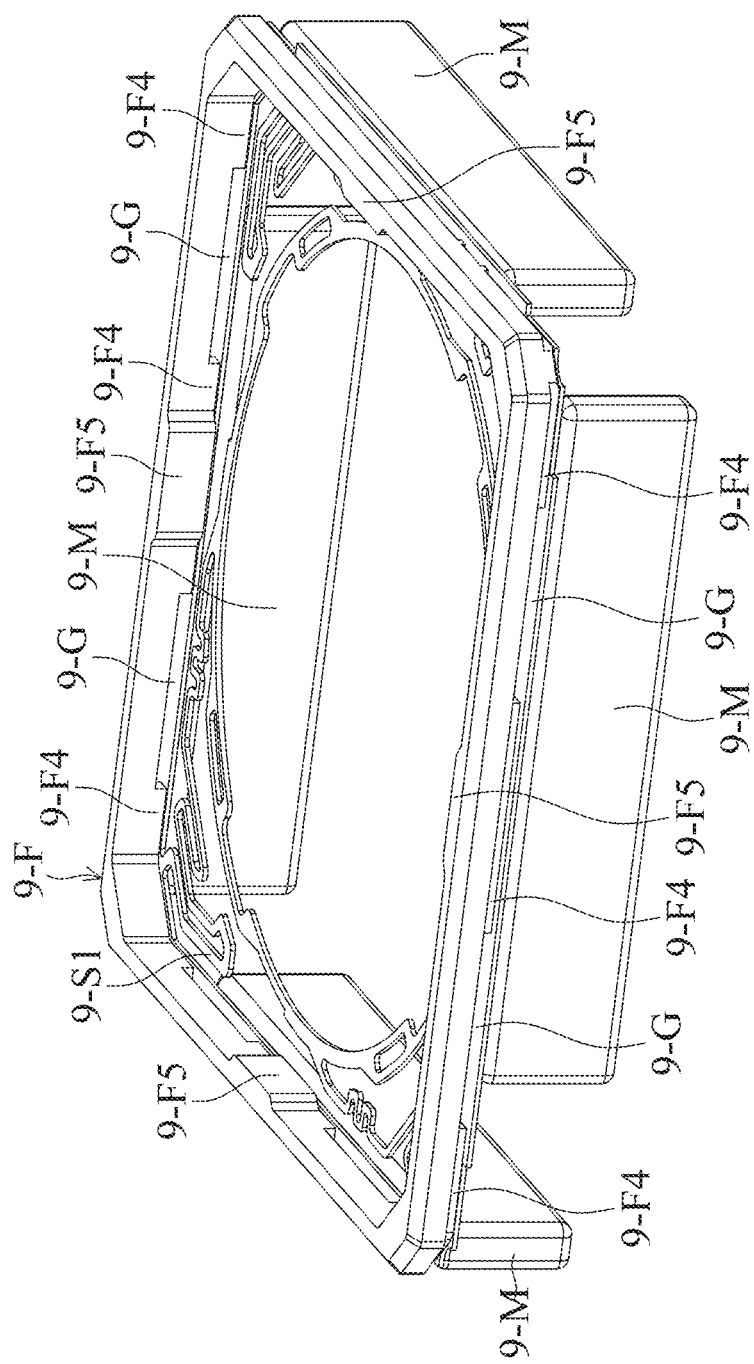
Figures 9, 10, 11, 12, 13, 14, 15:
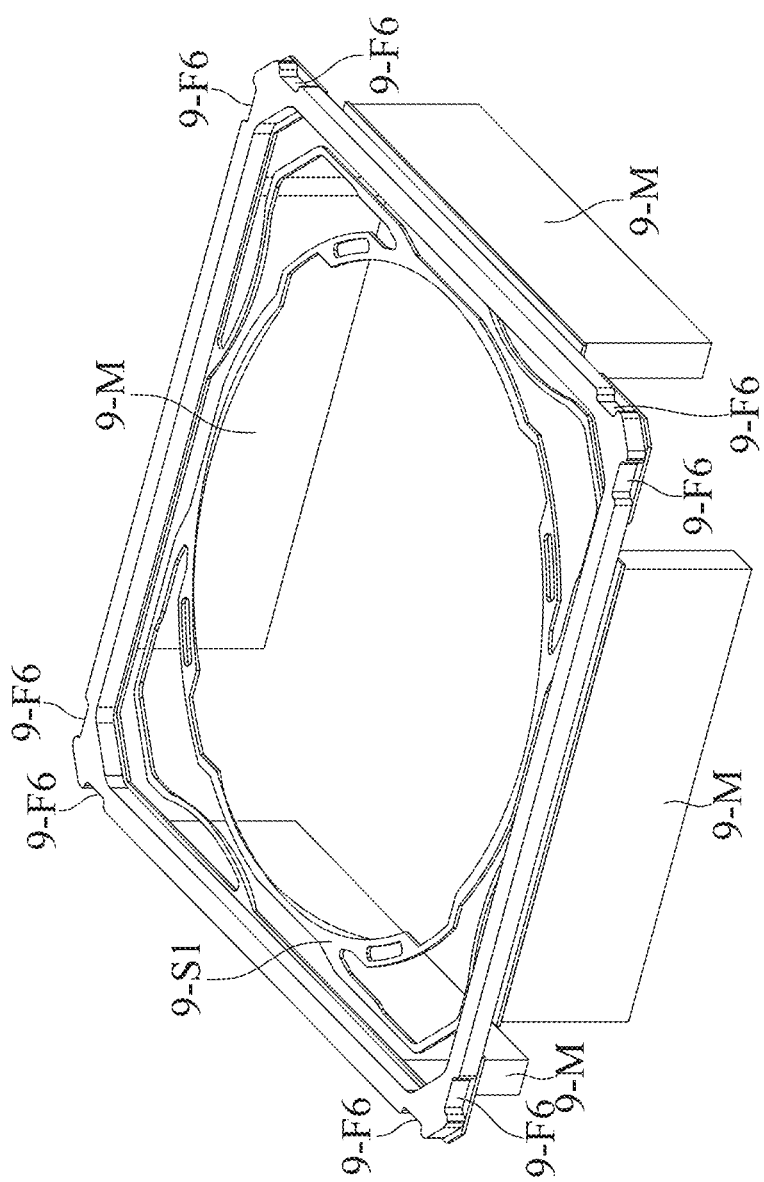
Figures 9, 10, 11, 12, 13, 14, 15, 16:
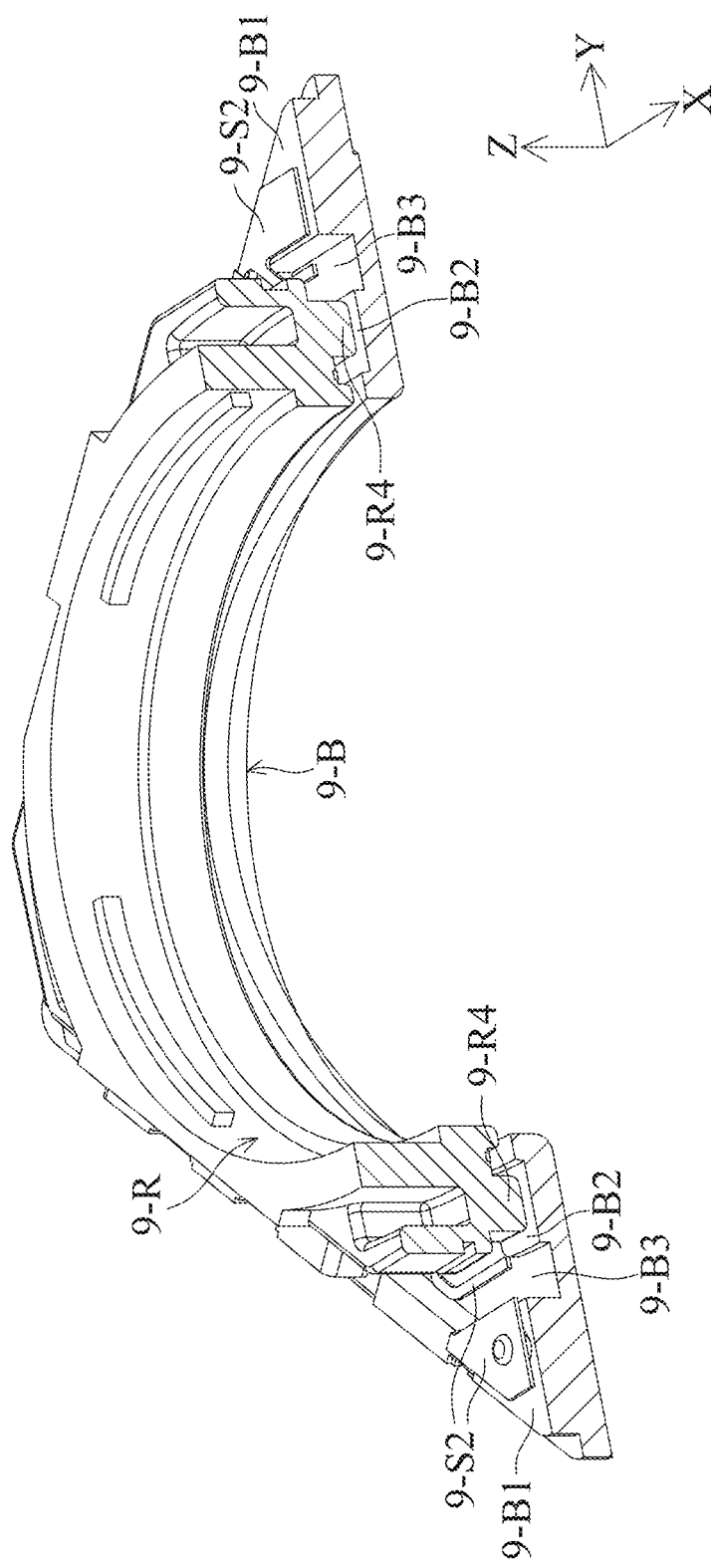

Referring to FIG. 7-7D, when the driving mechanism 7-10 is assembled, a lead 7-511 at the end of the first electromagnetic driving assembly 7-510 may be accommodated in the slot 7-416 of the carrier 7-410, and may be connected to the first connecting portion 7-310 of the second elastic member 7-300 with solder 7-L. A portion of the first connecting portion 7-310 may be disposed between two pillars 7-417 for positioning the second elastic member 7-300. Furthermore, a gap 7-G that communicates with the slot 7-416 is formed between two pillars 7-417, and the aforementioned lead 7-511 may be exposed from the gap 7-G. Thus, the state of the welding procedure can be observed from the gap 7-G when the lead 7-511 is being welded to the second elastic member 7-300 with solder 7-L.

In some embodiments, the slot 7-416 and the pillars 7-417 can be formed in a position adjacent to the first elastic member 7-200, and the lead 7-511 at the end of the first electromagnetic driving assembly 7-510 may be connected to the first elastic member 7-200 using the aforementioned method (i.e. the first engaging portion 7-210 can be disposed between the pillars 7-417, and the lead 7-511 may be connected to the first engaging portion 7-210 with solder 7-L).

Referring to FIG. 8-1, in an embodiment of the disclosure, a driving mechanism 8-10 can be disposed in an electronic device 8-20 and used to hold and drive an optical member 8-30, so that the optical member 8-30 can move relative to an image sensor (not shown) in the electronic device 8-20, and the purpose of focus adjustment can be achieved. For example, the electronic device 8-20 can be a digital camera or a smartphone having the function of capturing photographs or making video recordings, and the optical member 8-30 can be a lens.

FIG. 8-2 is a schematic diagram of the driving mechanism 8-10 according to an embodiment of the disclosure, and FIG. 8-3 is an exploded-view diagram of the aforementioned driving mechanism 8-10. As shown in FIGS. 8-2 and 8-3, the driving mechanism 8-10 primarily comprises a fixed portion 8-100, two elastic members 8-8-200 and 8-300, a movable portion 8-400, a driving module 8-500, a circuit board 8-600, and a position detecting module 8-700. The fixed portion 8-100 comprises a base 8-110 and a frame 8-120. The driving module 8-500 comprises at least one first electromagnetic driving assembly 8-510 and at least one second electromagnetic driving assembly 8-520. The position detecting module 8-700 comprises a sensor 8-710 and a sensing object 8-720. The specific structures of the aforementioned members are discussed below.

Referring to FIGS. 8-3 and 8-4A, the base 8-110 of the fixed portion 8-100 has a plate 8-111, a plurality of protrusions 8-112, a plurality of pillars 8-113, and a plurality of supporting parts 8-114. The plate 8-111 has a surface 8-111a facing the movable portion 8-400. The protrusions 8-112 and the pillars 8-113 protrude from this surface 8-111a.

First sidewalls 8-115 parallel to the optical axis of the optical member 8-30 are formed around the base 8-110, and the corners of the base 8-110 are formed by the connecting portions between the adjacent first sidewalls 8-115. The pillars 8-113a are situated at the corners, and the protrusions 8-112 are adjacent to the corners. It should be noted that, in this embodiment, two protrusions 8-112 can be disposed on one of the first sidewalls 8-115, and adjacent to the different corners. In other words, the distance between each of the protrusion 8-112 and the center of the first sidewall 8-115 is greater than the distance between each of the protrusion 8-112 and the corner of the base 8-110.

The supporting part 8-114 is connected to the plate 8-111, and protrudes along the direction away from the first sidewall 8-115. The height of the supporting part 8-114 is less than that of the plate 8-111, and the bottom of the supporting part 8-114 is aligned with the bottom of the plate 8-111.

In this embodiment, the base 8-110 can further comprises at least one recess 8-116, at least one partition 8-117, and at least one toothed structure 8-118. The recess 8-116 is formed on the first sidewall 8-115 and disposed on the protrusion 8-112. As shown in FIG. 8-4B, the recess 8-116 has a step-shaped structure, wherein the cross-section area of the portion of the step-shaped structure adjacent to the bottom surface 8-111b of the base 8-110 is greater than that of the portion of the step-shaped structure away from the bottom surface 8-111b. The aforementioned cross-section means the cross-section parallel to the XY-plane. In some embodiments, the recess 8-116 can comprises a trapezoidal structure or a triangular structure.

The partition 8-117 is disposed on the protrusion 8-112, adjacent to the recess 8-116 and slightly extended along the direction away from the first sidewall 8-115 (the extending length of the partition 8-117 is much less than that of the supporting part 8-114, for example, the extending length of the partition 8-117 is 1/10 of the extending length of the supporting part 8-114). The toothed structure 8-118 can be formed between two protrusions 8-112.

Referring to FIG. 8-4C, in this embodiment, at least one metal wire 8-130 can be embedded in the base 8-110. The metal wire 8-130 can have a plurality of pins 8-131 adjacent to the different first sidewalls 8-115, so as to connect the elastic members 8-200 and 8-300, the driving module 8-500, the circuit board 8-600, and/or the image sensor. It should be noted that, as shown in FIG. 8-4C, the pins 8-131a connected to the circuit board 8-600 and the pins 8-131b connected to the elastic member 8-300 are respectively disposed on opposite sides of the base 8-110, so as to prevent a short circuit. In some embodiments, the pins connected to the image sensor and the pins 8-131b connected to the elastic member 8-300 can also be disposed on opposite sides of the base 8-110, so as to prevent the detachment of the solder on the pins 8-131b connected to the elastic member 8-300 due to the heat produced when the pins are being welding to the image sensor. Furthermore, in this embodiment, some pins 8-131 are inserted into the pillars 8-113 of the base 8-110, and therefore the metal wire 8-130 can be tightly embedded in the base 8-110.

The metal wire 8-130 can be formed on the base 8-110 by using the molded interconnect device (MID), for example, by laser direct structuring (LDS), microscopic integrated processing technology (MIPTEC), laser induced metallization (LIM), laser restructuring print (LRP), an aerosol jet process, or a two-shot molding method.

Referring to FIGS. 8-3 and 8-5, the frame 8-120 comprises a plurality of second sidewalls 8-121 parallel to the optical axis of the optical member 8-30. At least one opening 8-122 is formed on the second sidewall 8-121. Furthermore, an engaging portion 8-123 is formed below the opening 8-122.

The base 8-110 and the frame 8-120 can be assembled and form a hollow box. As shown in FIG. 8-6, when the base 8-110 and the frame 8-120 are assembled, the recess 8-116 on the first sidewall 8-115 of the base 8-110 corresponds to the opening 8-122 on the second sidewall 8-121 of the frame 8-116, and the engaging portion 8-123 is extended to the bottom surface 8-111b. The partition 8-117 is disposed between the first sidewall 8-115 and the second sidewall 8-121, so as to facilitate the assembly of the base 8-110 and the frame 8-120.

An adhesive member 8-P can be filled in the recess 8-116 and the opening 8-122. The adhesive member 8-P accommodated in the recess 8-116 and the opening 8-122 is extended along the first sidewall 8-115 through the capillary action, and then filled between the first sidewall 8-115 and the second sidewall 8-121. In detail, the adhesive member 8-P is extended to the position beside the partition 8-117 and the position between the surface 8-111a of the plate 8-111 and the supporting part 8-114. Thus, the gap between the base 8-110 and the frame 8-120 can be filled with the adhesive member 8-P, so as to prevent the intrusion of the external object and increase the adhesive area therebetween.

Furthermore, since the adhesive member 8-P contacts the supporting part 8-114 and the step-shaped structure of the recess 8-116, the adhesive member 8-P can be engaged with the base even if an external force applies on the frame 8-120 in any direction. The adhesive strength between the base 8-110 and the frame 8-120 can be improved.

Referring to FIG. 8-3, the elastic members 8-200 and 8-300 are respectively disposed on opposite sides of the movable portion 8-400, and connect to the movable portion 8-400 and the fixed portion 8-100. The movable portion 8-400 can be hung in the hollow box. For example, the movable portion 8-400 can be a lens holder, and the optical member 8-300 can be affixed to the movable portion 8-400.

The first electromagnetic driving assembly 8-510 and the second electromagnetic driving assembly 8-520 can be respectively disposed on the movable portion 8-400 and the fixed portion 8-100, so as to drive the movable portion 8-400 to move relative to the fixed portion 8-100 along the optical axis of the optical member 8-30. In particular, the first electromagnetic driving assembly 8-510 can be a driving coil, and the second electromagnetic driving assembly 8-520 can be a magnet. When a current flows through the driving coil (the first electromagnetic driving assembly 8-510), the electromagnetic effect is generated between the driving coil and the magnet. Thus, the movable portion 8-400 and the optical member 8-30 disposed thereon can be driven to move upwardly or downwardly relative to the fixed portion 8-100 and the image sensor along the optical axis of the optical member 8-30, and the purpose of focus adjustment can be achieved.

In this embodiment, the second magnetic driving assembly 8-520 can be affixed to the toothed structure 8-118 of the base 8-110 using glue, so as to increase the adhesive area. The second magnetic driving assembly can be stably affixed to the base 8-110.

The circuit board 8-600 can be disposed on the frame 8-120 of the fixed portion 8-100, and electrically connected to the metal wire 8-130 in the base 8-110. As shown in FIG. 8-7, when the adhesive member 8-P is not filled, the user can connect the circuit board 8-600 to the metal wire 8-130 with solder 8-L outside the optical driving mechanism 8-10. When the adhesive member 8-P is filled, the solder 8-L can be covered by the adhesive member 8-P, so as to achieve an integrated appearance and prevent short circuits (as shown in FIG. 8-2). In some embodiments, the elastic members 8-200 and 8-300 and metal wire 8-130 can be also connected using solder 8-L, and covered by the adhesive member 8-P.

The sensor 8-710 of the position detecting module 8-700 is disposed on the circuit board 8-600, and the sensing object 8-720 is disposed on the movable portion 8-400. The sensor 8-710 can determine the position of the fixed portion 8-100 in the Z-axis by detecting the movement of the sensing object 8-720. For example, the sensor 8-710 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and the sensing object 8-720 can be a magnet.

Figures 3, 4, 5, 6, 7, 8, 8A:
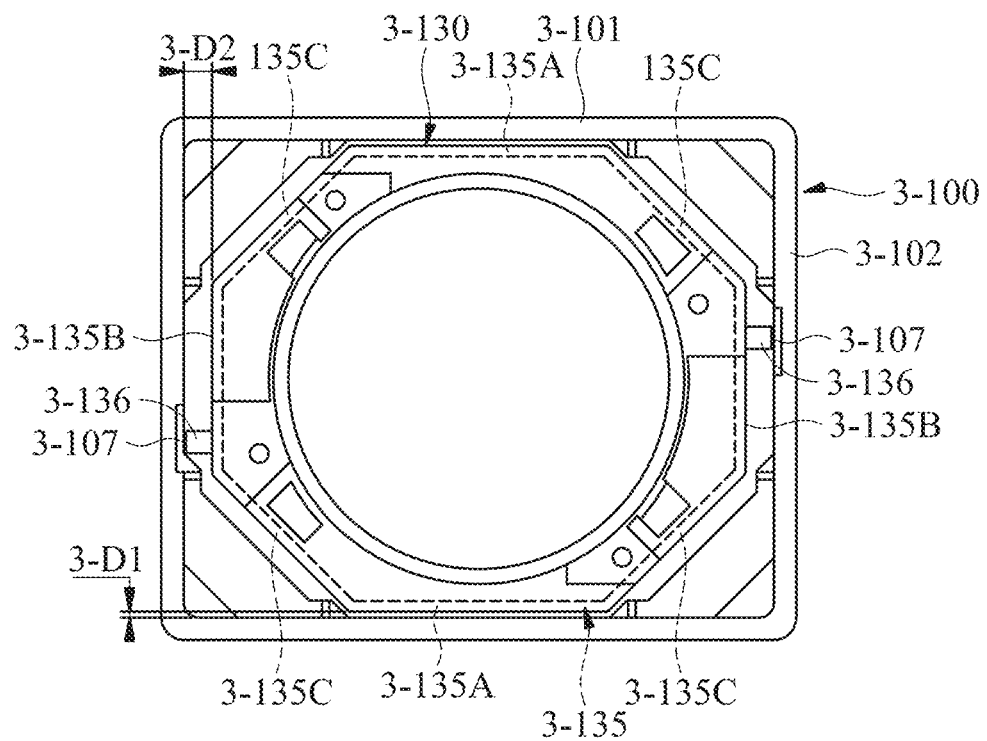
Figures 3, 4, 5, 6, 7, 8, 8B:
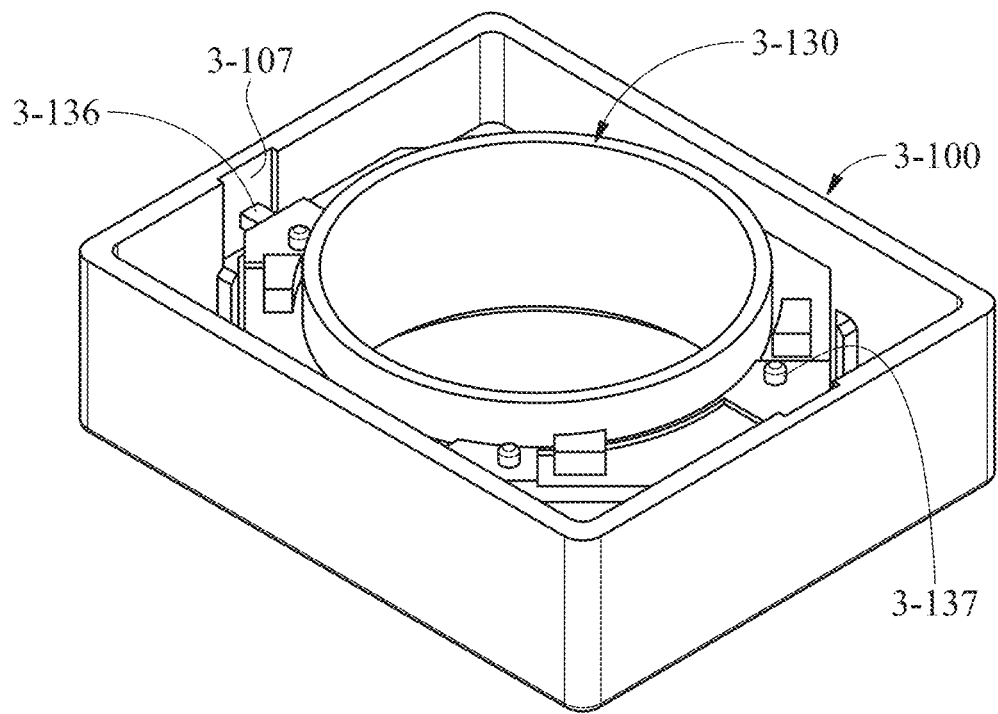
Figures 3, 4, 5, 6, 7, 8, 8C:
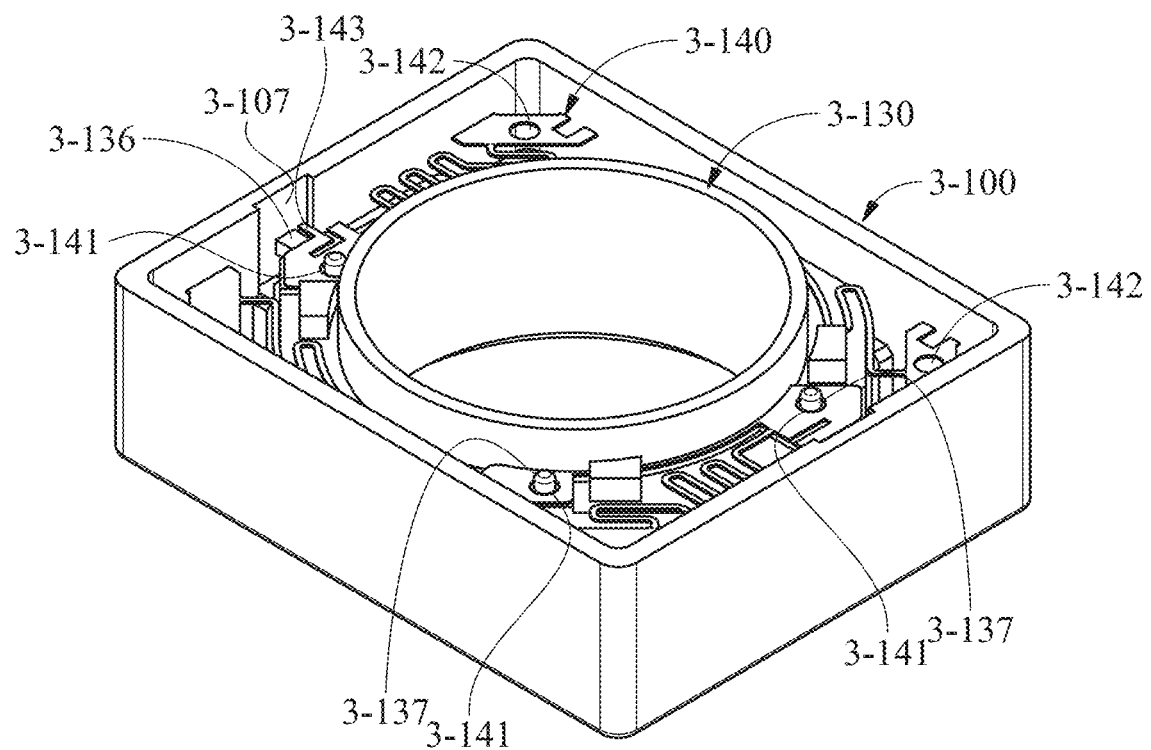
Figures 3, 4, 5, 6, 7, 8, 9, 9A:
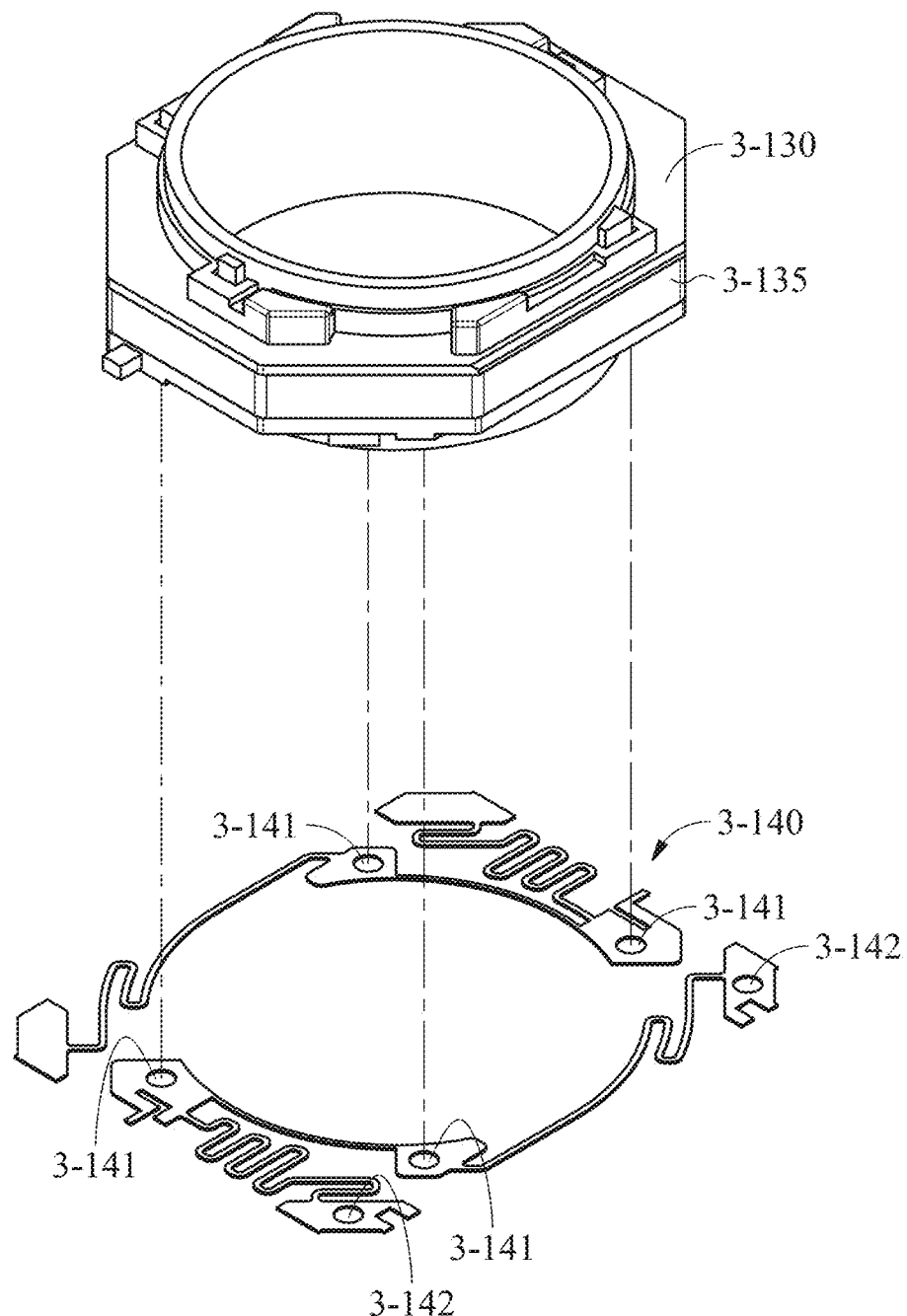
Figures 3, 4, 5, 6, 7, 8, 9, 9B:
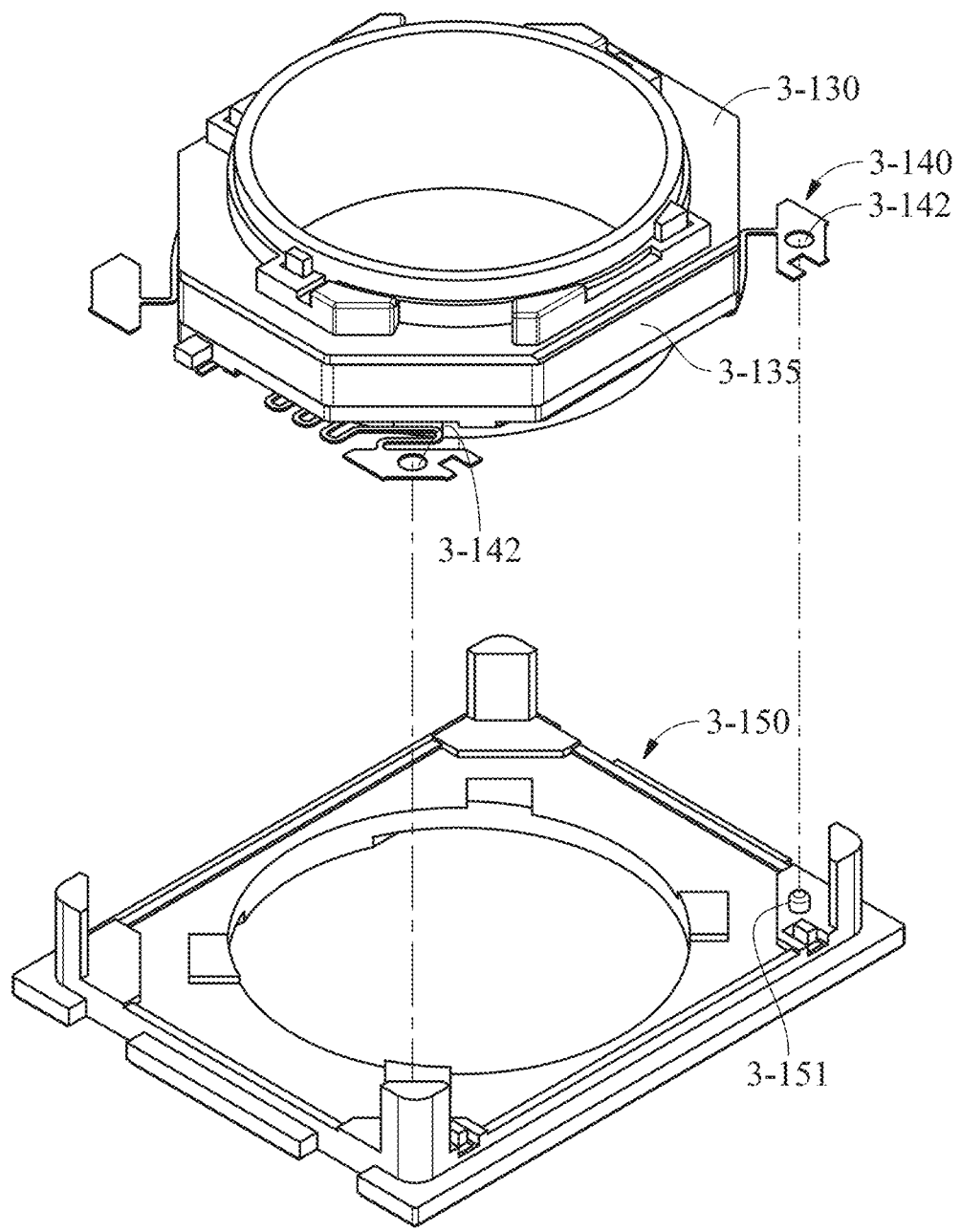
Figures 3, 4, 5, 6, 7, 8, 9, 9C:
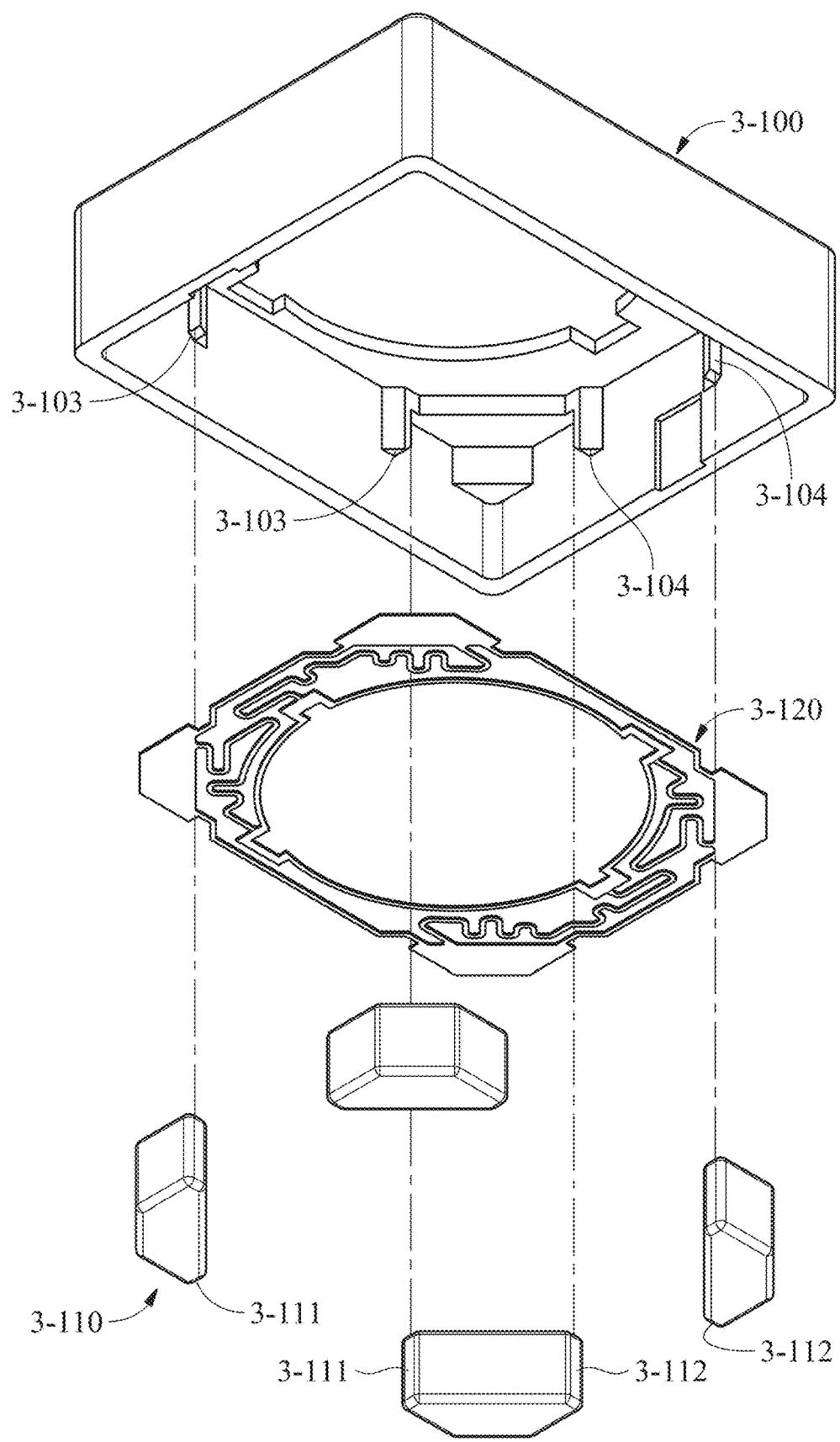
Figures 3, 4, 5, 6, 7, 8, 9, 9D:
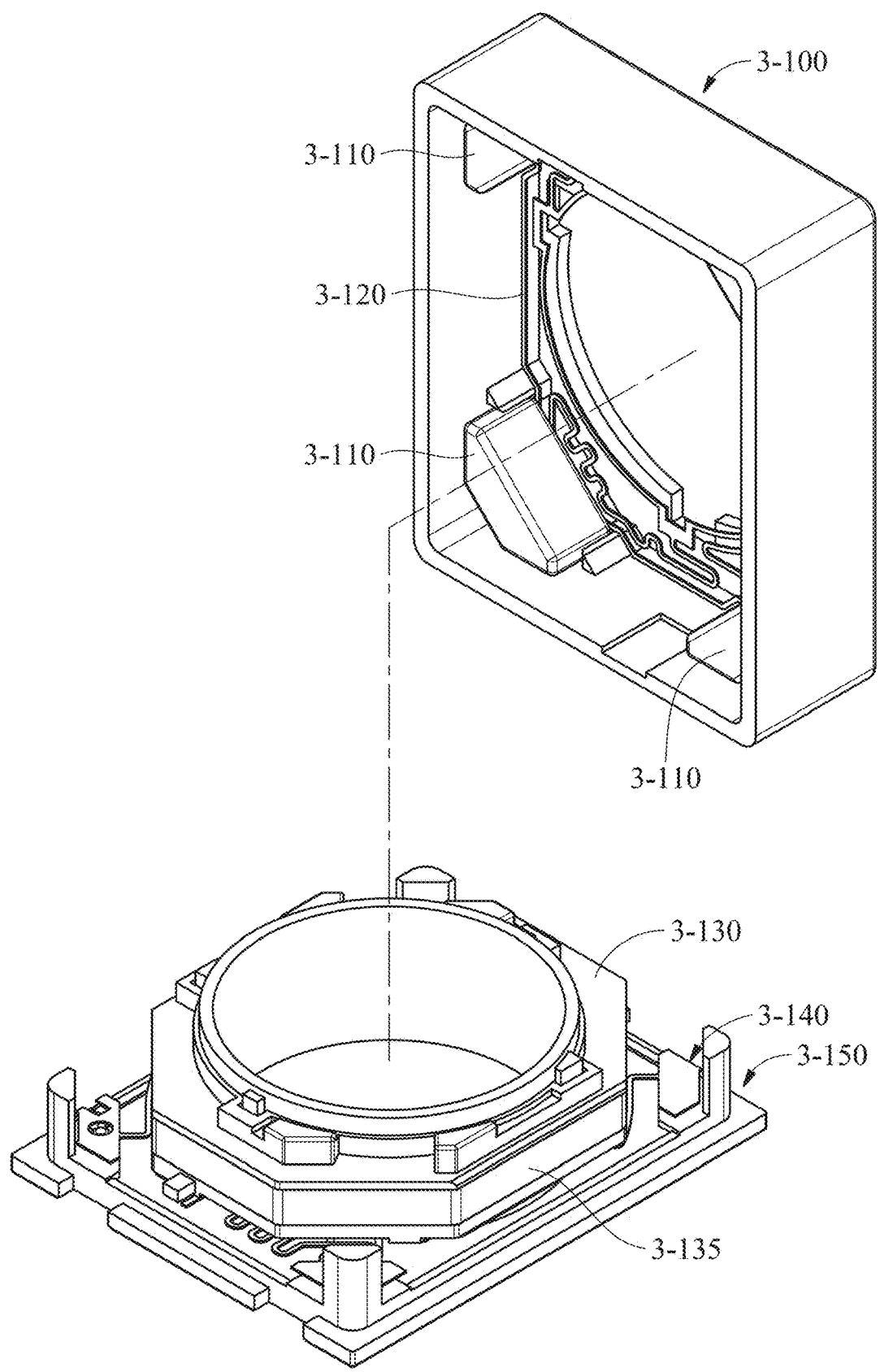

Referring to FIG. 8-8A, in another embodiment, the protrusions 8-112 on the same side of the base 8-110 of the fixed portion 8-100 can have different heights, and the appearances of the recesses 8-116 thereon can be adjusted accordingly. As shown in FIG. 8-8B, when the driving mechanism 8-10 comprises this base 8-110, glue 8-G can be applied to the protrusion 8-112 with low height to attach the second magnetic driving assembly 8-520, and the miniaturized driving mechanism 8-10 can be obtained.

As shown in FIG. 8-9, in another embodiment, the second electromagnetic assembly 8-520 is affixed to the frame 8-120 of the fixed portion 8-100. When the current does not flow through the first electromagnetic assembly 8-510 (driving coil), the first electromagnetic assembly 8-510 contacts and attaches the base 8-110. In other words, the distance between the second electromagnetic assembly 8-520 (magnetic member) and the bottom surface 8-111b of the base 8-110 is greater than the distance between the first electromagnetic assembly 8-510 and the bottom surface 8-111b. Therefore, the user can ensures that the movable portion 8-400 is not inclined relative to the fixed portion 8-100, and other members (such as the elastic member 8-300) can use the space below the second electromagnetic driving assembly 8-520.

As shown in FIGS. 8-10A and 8-10B, in another embodiment, the protrusion 8-112 of the base 8-110 has a first end 8-112a and a second end 8-112b, wherein the first end 8-112a is farther from the first sidewall 8-115 than the second end 8-112b, and the width 8-D1 of the first end 8-112a is less than the width 8-D2 of the second end 8-112b. Therefore, the space in the hollow box can be released for use by other members.

Referring to FIG. 8-11, in another embodiment, a depression portion 8-R can be formed on the bottom surface 8-111b of the base 8-110. The appearance of the depression portion 8-R corresponds to the appearance of the image sensor. That is, the depression portion 8-R can have the wide section and the narrow section. The narrow section is used to provide space for disposing the pins 8-131c connected to the image sensor. Furthermore, a process can be applied on the bottom surface 8-111b of the base 8-110 to increase its roughness, so as to facilitate the connection of the other external member (such as the aforementioned image sensor).

Referring to FIG. 8-12, in another embodiment, the movable portion 8-400 has a winding pole 8-410, and a lead on the end of the first electromagnetic driving assembly 8-510 can wrap around the winding pole 8-410. For avoiding the collision between the winding pole 8-410 and the second electromagnetic driving assembly 8-520 during the movable portion moves, the second electromagnetic driving assembly 8-520 can disposed in a deviation manner. As shown in FIG. 8-12, the upper and lower second electromagnetic driving assemblies 8-520 in the figure deviate along the direction away from the winding poles 8-410. The center of the movable portion 8-400 is disposed between the winding pole 8-410 and the center of the second electromagnetic driving assembly 8-520 (as observed from the direction perpendicular to the longitudinal axis of the second electromagnetic driving assembly 8-520). The left and right second electromagnetic driving assemblies 8-520 respectively move downwardly and upwardly according to the deviation directions of the upper and lower second electromagnetic driving assemblies 8-520. The driving module 8-500 can therefore provide uniform driving force on the movable portion 8-400.

Referring to FIG. 8-13A, in another embodiment, the pin 8-131 of the metal wire 8-130 embedded in the base 8-110 is exposed from the recess 8-116 for positioning the metal wire 8-130 (the adhesive member 8-P has not been filled in the figure, and the pin 8-131 can be covered by the adhesive member 8-P after filling). For preventing the short circuit between the frame 8-120 and the pin 8-131 when assembling, the opening 8-122 of the frame 8-120 is extended to its bottom.

Furthermore, as shown in FIG. 8-12B, in this embodiment, as observed from the optical axis of the optical member 8-30, each of the metal wires 8-130 and the elastic member 8-300 overlap at two positions, and the aforementioned positions are located at the different corners of the base 8-110. Therefore, the miniaturized driving mechanism 8-10 can be obtained, and increased structural strength can be achieved.

FIG. 9-1 is an exploded view of a lens module in accordance with an embodiment of the disclosure. It should be noted that the lens module may be provided in handheld digital products such as mobile phones or tablet PCs. The lens module 9-10 primarily comprises a driving mechanism and an optical element 9-E received therein. In this embodiment, the driving mechanism may constitute a voice coil motors (VCM), and the optical element 9-E may comprise an optical lens to achieve auto-focus (AF) function.

As shown in FIG. 9-1, the driving mechanism comprises a housing 9-H, a frame 9-F, an upper spring 9-S1, at least a lower spring 9-S2, a base 9-B, a holder 9-R, a circuit board 9-P, at least a longitudinal magnet 9-M, and at least a coil 9-C corresponding to the magnet 9-M. The holder 9-R is connected to the frame 9-F and the base 9-B through the upper and lower springs 9-S1 and 9-S2 (resilient elements), so that the holder 9-R is suspended in the housing 9-H. The optical element 9-E is affixed in the holder 9-R, and the magnet 9-M and the coil 9-C can constitute a drive assembly for driving the holder 9-R and the optical element 9-E to move along an optical axis 9-O of the optical element 9-E, so as to achieve auto-focus (AF) of the lens module.

In this embodiment, the frame 9-F has a quadrilateral structure, wherein two columns 9-F1 and a stop surface 9-F2 are formed on a side of the frame 9-F, corresponding to an opening of the upper spring 9-S1. A recess 9-F10 is formed between the two columns 9-F1 for receiving the electronic component on the circuit board 9-P. The stop surface 9-F2 can contact and restrict the holder 9-R in a limit position, so as to protect the electronic component from being impacted and damaged by the holder 9-R. Additionally, since the lower spring 9-S2 has a deformable portion longer than the upper spring 9-S1, the hardness of the lower spring 9-S2 may be greater than that of the upper spring 9-S1 to sufficiently support the holder 9-R and the optical element 9-E, and excessive deformation and mechanical failure of the lower spring 9-S2 can be also prevented.

FIG. 9-2 is a schematic view of the lens module in FIG. 9-1 after assembly, wherein the optical element 9-E is removed therefrom. FIG. 9-3 is a cross-sectional view taken along the line 9A1-9A1 in FIG. 9-2, and FIG. 9-4 is a cross-sectional view taken along the line 9A2-9A2 in FIG. 9-2. FIG. 9-5 is a schematic view of the driving mechanism in FIG. 9-2 with the housing 9-H removed therefrom. Referring to FIGS. 9-1 to 9-5, two multipolar magnets 9-M and two coils 9-C are disposed in the driving mechanism. Each of the magnets 9-M comprises two magnetic units 9-M1 and 9-M2 having opposite polar directions, as shown in FIGS. 9-1 and 9-3. The two coils 9-C have an oval-shaped structure and are affixed to opposite sides of the holder 9-R, corresponding to the magnets 9-M. When a current is applied to the coil 9-C, an electromagnetic force can be generated between the coil 9-C and the magnet 9-M for driving the holder 9-R and the optical element 9-E to move relative to the housing 9-H along the optical axis 9-O.

Still referring to FIGS. 9-1 to 9-5, the housing 9-H is affixed to the base 9-B, wherein the frame 9-F, the upper spring 9-S1, the lower spring 9-S2, the holder 9-R, the circuit board 9-P, the magnets 9-M, and the coils 9-C are received in a space between the housing 9-H and the base 9-B. In this embodiment, the frame 9-F and the circuit board 9-P are affixed to an inner surface of the housing 9-H. The magnets 9-M and an outer portion of the upper spring 9-S1 are affixed to a lower surface of the frame 9-F, and the upper and lower springs 9-S1 and 9-S2 respectively connect the holder 9-R with the frame 9-F and the base 9-B. It should be noted that the housing 9-H may comprise metal material and form two extending portions 9-H1 (FIG. 9-2) respectively extending to two recesses 9-R1 of the holder 9-R (FIG. 9-5), so that the electromagnetic force generated between the magnet 9-M and the coil 9-C can be enhanced, and the holder 9-R can rotate relative to the housing 9-H within a specific range to prevent mechanical failure due to excessive rotation of the holder 9-R.

FIG. 9-6A is a schematic view showing relative position of the frame 9-F, the circuit board 9-P, and three electronic elements 9-G1 to 9-G3 after assembly of the driving mechanism. Referring to FIGS. 9-5 and 9-6A, the frame 9-F has a quadrilateral structure and forms at least a vertical surface 9-F3 that connects two adjacent sides of the quadrilateral structure. Specifically, the vertical surface 9-F3 is adjacent to the housing 9-H but not in contact with the housing 9-H. In this embodiment, the vertical surface 9-F3 is parallel to the optical axis 9-O (Z axis) and angled with respect to the two adjacent sides of the quadrilateral structure. For example, the vertical surface 9-F3 may be angled with respect to the X and Y axes at 45 degrees.

Additionally, at least one side of the frame 9-F forms a longitudinal sloping surface 9-F32 (depressed surface) adjacent to the housing 9-H but not in contact with the housing 9-H. The sloping surface 9-F32 is parallel to the X axis or the Y axis, and it is angled with respect to the Z axis (e.g. 45 degrees). Thus, a groove can be formed between the inner surface of the housing 9-H and the vertical surface 9-F31/ sloping surface 9-F32 for guiding the glue to flow, thus efficiently preventing overflow of the glue and enhancing adhesion strength between the housing 9-H and the frame 9-F.

In another embodiment as shown in FIG. 9-6B, the L-shaped depressed surface 9-F32' can substitute for the sloping surface 9-F32 in FIGS. 9-3 to 9-6A, wherein the depressed surface 9-F32' is adjacent to the housing 9-H but not in contact with the housing 9-H. Thus, a groove can be formed between the inner surface of the housing 9-H and the depressed surface 9-F32', thereby preventing overflow of the glue and enhancing adhesion strength between the housing 9-H and the frame 9-F.

Referring to FIG. 9-6A, the electronic element 9-G1 (such as an integrated circuit element) on the inner surface of the circuit board 9-P is accommodated in the recess 9-F10 between the two columns 9-F1 of the frame 9-F, and the electronic element 9-G2 (such as a displacement sensing element) and the electronic element 9-G3 (such as a filter element) are disposed outside the recess 9-F10. It should be noted that the columns 9-F1 can be used to position and protect the electronic element 9-G1, and the stop surface 9-F2 can contact the holder to prevent the electronic element 9-G1 from being impacted and damaged by the holder 9-R.

FIG. 9-7 is a schematic view showing relative position of the magnets 9-M, the coils 9-C, the holder 9-R, the circuit board 9-P, and the electronic elements 9-G1 to 9-G3 after assembly of the driving mechanism. As shown in FIGS. 9-1, 9-5, and 9-7, two magnetic elements 9-D1 and 9-D2 (such as magnets) are affixed to opposite sides of the holder 9-R and located close to two corners of the holder 9-R. Thus, weight balance of the driving mechanism can be improved, and the magnetic attractive forces generated between the housing 9-H and the magnetic elements 9-D1 and 9-D2 can also be balanced to prevent unexpected tilt of the lens module. Specifically, the two recesses 9-R1 for receiving the extending portions 9-H1 of the housing 9-H in FIG. 9-2 are located close to the other two corners of the holder 9-R, different from the corners where the two magnetic elements 9-D1 and 9-D2 are located (FIG. 9-7).

It should be noted that the electronic element 9-G2 (displacement sensing element) is located near the magnetic element 9-D1, and displacement of the holder 9-R and the optical element 9-E relative to the housing 9-H along the Z axis can be detected by the electronic element 9-G2, so as to achieve auto-focus (AF) of the lens module. In some embodiments, the electronic element 9-G2 may be a Hall effect sensor, MR sensor, or Fluxgate sensor.

FIG. 9-8 is a partial cross-sectional view showing a holder 9-R and an optical element 9-E in accordance with another embodiment of the disclosure. As shown in FIG. 9-8, the optical element 9-E has a curved outer surface 9-E1, and the holder 9-R forms at least a rib 9-R2 and an annular bottom portion 9-R3 below the rib 9-R2. The rib 9-R2 protrudes from an inner surface of the holder 9-R toward the curved outer surface 9-E1, and the bottom portion 9-R3 is closer to the optical element 9-E than the rib 9-R2. During assembly, the glue can be disposed in a space 9-RL between the optical element 9-E and the rib 9-R2, and the rib 9-R2 can guide the glue to smoothly flow around the curved outer surface 9-E1, thereby preventing overflow of the glue and enhancing the adhesion strength between the holder 9-R and the optical element 9-E.

FIG. 9-9 is an exploded view showing a frame 9-F, two magnetic conductive members 9-Q, two magnets 9-M, a holder 9-R, and a coil 9-C in accordance with another embodiment of the disclosure. FIG. 9-10 is a cross-sectional view of the frame 9-F, the magnetic conductive members 9-Q, the magnets 9-M, the holder 9-R, and the coil 9-C in FIG. 9-9 after assembly. As shown in FIG. 9-9, another embodiment of the driving mechanism comprise two magnetic conductive members 9-Q which has metal material and can be integrally formed with the plastic frame 9-F by insert molding, so as to increase the structural strength of the driving mechanism. It should be noted that the frame 9-F not only forms the vertical surfaces 9-F31 and the sloping surfaces 9-F32 as described in the foregoing embodiments, but also forms at least a sloping surface 9-F33 at a corner of the frame 9-F. It should be noted that the sloping surface 9-F33 is connected to the vertical surface 9-F31 and the sloping surface 9-F32, and is angled with respect to the X, Y, and Z axes (e.g. 45 degrees), so that a groove can be formed between the inner surface of the housing 9-H and the sloping surface 9-F33 for receiving and guiding the flue to flow. Thus, overflow of the glue can be efficiently prevented, and adhesion strength between the housing 9-H and the frame 9-F can be also enhanced.

Still referring to FIGS. 9 and 10, the two magnetic conductive members 9-Q are disposed on opposite sides of the frame 9-F and respectively have an inverted U-shaped structure. The magnet 9-M can be affixed to the frame 9-F and received in the inverted U-shaped structure, so that the magnetic field distribution of the magnet 9-M can be improved by the magnetic conductive member 9-Q, to enhance the electromagnetic driving force generated by the magnet 9-M and the coil 9-C.

FIG. 9-11 is an exploded view showing a frame 9-F and a magnetic conductive member 9-Q in accordance with another embodiment of the disclosure. FIG. 9-12 is an exploded view showing the frame 9-F and the magnetic conductive member 9-Q in FIG. 9-11, two magnets 9-M, a holder 9-R, and a coil 9-C disposed on the holder 9-R. FIG. 9-13 is a cross-sectional view of the frame 9-F, the magnetic conductive member 9-Q, the magnets 9-M, the holder 9-R, and the coil 9-C in FIG. 9-12 after assembly. As shown in FIG. 9-11, the conductive member 9-Q in this embodiment can substitute for the two magnetic conductive members 9-Q in FIGS. 9-9 and 9-10. Here, the conductive member 9-Q may comprise metal and have a hollow polygonal structure, and it can be integrally formed with the plastic frame 9-F by insert molding, so as to increase the structural strength of the driving mechanism and enhance the electromagnetic driving force generated by the magnet 9-M and the coil 9-C.

As shown in FIGS. 9-11 to 9-13, the conductive member 9-Q has two inverted U-shaped structures on opposite sides of the frame 9-F and corresponding to the magnets 9-M. The two magnets 9-M are affixed to the frame 9-F and received in the inverted U-shaped structures, respectively. It should be noted that a protrusion 9-Q1 is formed on the top of the inverted U-shaped structure and extended upwardly toward a light incident side of the optical axis 9-O (Z axis). The protrusion 9-Q1 is located corresponding to the coil 9-C (FIG. 9-13), so that the holder 9-R and the coil 9-C can move with respect to the frame 9-F within a large range along the Z axis to enhance the auto-focus (AF) function.

FIG. 9-14 is a schematic view showing relative position of a frame 9-F, an upper spring 9-S1, and four magnets 9-M after assembly of a driving mechanism, in accordance with another embodiment of the disclosure. Referring to FIG. 9-14, the frame 9-F in this embodiment forms several stages 9-F4 protruding from a bottom side thereof. Moreover, at least one thickened portion 9-F5 is formed on an inner side of the frame 9-F. Since the thickened portion 9-F5 extends toward the center of the frame 9-F, the adhesion area between the frame 9-F and the upper spring 9-S1 can be increased, and the structural strength of the driving mechanism can also be enhanced.

It should be noted that at least a gap 9-G is formed between the frame 9-F and the upper spring 9-S1 in a vertical direction, and the gap 9-G is located between two adjacent stages 9-F4 in a horizontal direction. Therefore, the poor positioning accuracy and assembly difficulty owing to excessively large bonding area between the frame 9-F and the upper spring 9-S1 can be circumvented.

FIG. 9-15 is a schematic view showing relative position of a frame 9-F, an upper spring 9-S1, and four magnets 9-M after assembly of a driving mechanism, in accordance with another embodiment of the disclosure. Referring to FIG. 9-15, the frame 9-F has a polygonal structure and comprises magnetic conductive material, wherein at least a recess 9-F6 is formed close to a corner of the frame 9-F for receiving and guiding the glue between the housing 9-H and the frame 9-F, so as to efficiently prevent overflow of the glue and enhance adhesion strength between the housing 9-H and the frame 9-F. In some embodiments, the frame 9-F may also be affixed to the housing 9-H by soldering or welding process to further enhance the connection strength thereof.

FIG. 9-16 is a cross-sectional view showing a holder 9-R, at least one lower spring 9-S2, and a base 9-B after assembly of a driving mechanism, in accordance with another embodiment of the disclosure. Referring to FIG. 9-16, the base 9-B in this embodiment is affixed to the housing 9-H of the driving mechanism, wherein the base 9-B forms a connection surface 9-B1, a restricting surface 9-B2, and a recessed portion 9-B3 between the connection surface 9-B1 and the restricting surface 9-B2. During assembly of the driving mechanism, the glue is disposed on the connection surface 9-B1, so that a part of the lower spring 9-S2 can be adhered to the connection surface 9-B 1. Moreover, when the holder 9-R moves downwardly relative to the base 9-B along the Z axis, a contact portion 9-R4 of the holder 9-R can contact the restricting surface 9-B2, so that the holder 9-R is restricted in a limit position, wherein the restricting surface 9-B2 is lower than the connection surface 9-B1. It should be noted that the recessed portion 9-B3 is lower than the connection surface 9-B1 and the restricting surface 9-B2 in the Z direction. Thus, the glue can be received and guided by the recessed portion 9-B3, to prevent the glue from flowing to the restricting surface 9-B2 and contacting the holder 9-R.

In summary, a driving mechanism having two adjacent sides with unequal lengths is provided in this disclosure. The space in the driving mechanism may be effectively utilized to achieve mechanism miniaturization through this arrangement. Furthermore, the elastic member in the driving mechanism has strings with different structures, thereby allowing the presence of the driving mechanism having two asymmetric sides.

In summary, the present disclosure provides a driving mechanism with a damping member, which is disposed between the positioning member and the carrier, and is in direct contact with the former two. Therefore, the stability of the driving mechanism can be enhanced. In addition, the present disclosure provides a driving mechanism including a positioning member with a trench, and thereby the contact area of the adhesive may be increased. The bonding strength is enhanced.

In summary, the driving mechanism of the present disclosure utilizes the design of the position element to reduce the pollution particles. The buffer groove allows the elastic element to prevent deformation portion colliding with the carrying base in the frame. Moreover, with the dustproof ring design, fewer contaminating particles fall on the optical element. Moreover, the design of the carrying base in the present disclosure may prevent the deformation portion of the elastic element from colliding with the carrying base.

In summary, the driving mechanism of the present disclosure may set a plurality of stop portions in the carrying base, so as to disperse the impact force of the carrying base on the frame or the base. Therefore, the driving mechanism can be protected and the strength of the carrying base can be improved.

In summary, a driving mechanism is provided, including a carrier, an optical lens, a first electromagnetic driving assembly, a fixed portion, and a first elastic member. The carrier has a side wall, and the optical lens is disposed in the carrier. The first electromagnetic driving assembly is disposed on the carrier. The side wall is disposed between the optical lens and the first electromagnetic driving assembly, and the optical lens and the first electromagnetic driving assembly is in contact with the side wall. The first elastic member is connected to the carrier and the fixed portion. At least a portion of the first elastic member overlaps the side wall as observed from the optical axis of the optical lens.

In summary, a driving mechanism for supporting an optical member is provided, including a base, a frame, a movable portion, a driving module, and an adhesive member. The base includes a plurality of first sidewalls, and at least one recess is formed on the first sidewalls. The frame includes a plurality of second sidewalls, and at least one opening is formed on the second sidewalls. The base and the frame can form a hollow box, and the opening corresponds to the recess. The movable portion and the driving module are disposed in the hollow box. The driving module can drive the movable portion to move relative to the base. The adhesive member is accommodated in the opening and the recess, and extended along the first sidewalls. The adhesive member is disposed between the first sidewalls and the second sidewalls, and the first and second sidewalls are parallel to the optical axis of the optical member.

In summary, the disclosure provides a driving mechanism for moving an optical element. According to some embodiments, a frame of the driving mechanism may form a depressed or sloping surface which is angled with respect to the optical axis of the optical element. According to some embodiments, a frame or a base of the driving mechanism may have specific structures for receiving or guiding the flue. Thus, overflow of the glue during assembly and malfunction of the driving mechanism can be prevented. Additionally, one or several magnetic conductive members may also be disposed on the frame, so as to enhance the electromagnetic driving force generated by the magnet and the coil and improve the structural strength of the driving mechanism.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

The disclosed features may be combined, modified, or replaced in any suitable manner in one or more disclosed embodiments, but are not limited to any particular embodiments.

What is claimed is:

1. A driving mechanism for moving an optical element, comprising:
  a movable portion for connecting the optical element;
  a fixed portion, wherein the movable portion is movable relative to the fixed portion;
  a driving assembly, driving the movable portion to move relative to the fixed portion; and
  a first resilient element having a board structure, the movable portion is movably connected to the fixed portion via the first resilient element;
  wherein the fixed portion includes:
    a connection surface, wherein at least a portion of the first resilient element is disposed on the connection surface;
    a restricting surface, contacting and restricting the movable portion; and
    a recessed portion located between the connection surface and the restricting surface, wherein the recessed portion is lower than the connection surface and the restricting surface.

2. The driving mechanism as claimed in claim 1, wherein the restricting surface is lower than the connection surface.

3. The driving mechanism as claimed in claim 1, wherein the first resilient element connects the movable portion with the fixed portion.

4. The driving mechanism as claimed in claim 1, further comprising a housing, wherein the fixed portion is connected to the housing, and the movable portion is movably disposed in the housing.

5. The driving mechanism as claimed in claim 4, wherein the housing comprises metal material and forms two extending portions respectively extending to two recesses of the movable portion.

6. The driving mechanism as claimed in claim 4, further comprising a frame affixed to the housing and forming a depressed surface adjacent to the housing, wherein the depressed surface faces the housing and is not in contact with the housing, wherein the depressed surface is a sloping surface angled with respect to an optical axis of the optical element.

7. The driving mechanism as claimed in claim 6, further comprising a second resilient element having a board structure, wherein the second resilient element connects the movable portion with the frame.

8. The driving mechanism as claimed in claim 7, wherein the hardness of the first resilient element is greater than the hardness of the second resilient element.

9. The driving mechanism as claimed in claim 6, wherein the frame has a polygonal structure and forms a vertical surface connecting two adjacent sides of the polygonal structure, wherein the vertical surface is parallel to the optical axis and angled with respect to the two adjacent sides of the polygonal structure.

10. The driving mechanism as claimed in claim 6, wherein the frame has a polygonal structure, and the sloping surface is formed at a corner of the polygonal structure, wherein the sloping surface is angled with respect to two adjacent sides of the polygonal structure.

11. The driving mechanism as claimed in claim 6, further comprising a magnetic conductive member affixed to the frame, wherein the driving assembly comprises a magnet affixed to the magnetic conductive member and a coil affixed to the holder, and at least a part of the magnet is received in the magnetic conductive member.

12. The driving mechanism as claimed in claim 11, wherein the magnetic conductive member comprises metal material, and the frame comprises plastic material, wherein the frame and the magnetic conductive member are integrally formed in one piece by insert molding.

13. The driving mechanism as claimed in claim 11, wherein the magnetic conductive member has an inverted U-shaped structure.

14. The driving mechanism as claimed in claim 13, wherein the inverted U-shaped structure has a protrusion extending toward a light incident end of the optical axis, and the protrusion and the coil at least partially overlap along the optical axis.

15. The driving mechanism as claimed in claim 11, wherein at least a part of the coil is received in the magnetic conductive member.

16. The driving mechanism as claimed in claim 11, wherein the magnetic conductive member has a hollow polygonal structure.

17. The driving mechanism as claimed in claim 1, wherein the optical element forms a curved outer surface, and an inner surface of the movable portion forms a rib protruding toward the curved outer surface.

18. The driving mechanism as claimed in claim 17, wherein the movable portion further forms an annular bottom portion closer to the optical element than the rib.

19. The driving mechanism as claimed in claim 17, further comprising a glue disposed between the curved outer surface and the rib.

20. The driving mechanism as claimed in claim 1, further comprising a glue disposed between the connecting surface and the first resilient element.

* * * * *